United States Patent
Cirik et al.

(10) Patent No.: US 12,501,426 B2
(45) Date of Patent: Dec. 16, 2025

(54) RESOURCE CONFIGURATION FOR OVERLAPPING TRANSMISSIONS

(71) Applicant: Comcast Cable Communications, LLC, Philadelphia, PA (US)

(72) Inventors: Ali Cagatay Cirik, Chantilly, VA (US); Hua Zhou, Vienna, VA (US); Esmael Hejazi Dinan, McLean, VA (US); Gautham Prasad, Herndon, VA (US); Hyoungsuk Jeon, Centreville, VA (US); Kai Xu, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 412 days.

(21) Appl. No.: 18/165,674

(22) Filed: Feb. 7, 2023

(65) Prior Publication Data

US 2023/0254853 A1    Aug. 10, 2023

Related U.S. Application Data

(63) Continuation of application No. 18/165,481, filed on Feb. 7, 2023.
(Continued)

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0048* (2013.01); *H04L 5/0085* (2013.01);
(Continued)

(58) Field of Classification Search
None
See application file for complete search history.

(56) References Cited

U.S. PATENT DOCUMENTS 10,560,901 B2    2/2020  Jung et al.
10,778,367 B2    9/2020  Zhou et al.
(Continued)

FOREIGN PATENT DOCUMENTS

EP       3917223 A1    12/2021
TW    202127949 A     7/2021
(Continued)

OTHER PUBLICATIONS

3GPP TS 38.214; Physical Layer Procedures for Data (Release 17) (Jan. 5, 2022).*
(Continued)

*Primary Examiner* — Andrew C Oh
(74) *Attorney, Agent, or Firm* — Banner & Witcoff, Ltd.

(57) ABSTRACT

A wireless device may communicate with a base station by using overlapping transmissions. Information such as a channel state information (CSI) report may be multiplexed in a repetition of a transmission such as a physical uplink shared channel (PUSCH) transmission. A rule may be applied to indicate/determine which repetition, of a plurality of repetitions, comprises the multiplexed information. The rule may comprise including the multiplexed information in a transmission associated with at least one of: a lowest (or highest) frequency or range of frequencies, a lowest (or highest) starting (or ending) resource block, a lowest (or highest) transmission configuration indicator (TCI) state, a lowest (or highest) TCI state index, a lowest (or highest) panel or panel index, and/or any other parameter/indicator that may differentiate a transmission (including the multiplexed information) from other transmission(s).

20 Claims, 39 Drawing Sheets

Related U.S. Application Data

(60) Provisional application No. 63/308,699, filed on Feb. 10, 2022, provisional application No. 63/307,703, filed on Feb. 8, 2022, provisional application No. 63/307,299, filed on Feb. 7, 2022, provisional application No. 63/307,301, filed on Feb. 7, 2022.

(51) Int. Cl.
*H04W 52/36* (2009.01)
*H04W 72/044* (2023.01)
*H04W 72/0446* (2023.01)
*H04W 72/21* (2023.01)
*H04W 72/23* (2023.01)
*H04W 72/232* (2023.01)

(52) U.S. Cl.
CPC ..... *H04W 52/365* (2013.01); *H04W 72/0446* (2013.01); *H04W 72/0473* (2013.01); *H04W 72/21* (2023.01); *H04W 72/23* (2023.01); *H04W 72/232* (2023.01)

(56) References Cited

U.S. PATENT DOCUMENTS

| | | |
|---|---|---|
| 11,089,585 B2 | 8/2021 | Xu et al. |
| 2015/0271765 A1 | 9/2015 | Hakola et al. |
| 2017/0208590 A1* | 7/2017 | Kim ................ H04W 72/0453 |
| 2017/0273056 A1 | 9/2017 | Papasakellariou |
| 2018/0279376 A1 | 9/2018 | Dinan et al. |
| 2019/0044664 A1 | 2/2019 | Takeda et al. |
| 2019/0104536 A1 | 4/2019 | Wang et al. |
| 2019/0230683 A1 | 7/2019 | Akkarakaran et al. |
| 2019/0313342 A1 | 10/2019 | Papasakellariou |
| 2020/0053820 A1 | 2/2020 | Chin et al. |
| 2020/0107272 A1 | 4/2020 | He et al. |
| 2020/0137821 A1 | 4/2020 | Cirik et al. |
| 2020/0145936 A1 | 5/2020 | Lee |
| 2020/0145967 A1 | 5/2020 | Park et al. |
| 2020/0204312 A1 | 6/2020 | Xu et al. |
| 2020/0213955 A1 | 7/2020 | Hosseini et al. |
| 2020/0221310 A1 | 7/2020 | Babaei et al. |
| 2020/0229227 A1 | 7/2020 | Babaei et al. |
| 2020/0259625 A1 | 8/2020 | Papasakellariou |
| 2020/0267667 A1 | 8/2020 | MolavianJazi et al. |
| 2020/0296673 A1 | 9/2020 | Ouchi et al. |
| 2020/0314761 A1 | 10/2020 | Hosseini et al. |
| 2020/0314858 A1 | 10/2020 | Xu et al. |
| 2020/0351129 A1 | 11/2020 | Kwak et al. |
| 2020/0367208 A1 | 11/2020 | Khoshnevisan et al. |
| 2021/0007138 A1 | 1/2021 | Xu et al. |
| 2021/0022142 A1 | 1/2021 | Wu et al. |
| 2021/0068140 A1 | 3/2021 | Yang et al. |
| 2021/0105790 A1 | 4/2021 | Lin |
| 2021/0112501 A1 | 4/2021 | Dinan et al. |
| 2021/0144720 A1 | 5/2021 | Xu et al. |
| 2021/0184819 A1* | 6/2021 | Takeda ................ H04W 24/10 |
| 2021/0185614 A1 | 6/2021 | Zhou et al. |
| 2021/0194556 A1* | 6/2021 | Ly ................ H04B 7/0626 |
| 2021/0360616 A1 | 11/2021 | Yi et al. |
| 2021/0360660 A1* | 11/2021 | Cozzo ................ H04W 72/535 |
| 2021/0377876 A1 | 12/2021 | Jeon et al. |
| 2021/0410192 A1 | 12/2021 | Ly et al. |
| 2022/0007208 A1 | 1/2022 | Zhou et al. |
| 2022/0007410 A1 | 1/2022 | Cirik et al. |
| 2022/0038935 A1* | 2/2022 | Xiong ................ H04L 1/0026 |
| 2022/0046555 A1 | 2/2022 | Khoshnevisan et al. |
| 2022/0078816 A1 | 3/2022 | Wu et al. |
| 2022/0095330 A1* | 3/2022 | Kang ................ H04B 7/0408 |
| 2022/0104224 A1 | 3/2022 | Choi et al. |
| 2022/0150928 A1 | 5/2022 | Choi et al. |
| 2022/0201502 A1* | 6/2022 | Kang ................ H04B 7/08 |
| 2022/0225388 A1* | 7/2022 | You ................ H04L 1/08 |
| 2022/0255700 A1* | 8/2022 | Jang ................ H04L 5/0044 |
| 2022/0256571 A1 | 8/2022 | Lo et al. |
| 2022/0256572 A1* | 8/2022 | Kim ................ H04W 72/23 |
| 2023/0031429 A1 | 2/2023 | Khoshnevisan et al. |
| 2023/0031875 A1* | 2/2023 | Dai ................ H04L 5/0012 |
| 2023/0035886 A1 | 2/2023 | Chen et al. |
| 2023/0062024 A1 | 3/2023 | Yuan et al. |
| 2023/0224949 A1 | 7/2023 | Yin et al. |
| 2023/0239879 A1* | 7/2023 | Khoshnevisan ...... H04L 5/0044 370/329 |
| 2023/0261694 A1 | 8/2023 | Guo et al. |
| 2023/0291451 A1* | 9/2023 | Su ................ H04L 1/08 |
| 2023/0412238 A1* | 12/2023 | Tran ................ H04W 16/28 |
| 2023/0413253 A1* | 12/2023 | Xue ................ H04W 72/0453 |
| 2023/0421332 A1* | 12/2023 | Hao ................ H04L 1/0026 |
| 2024/0015732 A1* | 1/2024 | Muruganathan ... H04B 7/06952 |
| 2024/0023080 A1 | 1/2024 | Wei et al. |
| 2024/0031948 A1 | 1/2024 | Zhang et al. |
| 2024/0048275 A1* | 2/2024 | Liu ................ H04L 1/08 |
| 2024/0049292 A1* | 2/2024 | Liu ................ H04L 1/1893 |
| 2024/0106614 A1* | 3/2024 | Gao ................ H04B 7/022 |
| 2024/0107521 A1* | 3/2024 | Su ................ H04W 72/1268 |
| 2024/0129097 A1* | 4/2024 | Li ................ H04L 5/0053 |
| 2024/0195483 A1 | 6/2024 | Jang et al. |
| 2025/0016752 A1 | 1/2025 | Deghel et al. |
| 2025/0056594 A1 | 2/2025 | Kim et al. |

FOREIGN PATENT DOCUMENTS

| | | |
|---|---|---|
| WO | 2020/044409 A1 | 3/2020 |
| WO | 2020142929 A1 | 7/2020 |
| WO | 2020187080 A1 | 9/2020 |
| WO | 2020222690 A1 | 11/2020 |
| WO | 2021022511 A1 | 2/2021 |
| WO | 2021034519 A1 | 2/2021 |
| WO | 2021118307 A1 | 6/2021 |
| WO | 2021142432 A1 | 7/2021 |
| WO | 2021168648 A1 | 9/2021 |
| WO | 2021191823 A1 | 9/2021 |
| WO | 2021207567 A1 | 10/2021 |
| WO | 2021/231117 A1 | 11/2021 |
| WO | 2021/260658 A1 | 12/2021 |
| WO | 2021243674 A1 | 12/2021 |
| WO | 2022026449 A1 | 2/2022 |
| WO | 2022031651 A1 | 2/2022 |
| WO | 2022/046717 A1 | 3/2022 |
| WO | 2022/066740 A1 | 3/2022 |
| WO | 2022061118 A2 | 3/2022 |
| WO | 2022076400 A1 | 4/2022 |
| WO | 2022087347 A1 | 4/2022 |
| WO | 2022087348 A2 | 4/2022 |

OTHER PUBLICATIONS

3GPP TS 38.212; Multiplexing and channel coding (Release 17) (Jan. 5, 2022).*
3GPP TS 38.331; Radio Resource Control (RRC) protocol specification (Release 16) (Dec. 23, 2021).*
R1-2108952 3GPP TSG RAN WG1 #106bis-e, e-Meeting, Oct. 11-19, 2021, Source: vivo, Title: Further discussion on Multi-TRP for PDCCH, PUCCH and PUSCH enhancements.
R1-2109104 3GPP TSG RAN WG1#106bis-e, e-Meeting, Oct. 11-19, 2021, Source: Lenovo, Motorola Mobility, Title: Enhancements on Multi-TRP for PDCCH, PUCCH and PUSCH.
R1-2109271 3GPP TSG RAN WG1 #106b-e, e-Meeting, Oct. 11-19, 2021, Source: CMCC, Title: Enhancements on Multi-TRP for PDCCH, PUCCH and PUSCH.
R1-2109469 3GPP TSG RAN WG1 #106b-e, e-Meeting, Oct. 11-19, 2021, Source: Samsung, Title: Enhancements on Multi-TRP for PDCCH, PUCCH and PUSCH.
R1-2109544 3GPP TSG RAN WG1 #106bis-e, e-Meeting, Oct. 11-19, 2021, Source: MediaTek Inc., Title: Enhancements on Multi-TRP for PDCCH, PUCCH and PUSCH.
R1-2109592 3GPP TSG RAN WG1 #106bis-e, e-Meeting, Oct. 11-19, 2021, Source: Intel Corporation, Title: Multi-TRP enhancements for PDCCH, PUCCH and PUSCH.
R1-2109659 3GPP TSG RAN WG1 #106bis-e, e-Meeting, Oct. 11-19, 2021, Source: NTT Docomo, Inc, Title: Discussion on MTRP for reliability.

(56) References Cited

OTHER PUBLICATIONS

R1-2109824 3GPP TSG-RAN WG1 #106-bis-e, e-Meeting, Oct. 11-19, 2021, Source: FGI, Asia Pacific Telecom, Title: Discussion on enhancements on multi-TRP for uplink channels.
R1-2110014 3GPP TSG-RAN WG1 Meeting #106b-e, e-Meeting, Oct. 11-19, 2021, Source: Apple Inc., Title: On Multi-TRP Reliability Enhancement.
R1-2110286 3GPP TSG RAN WG1 #106 bis-e, e-Meeting, Oct. 11-19, 2021, Source: ASUSTek, Title: Discussion on mTRP PXXCH.
R1-2110438 3GPP TSG-RAN WG1 Meeting #106-bis-e, e-Meeting, Oct. 11-Oct. 19, 2021, Source: Moderator (Qualcomm), Title: Summary #1 of [106bis-e-NR-feMIMO-02] Email discussion on multi-TRP for PDCCH.
R1-2110439 3GPP TSG-RAN WG1 Meeting #106-bis-e, e-Meeting, Oct. 11-Oct. 19, 2021, Source: Moderator (Qualcomm), Title: Summary #2 of [106bis-e-NR-feMIMO-02] Email discussion on multi-TRP for PDCCH.
R1-2110440 3GPP TSG-RAN WG1 Meeting #106-bis-e, e-Meeting, Oct. 11-Oct. 19, 2021, Source: Moderator (Qualcomm), Title: Summary #3 of [106bis-e-NR-feMIMO-02] Email discussion on multi-TRP for PDCCH.
R1-2110468 3GPP TSG RAN WG1 #106bis-e, e-Meeting, Oct. 11-19, 2021, Source: Moderator (Nokia, Nokia Shanghai Bell), Title: Summary #1 of Multi-TRP PUCCH and PUSCH Enhancements.
R1-2110469 3GPP TSG RAN WG1 #106bis-e, e-Meeting, Oct. 11-19, 2021, Source: Moderator (Nokia, Nokia Shanghai Bell), Title: Summary #2 of Multi-TRP PUCCH and PUSCH Enhancements.
R1-2110470 3GPP TSG RAN WG1 #106bis-e, e-Meeting, Oct. 11-19, 2021, Source: Moderator (Nokia, Nokia Shanghai Bell), Title: Summary #3 of Multi-TRP PUCCH and PUSCH Enhancements.
R1-2110762 3GPP TSG RAN WG1 #107-e, e-Meeting, Nov. 11-19, 2021, Source: InterDigital, Inc., Title: Discussion on Enhancements for PDCCH, PUCCH, and PUSCH.
R1-2110782 3GPP TSG RAN WG1 Meeting #107-e, e-Meeting, Nov. 11-19, 2021, Source: Huawei, HiSilicon, Title: Enhancements on multi-TRP for reliability and robustness in Rel-17.
R1-2110933 3GPP Tsg Ran WG1#107-e , e-Meeting, Nov. 11-19, 2021, Source: Lenovo, Motorola Mobility, Title: Enhancements on Multi-TRP for PDCCH, PUCCH and PUSCH.
R1-2111477 3GPP TSG RAN WG1 #107-e, e-Meeting, Nov. 11-19, 2021, Source: Intel Corporation, Title: Multi-TRP enhancements for PDCCH, PUCCH and PUSCH.
R1-2111718 3GPP TSG RAN WG1 #107-e, e-Meeting, Nov. 11-19, 2021, Source: Samsung, Title: Enhancements on Multi-TRP for PDCCH, PUCCH and PUSCH.
R1- 2111854 3GPP TSG RAN WG1 #107-e, e-Meeting, Nov. 11-19, 2021, Source: Apple Inc., Title: On Multi-TRP Reliability Enhancement.
R1-2112090 3GPP TSG RAN WG1 #107-e, e-Meeting, Nov. 11-19, 2021, Source: NTT Docomo, Inc, Title: Discussion on MTRP for reliability.
R1-2112269 3GPP TSG RAN WG1 #107-e, e-Meeting, Nov. 11-19, 2021, Source: ASUSTeK, Title: Discussion on mTRP PUSCH.
R1-2112453 3GPP TSG RAN WG1 #107-e, e-Meeting, Nov. 11-19, 2021, Source: Moderator (Qualcomm), Title: Summary #1 of [107-e-NR-feMIMO-02] Email discussion on multi-TRP for PDCCH.
R1-2112454 3GPP TSG RAN WG1 #107-e, e-Meeting, Nov. 11-19, 2021, Source: Moderator (Qualcomm), Title: Summary #2 of [107-e-NR-feMIMO-02] Email discussion on multi-TRP for PDCCH.
R1-2112583 3GPP TSG RAN WG1 #107-e, e-Meeting, Nov. 11-19, 2021, Source: Moderator (Nokia, Nokia Shanghai Bell), Title: Summary #1 of Multi-TRP PUCCH and PUSCH Enhancements.
R1-2112584 3GPP TSG RAN WG1 #107-e, e-Meeting, Nov. 11-19, 2021, Source: Moderator (Nokia, Nokia Shanghai Bell), Title: Summary #2 of Multi-TRP PUCCH and PUSCH Enhancements.
3GPP TS 36.413 V16.2.0 (Jul. 2020), Technical Specification, 3rd Generation Partnership Project; Technical Specification Group Radio Access Network; Evolved Universal Terrestrial Radio Access Network (E-Utran); S1 Application; Protocol (S1AP) (Release 16).
May 15, 2023—Partial International Search Report—PCT/US2023/012480.
R1-2102334 3GPP TSG RAN WG1 Meeting #104bis-e, E-meeting, Apr. 12-20, 2021, Source: Huawei, HiSilicon, Title: Enhancements on multi-TRP for reliability and robustness in Rel-17.
R1-2108074 3GPP TSG-RAN WG1 Meeting #106-e, eMeeting, Aug. 16-27, 2021, Source: Ericsson, Title: On PDCCH, PUCCH and PUSCH enhancements for multi-TRP.
3GPP TS 38.212 V17.0.0 (Dec. 2021) 3rd Generation Partnership Project; Technical Specification Group Radio Access Network; NR; Multiplexing and channel coding (Release 17).
3GPP TS 38.213 V17.0.0 (Dec. 2021) 3rd Generation Partnership Project; Technical Specification Group Radio Access Network; NR; Physical layer procedures for control (Release 17).
3GPP TS 38.214 V17.0.0 (Dec. 2021) 3rd Generation Partnership Project; Technical Specification Group Radio Access Network; NR; Physical layer procedures for data (Release 17).
3GPP TS 38.321 V16.7.0 (Dec. 2021) 3rd Generation Partnership Project; Technical Specification Group Radio Access Network; NR; Medium Access Control (MAC) protocol specification (Release 16).
3GPP TS 38.331 V16.7.0 (Dec. 2021) 3rd Generation Partnership Project; Technical Specification Group Radio Access Network; NR; Radio Resource Control (RRC) protocol specification (Release 16).
U.S. Appl. No. 62/706,327 Qualcomm Provisional.
R1-2102442 3GPP TSG RAN WG1 #104b-e, e-Meeting, Apr. 12-20, 2021, Source: Spreadtrum Communications, Title: Discussion on enhancements on Multi-TRP for PDCCH, PUCCH and PUSCH.
R1-2102507 3GPP TSG RAN WG1 #104b-e, e-Meeting, Apr. 12-20, 2021, Source: vivo, Title: Enhancements on Multi-TRP for PDCCH, PUCCH and PUSCH.
R1-2102568 3GPP TSG RAN WG1 #104bis-e, e-Meeting, Apr. 12-20, 2021, Source: CAICT, Title: Enhancements on Multi-TRP for PUSCH.
R1-2103089 3GPP TSG RAN WG1 Meeting #104b-e, e-Meeting, Apr. 12-20, 2021, Source: Apple Inc., Title: On Multi-TRP Reliability Enhancement.
R1-2103151 3GPP TSG RAN WG1 Meeting #104-bis-e, e-Meeting, Apr. 12-Apr. 20, 2021, Source: Qualcomm Incorporated, Title: Enhancements on Multi-TRP for PDCCH, PUCCH and PUSCH.
R1-2103366 3GPP TSG RAN WG1 #104-bis-e, e-Meeting, Apr. 12-Apr. 20, 2021, Source: Nokia, Nokia Shanghai Bell, Title: Enhancements for Multi-TRP URLLC schemes.
R1-2103550 3GPP TSG-RAN WG1 Meeting #104bis-e, eMeeting, Apr. 12-20, 2021, Source: Ericsson, Title: On PDCCH, PUCCH and PUSCH enhancements for multi-TRP.
R1-2103660 3GPP TSG-RAN WG1 Meeting #104bis-e, E-meeting, Apr. 12-Apr. 20, 2021, Source: TCL communication, Title: Enhancements on Multi-TRP for PDCCH, PUCCH and PUSCH.
R1-2103844 3GPP TSG-RAN WG1 Meeting #104bis-e, E-meeting, Apr. 12-Apr. 20, 2021, Source: Moderator (Nokia, Nokia Shanghai Bell), Title: Summary #2 of Multi-TRP PUCCH and PUSCH.
R1-2103845 3GPP TSG-RAN WG1 Meeting #104bis-e, E-meeting, Apr. 12-Apr. 20, 2021, Source: Moderator (Nokia, Nokia Shanghai Bell), Title: Summary #3 of Multi-TRP PUCCH and PUSCH Enhancements.
R1-2104052 3GPP TSG-RAN WG1 Meeting #104bis-e, E-meeting, Apr. 12-Apr. 20, 2021, Source: Moderator (Nokia, Nokia Shanghai Bell), Title: Summary #4 of Multi-TRP PUCCH and PUSCH Enhancements.
R1-2104267 3GPP TSG RAN WG1 #105-e, e-Meeting, May 10-27, 2021, Source: Huawei, HiSilicon, Title: Enhancements on multi-TRP for reliability and robustness in Rel-17.
R1-2105088 3GPP TSG RAN WG1 #105-e, e-Meeting, May 10-27, 2021, Source: Apple Inc., Title: On Multi-TRP Reliability Enhancement.
R1-2106073 3GPP TSG RAN WG1 #105-e, e-Meeting, May 10-27, 2021, Source: Moderator (Nokia, Nokia Shanghai Bell), Title: Summary #1 of Multi-TRP PUCCH and PUSCH Enhancements.

(56) References Cited

OTHER PUBLICATIONS

R1-2106074 3GPP TSG RAN WG1 #105-e, e-Meeting, May 10-27, 2021, Source: Moderator (Nokia, Nokia Shanghai Bell), Title: Summary #2 of Multi-TRP PUCCH and PUSCH Enhancements.
R1-2106075 3GPP TSG RAN WG1 #105-e, e-Meeting, May 10-27, 2021, Source: Moderator (Nokia, Nokia Shanghai Bell), Title: Summary #3 of Multi-TRP PUCCH and PUSCH Enhancements.
R1-2106464 3GPP TSG RAN WG1 #106-e, e-Meeting, Aug. 16-27, 2021, Source: Huawei, HiSilicon, Title: Enhancements on multi-TRP for reliability and robustness in Rel-17.
R1-2106542 3GPP TSG RAN WG1 #106-e, e-Meeting, Aug. 16-27, 2021, Source: ZTE, Title: Multi-TRP enhancements for PDCCH, PUCCH and PUSCH.
R1-2106572 3GPP TSG RAN WG1 #106-e, e-Meeting, Aug. 16-27, 2021, Source: vivo, Title: Further discussion on Multi-TRP for PDCCH, PUCCH and PUSCH enhancements.
R1-2106641 3GPP TSG RAN WG1 #106-e, e-Meeting, Aug. 16-27, 2021, Source: InterDigital, Inc., Title: Discussion on Enhancements for PDCCH, PUCCH, and PUSCH.
R1-2106667 3GPP TSG RAN WG1 #106-e, e-Meeting, Aug. 16-27, 2021, Source: Lenovo, Motorola Mobility, Title: Enhancements on Multi-TRP for PDCCH, PUCCH and PUSCH.
R1-2106866 3GPP TSG RAN WG1 #106-e, e-Meeting, Aug. 16-27, 2021, Source: Samsung, Title: Enhancements on Multi-TRP for PDCCH, PUCCH and PUSCH.
R1-2107079 3GPP TSG RAN WG1 #106-e, e-Meeting, Aug. 16-27, 2021, Source: FUTUREWEI, Title: Multi-TRP/panel for non-PDSCH.
R1-2107204 3GPP TSG RAN WG1 #106-e, e-Meeting, Aug. 16-27, 2021, Source: OPPO, Title: Enhancements on multi-TRP for PDCCH, PUCCH and PUSCH.
R1-2107293 3GPP TSG RAN WG1 #106-e, e-Meeting, Aug. 16-27, 2021, Source: FGI, Asia Pacific Telecom, Title: Discussion on enhancements on multi-TRP for uplink channels.
R1-2107324 3GPP TSG RAN WG1 #106-e, e-Meeting, Aug. 16-27, 2021, Source: Qualcomm Incorporated, Title: Enhancements on Multi-TRP for PDCCH, PUCCH and PUSCH.
R1-2107486 3GPP TSG RAN WG1 #106e, e-Meeting, Aug. 16-27, 2021, Source: MediaTek Inc., Title: Enhancements on Multi-TRP for PDCCH, PUCCH and PUSCH.
R1-2107571 3GPP TSG RAN WG1 #106-e, e-Meeting, Aug. 16-27, 2021, Source: Intel Corporation, Title: Multi-TRP enhancements for PDCCH, PUCCH and PUSCH.
R1-2107719 3GPP TSG RAN WG1 #106-e, e-Meeting, Aug. 16-27, 2021, Source: Apple Inc., Title: On Multi-TRP Reliability Enhancement.
R1-2107815 3GPP TSG RAN WG1 #106-e, e-Meeting, Aug. 16-27, 2021, Source: LG Electronics, Title: Enhancements on Multi-TRP for PDCCH, PUCCH and PUSCH.
R1-2107894 3GPP TSG RAN WG1 #106-e, e-Meeting, Aug. 16-27, 2021, Source: Xiaomi, Title: Enhancements on Multi-TRP for PDCCH, PUSCH and PUCCH.
R1-2108020 3GPP TSG RAN WG1 #106-e, e-Meeting, Aug. 16-27, 2021, Source: Convida Wireless, Title: Enhancements on Multi-TRP for PDCCH, PUCCH and PUSCH.
R1-2108053 3GPP TSG RAN WG1 #106-e, e-Meeting, Aug. 16-27, 2021, Source: Nokia, Nokia Shanghai Bell, Title: Enhancements for Multi-TRP URLLC schemes.
R1-2108106 3GPP TSG RAN WG1 #106-e, e-Meeting, Aug. 16-27, 2021, Source: ASUSTeK, Title: Discussion on mTRP PXXCH.
R1-2108254 3GPP TSG-RAN WG1 Meeting #106-e, e-Meeting, Aug. 16-Aug. 27, 2021, Source: Moderator (Qualcomm), Title: Summary #1 of email discussions [106-e-NR-feMIMO-03] for mTRP PDCCH enhancements.
R1-2108256 3GPP TSG-RAN WG1 Meeting #106-e, e-Meeting, Aug. 16-Aug. 27, 2021, Source: Moderator (Qualcomm), Title: Summary #3 of email discussions [106-e-NR-feMIMO-03] for mTRP PDCCH enhancements.
R1-2108298 3GPP TSG RAN WG1 #106-e, e-Meeting, Aug. 16-27, 2021, Source: Moderator (Nokia, Nokia Shanghai Bell), Title: Summary #1 of Multi-TRP PUCCH and PUSCH Enhancements.
R1-2108299 3GPP TSG RAN WG1 #106-e, e-Meeting, Aug. 16-27, 2021, Source: Moderator (Nokia, Nokia Shanghai Bell), Title: Summary #2 of Multi-TRP PUCCH and PUSCH Enhancements.
R1-2108300 3GPP TSG RAN WG1 #106-e, e-Meeting, Aug. 16-27, 2021, Source: Moderator (Nokia, Nokia Shanghai Bell), Title: Summary #3 of Multi-TRP PUCCH and PUSCH Enhancements.
R1-2108790 3GPP TSG RAN WG1 Meeting #106bis-e, e-Meeting, Oct. 11-19, 2021, Source: FUTUREWEI, Title: Multi-TRP/panel for non-PDSCH.
R1-2108809 3GPP TSG RAN WG1 #106b-e, e-Meeting, Oct. 11-19, 2021, Source: InterDigital, Inc., Title: Remaining Details on enhancements for PDCCH, PUCCH, and PUSCH.
R1-2108871 3GPP TSG RAN WG1 #106b-e, e-Meeting, Oct. 11-19, 2021, Source: ZTE, Title: Multi-TRP enhancements for PDCCH, PUCCH and PUSCH.
Aug. 19, 2025—Japanese Office Action—JP App. 2024-547138.

\* cited by examiner

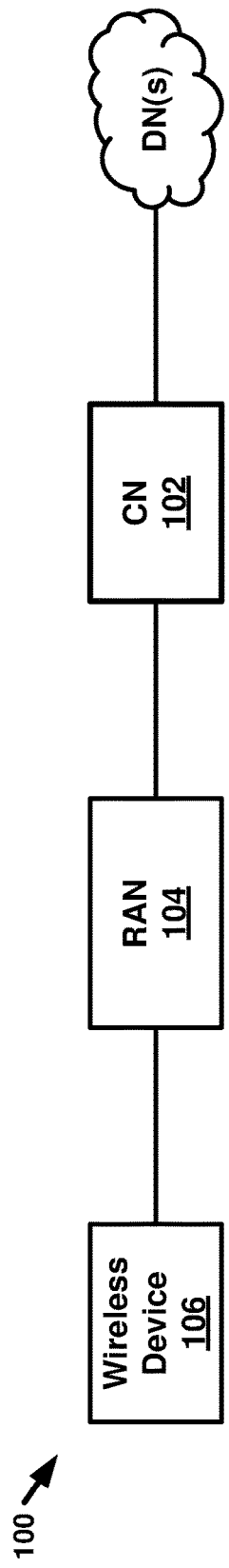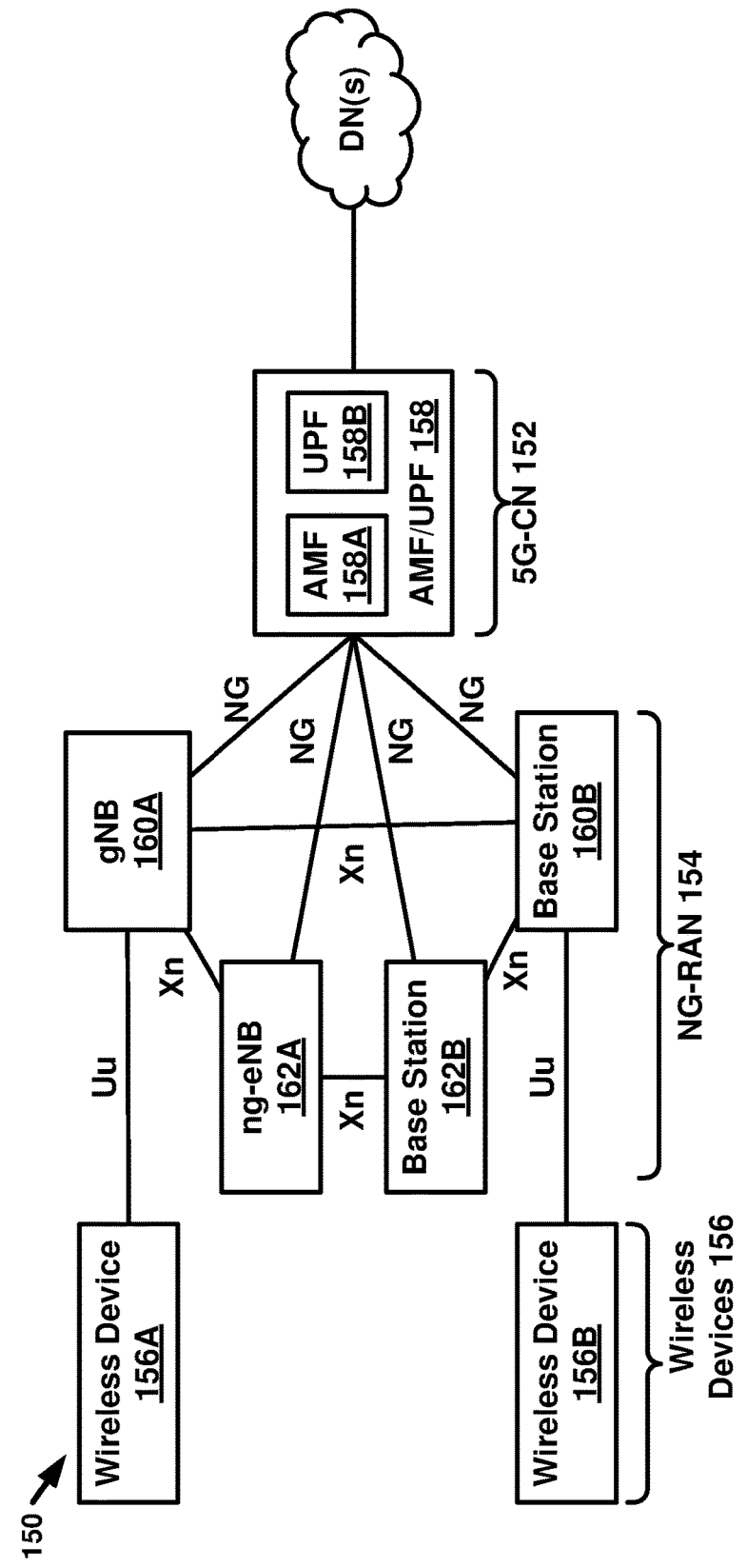

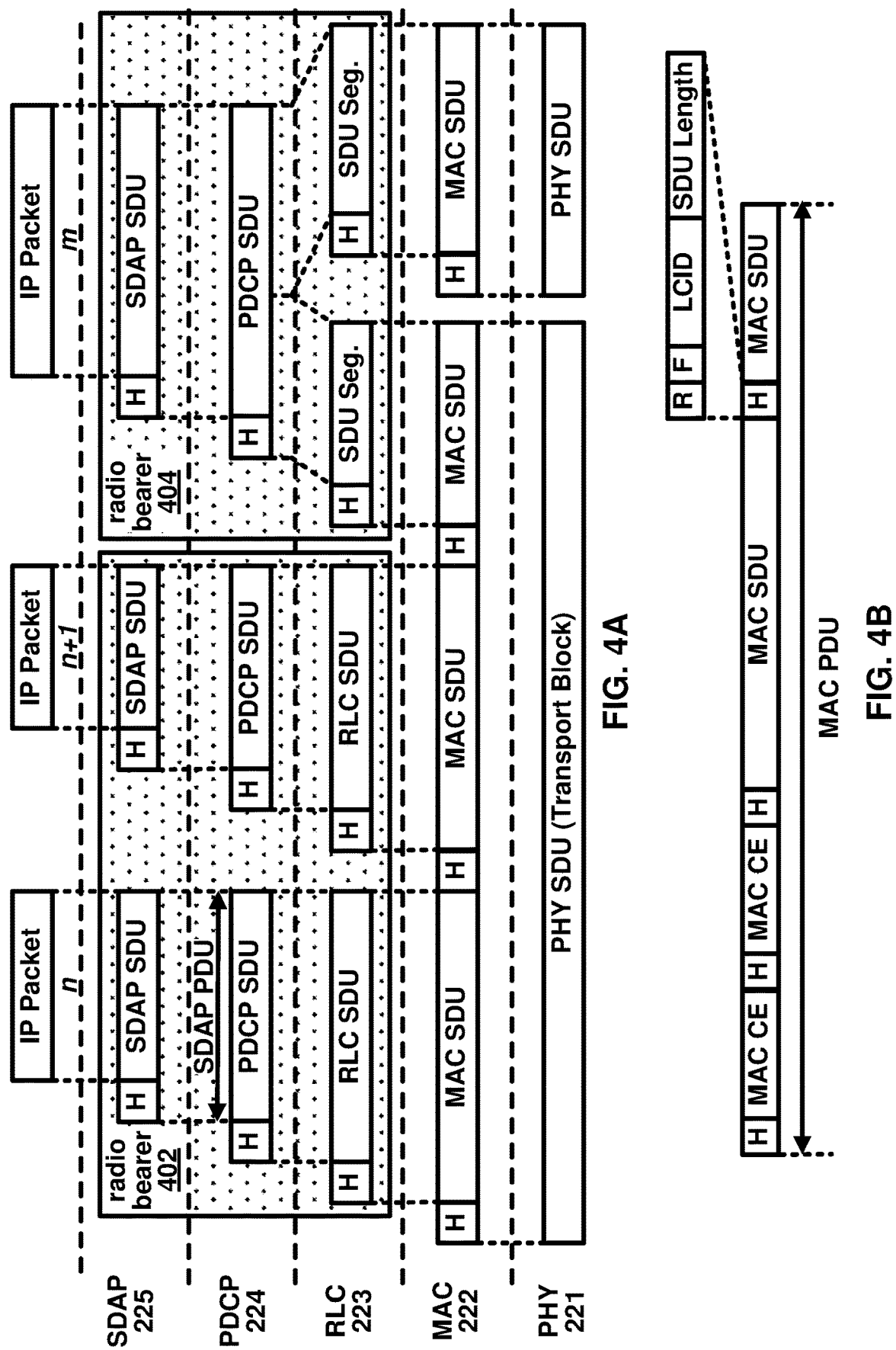

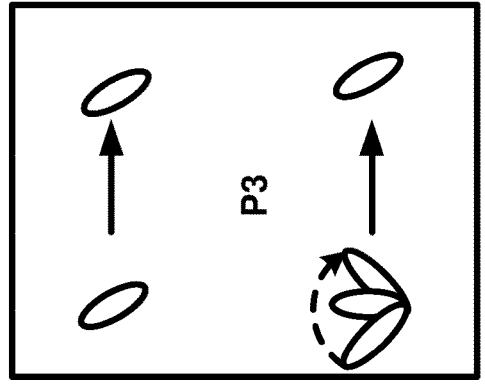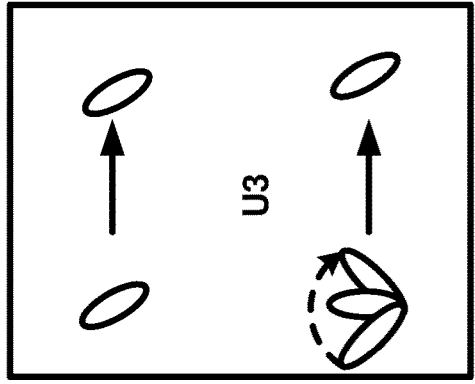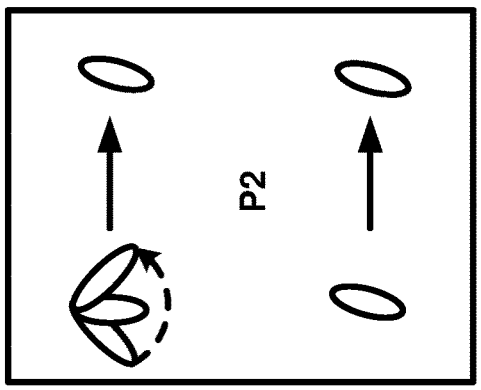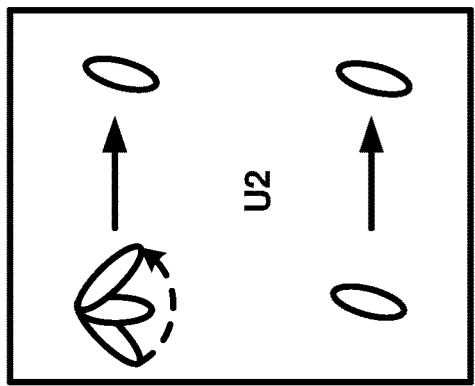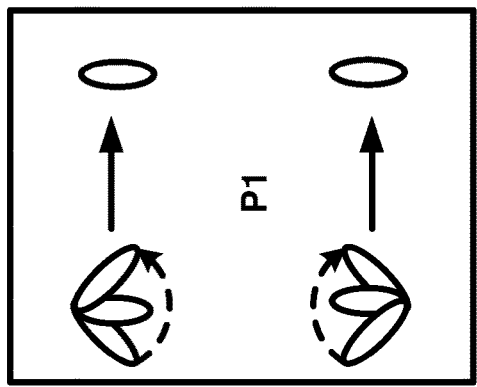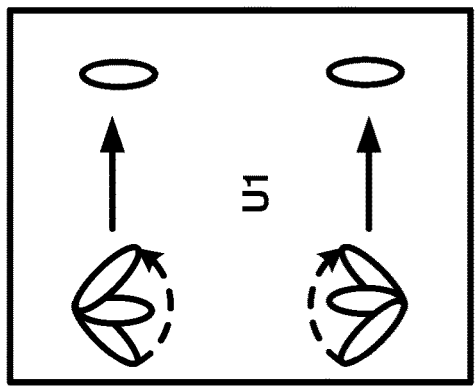
FIG. 12A
FIG. 12B

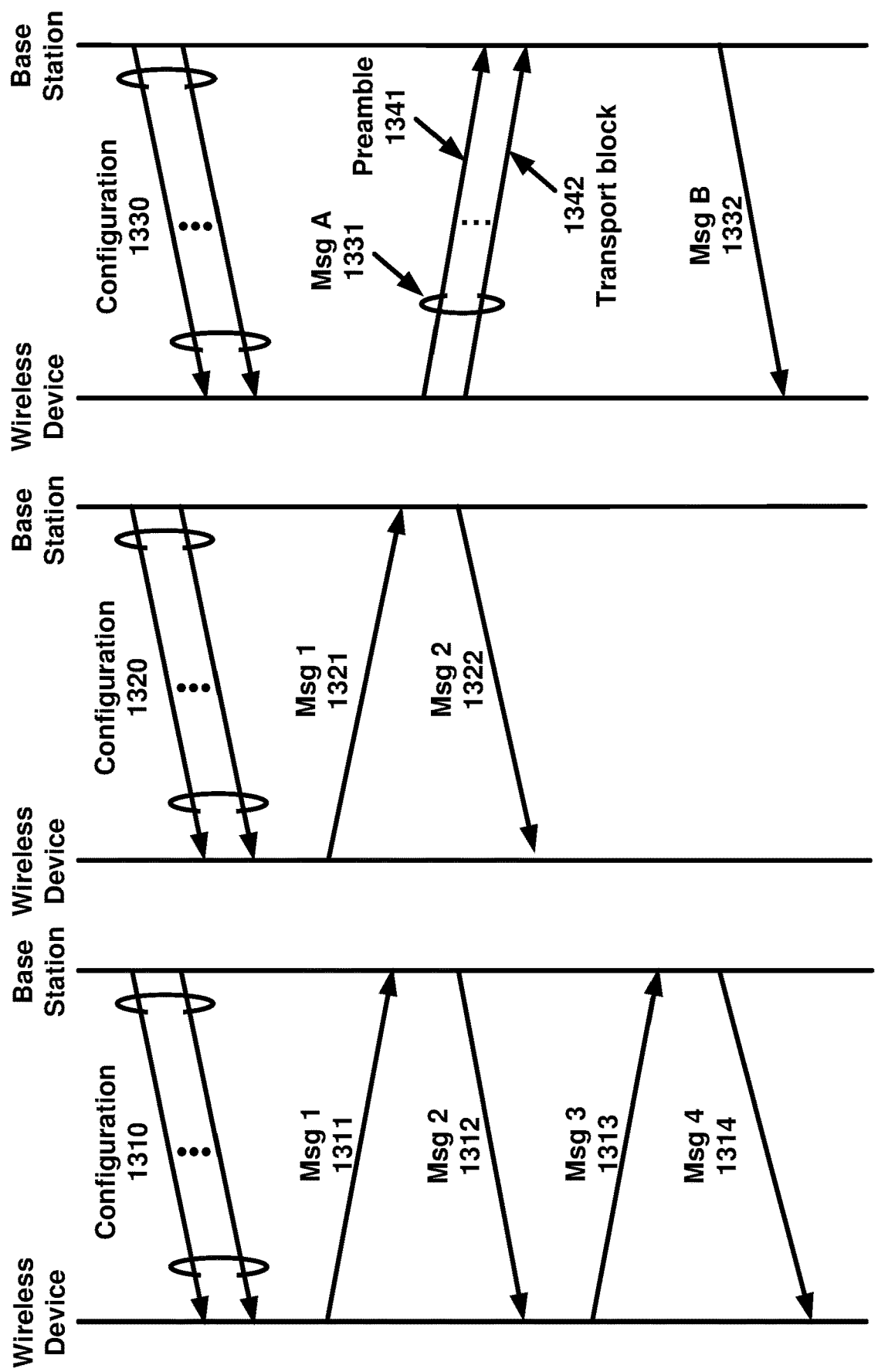

RESOURCE CONFIGURATION FOR OVERLAPPING TRANSMISSIONS

CROSS-REFERENCE TO RELATED APPLICATIONS

This application is a continuation of and claims priority to U.S. patent application Ser. No. 18/165,481, filed on Feb. 7, 2023, which claims the benefit of: U.S. Provisional Application No. 63/307,299, filed on Feb. 7, 2022; U.S. Provisional Application No. 63/307,301, filed on Feb. 7, 2022; U.S. Provisional Application No. 63/308,699, filed on Feb. 10, 2022; and U.S. Provisional Application No. 63/307,703, filed on Feb. 8, 2022. Each of the above-referenced applications is hereby incorporated by reference in its entirety.

BACKGROUND

Wireless communications include repetitions of a transmission to increase a likelihood of successful reception of a message. Repetitions are transmitted using time division multiplexing.

SUMMARY

The following summary presents a simplified summary of certain features. The summary is not an extensive overview and is not intended to identify key or critical elements.

A wireless device may communicate with a base station by using overlapping transmissions. For example, overlapping transmissions may comprise using time division multiplexing (TDM), frequency division multiplexing (FDM), and/or spatial division multiplexing (SDM) for transmissions that overlap in time (e.g., using FDM and/or SDM), frequency (e.g., using TDM and/or SDM), and/or spatial domain (e.g., using TDM and/or FDM). The wireless device may use multiplexing to send repetitions of a message/transmission, which may increase a likelihood of successful reception. In at least some repetitions, the wireless device may multiplex information within the repeated message/transmission. Multiplexed information may comprise, for example, a channel state information (CSI) report multiplexed on a repetition of a physical uplink shared channel (PUSCH) transmission, a physical uplink control channel (PUCCH) transmission (e.g., comprising uplink control information (UCI)) multiplexed on a repetition of a PUSCH transmission, and/or any other information included in a transmission. A rule may be applied by the wireless device and the base station to indicate/determine which repetition(s), of a plurality of repetitions, comprises multiplexed information so that the multiplexed information may be successfully communicated. For example, a rule may comprise including the multiplexed information in a transmission associated with at least one of: a lowest (or highest) frequency or range of frequencies, a lowest (or highest) starting (or ending) resource block, a lowest (or highest) transmission configuration indicator (TCI) state, a lowest (or highest) TCI state index, a lowest (or highest) panel or panel index, and/or any other parameter/indicator that may differentiate a transmission (including the multiplexed information) from other transmissions. Additionally or alternatively, a rule may be applied by the wireless device and the base station to indicate/determine (e.g., using a lowest or highest frequency, a lowest/starting or highest/ending resource block, a lowest or highest TCI state or TCI state index, a lowest or highest panel or panel index, etc.) a value/parameter associated with a transmission, such as a value of a power headroom report that may indicate a pathloss reference signal used to determine the power headroom report (e.g., which in turn may indicate to which of a plurality of transmission-and-reception points the power headroom report corresponds). Additionally or alternatively, a rule may comprise a power prioritization rule that may be applied by the wireless device and the base station to indicate/determine (e.g., using a lowest or highest frequency, a lowest/starting or highest/ending resource block, a lowest or highest TCI state/TCI state index, a lowest or highest panel/panel index, etc.) a power prioritization for transmissions overlapping in time, wherein the power prioritization rule may indicate which of multiple transmissions of a same type/channel (e.g., PUSCH, PUCCH, etc.) may be dropped or transmitted using a reduced power if the multiple transmissions would otherwise exceed a power threshold (e.g., a maximum transmission power of the wireless device). By establishing one or more rules for overlapping transmissions as described herein, advantages may result such as increased synchronization between a wireless device and a base station, reduced retransmission, reduced latency, and/or reduced power consumption.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 4A shows an example downlink data flow for a user plane configuration.

FIG. 4B shows an example format of a Medium Access Control (MAC) subheader in a MAC Protocol Data Unit (PDU).

FIG. 12A shows examples of downlink beam management procedures.

FIG. 12B shows examples of uplink beam management procedures.

FIG. 13A shows an example four-step random access procedure.

FIG. 13B shows an example two-step random access procedure.

FIG. 13C shows an example two-step random access procedure.

DETAILED DESCRIPTION

Figure 2A:
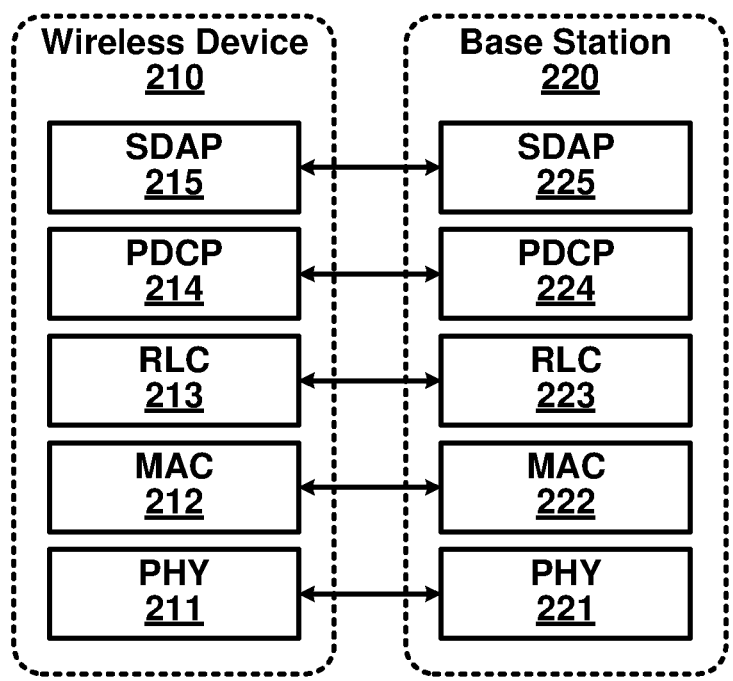
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to wireless communication exposure detection and/or reporting.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a SMF, an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack.

The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
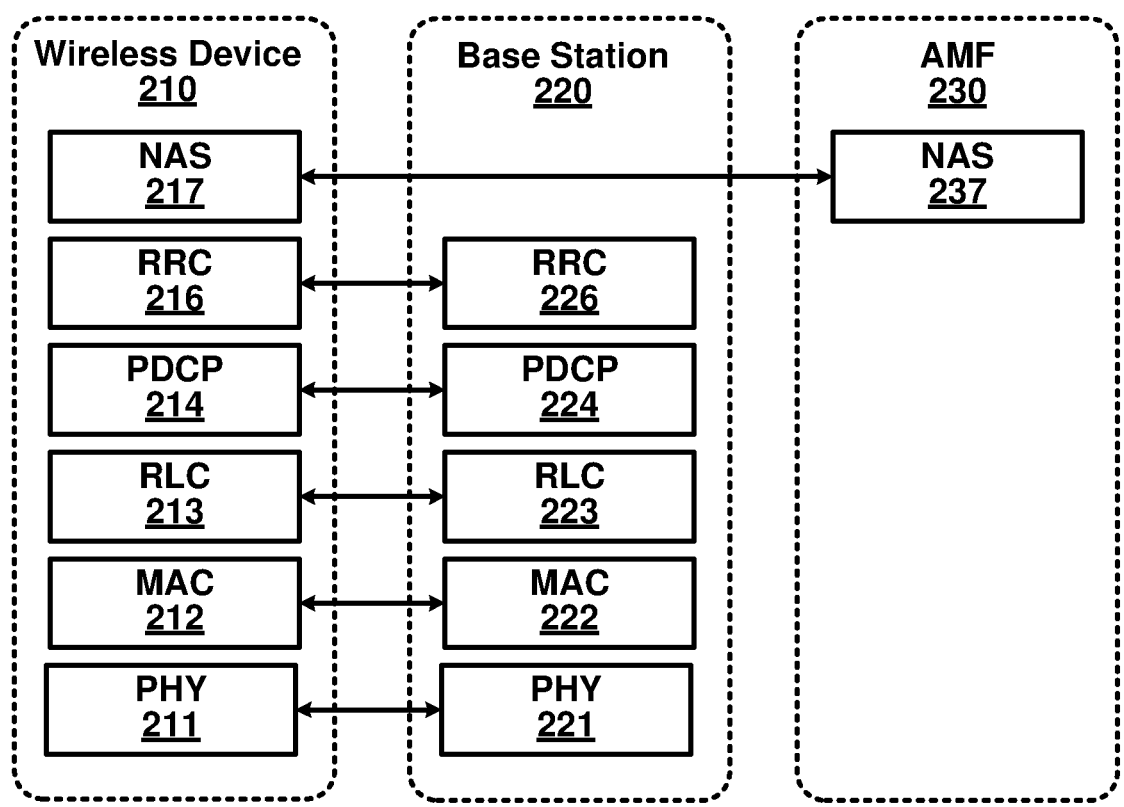
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
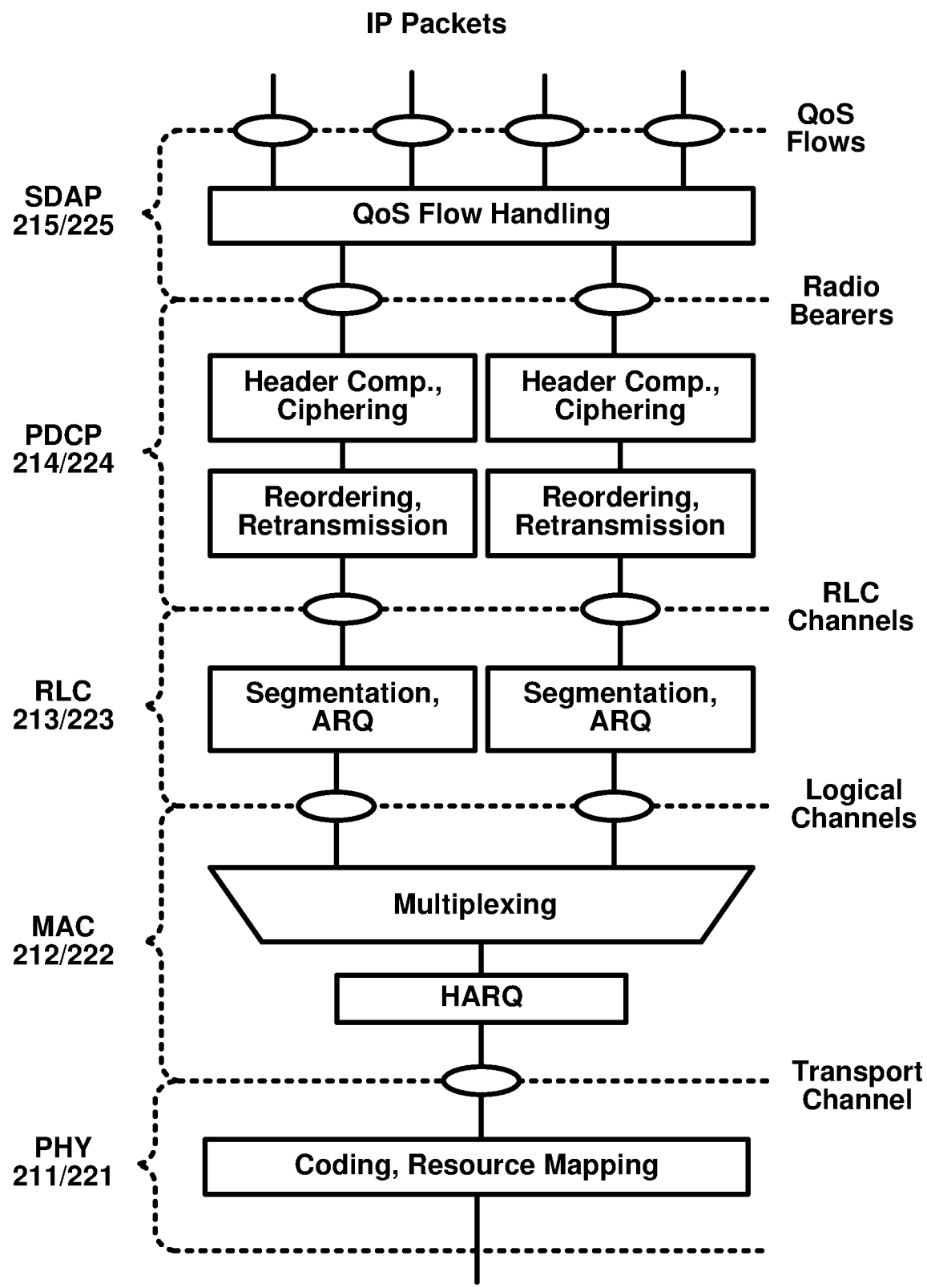
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a PDU of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figure 5B:
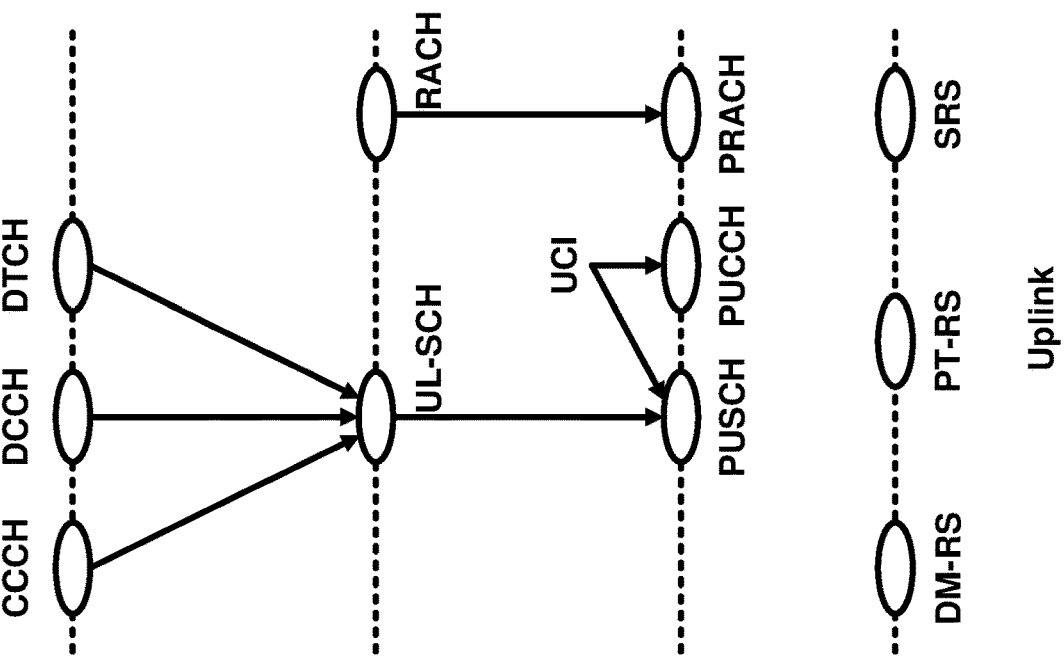
FIG. 5B shows an example mapping for uplink channels.
Figure 5A:
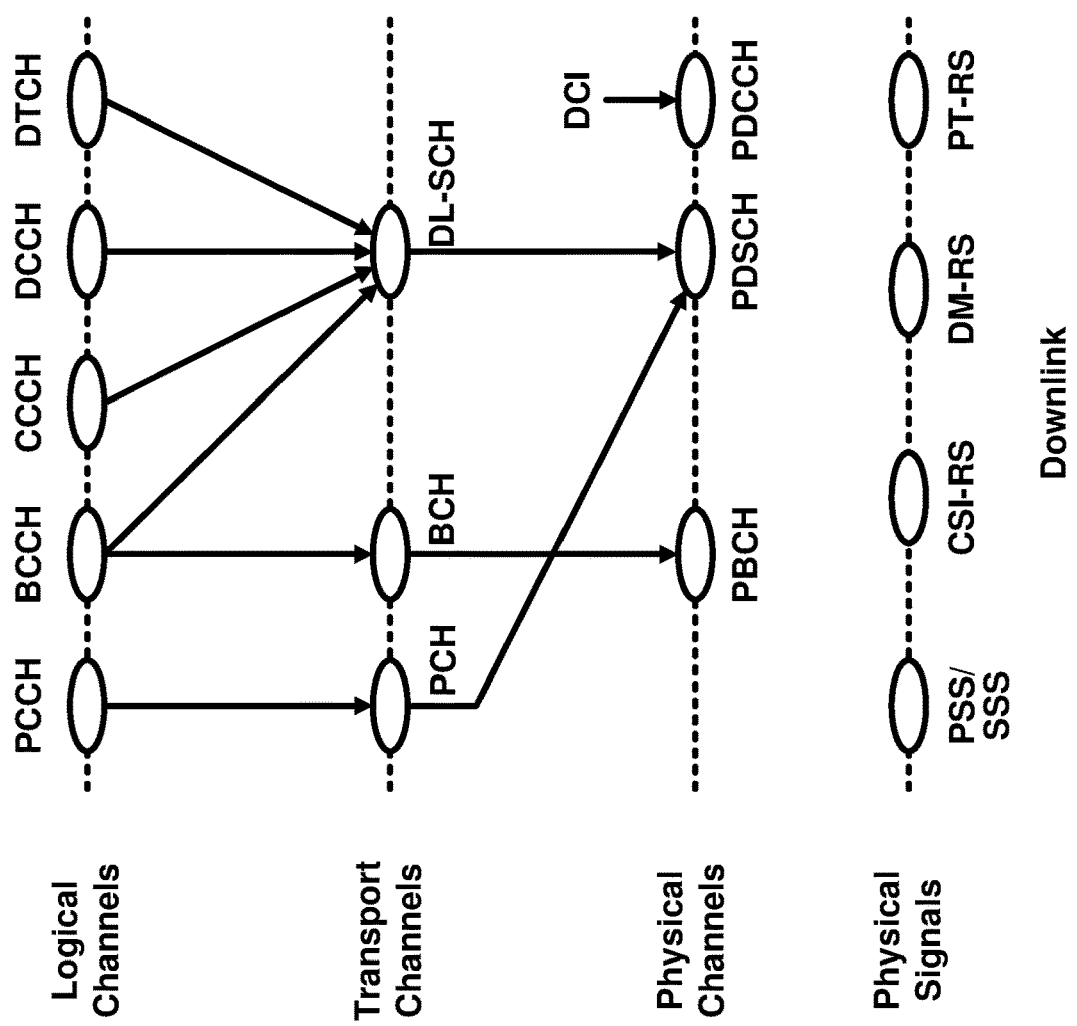
FIG. 5A shows an example mapping for downlink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex controlplane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
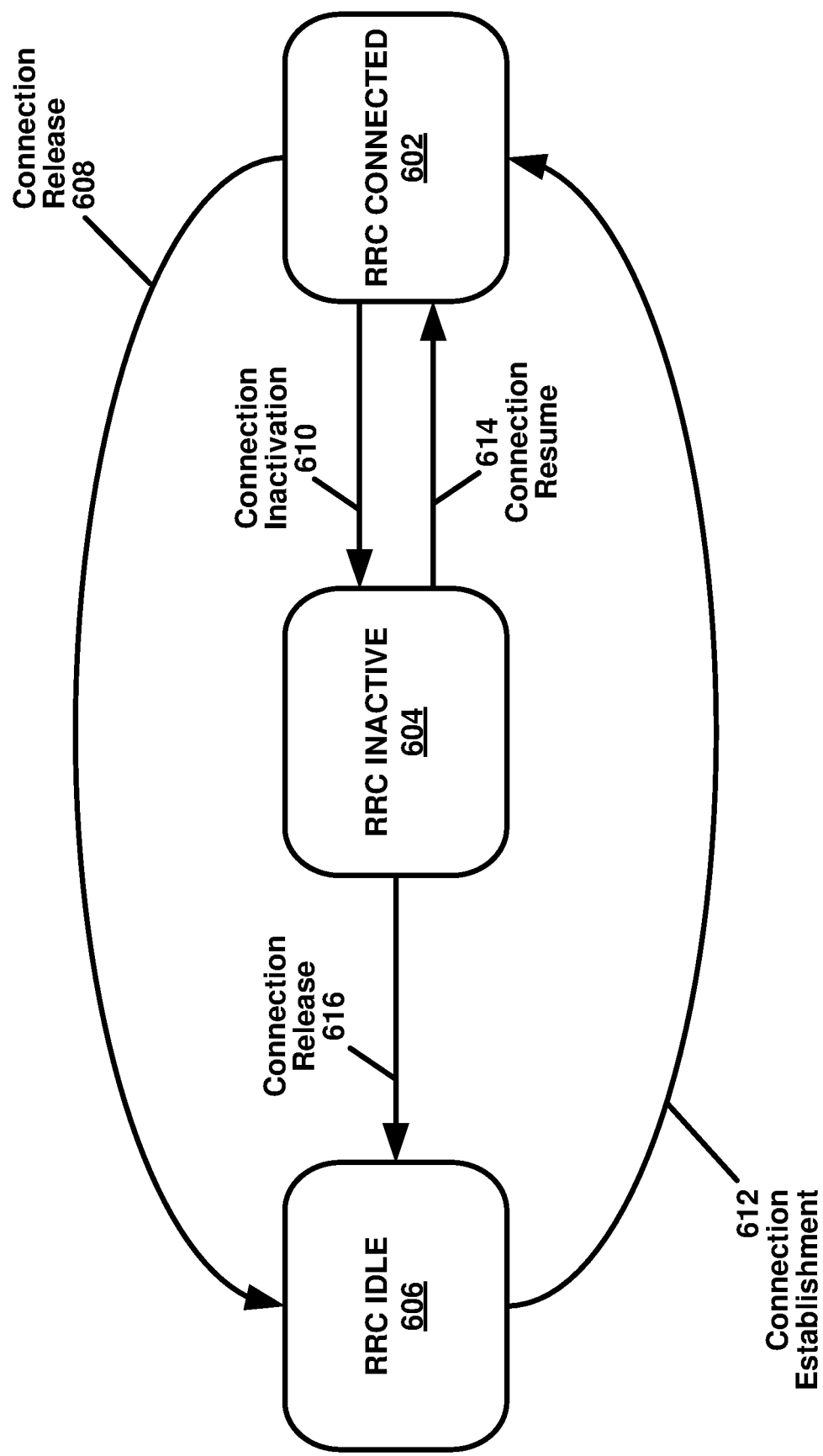
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
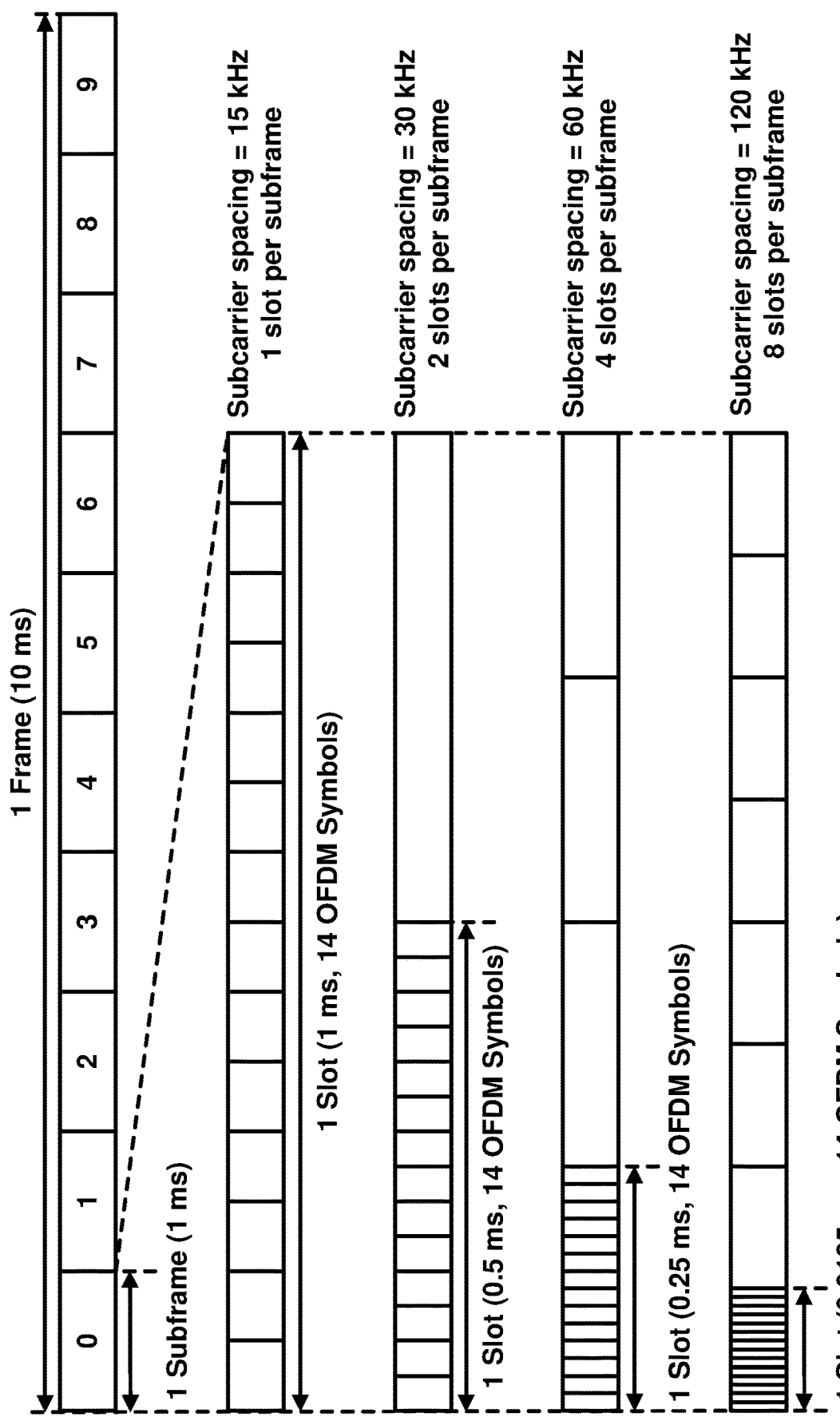
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 s, for example, for a numerology in an NR configuration or any other radio configurations. Numerologies may be defined with the following subcarrier spacing/cyclic prefix duration combinations: 15 kHz/4.7 s; 30 kHz/

2.3 s; 60 kHz/1.2 s; 120 kHz/0.59 s; 240 kHz/0.29 s, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
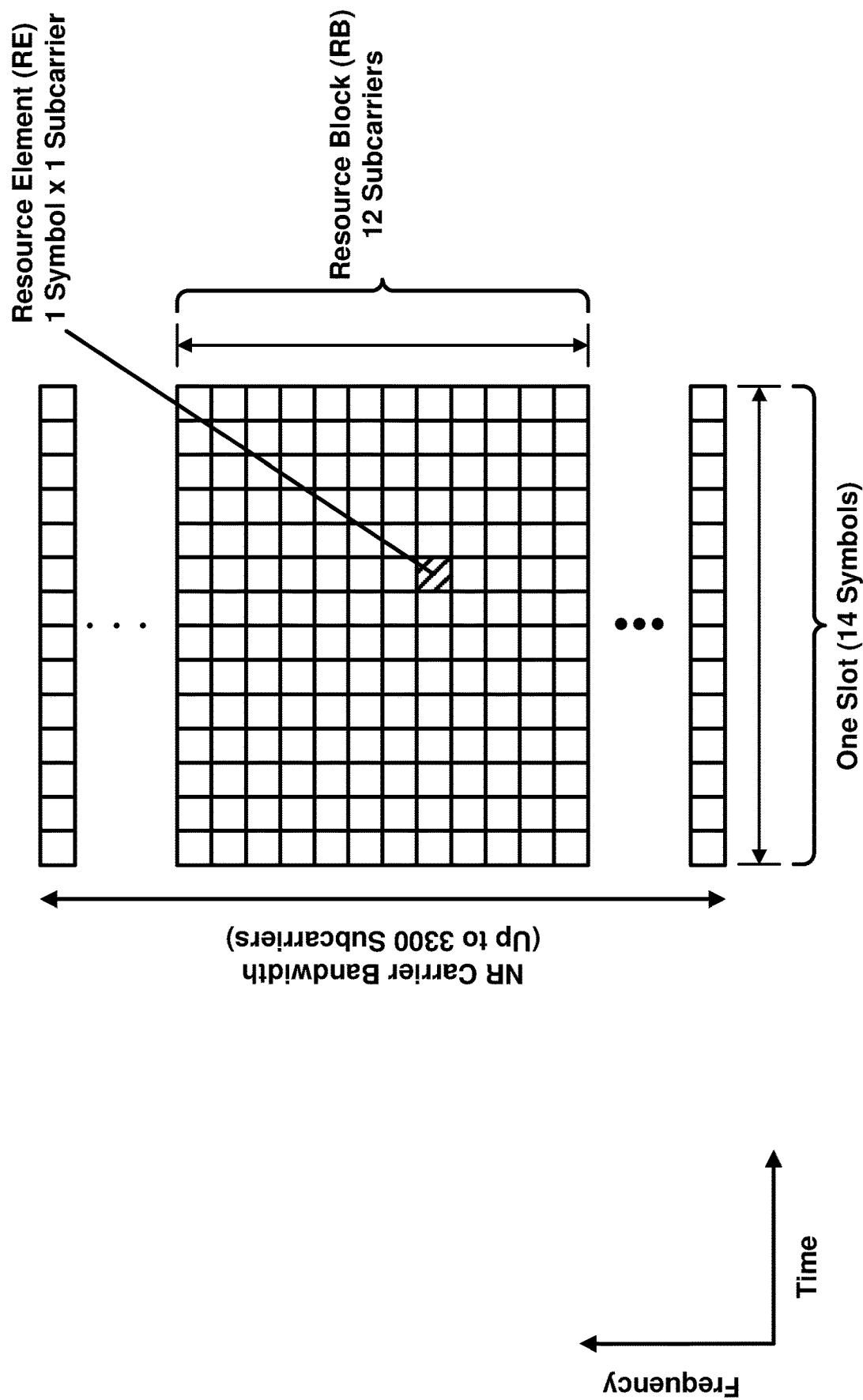
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time.

The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in DCI. A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
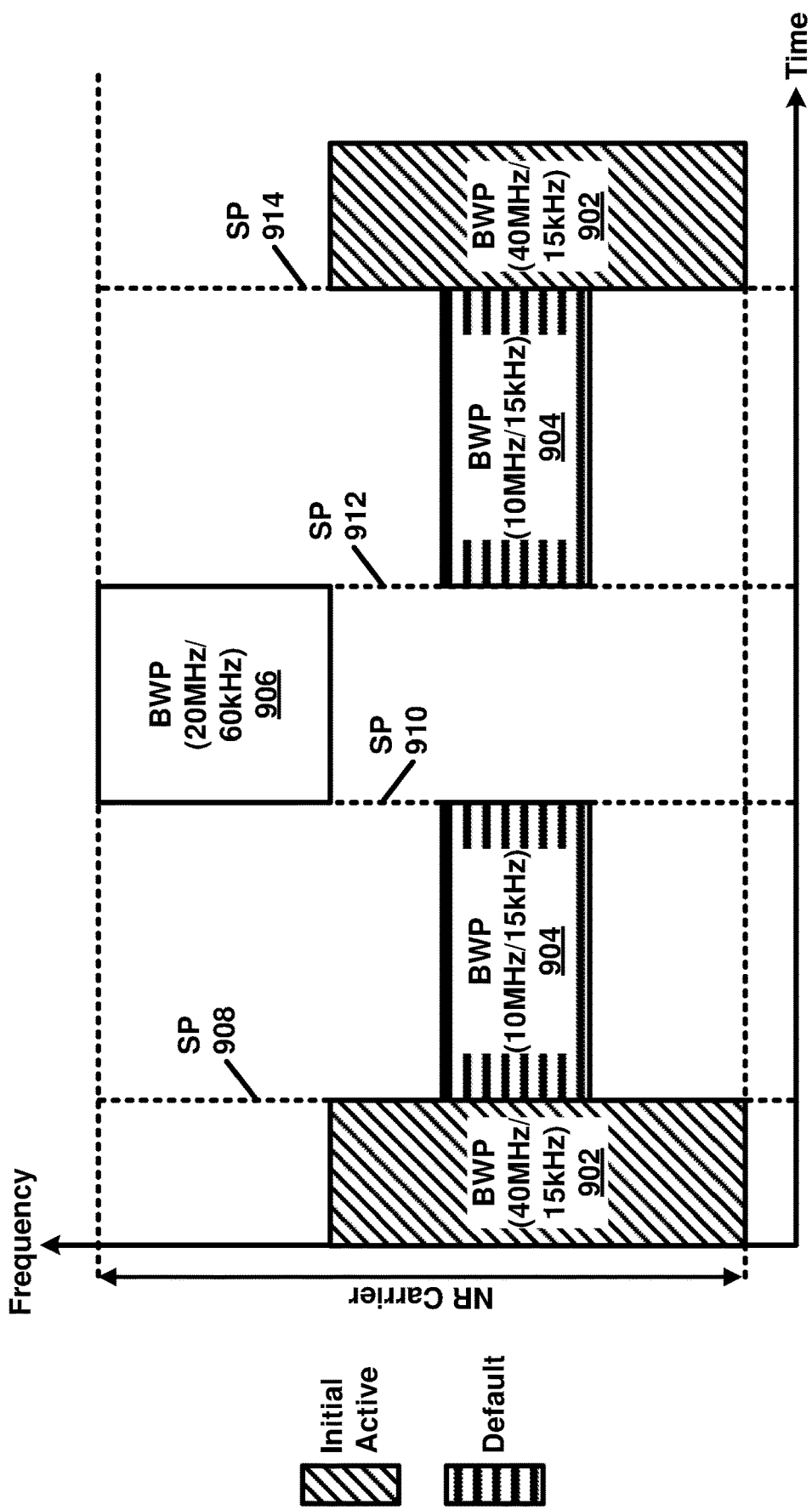
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, a based on (e.g., after or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
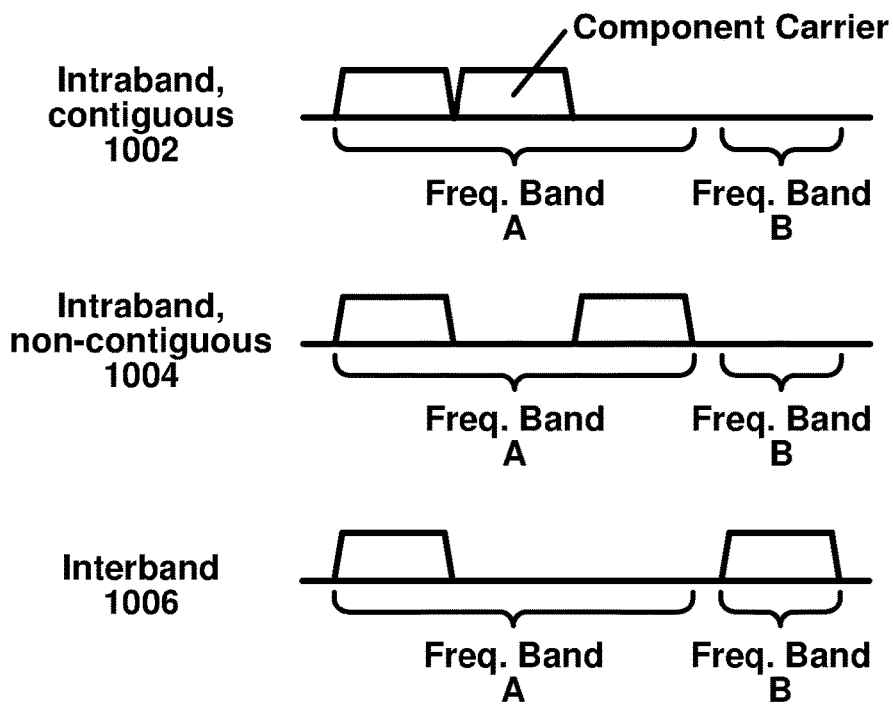
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC)

for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
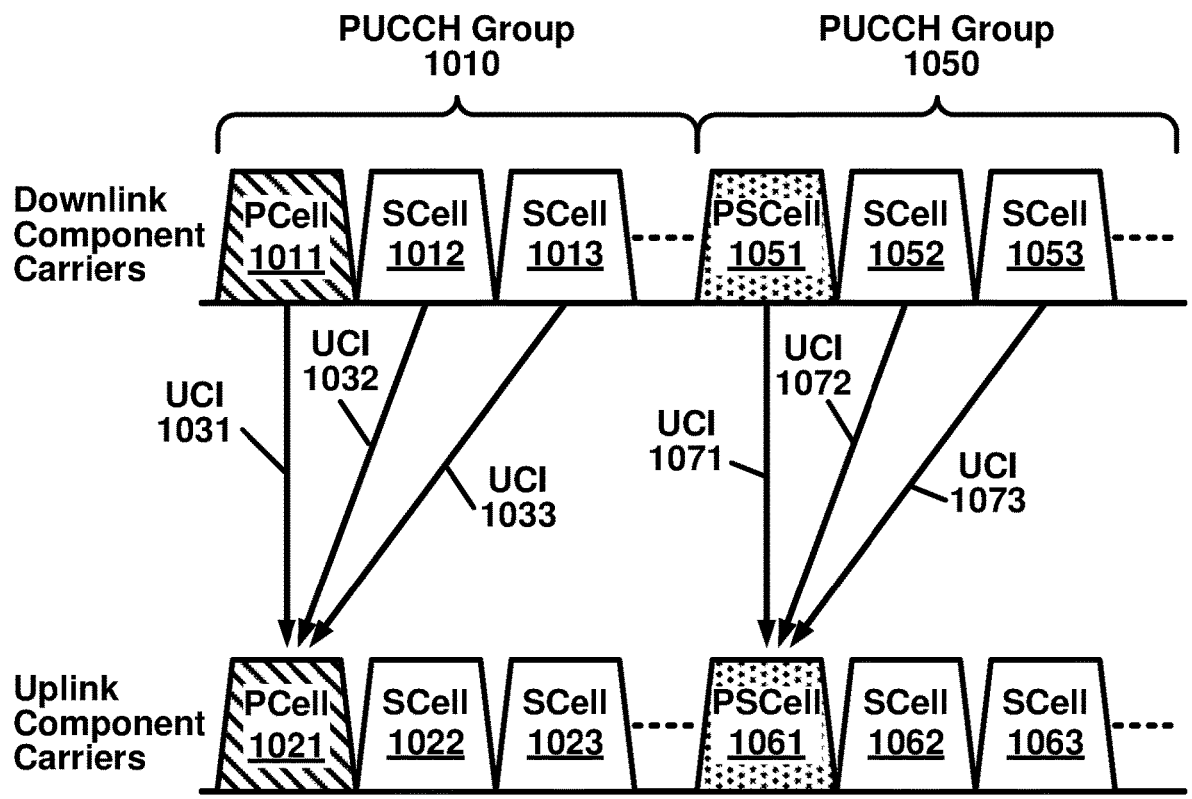
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
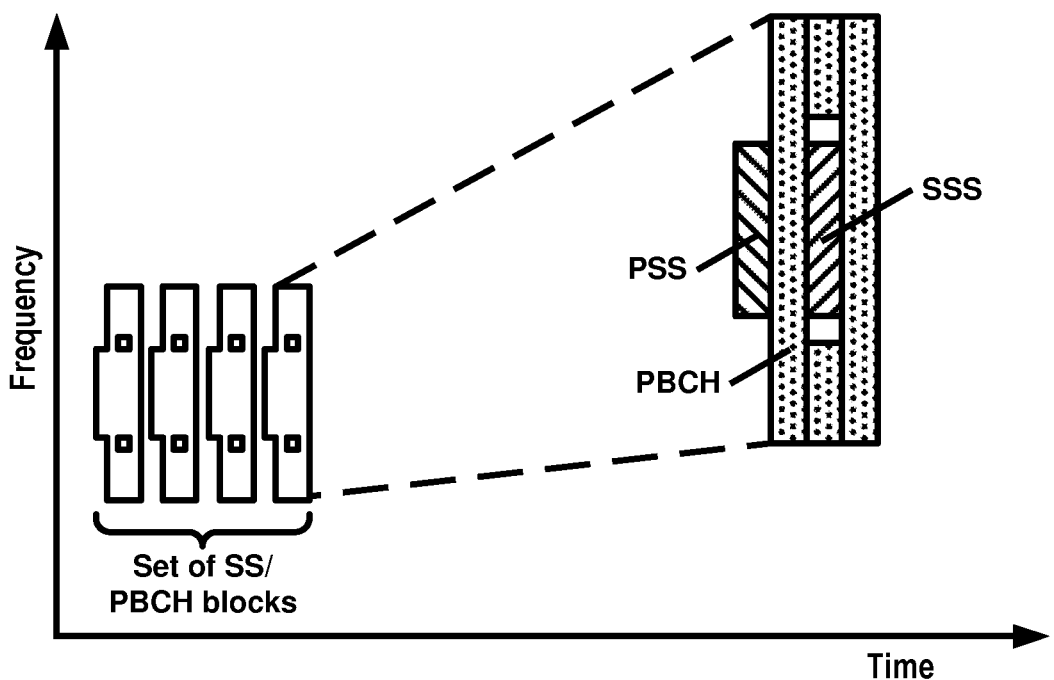
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A D M-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g., the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
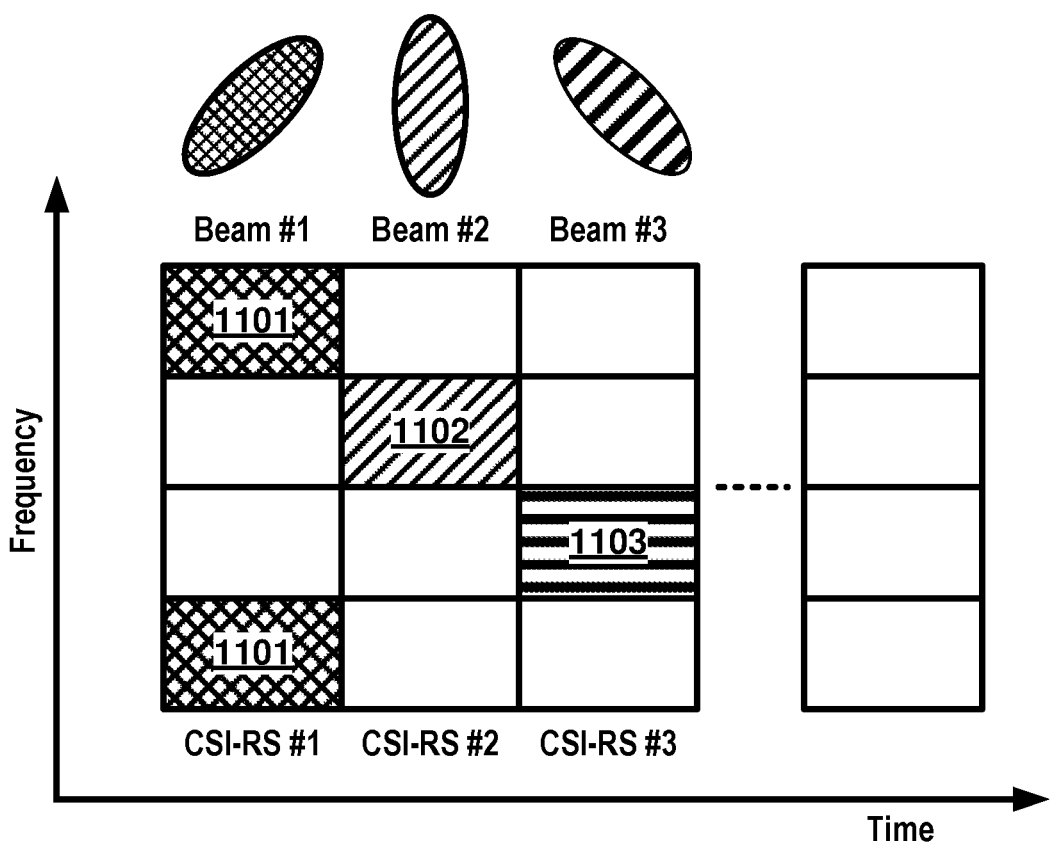
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random-access procedure. A wireless device in an RRC idle (e.g., an RRC_IDLE) state and/or an RRC inactive (e.g., an RRC_INACTIVE) state may initiate/perform the random-access procedure to request a connection setup to a network. The wireless device may initiate/start/perform the random-access procedure from an RRC connected (e.g., an RRC_CONNECTED) state. The wireless device may initiate/start/perform the random-access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random-access procedure to request one or more system information blocks (SIBs) (e.g., other system information blocks, such as SIB2, SIB3, and/or the like). The wireless device may initiate/start/perform the random-access procedure for a beam failure recovery request. A network may initiate/start/perform a random-access procedure, for example, for a handover and/or for establishing time alignment for an SCell addition.

FIG. 13A shows an example four-step random access procedure. The four-step random access procedure may comprise a four-step contention-based random-access procedure. A base station may send/transmit a configuration message 1310 to a wireless device, for example, before initiating the random-access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random-access preamble). The first message (e.g., Msg 1 1311) may be referred to as a preamble. The second message (e.g., Msg 2 1312) may comprise as a random-access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random-access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random-access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random-access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0<s_id<14), t_id may be an index of a first slot of the PRACH occasion in a system frame (e.g., 0<t_id<80), f_id may be an index of the PRACH occasion in the frequency domain (e.g., 0<f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random-access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random-access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random-access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random-access procedure (e.g., the first message (e.g., Msg 1 1311) and/or the third message (e.g., Msg 3 1313)) may remain on, or may be performed via, the selected carrier. The wireless device may switch an uplink carrier during the random-access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random-access procedure. Similar to the four-step contention-based random-access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random-access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random-access procedure is successful, for example, based on (e.g., after or in response to) sending/transmitting first message (e.g., Msg 1 1321) and receiving a corresponding second message (e.g., Msg 2 1322). The wireless device may determine that a random-access procedure has successfully been completed, for example, if a PDCCH transmission is addressed to a corresponding C-RNTI. The wireless device may determine that a random-access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random-access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as DCI. The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random-access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
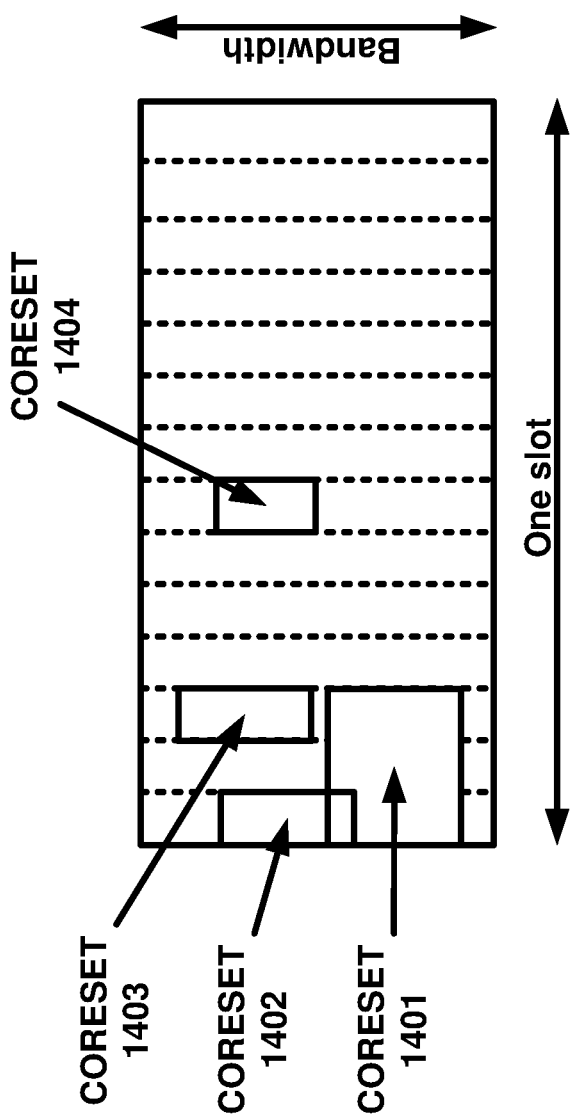
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORE- SET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
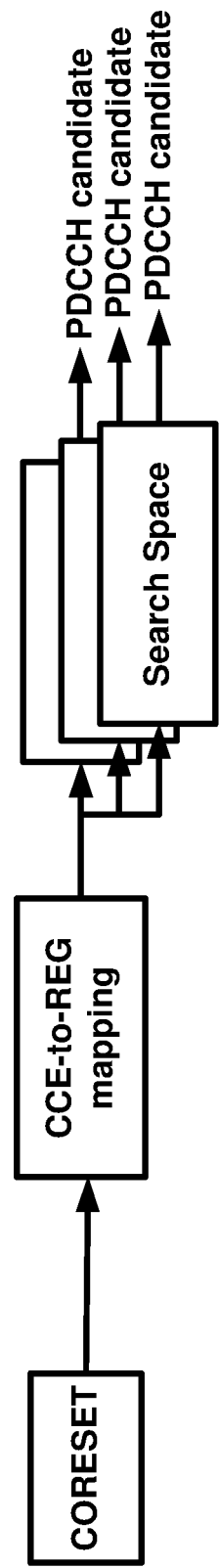
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
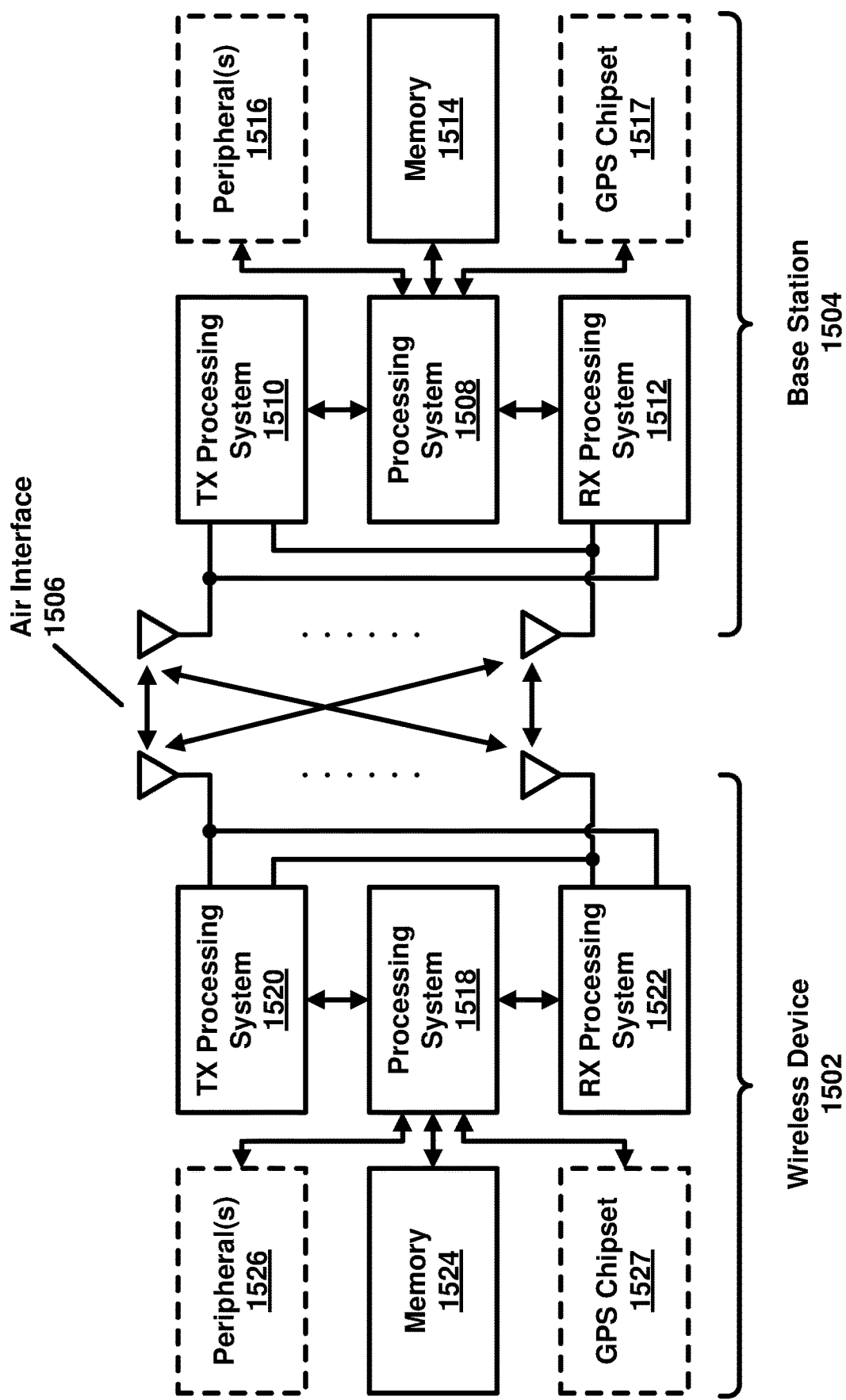
FIG. 15A shows an example of communications between a wireless device and a base station.

FIG. 15A shows example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
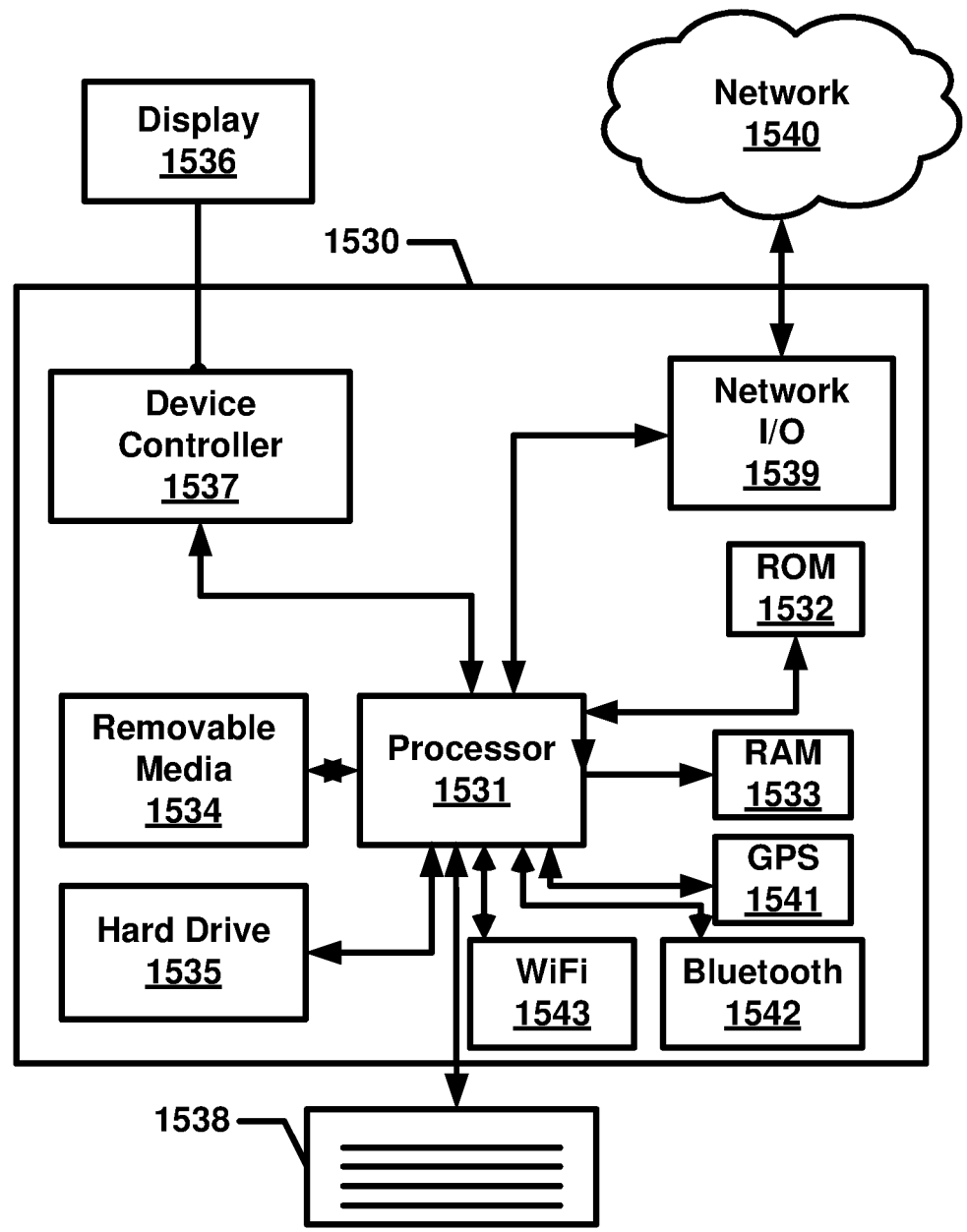
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figure 16A:
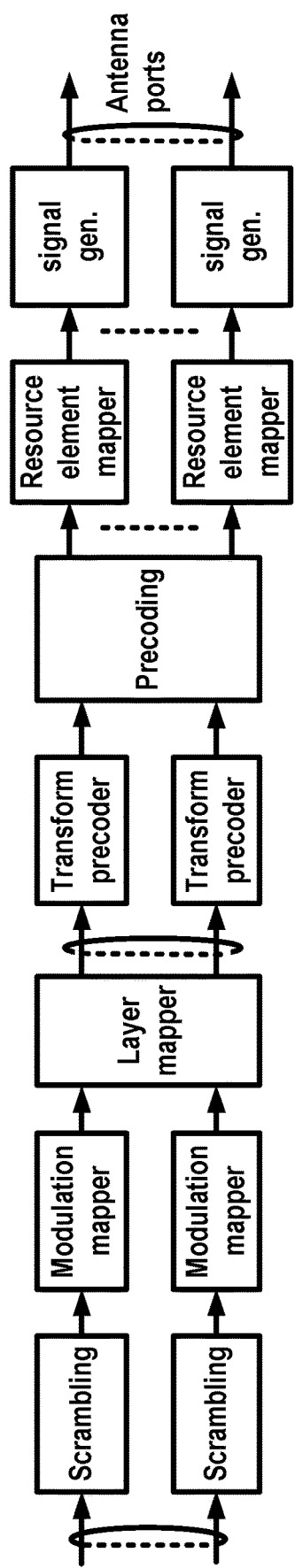
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

Figure 16B:
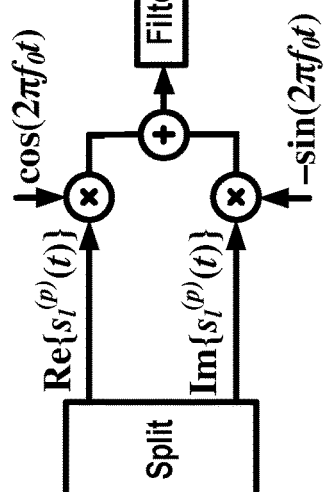

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

Figure 16D:
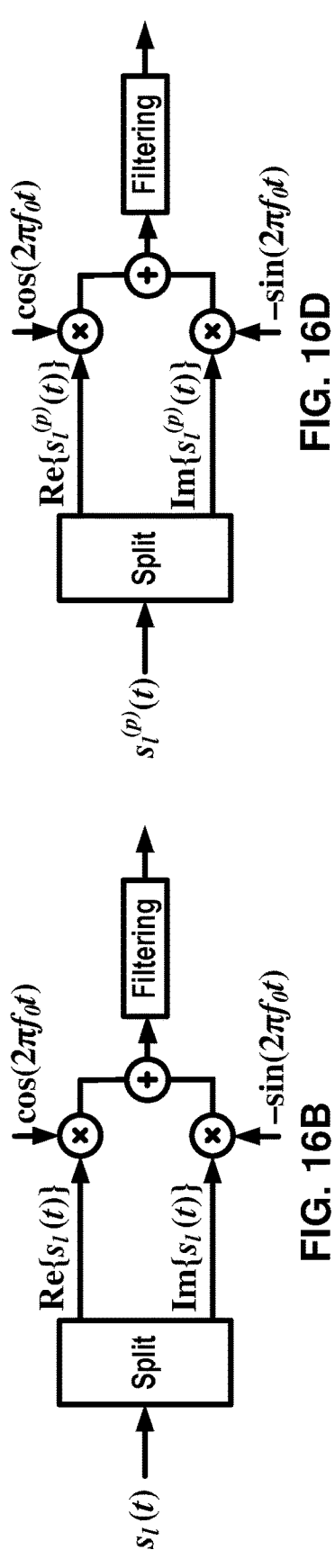
Figure 16C:
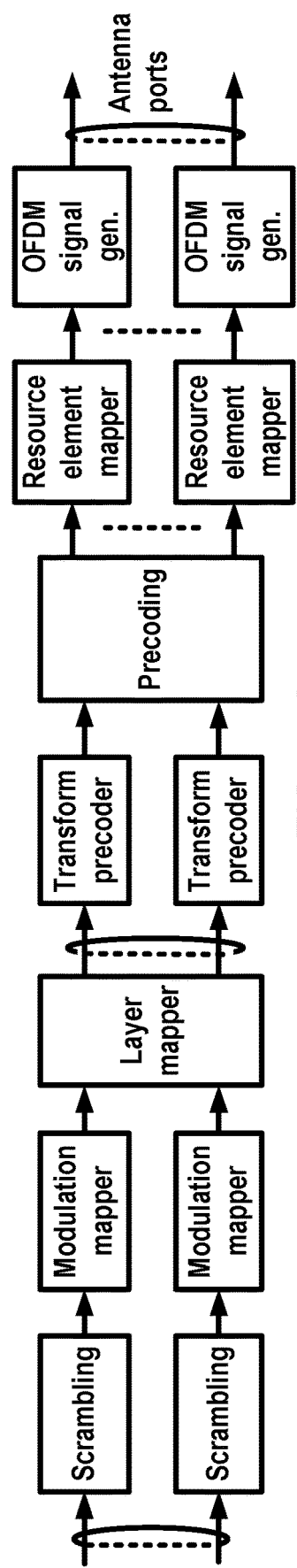

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random-access response window timer may be used for measuring a window of time for receiving a random-access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Figure 17:
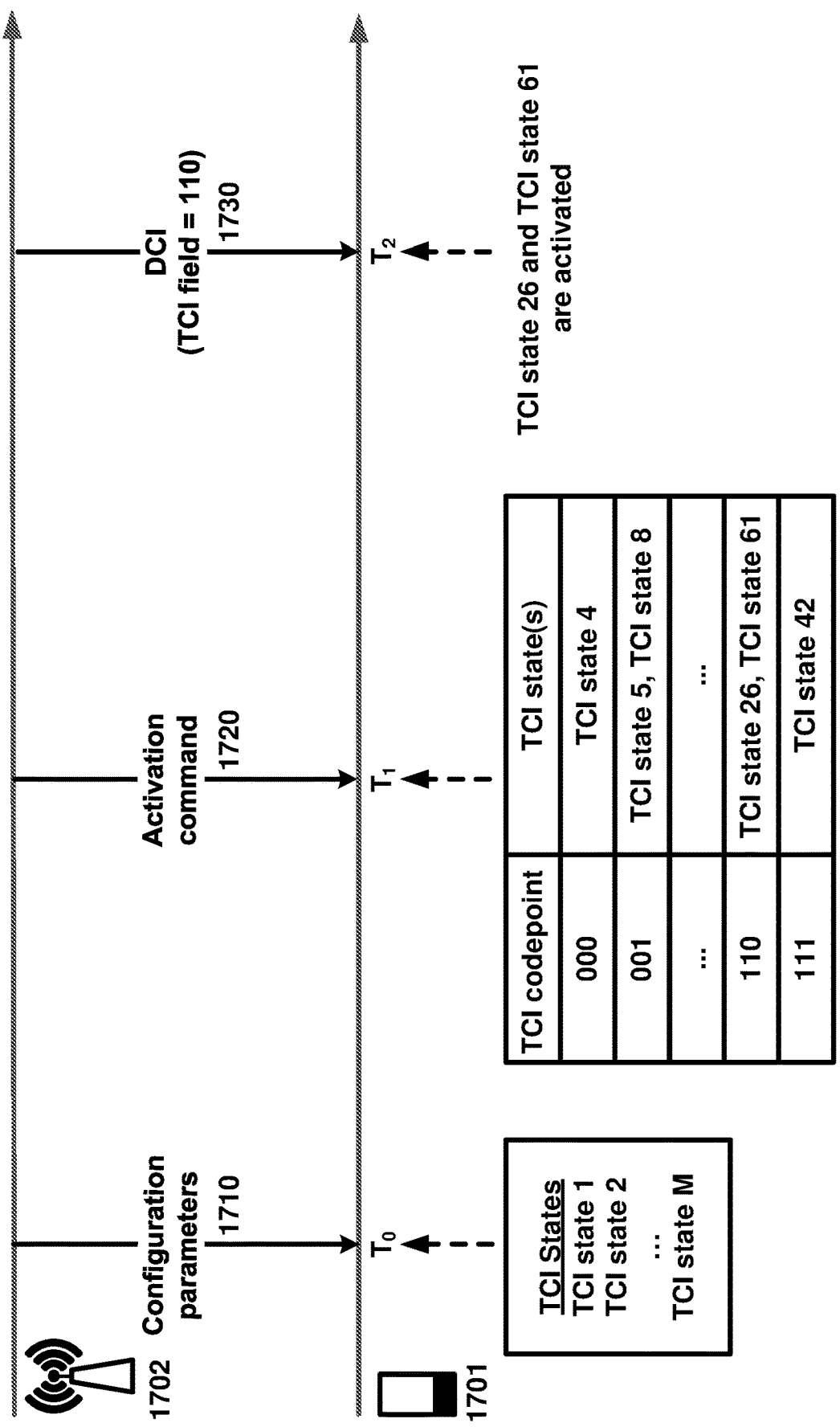
FIG. 17 shows an example TCI state update.

FIG. 17 shows an example TCI state update. The TCI state update may comprise a unified beam update. A wireless device 1701 may receive one or more messages (e.g., at time $T_0$). The wireless device 1701 may receive the one or more messages from a computing device 1702, which may comprise any computing device described herein (e.g., base station, relay node, wireless device, etc.). For example, the wireless device 1701 may receive the one or more messages from a base station. The wireless device 1701 may receive the one or more messages from a relay node. The wireless device 1701 may receive the one or more messages from another wireless device (e.g., TRP, vehicle, remote radio head, and the like). The one or more messages may comprise one or more configuration parameters (e.g., Configuration parameters at time $T_0$ in FIG. 17). The one or more configuration parameters may comprise RRC configuration parameter(s). The one or more configuration parameters may comprise RRC reconfiguration parameter(s).

One or more configuration parameters may be for one or more cells (e.g., a plurality of cells). The one or more (or plurality) of cells may comprise a cell. The cell may be, for example, a serving cell. At least one configuration parameter of the one or more configuration parameters may be for the cell. The cell may be a primary cell (PCell). The cell may be a secondary cell (SCell). The cell may be a secondary cell configured for/with a PUCCH (e.g., PUCCH SCell). The cell may be an unlicensed cell, for example, operating in an unlicensed band. The cell may be a licensed cell, for example, operating in a licensed band. The cell may operate in a first frequency range (FR1). The FR1 may comprise, for example, frequency bands below 6 GHz (or any other frequency or range of frequencies). The cell may operate in a second frequency range (FR2). The FR2 may comprise, for example, frequency bands from 24 GHz to 52.6 GHz (or any other frequency or range of frequencies). The cell may operate in a third frequency range (FR3). The FR3 may comprise, for example, frequency bands from 52.6 GHz to 71 GHz (or any other frequency or range of frequencies). The FR3 may comprise, for example, frequency bands starting from (or above) 52.6 GHz (or any other frequency).

A wireless device may perform uplink transmissions (e.g., PUSCH, PUCCH, SRS) via/of the cell in a first time and in a first frequency. The wireless device may perform downlink receptions (e.g., PDCCH, PDSCH) via/of the cell in a second time and in a second frequency. The cell may operate in a time-division duplex (TDD) mode. The first frequency and the second frequency may be the same, for example, in the TDD mode. The first time and the second time may be different, for example, in the TDD mode. The cell may operate in a frequency-division duplex (FDD) mode. The first frequency and the second frequency may be different, for example, in the FDD mode. The first time and the second time may be the same, for example, in the FDD mode. The cell may operate in a code-division multiplex (CDM) mode, for example, in which the first frequency and the second frequency may be the same or different, and or in which the first time and the second time may be the same or different. The cell may operate in a spatial-domain multiplex (SDM) mode, for example, in which the first frequency and the second frequency may be the same or different, and or in which the first time and the second time may be the same or different. The cell may operation in one or more of a TDD mode, an FDD mode, a CDM mode, and/or an SDM mode.

A wireless device may be an RRC mode of a plurality of RRC modes. For example, the wireless device may be in an RRC connected mode. The wireless device may be in an RRC idle mode. The wireless device may be in an RRC inactive mode.

A cell may comprise a plurality of BWPs. The plurality of BWPs may comprise one or more uplink BWPs comprising an uplink BWP of the cell. The plurality of BWPs may comprise one or more downlink BWPs comprising a downlink BWP of the cell.

A BWP of the plurality of BWPs may be in one of an active state and an inactive state. In the active state of a downlink BWP of the one or more downlink BWPs, the wireless device may monitor a downlink channel/signal (e.g., PDCCH, DCI, CSI-RS, PDSCH) on/for/via the downlink BWP. In the active state of a downlink BWP of the one or more downlink BWPs, the wireless device may receive a PDSCH on/via/for the downlink BWP. In the inactive state of a downlink BWP of the one or more downlink BWPs, the wireless device may not monitor a downlink channel/signal (e.g., PDCCH, DCI, CSI-RS, PDSCH) on/via/for the downlink BWP. In the inactive state of a downlink BWP of the one or more downlink BWPs, the wireless device may stop monitoring (or receiving) a downlink channel/signal (e.g., PDCCH, DCI, CSI-RS, PDSCH) on/via/for the downlink BWP. In the inactive state of a downlink BWP of the one or more downlink BWPs, the wireless device may not receive a PDSCH on/via/for the downlink BWP. In the inactive state of a downlink BWP of the one or more downlink BWPs, the wireless device may stop receiving a PDSCH on/via/for the downlink BWP.

In the active state of an uplink BWP of the one or more uplink BWPs, the wireless device may send (e.g., transmit) an uplink signal/channel (e.g., PUCCH, preamble, PUSCH, PRACH, SRS, etc.) on/via the uplink BWP. In the inactive state of an uplink BWP of the one or more uplink BWPs, the wireless device may not send (e.g., transmit) an uplink signal/channel (e.g., PUCCH, preamble, PUSCH, PRACH, SRS, etc.) on/via the uplink BWP.

A wireless device may activate the downlink BWP of the one or more downlink BWPs of the cell. Activating the downlink BWP may comprise setting (or switching to) the downlink BWP as an active downlink BWP of the cell. Activating the downlink BWP may comprise setting the downlink BWP in the active state. Activating the downlink BWP may comprise switching the downlink BWP from the inactive state to the active state.

A wireless device may activate the uplink BWP of the one or more uplink BWPs of the cell. Activating the uplink BWP may comprise that the wireless device sets (or switches to) the uplink BWP as an active uplink BWP of the cell. Activating the uplink BWP may comprise setting the uplink BWP in the active state. Activating the uplink BWP may comprise switching the uplink BWP from the inactive state to the active state.

One or more configuration parameters may be for the (active) downlink BWP of the cell. At least one configuration parameter of the one or more configuration parameters may be for the downlink BWP of the cell.

One or more configuration parameters may be for the (active) uplink BWP of the cell. At least one configuration parameter of the one or more configuration parameters may be for the uplink BWP of the cell. The one or more configuration parameters may indicate a subcarrier spacing (or a numerology) for the downlink BWP. The one or more configuration parameters may indicate a subcarrier spacing (or a numerology) for the uplink BWP.

A value of the subcarrier spacing (of the downlink BWP and/or the uplink BWP) may be/indicate, for example, 15 kHz ($\mu=0$), or any other frequency or range of frequencies. A value of the subcarrier spacing may be/indicate, for example, 30 kHz ($\mu=1$). A value of the subcarrier spacing may be/indicate, for example, 60 kHz ($\mu=2$). A value of the subcarrier spacing may be/indicate, for example, 120 kHz ($\mu=3$). A value of the subcarrier spacing may be/indicate, for example, 240 kHz ($\mu=4$). A value of the subcarrier spacing may be/indicate, for example, 480 kHz ($\mu=5$). A value of the subcarrier spacing may be/indicate, for example, 960 kHz ($\mu=6$). For example, 480 kHz may be valid/applicable in FR3. For example, 960 kHz may be valid/applicable in FR3. For example, 240 kHz may be valid/applicable in FR3. For example, 120 kHz may be valid/applicable in FR3. Any frequency or range of frequencies may be valid/applicable to any FR(n) (e.g., $\mu$ may be equal to any value).

One or more configuration parameters may indicate a plurality of control resource sets (CORESETS). The one or more configuration parameters may indicate the plurality of CORESETS for the (active) downlink BWP of the cell. The (active) downlink BWP may comprise the plurality of CORESETS.

One or more configuration parameters may indicate a plurality of CORESET indexes/identifiers/indicators (e.g., provided by a higher layer parameter ControlResourceSetId) for the plurality of CORESETS. Each CORESET of the plurality of CORESETS may be identified/indicated by a respective CORESET index of the plurality of CORESET indexes. A first CORESET of the plurality of CORESETS may be identified by a first CORESET index of the plurality of CORESET indexes. A second CORESET of the plurality of CORESETS may be identified by a second CORESET index of the plurality of CORESET indexes.

One or more configuration parameters may indicate a plurality of TCI states (e.g., provided by a higher layer parameter tci-StatesToAddModList in PDSCH_Config, PUSCH_Config, PDCCH_Config or PUCCH_Config, etc.). The one or more configuration parameters may be sent/received in one or more messages 1710, such as shown in FIG. 17 at time $T_0$. The one or more configuration parameters may indicate the plurality of TCI states, for example, for the downlink BWP of the cell. In FIG. 17, the plurality of TCI states may comprise TCI state 1, TCI state 2, . . . , TCI state M.

A quantity/number of the plurality of TCI states may be equal to, for example, 128 (e.g., M=128) or any other value. A quantity/number of the plurality of TCI states may be equal to, for example, 64 (e.g., M=64). A quantity/number of the plurality of TCI states may be equal to, for example, 32 (e.g., M=32). A quantity/number of the plurality of TCI states may be based on a capability of the wireless device. A wireless device may send (e.g., transmit) a capability message (e.g., a UE capability message) indicating a maximum quantity/number of TCI states. A quantity/number of the plurality of TCI states indicated by the one or more configuration parameters may be equal to or less than the maximum number of TCI states.

One or more configuration parameters may indicate a plurality of TCI state indexes/identifiers/indicators (e.g., provided by a higher layer parameter TCI-StateId) for the plurality of TCI states. Each TCI state of the plurality of TCI states may be identified/indicated by a respective TCI state index of the plurality of TCI state indexes. A first TCI state of the plurality of TCI states may be identified by a first TCI state index of the plurality of TCI state indexes. A second TCI state of the plurality of TCI states may be identified by a second TCI state index of the plurality of TCI state indexes.

A plurality of TCI states (or at least one TCI state of the plurality of TCI states) may be for (decoding) PDSCH transmissions/receptions of/for the cell. The one or more configuration parameters may indicate the plurality of TCI states (or the at least one TCI state of the plurality of TCI states) for decoding PDSCH transmissions/receptions of/for the downlink BWP of the cell. A TCI state of the plurality of TCI states may indicate a reference signal (e.g., by a SourceRs-Info) for quasi-colocation of/for DM-RS (or DM-RS antenna port(s)) of the PDSCH transmissions/receptions.

A plurality of TCI states (or at least one TCI state of the plurality of TCI states) may be for PDCCH transmissions/receptions of/for the cell. The one or more configuration parameters may indicate the plurality of TCI states (or the at least one TCI state of the plurality of TCI states) for PDCCH transmissions/receptions of/for the downlink BWP of the cell. A TCI state of the plurality of TCI states may indicate a reference signal for quasi-colocation of/for DM-RS (or DM-RS antenna port(s)) of the PDCCH transmissions/receptions.

A plurality of TCI states (or at least one TCI state of the plurality of TCI states) may be for CSI-RS transmissions/receptions of/for the cell. The one or more configuration parameters may indicate the plurality of TCI states (or the at least one TCI state of the plurality of TCI states) for CSI-RS transmissions/receptions of/for the downlink BWP of the cell. A TCI state of the plurality of TCI states may indicate a reference signal for quasi-colocation of/for CSI-RS transmissions/receptions.

A plurality of TCI states (or at least one TCI state of the plurality of TCI states) may be for transmission of uplink signals (e.g., UCI, dynamic grant PUSCH, configured uplink grant based PUSCH, SRS, PUCCH, transport block, SR, CSI, HARQ-ACK) of/for/on/via an uplink resource (e.g., PUSCH resource, PUCCH resource, SRS resource) of the cell. The one or more configuration parameters may indicate the plurality of TCI states (or the at least one TCI state of the plurality of TCI states) for transmission of the uplink signals of/for/on/via the uplink resource of the uplink BWP of the cell. A wireless device may determine, for transmission of uplink signals, a spatial domain transmission filter/beam based on a reference signal indicated by (or in) a TCI state of the plurality of TCI states.

A plurality of TCI state pools/groups may comprise a plurality of TCI states For example, two TCI state pools/groups may comprise a plurality of TCI states. A first TCI state pool of the two TCI state pools may comprise a plurality of downlink TCI states of the plurality of TCI states. A second TCI state pool of the two TCI state pools may comprise a plurality of uplink TCI states of the plurality of TCI states.

A (single) TCI state pool/group may comprise the plurality of TCI states. The plurality of TCI states may comprise/be a plurality of downlink TCI states. The plurality of TCI states may comprise/be a plurality of uplink TCI states.

A wireless device may apply/use the plurality of downlink TCI states for reception/decoding of transport blocks (or PDSCH transmissions/receptions). The wireless device may use the plurality of downlink TCI states, for example, for reception/decoding of transport blocks (or PDSCH transmissions/receptions) scheduled for the downlink BWP of the cell. The wireless device may use the plurality of downlink TCI states, for example, for reception of downlink signals (e.g., PDSCH transmission/reception, PDCCH transmission/reception, DCI, transport block, CSI-RS and the like) via the downlink BWP of the cell. For example, the wireless device may not use the plurality of downlink TCI states (or each TCI state of the plurality of downlink TCI states) for transmission of uplink signals (e.g., PUSCH transmissions, PUCCH transmissions, UCI, transport block, SRS and the like). A TCI state of the plurality of downlink TCI states may indicate/have/comprise a reference signal for quasi-colocation of/for DM-RS of downlink signals (e.g., PDSCH/PDCCH transmissions/receptions). The reference signal may be quasi co-located with the DM-RS of the downlink signals. The reference signal may be quasi co-located with the DM-RS of the downlink signals with respect to a quasi co-location type (e.g., QCL Type A, QCL Type B, QCL Type C, QCL Type D, QCL Type E, and the like). The TCI state may indicate/comprise/have, for the reference signal, the quasi co-location type. A TCI state of the plurality of downlink TCI states may indicate a reference signal for quasi-colocation of/for reception of downlink signals (e.g., CSI-RS). Each TCI state of the plurality of downlink TCI states may indicate a respective reference signal for quasi-colocation of/for DM-RS of downlink signals (e.g., PDSCH/PDCCH transmissions/receptions). Each TCI state of the plurality of downlink TCI states may indicate a respective reference signal for quasi-colocation of/for reception of downlink signals (e.g., CSI-RS).

A wireless device may apply/use the plurality of uplink TCI states for transmission of transport blocks (or PUSCH transmissions). The wireless device may use the plurality of uplink TCI states, for example, for transmission of transport blocks (or PUSCH transmissions) scheduled/configured for the uplink BWP of the cell. The wireless device may use the plurality of uplink TCI states, for example, for transmission of uplink signals (e.g., PUSCH transmissions, PUCCH transmissions, UCI, transport block, SRS and the like) via the uplink BWP of the cell. The wireless device may not use the plurality of uplink TCI states (or each TCI state of the plurality of uplink TCI states) for reception of downlink signals (e.g., PDSCH transmission/reception, PDCCH transmission/reception, DCI, transport block, CSI-RS and the like). The wireless device may determine a spatial domain transmission filter/beam based on a reference signal indicated by (or in) a TCI state of the plurality of uplink TCI states for transmission of uplink signals. The wireless device may determine, for transmission of uplink signals, a respective spatial domain transmission filter/beam based on a reference signal indicated by (or in) each TCI state of the plurality of uplink TCI states. The wireless device may determine a transmission power based on one or more power control parameters (e.g., target received power, closed-loop index, pathloss compensation factor, alpha, pathloss reference signal, and the like) indicated by (or included in or associated with or mapped to) a TCI state of the plurality of uplink TCI states for transmission of uplink signals. The wireless device may determine, for transmission of uplink signals, a respective transmission power based on one or more power control parameters indicated by (or included in or associated with or mapped to) each TCI state of the plurality of uplink TCI states.

A (single) TCI state pool/group may comprise the plurality of TCI states. The one or more configuration parameters may indicate a joint/common UL/DL TCI state mode and a separate UL/DL TCI state mode, for example, based on a number of TCI state pools. The one or more configuration parameters may indicate the joint/common UL/DL TCI state mode, for example, based on the one or more configuration parameters indicating the (single) TCI state pool/group. The one or more configuration parameters may indicate the separate UL/DL TCI state mode, for example, based on the one or more configuration parameters indicating the two TCI state pools/groups.

One or more configuration parameters may, for example, comprise a TCI type parameter indicating a joint/common UL/DL TCI state mode or a separate UL/DL TCI state mode. The TCI type parameter may be set to "joint" or "joint UL/DL TCI state" indicating the joint/common UL/DL TCI state mode. The TCI type parameter may be set to "separate" or "separate UL/DL TCI states" indicating the separate UL/DL TCI state mode.

A plurality of TCI states may be/comprise a plurality of common/joint TCI states (or a plurality of common/joint uplink and downlink TCI states). The wireless device may use the plurality of common/joint TCI states, for example, for reception of downlink signals (e.g., PDSCH, PDCCH, CSI-RS, DCI, transport block, and the like) via the downlink BWP of the cell. The wireless device may use the plurality of common/joint TCI states, for example, for transmission of uplink signals (e.g., PUSCH, PUCCH, UCI, transport block, SRS and the like) via the uplink BWP of the cell. The wireless device may use each TCI state of the plurality of common/joint TCI states, for example, for reception of downlink signals and for transmission of uplink signals. A TCI state of the plurality of TCI states (or the plurality of common/joint TCI states) may indicate a reference signal for quasi-colocation of/for DM-RS of downlink signals (e.g., PDSCH/PDCCH transmissions/receptions). A TCI state of the plurality of TCI states (or the plurality of common/joint TCI states) may indicate a reference signal for quasi-colocation of/for reception of downlink signals (e.g., CSI-RS). Each TCI state of the plurality of TCI states (or the plurality of common/joint TCI states) may indicate a respective reference signal for quasi-colocation of/for DM-RS of downlink signals (e.g., PDSCH/PDCCH transmissions/receptions). Each TCI state of the plurality of TCI states (or the plurality of common/joint TCI states) may indicate a respective reference signal for quasi-colocation of/for reception of downlink signals (e.g., CSI-RS). The wireless device may determine a spatial domain transmission filter/beam based on a reference signal indicated by (or in) a TCI state of the plurality of TCI states (or the plurality of common/joint TCI states) for transmission of uplink signals. The wireless device may determine, for transmission of uplink signals, a respective spatial domain transmission filter/beam based on a reference signal indicated by (or in) each TCI state of the plurality of TCI states (or the plurality of common/joint TCI states).

One or more configuration parameters may not indicate one or more TCI states for the downlink BWP of the cell. One or more TCI state parameters/configuration may be absent in the one or more configuration parameters. The one or more configuration parameters may not comprise the one or more TCI state parameters/configuration in/for the downlink BWP of the cell. The one or more configuration parameters may indicate a plurality of TCI states, for example, for a reference BWP (e.g., reference downlink BWP) of a reference cell. The plurality of cells may comprise the reference cell. The wireless device may apply/use the plurality of TCI states of (or associated with) the reference BWP of the reference cell to the downlink BWP of the cell. The one or more configuration parameters may indicate, for the cell (or the downlink BWP of the cell), the reference BWP of the reference cell to apply/use the plurality of TCI states of (or associated with) the reference BWP of the reference cell.

A wireless device may receive an activation command 1720 such as shown in FIG. 17. The activation command may be sent/received in one or more messages (e.g., DCI, MAC-CE, TCI States Activation/Deactivation for UE-specific MAC CE, Activation command at time $T_1$ in FIG. 17) indicating activation of a subset of the plurality of TCI states. The activation command may activate/select/indicate/update the subset of the plurality of TCI states. The subset of the plurality of TCI states may comprise/be, for example, one or more TCI states of the plurality of TCI states. The subset of the plurality of TCI states may comprise/be, for example, a first plurality of TCI states of the plurality of TCI states. For example, in FIG. 17, the subset of the plurality of TCI states are TCI state 4, TCI state 5, TCI state 8, TCI state 26, TCI state 61, and TCI state 42.

An activation command may comprise one or more fields indicating/comprising at least one TCI state index of/indicating/identifying the subset of the plurality of TCI states. The plurality of TCI state indexes may comprise the at least one TCI state index. Each TCI state of the subset of the plurality of TCI states may be identified/indicated by a respective TCI state index of the at least one TCI state index. The one or more fields may be set to a value (e.g., one) indicating activation of the subset of the plurality of TCI states. Based on the one or more fields that indicate the subset of the plurality of TCI states being set to the value, the wireless device may activate the subset of the plurality of TCI states. The wireless device may activate the subset of the plurality of TCI states, for example, based on the receiving the activation command activating/selecting/indicating/updating the subset of the plurality of TCI states.

A wireless device may map the subset of the plurality of TCI states to one or more TCI codepoints (e.g., 000, 001, . . . , 110, and 011 in TCI Codepoint in FIG. 17). The mapping the subset of the plurality of TCI states to the one or more TCI codepoints may comprise grouping the subset of the plurality of TCI states into/in the one or more TCI codepoints. Each TCI codepoint of the one or more TCI codepoints may comprise/indicate respective TCI state(s) of the subset of the plurality of TCI states. For example, in FIG. 17, TCI state 4 may be mapped to TCI codepoint 000; TCI state 5 and TCI state 8 may be mapped to TCI codepoint 001; TCI state 26 and TCI state 61 may be mapped to TCI codepoint 110; and TCI state 42 may be mapped to the TCI codepoint 111. Each TCI codepoint of the one or more TCI codepoints may be equal to a value of a TCI field in a DCI. The DCI may or may not schedule a transport block (e.g., PDSCH, PUSCH). The TCI field in the DCI may indicate (or be equal to) a TCI codepoint of the one or more TCI codepoints. The TCI codepoint may comprise/indicate at least one TCI state of the subset of the plurality of TCI states.

A TCI state of the subset of the plurality of TCI states may indicate a reference signal with/for a quasi co-location type (e.g., QCL Type A, QCL Type D). The TCI state may not comprise/indicate a BWP index/ID and/or a cell index/ID for the reference signal. The wireless device may assume that the reference signal is configured in the downlink BWP of the cell where the TCI state applies.

A subset of the plurality of TCI states may be for (decoding) PDSCH transmissions/receptions of/for the cell. The activation command may indicate activation of the subset of the plurality of TCI states for decoding PDSCH transmissions/receptions of/for the downlink BWP of the cell.

A subset of the plurality of TCI states may be for transmission of uplink signals (e.g., UCI, PUSCH, SRS, PUCCH, transport block, SR, CSI, CSI report, HARQ-ACK) of/for/on/via an uplink resource (e.g., PUSCH resource, PUCCH resource, SRS resource) of the cell. The activation command may indicate activation of the subset of the plurality of TCI states for transmission of the uplink signals of/for/on/via the uplink resource of the uplink BWP of the cell.

A subset of the plurality of TCI states may be/comprise one or more downlink TCI states. The wireless device may use the one or more downlink TCI states for reception/decoding of transport blocks (or PDSCH transmissions/receptions). The wireless device may use the one or more downlink TCI states, for example, for reception/decoding of transport blocks (or PDSCH transmissions/receptions) scheduled/configured for the downlink BWP of the cell. The wireless device may use the one or more downlink TCI states, for example, for reception of downlink signals (e.g., PDSCH, PDCCH, DCI, CSI-RS, transport block, and the like) via the downlink BWP of the cell.

A subset of the plurality of TCI states may be/comprise one or more uplink TCI states. The wireless device may use the one or more uplink TCI states for transmission of transport blocks (or PUSCH transmissions). The wireless device may use the one or more uplink TCI states, for example, for transmission of transport blocks (or PUSCH transmissions) scheduled/configured for the uplink BWP of the cell. The wireless device may use the one or more uplink TCI states, for example, for transmission of uplink signals (e.g., PUSCH, PUCCH, UCI, transport block, SRS and the like) via the uplink BWP of the cell.

A subset of the plurality of TCI states may be/comprise one or more common/joint TCI states. The wireless device may use the one or more common/joint TCI states, for example, for reception of downlink signals (e.g., PDSCH, PDCCH, DCI, CSI-RS, transport block, and the like) via the downlink BWP of the cell. The wireless device may use the one or more common/joint TCI states, for example, for transmission of uplink signals (e.g., PUSCH, PUCCH, UCI, transport block, SRS and the like) via the uplink BWP of the cell. For example, the wireless device may use the one or more common/joint TCI states for reception of downlink signals via the downlink BWP of the cell and for transmission of uplink signals via the uplink BWP of the cell.

A wireless device may receive a downlink signal 1730 such as shown in FIG. 17. The downlink signal may be sent/received in one or more messages. The downlink signal may comprise date and/or control information (e.g., transport block, PDCCH/PDSCH transmission, CSI-RS, aperiodic CSI-RS, DCI, and the like). The wireless device may receive the downlink signal, for example, based on a TCI state of the subset of the plurality of TCI states. The wireless device may, for example, receive a DCI scheduling/triggering reception/transmission of the downlink signal. The DCI may, for example, indicate a dynamic uplink/downlink grant. The DCI may, for example, indicate an activation of a SPS PDSCH transmission. The wireless device may receive the downlink signal (e.g., transport block) for/of the SPS PDSCH transmission. The DCI may comprise a TCI field indicating the TCI state (or a TCI codepoint comprising/indicating the TCI state). The one or more configuration parameters may indicate/configure/schedule/trigger transmission/reception of the downlink signal (e.g., periodic CSI-RS, PDCCH/PDSCH transmission, and so on). The one or more configuration parameters may comprise/indicate a TCI field indicating the TCI state (or a TCI codepoint comprising/indicating the TCI state) for transmission/reception of the downlink signal.

Receiving the downlink signal based on the TCI state may comprise at least one DMRS antenna port of the downlink signal (e.g., PDSCH/PDCCH transmissions, transport block) being quasi co-located with a reference signal (e.g., CSI-RS, SS/PBCH block, SRS, PUCCH, and the like) indicated by the TCI state. The at least one DMRS antenna port of the downlink signal may be quasi co-located with the reference signal with respect to a quasi co-location type (e.g., QCL TypeA, QCL TypeB, QCL TypeC, QCL TypeD, and the like). The TCI state may indicate/comprise/have the quasi co-location type. The TCI state may comprise/have a reference signal index indicating/identifying the reference signal. The one or more configuration parameters may indicate, for the TCI state, the reference signal index.

Receiving the downlink signal based on the TCI state may comprise the downlink signal (e.g., CSI-RS, DM-RS) being quasi co-located with a reference signal (e.g., CSI-RS, SS/PBCH block, SRS, PUCCH, and the like) indicated by the TCI state. The downlink signal may be quasi co-located with the reference signal with respect to a quasi co-location type (e.g., QCL TypeA, QCL TypeB, QCL TypeC, QCL TypeD, and the like). The TCI state may indicate/comprise/have the quasi co-location type. The TCI state may comprise/have a reference signal index indicating/identifying the reference signal. The one or more configuration parameters may indicate, for the TCI state, the reference signal index.

Receiving the downlink signal based on the TCI state may comprise receiving the downlink signal with a spatial domain reception/receiving filter/beam that is used to receive the reference signal indicated by the TCI state. The spatial domain reception/receiving filter/beam used to receive the downlink signal may be same as (or substantially same as, x degrees apart, x=0, 1, 5, 10, and the like) a spatial domain reception/receiving filter/beam used to receive the reference signal.

A wireless device may send (e.g., transmit) an uplink signal (e.g., transport block, PUCCH/PUSCH transmission, SRS, aperiodic SRS, PUCCH, aperiodic PUCCH, UCI, and the like) based on a TCI state of the subset of the plurality of TCI states. The wireless device may, for example, receive a DCI scheduling/triggering transmission of the uplink signal. The DCI may, for example, indicate a dynamic uplink/downlink grant. The DCI may, for example, indicate an activation of a configured uplink grant (e.g., Type 2 configured uplink grant). The wireless device may send (e.g., transmit) the uplink signal (e.g., transport block) for/of the configured uplink grant. The DCI may comprise a TCI field indicating the TCI state (or a TCI codepoint comprising/indicating the TCI state). The one or more configuration parameters may indicate/configure/schedule/trigger transmission of the uplink signal (e.g., periodic SRS, PUCCH/PUSCH transmission, periodic PUCCH, configured uplink grant, and so on). The one or more configuration parameters may comprise/indicate a TCI field indicating the TCI state (or a TCI codepoint comprising/indicating the TCI state) for transmission of the uplink signal. The one or more configuration parameters indicate, for a configured uplink grant (e.g., Type 1 configured uplink grant), the TCI state. The wireless device may send (e.g., transmit) the uplink signal (e.g., transport block) for/of the configured uplink grant (e.g., Type 1 configured uplink grant).

Sending (e.g., transmitting) the uplink signal based on the TCI state may comprise transmitting the uplink signal with a spatial domain transmitting/transmission filter/beam that is determined based on the reference signal (e.g., CSI-RS, SS/PBCH block, SRS, PUCCH) indicated by the TCI state. The spatial domain transmitting/transmission filter/beam used to transmit the uplink signal may be same as (or substantially same as, x degrees apart, x=0, 1, 5, 10, and the like) a spatial domain transmitting/transmission filter/beam used to transmit the reference signal (e.g., SRS, PUCCH). The spatial domain transmitting/transmission filter/beam used to transmit the uplink signal may be same as (or substantially same as, x degrees apart, x=0, 1, 5, 10, and the like) a spatial domain reception/receiving filter/beam used to receive the reference signal (e.g., CSI-RS, SS/PBCH block).

A wireless device may monitor, for a DCI, PDCCH transmissions in/via a CORESET based on a TCI state. The plurality of CORESETS may comprise the CORESET. The downlink BWP of the cell (or one or more CORESETS in the downlink BWP) may comprise the CORESET. The subset of the plurality of TCI states may comprise the TCI state. The subset of the TCI state may or may not comprise the TCI state. The wireless device may receive a second activation command indicating activation of the TCI state for the CORESET. The second activation command may or may not be same as the activation command (at time $T_1$ in FIG. 17). Monitoring the PDCCH transmissions in the CORESET based on the TCI state may comprise at least one DMRS antenna port of the PDCCH transmissions in the CORESET being quasi co-located with a reference signal (e.g., CSI-RS, SS/PBCH block, SRS, and the like) indicated by the TCI state. The at least one DMRS antenna port may be quasi co-located with the reference signal with respect to a quasi co-location type (e.g., QCL TypeA, QCL TypeB, QCL TypeC, QCL TypeD, and the like). The TCI state may indicate/comprise/have the quasi co-location type.

A quantity/number of the one or more TCI codepoints may be equal to one. The one or more TCI codepoints may be a (single) TCI codepoint. The (single) TCI codepoint may indicate at least two TCI states of the plurality of TCI states. The subset of the plurality of TCI states may be the at least two TCI states. The wireless device may not receive a DCI indicating activation of one or more TCI states among the at least two TCI states, for example, based on the number of the one or more TCI codepoints being equal to one. The wireless device may not receive a DCI indicating activation of one or more TCI states among the at least two TCI states, for example, based on the activation command indicating activation of the at least two TCI states.

A quantity/number of the one or more TCI codepoints may be greater than one. The wireless device may receive a DCI (e.g., DCI 1 at time $T_2$ in FIG. 17). The DCI may be, for example, a DCI format 1_1. The DCI may be, for example, a DCI format 1_2. The DCI may be, for example, a DCI format 1_x, where x=0, 1, 2 . . . . The DCI may be, for example, a DCI format 0_x, where x=0, 1, 2 . . . .

DCI may comprise a TCI field. The TCI field may indicate a TCI codepoint of the one or more TCI codepoints. A value of the TCI field (e.g., 110 at step 1730 in FIG. 17) may be, for example, equal to the TCI codepoint. The value of the TCI field may be, for example, indicate the TCI codepoint. The TCI codepoint (e.g., 110) may indicate/comprise at least two TCI states. The DCI may indicate activation of (or may activate) the at least two TCI states. The at least two TCI states may comprise a first TCI state and a second TCI state. For example, in FIG. 17, the first TCI state is the TCI state 26. The second TCI state is the TCI state 61. Any TCI codepoint may indicate/comprise any one or more TCI states (e.g., one TCI state, two TCI states, or any quantity of TCI states). The DCI may indicate activation of one TCI state (e.g., TCI state 42). The DCI may indicate activation of the at least two TCI states (or any other quantity of TCI states).

The first TCI state of the at least two TCI states may be identified/indicated by a first TCI state index. The second TCI state of the at least two TCI states may be identified/indicated by a second TCI state index. The plurality of TCI state indexes may comprise the first TCI state index. The plurality of TCI state indexes may comprise the second TCI state index. The at least one TCI state index of the plurality of TCI state indexes may comprise the first TCI state index. The at least one TCI state index of the plurality of TCI state indexes may comprise the second TCI state index.

At least two TCI states may be/comprise at least two unified TCI states. The first TCI state may be/comprise a first unified TCI state. The second TCI state may be/comprise a second unified TCI state.

A first TCI state (e.g., TCI state 26) may be a first/starting/earliest/initial TCI state in a vector/set/list of the at least two TCI states. The first TCI state may be a first/starting/earliest element in a vector/set/list of the at least two TCI states. The first TCI state may be a first/starting/earliest TCI state among the at least two TCI states in (or indicated by) the TCI codepoint. A position/location of the first TCI state may be earliest/highest/lowest in the vector of the at least two TCI states. A position/location of the first TCI state may be earlier than (or before) a position/location of the second TCI state in the vector of the at least two TCI states. The first TCI state may occur first in a vector/set/list of the at least two TCI states. The first/starting/earliest TCI state (or the first TCI state) is TCI state 26, for example, if the vector of the at least two TCI states is equal to [TCI state 26, TCI state 61]. The first/starting/earliest TCI state (or the first TCI state) is TCI state 2, for example, if the vector of the at least two TCI states is equal to [TCI state 2, TCI state 1].

A second TCI state (e.g., TCI state 61) may be a second/second starting/second earliest TCI state in a vector/set/list of the at least two TCI states. The second TCI state may be a second/second starting/second earliest element in a vector/set/list of the at least two TCI states. The second TCI state may be a second/second starting/second earliest TCI state among the at least two TCI states in (or indicated by) the TCI codepoint. A position/location of the second TCI state may be the second earliest/second highest/second lowest in the vector of the at least two TCI states. A position/location of the first TCI state may be earlier than (or before) a position/location of the second TCI state in the vector of the at least two TCI states. A position/location of the second TCI state may be later than (e.g., after) a position/location of the first TCI state in the vector of the at least two TCI states. The second TCI state may occur second in a vector/set/list of the at least two TCI states. The second/second starting/second earliest TCI state (or the second TCI state) is TCI state 61, for example, if the vector of the at least two TCI states is equal to [TCI state 26, TCI state 61]. The second/second starting/second earliest TCI state (or the second TCI state) is TCI state 1, for example, if the vector of the at least two TCI states is equal to [TCI state 2, TCI state 1].

DCI may schedule transmission of a transport block (e.g., PDSCH, PUSCH). The DCI may comprise, for example, a downlink assignment indicating resource(s) for the transport block. The DCI may comprise, for example, an uplink grant/assignment indicating resource(s) for the transport block. The wireless device may send (e.g., transmit), via the resource(s), the transport block.

DCI may not schedule transmission of a transport block (e.g., PDSCH/PUSCH transmission). The DCI may not comprise, for example, a downlink assignment. The DCI may not comprise, for example, an uplink grant/assignment. A CRC for/of the DCI may be scrambled with an RNTI (e.g., CS-RNTI). An RV field of the DCI may be set to (or may indicate or may be equal to) one (e.g., all "1"s), for example, by the base station. A MCS field of the DCI may be set to (or may indicate or may be equal to) one (e.g., all "1"s), for example, by the base station. A new data indicator (NDI) field of the DCI may be set to (or may indicate or may be equal to) zero, for example, by the base station. A FDRA field of the DCI may be set to (or may indicate or may be equal to) zero (e.g., all "0"s), for example, for FDRA Type 0. A FDRA field of the DCI may be set to (or may indicate or may be equal to) one (e.g., all "1"s), for example, for FDRA Type 1. A FDRA field of the DCI may be set to (or may indicate or may be equal to) zero (e.g., all "0"s), for example, for dynamic switch.

A wireless device may send (e.g., transmit) an uplink signal (e.g., HARQ-ACK or a PUCCH with HARQ-ACK information) via a PUCCH resource. The wireless device may send (e.g., transmit) the uplink signal, for example, for the transport block scheduled by the DCI. The wireless device may send (e.g., transmit) the uplink signal, for example, for the DCI (e.g., if the DCI does not schedule transmission of a transport block).

A wireless device may apply (or start using) the at least two TCI states starting from a starting/initial/earliest/first slot that is/occurs, for example, after a number of symbols (e.g., Beam application time, MAC-CE activation time, $3N_{slot}^{subframe,\mu}$) from/after a slot last/ending/latest symbol of the uplink signal (or the PUCCH with the HARQ-ACK information). The wireless device may apply (or start using) the at least two TCI states starting from the starting/initial/earliest/first slot that is at least the quantity/number of symbols (e.g., Beam application time, MAC-CE activation time) from/after the last/ending/latest symbol of the uplink signal. The starting/initial/earliest/first slot may occur at least the quantity/number of symbols from/after the last/ending/latest symbol of the uplink signal. The quantity/number of symbols (e.g., Beam application time) may be based on a capability of the wireless device. For example, the wireless device may send (e.g., transmit) a capability message (e.g., UE capability message) indicating the quantity/number of symbols. For example, the wireless device may send (e.g., transmit) a capability message (e.g., UE capability message) indicating a minimum and/or maximum quantity/number of symbols. The one or more configuration parameters (e.g., by RRC parameter beamAppTime) may indicate the quantity/number of symbols. The one or more configuration parameters (e.g., by RRC parameter beamAppTime) may indicate the quantity/number of symbols, for example, based on the minimum/maximum number of symbols. The quantity/number of symbols may be, for example, equal to or greater than the minimum and/or maximum quantity/number of symbols. The quantity/number of symbols may be, for example, equal to or less than the minimum and/or maximum quantity/number of symbols. The quantity/number of symbols may be, for example, based on the subcarrier spacing (e.g., $\mu$) of the downlink BWP. The quantity/number of symbols may be, for example, based on the subcarrier spacing (e.g., $\mu$) of the uplink BWP.

A wireless device may apply (or start using) the at least two TCI states indicated/activated by the activation command (e.g., DCI 1 at time $T_1$ in FIG. 17) starting from the starting/initial/earliest/first slot, for example, based on the number of the one or more TCI codepoints being equal to one.

A wireless device may apply (or start using) the at least two TCI states indicated/activated by the DCI (e.g., at time $T_2$ in FIG. 17) starting from the starting/initial/earliest/first slot, for example, based on the number of the one or more TCI codepoints being greater than one.

At least two TCI states may be/comprise at least two uplink TCI states. The plurality of uplink TCI states may comprise the at least two uplink TCI states. The first TCI state may be/comprise a first uplink TCI state of the at least two uplink TCI states. The second TCI state may be/comprise a second uplink TCI state of the at least two uplink TCI states. The wireless device may apply/use the at least two uplink TCI states, for example, for transmission of uplink signals (e.g., PUSCH transmissions, PUCCH transmissions, UCI, transport block, SRS and the like) via the uplink BWP of the cell.

Using/applying the at least two uplink TCI states for transmission of the uplink signals may comprise sending (e.g., transmitting) one or more first uplink signals (e.g., PUSCH transmissions, PUCCH transmissions, UCI, transport block, SRS and the like) with a first spatial domain transmission filter/beam that is determined based on a first reference signal indicated by the first uplink TCI state. The first spatial domain transmitting/transmission filter/beam may be, for example, same as (or substantially same as, x degrees apart, x=0, 1, 5, 10, and the like) a spatial domain reception/receiving filter/beam used to receive the first reference signal. The first spatial domain transmitting/transmission filter/beam may be, for example, the same as (or substantially same as, x degrees apart, x=0, 1, 5, 10, and the like) a spatial domain transmission/transmitting filter/beam used to send (e.g., transmit) the first reference signal. The using/applying the at least two uplink TCI states for transmission of the uplink signals may comprise sending (e.g., transmitting) the one or more first uplink signals with a first transmission power that is determined based on one or more first power control parameters (e.g., target received power, closed-loop index, pathloss compensation factor, alpha, pathloss reference signal, and the like) indicated by (or included in or associated with or mapped to) the first uplink TCI state. The uplink signals may comprise the one or more first uplink signals. The using/applying the at least two uplink TCI states for transmission of the uplink signals may comprise sending (e.g., transmitting) one or more second uplink signals (e.g., PUSCH transmissions, PUCCH transmissions, UCI, transport block, SRS and the like) with a second spatial domain transmission filter/beam that is determined based on a second reference signal indicated by the second uplink TCI state. The second spatial domain transmitting/transmission filter/beam may be, for example, same as (or substantially same as, x degrees apart, x=0, 1, 5, 10, and the like) a spatial domain reception/receiving filter/beam used to receive the second reference signal. The second spatial domain transmitting/transmission filter/beam may be, for example, same as (or substantially same as, x degrees apart, x=0, 1, 5, 10, and the like) a spatial domain transmission/transmitting filter/beam used to send (e.g., transmit) the second reference signal. The using/applying the at least two uplink TCI states for transmission of the uplink signals may comprise sending (e.g., transmitting) the one or more second uplink signals with a second transmission power that is determined based on one or more second power control parameters (e.g., target received power, closed-loop index, pathloss compensation factor, alpha, pathloss reference signal, and the like) indicated by (or included in or associated with or mapped to) the second uplink TCI state. The uplink signals may comprise the one or more second uplink signals.

At least two TCI states may be/comprise at least two downlink TCI states. The plurality of downlink TCI states may comprise the at least two downlink TCI states. The first TCI state may be/comprise a first downlink TCI state of the at least two downlink TCI states. The second TCI state may be/comprise a second downlink TCI state of the at least two downlink TCI states. The wireless device may apply/use the at least two downlink TCI states, for example, for reception of downlink signals (e.g., PDSCH transmission/reception, PDCCH transmission/reception, CSI-RS, DMRS and the like) via the downlink BWP of the cell.

Using/applying the at least two downlink TCI states for reception of the downlink signals may comprise receiving one or more first downlink signals (e.g., PDSCH, PDCCH, CSI-RS, DMRS and the like) with a first spatial domain reception/receiving filter/beam that is determined based on a first reference signal indicated by the first downlink TCI state. The first spatial domain reception/receiving filter/beam may be, for example, same as (or substantially same as, x degrees apart, x=0, 1, 5, 10, and the like) a spatial domain reception/receiving filter/beam used to receive the first reference signal. The first spatial domain reception/receiving filter/beam may be, for example, same as (or substantially same as, x degrees apart, x=0, 1, 5, 10, and the like) a spatial domain transmission/transmitting filter/beam used to send (e.g., transmit) the first reference signal. The downlink signals may comprise the one or more first downlink signals. The using/applying the at least two downlink TCI states for reception of the downlink signals may comprise receiving one or more second downlink signals (e.g., PDSCH, PDCCH, CSI-RS, DMRS and the like) with a second spatial domain reception/receiving filter/beam that is determined based on a second reference signal indicated by the second downlink TCI state. The second spatial domain reception/receiving filter/beam may be, for example, same as (or substantially same as, x degrees apart, x=0, 1, 5, 10, and the like) a spatial domain reception/receiving filter/beam used to receive the second reference signal. The second spatial domain reception/receiving filter/beam may be, for example, same as (or substantially same as, x degrees apart, x=0, 1, 5, 10, and the like) a spatial domain transmission/transmitting filter/beam used to send (e.g., transmit) the second reference signal. The downlink signals may comprise the one or more second downlink signals.

Using/applying the at least two downlink TCI states for reception of the downlink signals may comprise DM-RS (or DM-RS antenna port(s)) of one or more first downlink signals (e.g., PDSCH, PDCCH, CSI-RS, DMRS and the like) being quasi co-located with a first reference signal indicated by the first downlink TCI state. The DM-RS (or the DM-RS antenna port(s)) of one or more first downlink signals may be quasi co-located with the first reference signal with respect to a first quasi co-location type (e.g., QCL Type A, QCL Type B, QCL Type C, QCL Type D, QCL Type E, and the like) indicated by the first downlink TCI state. The using/applying the at least two downlink TCI states for reception of the downlink signals may comprise DM-RS (or DM-RS antenna port(s)) of one or more second downlink signals (e.g., PDSCH, PDCCH, CSI-RS, DMRS and the like) being quasi co-located with a second reference signal indicated by the second downlink TCI state. The DM-RS (or the DM-RS antenna port(s)) of one or more second downlink signals may be quasi co-located with the second reference signal with respect to a second quasi co-location type (e.g., QCL Type A, QCL Type B, QCL Type C, QCL Type D, QCL Type E, and the like) indicated by the second downlink TCI state.

Using/applying the at least two downlink TCI states for reception of the downlink signals may comprise one or more first downlink signals (e.g., CSI-RS, DMRS and the like) being quasi co-located with a first reference signal indicated by the first downlink TCI state. The one or more first downlink signals may be quasi co-located with the first reference signal with respect to a first quasi co-location type indicated by the first downlink TCI state. The using/applying the at least two downlink TCI states for reception of the downlink signals may comprise one or more second downlink signals (e.g., CSI-RS, DMRS and the like) being quasi co-located with a second reference signal indicated by the second downlink TCI state. The one or more second downlink signals may be quasi co-located with the second reference signal with respect to a second quasi co-location type indicated by the second downlink TCI state.

At least two TCI states may be/comprise at least two common/joint TCI states (or at least two common/joint uplink and downlink TCI states). The plurality of common/joint TCI states may comprise the at least two common/joint TCI states. The first TCI state may be/comprise a first common/joint TCI state of the at least two common/joint TCI states. The second TCI state may be/comprise a second common/joint TCI state of the at least two common/joint TCI states. The wireless device may apply/use the at least two common/joint TCI states, for example, for reception of downlink signals (e.g., PDSCH, PDCCH, CSI-RS, DMRS and the like) via the downlink BWP of the cell. The wireless device may apply/use the at least two common/joint TCI states, for example, for transmission of uplink signals (e.g., PUSCH, PUCCH, UCI, transport block, SRS and the like) via the uplink BWP of the cell. The wireless device may apply/use the at least two common/joint TCI states for reception of downlink signals and for transmission of uplink signals.

Using/applying the at least two common/joint TCI states for reception of the downlink signals may comprise receiving one or more first downlink signals (e.g., PDSCH, PDCCH, CSI-RS, DMRS and the like) with a first spatial domain reception/receiving filter/beam that is determined based on a first reference signal indicated by the first common/joint TCI state. The first spatial domain reception/receiving filter/beam may be, for example, same as (or substantially same as, x degrees apart, x=0, 1, 5, 10, and the like) a spatial domain reception/receiving filter/beam used to receive the first reference signal. The first spatial domain reception/receiving filter/beam may be, for example, same as (or substantially same as, x degrees apart, x=0, 1, 5, 10, and the like) a spatial domain transmission/transmitting filter/beam used to send (e.g., transmit) the first reference signal. The downlink signals may comprise the one or more first downlink signals. The using/applying the at least two common/joint TCI states for reception of the downlink signals may comprise receiving one or more second downlink signals (e.g., PDSCH, PDCCH, CSI-RS, DMRS and the like) with a second spatial domain reception/receiving filter/beam that is determined based on a second reference signal indicated by the second common/joint TCI state. The second spatial domain reception/receiving filter/beam may be, for example, same as (or substantially same as, x degrees apart, x=0, 1, 5, 10, and the like) a spatial domain reception/receiving filter/beam used to receive the second reference signal. The second spatial domain reception/receiving filter/beam may be, for example, same as (or substantially same as, x degrees apart, x=0, 1, 5, 10, and the like) a spatial domain transmission/transmitting filter/beam used to send (e.g., transmit) the second reference signal. The downlink signals may comprise the one or more second downlink signals.

Using/applying the at least two common/joint TCI states for reception of the downlink signals may comprise DMRS (or DM-RS antenna port(s)) of one or more first downlink signals (e.g., PDSCH, PDCCH, CSI-RS, DMRS and the like) being quasi co-located with a first reference signal indicated by the first common/joint TCI state. The DM-RS (or the DM-RS antenna port(s)) of one or more first downlink signals may be quasi co-located with the first reference signal with respect to a first quasi co-location type (e.g., QCL Type A, QCL Type B, QCL Type C, QCL Type D, QCL Type E, and the like) indicated by the first common/joint TCI state. The using/applying the at least two common/joint TCI states for reception of the downlink signals may comprise DMRS (or DM-RS antenna port(s)) of one or more second downlink signals (e.g., PDSCH, PDCCH, CSI-RS, DMRS and the like) being quasi co-located with a second reference signal indicated by the second common/joint TCI state. The DM-RS (or the DM-RS antenna port(s)) of one or more second downlink signals may be quasi co-located with the second reference signal with respect to a second quasi co-location type (e.g., QCL Type A, QCL Type B, QCL Type C, QCL Type D, QCL Type E, and the like) indicated by the second common/joint TCI state.

Using/applying the at least two common/joint TCI states for reception of the downlink signals may comprise one or more first downlink signals (e.g., CSI-RS, DMRS and the like) being quasi co-located with a first reference signal indicated by the first common/joint TCI state. The one or more first downlink signals may be quasi co-located with the first reference signal with respect to a first quasi co-location type indicated by the first common/joint TCI state. The using/applying the at least two common/joint TCI states for reception of the downlink signals may comprise one or more second downlink signals (e.g., CSI-RS, DMRS and the like) being quasi co-located with a second reference signal indicated by the second common/joint TCI state. The one or more second downlink signals may be quasi co-located with the second reference signal with respect to a second quasi co-location type indicated by the second common/joint TCI state.

Using/applying the at least two common/joint TCI states for transmission of the uplink signals may comprise sending (e.g., transmitting) one or more first uplink signals (e.g., PUSCH transmissions, PUCCH transmissions, UCI, transport block, SRS and the like) with a first spatial domain transmission filter/beam that is determined based on a first reference signal indicated by the first common/joint TCI state. The first spatial domain transmitting/transmission filter/beam may be, for example, same as (or substantially same as, x degrees apart, x=0, 1, 5, 10, and the like) a spatial domain reception/receiving filter/beam used to receive the first reference signal. The first spatial domain transmitting/transmission filter/beam may be, for example, same as (or substantially same as, x degrees apart, x=0, 1, 5, 10, and the like) a spatial domain transmission/transmitting filter/beam used to send (e.g., transmit) the first reference signal. The using/applying the at least two common/joint TCI states for transmission of the uplink signals may comprise sending (e.g., transmitting) the one or more first uplink signals with a first transmission power that is determined based on one or more first power control parameters (e.g., target received power, closed-loop index, pathloss compensation factor, alpha, pathloss reference signal, and the like) indicated by (or included in or associated with or mapped to) the first common/joint TCI state. The uplink signals may comprise the one or more first uplink signals.

Using/applying the at least two common/joint TCI states for transmission of the uplink signals may comprise sending (e.g., transmitting) one or more second uplink signals (e.g., PUSCH transmissions, PUCCH transmissions, UCI, transport block, SRS and the like) with a second spatial domain transmission filter/beam that is determined based on a second reference signal indicated by the second common/joint TCI state. The second spatial domain transmitting/transmission filter/beam may be, for example, same as (or substantially same as, x degrees apart, x=0, 1, 5, 10, and the like) a spatial domain reception/receiving filter/beam used to receive the second reference signal. The second spatial domain transmitting/transmission filter/beam may be, for example, same as (or substantially same as, x degrees apart, x=0, 1, 5, 10, and the like) a spatial domain transmission/transmitting filter/beam used to send (e.g., transmit) the second reference signal. The using/applying the at least two common/joint TCI states for transmission of the uplink signals may comprise sending (e.g., transmitting) the one or more second uplink signals with a second transmission power that is determined based on one or more second power control parameters (e.g., target received power, closed-loop index, pathloss compensation factor, alpha, pathloss reference signal, and the like) indicated by (or included in or associated with or mapped to) the second common/joint TCI state. The uplink signals may comprise the one or more second uplink signals.

Figure 18:
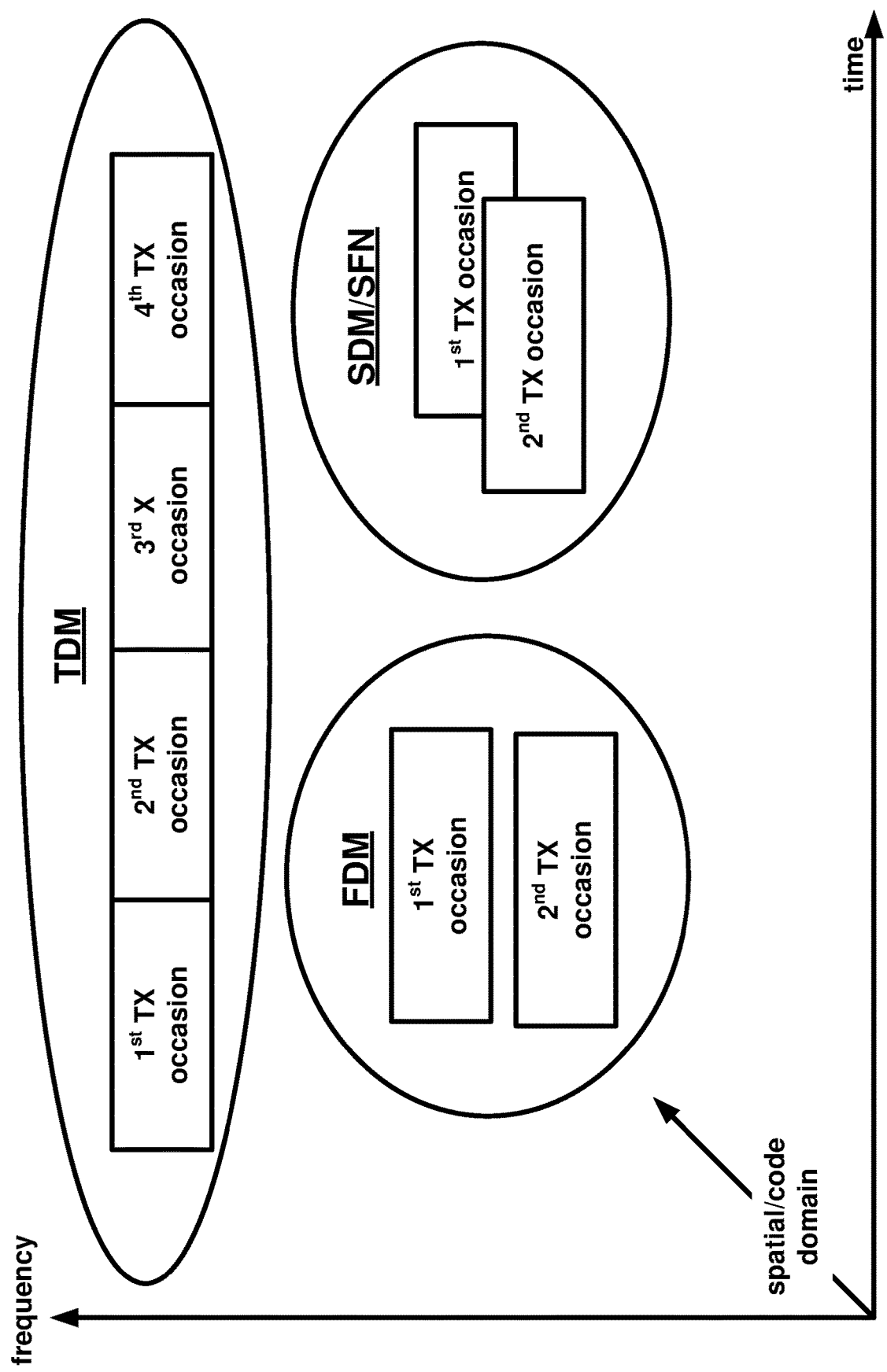
FIG. 18 shows an example of uplink repetition schemes.

FIG. 18 shows an example of uplink repetition schemes. One or more wireless devices may repeat (transmission of) an uplink signal (e.g., PUSCH transmission, transport block, PUCCH transmission, uplink control information, HARQ-ACK, SR, CSI report, SRS) across/over/in a plurality of transmission/repetition occasions. The one or more wireless devices may send (e.g., transmit) repetitions of the uplink signal across/over/in the plurality of transmission occasions.

One or more configuration parameters may indicate a repetition scheme (e.g., FDM-Scheme, TDM-Scheme, SFN-scheme, SDM-Scheme, CDM-Scheme). The one or more wireless devices may repeat (transmission of) the uplink signal across/over/in the plurality of transmission/repetition occasions, for example, based on the one or more configuration parameters indicating the repetition scheme. The one or more wireless devices may send (e.g., transmit) repetitions of the uplink signal across/over/in the plurality of transmission occasions, for example, based on the one or more configuration parameters indicating the repetition scheme.

The one or more wireless devices may receive DCI scheduling/triggering transmission of the uplink signal. The DCI may indicate a repetition scheme (e.g., FDM-Scheme, TDM-Scheme, SFN-scheme, SDM-Scheme, CDM-Scheme). The DCI may comprise one or more fields indicating the repetition scheme (e.g., SRI field(s), TCI field(s), antenna port field(s), PUCCH resource indicator field(s), SRS resource set indicator field, etc.). The one or more fields may be set/equal to one or more values indicating the repetition scheme. Each field of the one or more fields may be set to a respective value of the one or more values. The one or more wireless devices may repeat (transmission of) the uplink signal across/over/in the plurality of transmission/repetition occasions, for example, based on the DCI indicating the repetition scheme. The wireless device may send (e.g., transmit) repetitions of the uplink signal across/over/in the plurality of transmission occasions, for example, based on the DCI indicating the repetition scheme.

The repetition scheme may be for repetitions of the uplink signal via an uplink resource (e.g., PUCCH resource, SRS resource, PUSCH resource). The repetition scheme may be (set to), for example, a time domain repetition (e.g., TDM in FIG. 18). The repetition scheme may be (set to), for example, a frequency domain repetition (e.g., FDM in FIG. 18). The repetition scheme may be (set to), for example, a code/spatial domain repetition (e.g., SDM/SFN in FIG. 18).

The repetitions of the uplink signal, for example, may be a time domain repetition (e.g., TDM in FIG. 18, TDMSchemeA, TDMSchemeB). In the time domain repetition, the plurality of transmission occasions may not overlap in time. Each transmission occasion of the plurality of transmission occasions may have a non-overlapping time domain resource allocation with respect to other transmission occasion(s) of the plurality of transmission occasions. For example, a first transmission occasion of the plurality of transmission occasions may not overlap, in time, with a second transmission occasion of the plurality of transmission occasions. The first transmission occasion and the second transmission occasion may be different. In the time domain repetition, the plurality of transmission occasions may or may not overlap in frequency. The plurality of transmission occasions may comprise a first TX occasion, second TX occasion, third TX occasion, and fourth TX occasion in the time domain repetition (e.g., TDM in FIG. 18). In the time domain repetition, the repetitions of the uplink signal may, for example, be/occur in time units (e.g., TDM-ed). The wireless device, for example, may repeat transmission of the uplink signal across/over/in the time units. The one or more wireless devices, for example, may send (e.g., transmit) repetitions of the uplink signal across/over/in the time units. The time units, for example, may be consecutive. The time units, for example, may not be consecutive (e.g., may have a time/symbol/slot gap). A number/quantity of the time units may be equal to a number/quantity of the repetitions of the uplink signal. The time units, for example, may be time slots. The time units may, for example, be mini-slots. The time units may, for example, be time symbols (e.g., OFDM symbols). The time units may, for example, be sub-frames. The time units, for example, may be actual/nominal repetitions. The plurality of transmission occasions may be/occur in the time units. For example, the first transmission occasion of the plurality of transmission occasions may be/occur in a first time unit of the time units. The second transmission occasion of the plurality of transmission occasions may be/occur in a second time unit of the time units, and/or the like. The first time unit may be different from the second time unit. The first time unit may not overlap in time with the second time unit.

The repetitions of the uplink signal, for example, may be a frequency domain repetition (e.g., FDM in FIG. 18, FDMSchemeA, FDMSchemeB, etc.). In the frequency domain repetition, the plurality of transmission occasions may or may not overlap in time. In the frequency domain repetition, the plurality of transmission occasions may not overlap in frequency. Each transmission occasion of the plurality of transmission occasions may have a non-overlapping frequency domain resource allocation with respect to other transmission occasion(s) of the plurality of transmission occasions. For example, a first transmission occasion of the plurality of transmission occasions may not overlap, in frequency, with a second transmission occasion of the plurality of transmission occasions. The first transmission occasion and the second transmission occasion may overlap in time. The first transmission occasion and the second transmission occasion may be different. The plurality of transmission occasions may comprise a first TX occasion and second TX occasion in the frequency domain repetition (e.g., FDM in FIG. 18). In the frequency domain repetition, the repetitions of the uplink signal may, for example, be/occur in frequency units (e.g., frequencies, resource blocks (RBs), physical resource blocks (PRBs), frequency bands, subbands, bandwidth parts, cells). The one or more wireless devices, for example, may repeat transmission of the uplink signal across/over/in the frequency units. The one or more wireless devices, for example, may send (e.g., transmit) repetitions of the uplink signal across/over/in the frequency units. The frequency units, for example, may be consecutive. The frequency units, for example, may not be consecutive (e.g., may have a frequency/PRB/RB gap). A number/quantity of the frequency units may be equal to a number/quantity of the repetitions of the uplink signal. The frequency units, for example, may be frequency bands. The frequency units, for example, may be PRBs (or RBs). The frequency units may, for example, be BWPs. The frequency units may, for example, be cells. The plurality of transmission occasions may be/occur in the frequency units. For example, the first transmission occasion of the plurality of transmission occasions may be/occur in a first frequency unit of the frequency units. The second transmission occasion of the plurality of transmission occasions may be/occur in a second frequency unit of the frequency units, and/or the like. The first frequency unit may be different from the second frequency unit. The first frequency unit and the second frequency unit may not overlap in frequency.

The repetitions of the uplink signal, for example, may be a code/spatial domain repetition (e.g., SDM/SFN in FIG. 18, SDM scheme, CDM scheme, SDMScheme, CDMScheme, etc.). In the code/spatial domain repetition, the plurality of transmission occasions may overlap in time. In the code/spatial domain repetition, the plurality of transmission occasions may overlap in frequency. In the code/spatial domain repetition, the plurality of transmission occasions may be a transmission occasion (e.g., or a single transmission occasion). Each transmission occasion of the plurality of transmission occasions may be the same (or same as the transmission occasion or the single transmission occasion). Each transmission occasion of the plurality of transmission occasions may have an overlapping frequency domain resource allocation with respect to other transmission occasion(s) of the plurality of transmission occasions. Each transmission occasion of the plurality of transmission occasions may have an overlapping time domain resource allocation with respect to other transmission occasion(s) of the plurality of transmission occasions. For example, a first transmission occasion of the plurality of transmission occasions may overlap, in time and frequency, with a second transmission occasion of the plurality of transmission occasions. The first transmission occasion (e.g., first TX occasion) and the second transmission occasion (e.g., second TX occasion) may be the same. The plurality of transmission occasions are first TX occasion and second TX occasion in the code/spatial domain repetition (e.g., SDM/SFN in FIG. 18). The first TX occasion and the second TX occasion may be the same (e.g., may overlap in time and frequency) in the code/spatial domain repetition. In the code/spatial domain repetition, the plurality of transmission occasions may occur in same frequency units (e.g., frequencies, RBs, PRBs, frequency bands, bandwidth parts, cells). For example, a first frequency unit of the first transmission occasion and a second frequency unit of the second transmission occasion may overlap in frequency. The first frequency unit of the first transmission occasion and the second frequency unit of the second transmission occasion may be the same. The plurality of transmission occasions may occur in same time units (e.g., symbols, actual/nominal repetitions, mini-slots, slots, sub-frames, etc.). For example, a first time unit of the first transmission occasion and a second time unit of the second transmission occasion may overlap in time. The first time unit of the first transmission occasion and the second time unit of the second transmission occasion may be the same.

A wireless device may receive DCI, for example, from a base station. The DCI may trigger/indicate/activate/schedule transmission of information such as a CSI report (e.g., aperiodic CSI report, semi-persistent CSI report) and/or any other information. The DCI may schedule repetitions of a PUSCH transmission. The wireless device may send (e.g., transmit) repetition(s) of the PUSCH transmission to at least one TRP. For example, the wireless device may send (e.g., transmit) first repetition(s) of the PUSCH transmission to a first TRP or first computing device. The wireless device may send (e.g., transmit) second repetition(s) of the PUSCH transmission to a second TRP or second computing device. The repetitions of an uplink transmission (e.g., PUSCH transmission) may be, for example, in a time domain. The repetitions of the PUSCH transmission may be time domain repetitions.

The wireless device may receive one or more messages comprising one or more configuration parameters. The one or more configuration parameters may comprise a CSI-Multiplexing-Mode parameter. The CSI-Multiplexing-Mode parameter may be (set to) enabled.

In at least some wireless communications, a wireless device may send (e.g., transmit)/multiplex the CSI report (or other information) in more than one repetition (transmission occasion) of the PUSCH transmission (e.g., a first repetition (or a first transmission occasion) of the PUSCH transmission and a second repetition (or a second transmission occasion) of the PUSCH transmission), for example, based on the one or more configuration parameters comprising the CSI-Multiplexing-Mode parameter set to enabled. The wireless device may send (e.g., transmit), in the first transmission occasion, the first repetition of the PUSCH transmission. The wireless device may send (e.g., transmit), in the second transmission occasion, the second repetition of the PUSCH transmission. The first repetition(s) may comprise the first repetition. The first repetition may be an earliest/starting/first/initial repetition of the first repetition(s). The second repetition(s) may comprise the second repetition. The second repetition may be an earliest/starting/first/initial repetition of the second repetition(s).

The one or more configuration parameters may not comprise a CSI-Multiplexing-Mode parameter (or may not comprise a CSI-Multiplexing-Mode parameter set to enabled). The one or more configuration parameters may comprise a CSI-Multiplexing-Mode parameter set to disabled (or not set to enabled). In at least some wireless communications, the wireless device may send (e.g., transmit) the CSI report (or other information) in a first repetition (or a first transmission occasion) of the PUSCH transmission, for example, based on the one or more configuration parameters not comprising the CSI-Multiplexing-Mode parameter set to enabled. The wireless device may send (e.g., transmit), in the first transmission occasion, the first repetition of the PUSCH transmission. The wireless device may not send (e.g., transmit)/multiplex the CSI report in a second repetition (or a second transmission occasion) of the PUSCH transmission, for example, based on the one or more configuration parameters not comprising the CSI-Multiplexing-Mode parameter set to enabled. The wireless device may not send (e.g., transmit), in the second transmission occasion, the second repetition of the PUSCH transmission. The repetitions of the PUSCH transmission may comprise the first repetition. The first repetition may be an earliest/starting/first/initial repetition of the repetitions of the PUSCH transmission.

The repetitions of an uplink transmission (e.g., PUSCH transmission) may be, for example, in a frequency domain. The repetitions of the PUSCH transmission may be frequency domain repetitions. The repetitions of the uplink transmission (e.g., PUSCH transmission) may start at the same time/symbol (or simultaneously), for example, based on the repetitions being in the frequency domain. A first repetition of the repetitions of the PUSCH transmission may start in a first symbol. A second repetition of the repetitions of the PUSCH transmission may start in a second symbol. The first symbol and the second symbol may be the same (or substantially similar), for example, based on the repetitions being in the frequency domain. In at least some wireless communications, sending (e.g., transmitting) a CSI report (or other information) in the earliest/starting/first/initial repetition of the repetitions of the PUSCH transmission may not be efficient for the frequency domain repetitions, for example, based on the repetitions of the PUSCH transmission starting at the same time/symbol in the frequency domain repetitions. Each repetition of the repetitions of the PUSCH transmission may be the earliest/starting/first/initial repetition of the repetitions of the PUSCH transmission. The base station may not receive/decode the repetition of the PUSCH transmission, for example, if the base station and the wireless device are not aligned on a repetition of the PUSCH transmission that the wireless device sends (e.g., transmits)/multiplexes the CSI report (or other information). For example, the wireless device may send (e.g., transmit)/ multiplex the CSI report (or other information) in a first repetition of the repetitions of the PUSCH transmission. The wireless device may not send (e.g., transmit)/multiplex the CSI report (or other information) in a second repetition of the repetitions of the PUSCH transmission. The base station may not have information on which repetition the wireless device sends (e.g., transmits)/multiplex the CSI report (or other information). The base station may decode a/each repetition of the repetitions of the PUSCH transmission under two different assumptions (e.g., 1) the repetition is multiplexed with the CSI report (or other information), and 2) no CSI report is multiplexed in the repetition). This operation of the base station may increase the power consumption at the base station.

As described herein, transmission/multiplexing of a CSI report (or other information) for/in frequency domain repetitions may be enhanced by, for example, aligning the operations of the base station and the wireless device. The wireless device may send (e.g., transmit)/multiplex a CSI report (or other information) in a repetition, among the repetitions of the PUSCH transmission, based on a rule, such as sending/transmitting with a lowest/highest starting/ending frequency/resource block (RB). The wireless device may send (e.g., transmit)/multiplex the CSI report (or other information) in a repetition, among the repetitions of the PUSCH transmission, sent (e.g., transmitted) with an antenna panel with a lowest/highest antenna panel index/ identifier. The wireless device may send (e.g., transmit)/ multiplex the CSI report (or other information) in a repetition, among the repetitions of the PUSCH transmission, sent (e.g., transmitted) based on a TCI state (e.g., transmitting beam) with a lowest TCI state index. The wireless device may send (e.g., transmit)/multiplex the CSI report (or other information) in a repetition, among the repetitions of the PUSCH transmission, sent (e.g., transmitted) based on a first TCI state (or the first SRS resource set).

The wireless device may send (e.g., transmit)/multiplex the CSI report (or other information) in a plurality of repetitions of the PUSCH transmission in the frequency domain. The wireless device may send (e.g., transmit)/ multiplex the CSI report (or other information) in each repetition of the repetitions of the PUSCH transmission in the frequency domain. Sending (e.g., transmitting)/multiplexing the CSI report (or other information) in each repetition of the repetitions of the PUSCH transmission may increase robustness and diversity. In the frequency domain repetitions, the wireless device may not determine/check whether the one or more configuration parameters comprise the CSI-Multiplexing-Mode parameter (or other parameter) set to enabled or not. In the frequency domain repetitions, the wireless device may send (e.g., transmit)/multiplex the CSI report (or other information) in each repetition of the repetitions of the PUSCH transmission, regardless of whether the CSI-Multiplexing-Mode parameter (or other parameter) is set to enabled or not. In the time domain repetitions, the wireless device may determine/check whether the one or more configuration parameters comprise the CSI-Multiplexing-Mode parameter (or other parameter) is set to enabled or not. In the time domain repetitions, the wireless device may send (e.g., transmit)/multiplex the CSI report (or other information) in each repetition of the repetitions of the PUSCH transmission based on whether the one or more configuration parameters comprising the CSI-Multiplexing-Mode parameter (or other parameter) is set to enabled or not.

Examples described herein may provide advantages such as by helping to align the base station and the wireless device on the one or more repetitions that the wireless device sends (e.g., transmits)/multiplexes the CSI report (or other information). This alignment may achieve advantages such as reducing the power consumption at the base station, increasing successful decoding probability of the PUSCH transmission, and/or other advantages evident from descriptions herein.

Figure 19:
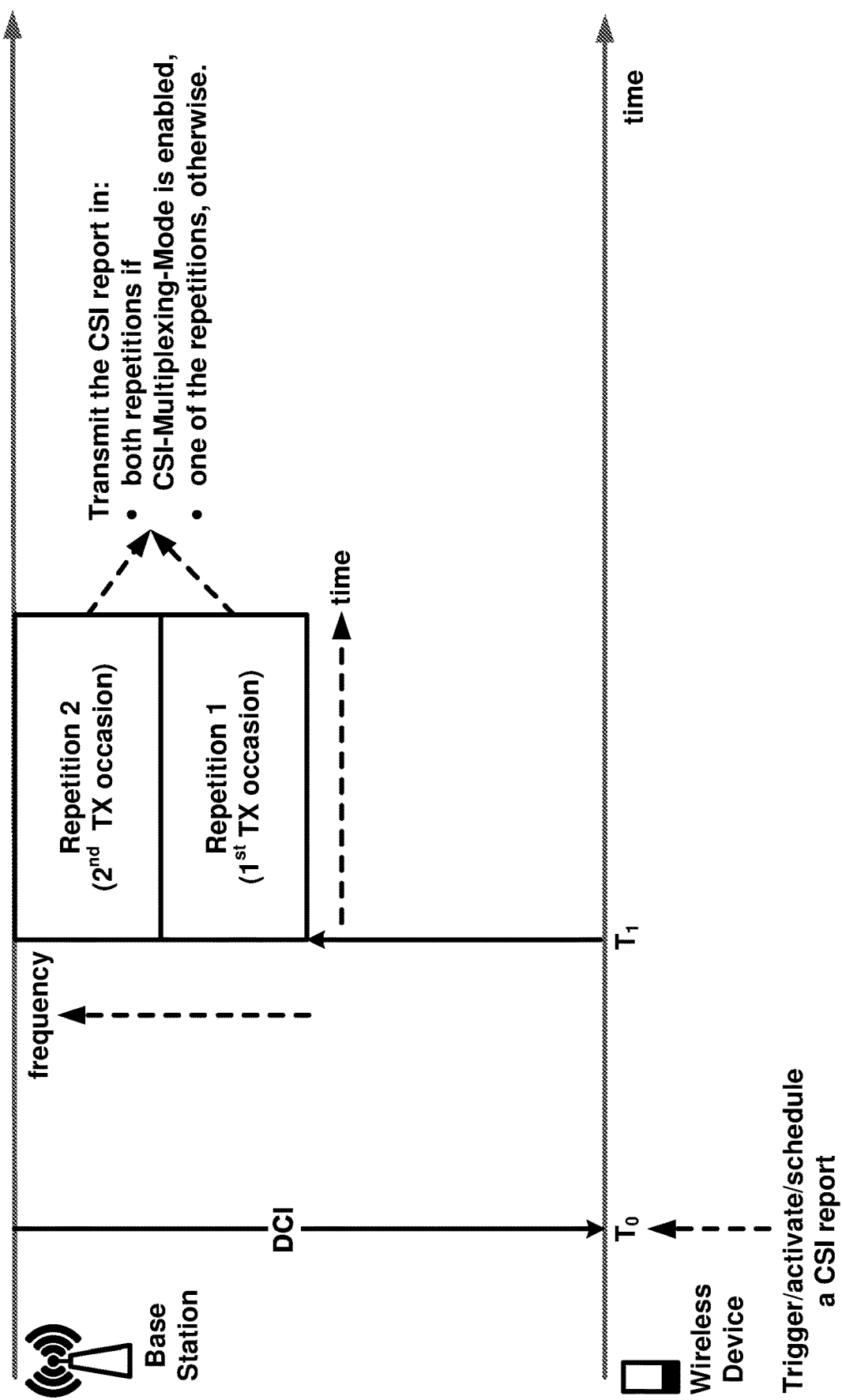
FIG. 19 shows an example of report multiplexing.

FIG. 19 shows an example of report multiplexing. One or more configuration parameters may indicate at least two SRS resource sets. The at least two SRS resource sets may comprise a first SRS resource set and a second SRS resource set. The one or more configuration parameters may comprise a usage parameter. The one or more configuration parameters may comprise, for example, for an SRS resource set (e.g., each SRS resource set of the at least two SRS resource sets), a respective usage parameter. The usage parameter may be set to codebook. The usage parameter of an SRS resource set (e.g., each SRS resource set of the at least two SRS resource sets) may be set to codebook. The one or more configuration parameters may indicate codebook, for example, for an SRS resource set (e.g., each SRS resource set of the at least two SRS resource sets). The one or more configuration parameters may indicate, for the first SRS resource set, codebook (or a usage parameter set to codebook). The one or more configuration parameters may indicate, for the second SRS resource set, codebook (or a usage parameter set to codebook).

The usage parameter may be set to non-codebook. The usage parameter of an SRS resource set (e.g., each SRS resource set of the at least two SRS resource sets) may be set to non-codebook. The one or more configuration parameters may indicate non-codebook, for example, for an SRS resource set (e.g., each SRS resource set of the at least two SRS resource sets). The one or more configuration parameters may indicate, for the first SRS resource set, non-codebook (or a usage parameter set to non-codebook). The one or more configuration parameters may indicate, for the second SRS resource set, non-codebook (or a usage parameter set to non-codebook).

The one or more configuration parameters may indicate, for the at least two SRS resource sets, at least two SRS resource set indexes. The one or more configuration parameters may indicate, for an SRS resource set (e.g., each SRS resource set of the at least two SRS resource sets), a respective SRS resource set index (e.g., of the at least two SRS resource set indexes). An SRS resource set (e.g., each SRS resource set of the at least two SRS resource sets) may be identified/indicated by a respective SRS resource set index (e.g., of the at least two SRS resource set indexes). The first SRS resource set of the at least two SRS resource sets may be identified/indicated by a first SRS resource set index of the at least two SRS resource set indexes. The second SRS resource set of the at least two SRS resource sets may be identified/indicated by a second SRS resource set index of the at least two SRS resource set indexes. The first SRS resource set index of the first SRS resource set may be lower than the second SRS resource set index of the second SRS resource set.

The one or more wireless devices may receive DCI (e.g., at time T0 in FIG. 19). The DCI may be, for example, DCI format 0_1. The DCI may be, for example, DCI format 0_2. The DCI may be, for example, DCI format 0_x, x=0, 1, 2, 3, . . . . The DCI (e.g., at time T0 in FIG. 19) may be, for example, the same as the DCI indicating activation of the at least two TCI states (e.g., at time T2 in FIG. 17). The DCI (e.g., at time T0 in FIG. 19) may be, for example, different from the DCI indicating activation of the at least two TCI states (e.g., at time T2 in FIG. 17).

The DCI may schedule/trigger/activate transmission of a CSI report. The CSI report may be, for example, an aperiodic CSI report. The DCI may comprise a CSI request field scheduling/triggering transmission of the aperiodic CSI report. The CSI report may be, for example, a semi-persistent CSI report. The DCI may comprise a CSI request field activating transmission of the semi-persistent CSI report. The CSI report may be, for example, a single CSI report. The CSI report may be, for example, a plurality of CSI reports. The CSI report may be, for example, one or more CSI reports.

The DCI may comprise at least one field (e.g., SRS resource set indicator, TCI field, Unified TCI state(s) field, TRP indicator field(s), and/or the like). The field may indicate, for example, a multi-TRP uplink repetition (e.g., multi-TRP PUSCH repetition, multi-TRP PUCCH repetition). A value of the field may indicate the multi-TRP uplink repetition. A value of the field may indicate the multi-TRP PUSCH repetition. A value of the field may indicate the multi-TRP PUCCH repetition. A size/length of the field may be, for example, two bits (or any other quantity of bits). For example, the value of the field (e.g., SRS resource set indicator) may be equal to '10' or any other value. For example, the value of the field (e.g., SRS resource set indicator) may be equal to '11'. A size/length of the field may be, for example, one bit. For example, the value of the field (e.g., SRS resource set indicator) may be equal to '1'.

The DCI may schedule repetitions of an uplink transmission. For example, the DCI may schedule repetitions of a PUSCH transmission. The wireless device may send (e.g., transmit) the repetitions of the uplink transmission (e.g., PUSCH transmission) in a plurality of transmission occasions. The wireless device may send (e.g., transmit) at least one repetition of the uplink transmission (e.g., each repetition of the repetitions of the PUSCH transmission) in a respective transmission occasion of the plurality of transmission occasions. A wireless device may send (e.g., transmit) a first repetition of the repetitions of the PUSCH transmission in a first transmission occasion of the plurality of transmission occasions. The wireless device may send (e.g., transmit) a second repetition of the repetitions of the PUSCH transmission in a second transmission occasion of the plurality of transmission occasions.

The repetitions of the PUSCH transmission may be associated with the at least two SRS resource sets. One or more first repetitions of the repetitions of the PUSCH transmission may be associated with the first SRS resource set of the at least two SRS resource sets. One or more second repetitions of the repetitions of the PUSCH transmission may be associated with the second SRS resource set of the at least two SRS resource sets. The repetitions of the PUSCH transmission may be associated with the at least two SRS resource sets, for example, based on the value of the field (e.g., SRS resource set indicator) being equal to '10' (or any other value). The repetitions of the PUSCH transmission may be associated with the at least two SRS resource sets, for example, based on the value of the field (e.g., SRS resource set indicator) being equal to '11' (or any other value). The repetitions of the PUSCH transmission may be associated with the at least two SRS resource sets, for example, based on the value of the field (e.g., SRS resource set indicator) indicating the multi-TRP uplink repetition.

The PUSCH transmission may, for example, comprise/carry (or may be with) a transport block. The PUSCH transmission may, for example, not comprise/carry (or may not be with) a transport block. The wireless device may determine/assume a number of the repetitions of the PUSCH transmission as (or being equal to) two, for example, based on the PUSCH transmission not comprising/carrying a transport block. The wireless device may determine/assume a number of the repetitions of the PUSCH transmission as (or being equal to) two, for example, based on the PUSCH transmission being with no transport block. The wireless device may determine/assume the number of the repetitions of the PUSCH transmission as two regardless of a value of a higher layer (e.g., RRC) parameter numberOfRepetitions or a value of a higher layer parameter pusch-AggregationFactor. The one or more configuration parameters may comprise, for example, the higher layer parameter numberOfRepetitions. The one or more configuration parameters may comprise, for example, the higher layer parameter pusch-AggregationFactor.

The one or more configuration parameters may comprise a CSI-Multiplexing-Mode parameter. The CSI-Multiplexing-Mode parameter may be (set to) enabled. The CSI-Multiplexing-Mode parameter may indicate whether sending (e.g., transmitting) a CSI report on at least two repetitions of a PUSCH transmission is enabled or not. The at least two repetitions of the PUSCH transmission may be, for example, in a time domain (e.g., TDM in FIG. 18). The CSI-Multiplexing-Mode parameter may be used/applicable for time domain repetitions (e.g., TDM in FIG. 18). The at least two repetitions of the PUSCH transmission may be, for example, in a frequency domain (e.g., FDM in FIG. 18). The CSI-Multiplexing-Mode parameter may be used/applicable for frequency domain repetitions (e.g., FDM in FIG. 18). The at least two repetitions of the PUSCH transmission may not be, for example, in a frequency domain (e.g., FDM in FIG. 18). The CSI-Multiplexing-Mode parameter may not be used/applicable for frequency domain repetitions (e.g., FDM in FIG. 18). The at least two repetitions of the PUSCH transmission may be associated with the at least two SRS resource sets. A first repetition of the at least two repetitions of the PUSCH transmission may be associated with the first SRS resource set of the at least two SRS resource sets. A second repetition of the at least two repetitions of the PUSCH transmission may be associated with the second SRS resource set of the at least two SRS resource sets.

The CSI-Multiplexing-Mode parameter may be, for example, an aperiodic-CSI-MultiplexingMode (or AP-CSI-MultiplexingMode) parameter. A CSI-AperiodicTriggerStateList parameter/IE may comprise the aperiodic-CSI-MultiplexingMode parameter. The one or more configuration parameters may comprise/indicate the CSI-AperiodicTriggerStateList parameter/IE.

The CSI-Multiplexing-Mode parameter may be, for example, a semi-persistent-CSI-MultiplexingMode (or SP-CSI-MultiplexingMode) parameter. A CSI-SemiPersistentOnPUSCH-TriggerStateList parameter/IE may comprise the semi-persistent-CSI-MultiplexingMode parameter. The one or more configuration parameters may comprise/indicate the CSI-SemiPersistentOnPUSCH-TriggerStateList parameter/IE.

The one or more wireless devices may send (e.g., transmit) a message, such as a capability message (e.g., UE capability message). The message (e.g., UE capability message) may indicate, for example, support of sending (e.g., transmitting) a CSI report (or other information) in/on at least two repetitions of an uplink transmission (e.g., PUSCH transmission). The capability message may indicate, for example, support of sending (e.g., transmitting) the CSI report (or other information) in/on at least two transmission occasions of the at least two repetitions of the PUSCH transmission. The capability message may indicate, for example, support of multiplexing a CSI report in/on at least two repetitions of a PUSCH transmission. The one or more configuration parameters may comprise the CSI-Multiplexing-Mode parameter (or the CSI-Multiplexing-Mode parameter set to enabled), for example, based on the capability message indicating support of sending (e.g., transmitting)/multiplexing a CSI report in/on at least two repetitions (or at least two transmission occasions) of a PUSCH transmission.

The one or more configuration parameters may comprise a CSI-Multiplexing-FDM-Mode parameter (or a CSI-FDM-Multiplexing-Mode parameter or a CSI-frequency-Multiplexing-Mode parameter, and/or the like). The CSI-Multiplexing-FDM-Mode parameter may be (set to) enabled. The CSI-Multiplexing-FDM-Mode parameter may be, for example, different from the CSI-Multiplexing-Mode parameter.

The CSI-Multiplexing-FDM-Mode parameter may indicate whether sending (e.g., transmitting) a CSI report (or other information) on at least two repetitions of a PUSCH transmission is enabled or not. The at least two repetitions of the PUSCH transmission may be in a frequency domain (e.g., FDM in FIG. 18). The CSI-Multiplexing-FDM-Mode parameter may be used/applicable for frequency domain repetitions (e.g., FDM in FIG. 18). The at least two repetitions of the PUSCH transmission may be associated with the at least two SRS resource sets. A first repetition of the at least two repetitions of the PUSCH transmission may be associated with the first SRS resource set of the at least two SRS resource sets. A second repetition of the at least two repetitions of the PUSCH transmission may be associated with the second SRS resource set of the at least two SRS resource sets.

The CSI-Multiplexing-FDM-Mode parameter may be, for example, an aperiodic-CSI-Multiplexing-FDM-Mode (or AP-CSI-Multiplexing-FDM-Mode) parameter. A CSI-AperiodicTriggerStateList parameter/IE may comprise the aperiodic-CSI-Multiplexing-FDM-Mode parameter. The one or more configuration parameters may comprise/indicate the CSI-AperiodicTriggerStateList parameter/IE.

The CSI-Multiplexing-FDM-Mode parameter may be, for example, a semi-persistent-CSI-Multiplexing-FDM-Mode (or SP-CSI-Multiplexing-FDM-Mode) parameter. A CSI-SemiPersistentOnPUSCH-TriggerStateList parameter/IE may comprise the semi-persistent-CSI-Multiplexing-FDM-Mode parameter. The one or more configuration parameters may comprise/indicate the CSI-SemiPersistentOnPUSCH-TriggerStateList parameter/IE.

The one or more wireless devices may send (e.g., transmit) a message, for example, a UE capability message. The message (e.g., UE capability message) may indicate, for example, support of sending (e.g., transmitting) a CSI report in/on at least two repetitions of an uplink transmission (e.g., PUSCH transmission). The at least two repetitions of the PUSCH transmission may be in a frequency domain (e.g., FDM in FIG. 18). The capability message may indicate, for example, support of sending (e.g., transmitting) the CSI report in/on at least two transmission occasions of the at least two repetitions of the PUSCH transmission. The capability message may indicate, for example, support of multiplexing a CSI report in/on at least two repetitions of a PUSCH transmission. The one or more configuration parameters may comprise the CSI-Multiplexing-FDM-Mode parameter (or the CSI-Multiplexing-FDM-Mode parameter set to enabled), for example, based on the capability message indicating support of sending (e.g., transmitting)/multiplexing a CSI report in/on at least two repetitions (or at least two transmission occasions) of a PUSCH transmission.

The one or more configuration parameters may not comprise a CSI-Multiplexing-Mode parameter (e.g., AP-CSI-MultiplexingMode, SP-CSI-MultiplexingMode). The one or more configuration parameters may not comprise the CSI-Multiplexing-Mode parameter set to enabled.

The one or more wireless devices may send (e.g., transmit) a message, for example, a UE capability message. The message (e.g., UE capability message) may not indicate, for example, support of sending (e.g., transmitting) a CSI report in/on at least two repetitions of an uplink transmission (e.g., PUSCH transmission). The capability message may not indicate, for example, support of sending (e.g., transmitting) a CSI report in/on at least two transmission occasions of at least two repetitions of a PUSCH transmission. The capability message may not indicate, for example, support of multiplexing a CSI report in/on at least two repetitions of a PUSCH transmission. The one or more configuration parameters may not comprise the CSI-Multiplexing-Mode parameter (or the CSI-Multiplexing-Mode parameter set to enabled), for example, based on the capability message not indicating support of sending (e.g., transmitting)/multiplexing a CSI report in/on at least two repetitions (or at least two transmission occasions) of a PUSCH transmission.

The one or more configuration parameters may not comprise a CSI-Multiplexing-FDM-Mode (e.g., AP-CSI-Multiplexing-FDM-Mode, SP-CSI-Multiplexing-FDM-Mode). The one or more configuration parameters may not comprise the CSI-Multiplexing-FDM-Mode parameter set to enabled.

The one or more wireless devices may send (e.g., transmit) a message, for example, a UE capability message. The message (e.g., UE capability message) may not indicate, for example, support of sending (e.g., transmitting) a CSI report in/on at least two repetitions of an uplink transmission (e.g., PUSCH transmission). The at least two repetitions of the PUSCH transmission may be in a frequency domain (e.g., FDM in FIG. 18). The UE capability message may not indicate, for example, support of sending (e.g., transmitting) a CSI report in/on at least two transmission occasions of at least two repetitions of a PUSCH transmission. The capability message may not indicate, for example, support of multiplexing a CSI report in/on at least two repetitions of a PUSCH transmission. The one or more configuration parameters may not comprise the CSI-Multiplexing-FDM-Mode parameter (or the CSI-Multiplexing-FDM-Mode parameter set to enabled), for example, based on the capability message not indicating support of sending (e.g., transmitting)/multiplexing a CSI report in/on at least two repetitions (or at least two transmission occasions) of a PUSCH transmission.

The one or more configuration parameters may indicate a repetition scheme. The repetition scheme may be (or set to) a frequency domain repetition (e.g., frequency-domain-multiplexing (FDM) repetition). The repetitions of the uplink transmission (e.g., PUSCH transmission) may be in a frequency domain. The repetitions of the uplink transmission (e.g., PUSCH transmission) may be in the frequency domain, for example, based on the one or more configuration parameters indicating the repetition scheme that is (set to) the frequency domain repetition. The repetitions of the PUSCH transmission may comprise a first repetition (e.g., Repetition 1 in FIG. 19) and a second repetition (Repetition 2 in FIG. 19). The first repetition and the second repetition may overlap in time (e.g., in at least one symbol, fully in time, partially in time). A starting symbol of the first repetition and a starting symbol of the second repetition may be, for example, the same. An ending symbol of the first repetition and an ending symbol of the second repetition may be, for example, the same. The first repetition and the second repetition may not overlap in frequency. The first repetition and the second repetition may be in different frequencies (or different RBs or different PRBs). The first repetition and the second repetition may not overlap in at least one RB (or PRB).

The one or more first repetitions of the PUSCH transmission may comprise the first repetition (e.g., Repetition 1 in FIG. 19). The first repetition may be associated with the first SRS resource set of the at least two SRS resource sets. The wireless device may send (e.g., transmit) the first repetition of the PUSCH transmission, for example, based on the first SRS resource set. The wireless device may send (e.g., transmit) the first repetition of the PUSCH transmission, for example, based on a first SRS resource in the first SRS resource set. The one or more configuration parameters may indicate, for the first SRS resource, a first number of SRS ports (e.g., nrofSRS-Ports). The wireless device may send (e.g., transmit) the first repetition of the PUSCH transmission, for example, based on the first number of SRS ports of the first SRS resource in the first SRS resource set. For example, the wireless device may send (e.g., transmit) the first repetition with a first transmission precoder that is determined based on the first number of SRS ports.

The one or more second repetitions of the PUSCH transmission may comprise the second repetition (e.g., Repetition 2 in FIG. 19). The second repetition may be associated with the second SRS resource set of the at least two SRS resource sets. The wireless device may send (e.g., transmit) the second repetition of the PUSCH transmission, for example, based on the second SRS resource set. The wireless device may send (e.g., transmit) the second repetition of the PUSCH transmission, for example, based on a second SRS resource in the second SRS resource set. The one or more configuration parameters may indicate, for the second SRS resource, a second number of SRS ports (e.g., nrofSRS-Ports). The wireless device may send (e.g., transmit) the second repetition of the PUSCH transmission, for example, based on the second number of SRS ports of the second SRS resource in the second SRS resource set. For example, the wireless device may send (e.g., transmit) the second repetition with a second transmission precoder that is determined based on the second number of SRS ports.

The one or more wireless devices may send (e.g., transmit) the first repetition (e.g., Repetition 1 in FIG. 19) of the repetitions of the PUSCH transmission in a first transmission occasion (e.g., first TX occasion in FIG. 19) of the plurality of transmission occasions (e.g., at time T1 in FIG. 19). The wireless device may send (e.g., transmit) a second repetition (e.g., Repetition 2 in FIG. 19) of the repetitions of the PUSCH transmission in a second transmission occasion (e.g., second TX occasion in FIG. 19) of the plurality of transmission occasions (e.g., at time T1 in FIG. 19).

The one or more wireless devices may send (e.g., transmit) the first repetition of the PUSCH transmission based on the first TCI state (e.g., the TCI state 26 in FIG. 17) of the at least two TCI states. The one or more wireless devices may send (e.g., transmit) the first repetition of the PUSCH transmission with a first spatial domain transmission filter/beam that is determined based on a first reference signal indicated by the first TCI state. The first spatial domain transmitting/transmission filter/beam may be, for example, same as (or substantially same as, x degrees apart, x=0, 1, 5, 10, and/or the like) a spatial domain reception/receiving filter/beam used to receive the first reference signal. The first spatial domain transmitting/transmission filter/beam may be, for example, same as (or substantially same as, x degrees apart, x=0, 1, 5, 10, and/or the like) a spatial domain transmission/transmitting filter/beam used to send (e.g., transmit) the first reference signal.

The one or more wireless devices may send (e.g., transmit) the first repetition of the PUSCH transmission with a first transmission power that is determined based on one or more first power control parameters (e.g., target received power, closed-loop index, pathloss compensation factor, alpha, pathloss reference signal, and/or the like) indicated by (or included in or associated with or mapped to) the first TCI state. The one or more configuration parameters may indicate, for the first TCI state, the one or more first power control parameters.

The one or more wireless devices may send (e.g., transmit) the second repetition of the PUSCH transmission based on the second TCI state (e.g., the TCI state 61 in FIG. 17) of the at least two TCI states. The one or more wireless devices may send (e.g., transmit) the second repetition of the PUSCH transmission with a second spatial domain transmission filter/beam that is determined based on a second reference signal indicated by the second TCI state. The second spatial domain transmitting/transmission filter/beam may be, for example, same as (or substantially same as, x degrees apart, x=0, 1, 5, 10, and/or the like) a spatial domain reception/receiving filter/beam used to receive the second reference signal. The second spatial domain transmitting/transmission filter/beam may be, for example, same as (or substantially same as, x degrees apart, x=0, 1, 5, 10, and/or the like) a spatial domain transmission/transmitting filter/beam used to send (e.g., transmit) the second reference signal.

The one or more wireless devices may send (e.g., transmit) the second repetition of the PUSCH transmission with a second transmission power that is determined based on one or more second power control parameters (e.g., target received power, closed-loop index, pathloss compensation factor, alpha, pathloss reference signal, and/or the like) indicated by (or included in or associated with or mapped to) the second TCI state. The one or more configuration parameters may indicate, for the second TCI state, the one or more second power control parameters.

The one or more wireless devices may be equipped with a plurality of antenna panels. The plurality of antenna panels may comprise a first antenna panel and a second antenna panel. The first antenna panel may be identified/indicated by a first antenna panel index/identifier. The one or more configuration parameters may, for example, indicate the first antenna panel index for the first antenna panel. For example, the one or more wireless devices may send (e.g., transmit) an uplink signal (e.g., Beam report, CSI report, UE capability message, PUCCH transmission) indicating the first antenna panel index for the first antenna panel. The second antenna panel may be identified/indicated by a second antenna panel index/identifier. The one or more configuration parameters may, for example, indicate the second antenna panel index for the second antenna panel. For example, the one or more wireless devices may send (e.g., transmit) an uplink signal (e.g., Beam report, CSI report, UE capability message, PUCCH transmission) indicating the second antenna panel index for the second antenna panel.

The one or more wireless devices may send (e.g., transmit) the first repetition of the PUSCH transmission with the first antenna panel. The first repetition of the PUSCH transmission may be associated with the first antenna panel, for example, based on sending (e.g., transmitting) the first repetition of the PUSCH transmission with the first antenna panel. The one or more wireless devices may send (e.g., transmit) the second repetition of the PUSCH transmission with the second antenna panel. The second repetition of the PUSCH transmission may be associated with the second antenna panel, for example, based on sending (e.g., transmitting) the second repetition of the PUSCH transmission with the second antenna panel.

A message (e.g., UE capability message) sent (e.g., transmitted) by the one or more wireless devices may comprise/indicate a list of capability value sets (e.g., a list of UE capability value sets, a list of capability value sets of the wireless device, etc.). A capability value set (e.g., each capability value set of the list of capability value sets) may comprise/indicate a respective maximum number of SRS ports. For example, a first capability value set of the list of capability value sets may comprise/indicate a first maximum number of SRS ports. A second capability value set of the list of capability value sets may comprise/indicate a second maximum number of SRS ports.

A capability value set (e.g., each capability value set of the list of capability value sets) may be identified/indicated by a respective capability value set index. For example, the first capability value set may be identified/indicated by a first capability value set index. The second capability value set may be identified/indicated by a second capability value set index.

The one or more wireless devices may send (e.g., transmit) at least one report (e.g., beam reporting, CSI reporting, L1-RSRP reporting, SINR reporting, and/or any other report). The one or more wireless devices may send (e.g., transmit) the report via PUCCH. The report may indicate an association/mapping/correspondence between the first reference signal indicated by the first TCI state and the first capability value set. The report may comprise a first reference signal index (e.g., CSI-RS and/or SSB resource index) of the first reference signal and the first capability value set index of the first capability value set. The one or more wireless devices may determine the association/mapping/correspondence between the first reference signal and the first capability value set. The one or more configuration parameters may indicate, for the first reference signal, the first reference signal index. The first TCI state may be associated with the first capability value set, for example, based on the association/mapping/correspondence between the first reference signal indicated by the first TCI state and the first capability value set. The first repetition of the PUSCH transmission may be associated with the first capability value set, for example, based on (e.g., in response to) sending (e.g., transmitting) the first repetition based on the first TCI state associated with the first capability value set.

The report may indicate an association/mapping/correspondence between the second reference signal indicated by the second TCI state and the second capability value set. The report may comprise a second reference signal index (e.g., CSI-RS and/or SSB resource index) of the second reference signal and the second capability value set index of the second capability value set. The one or more wireless devices may determine the association/mapping/correspondence between the second reference signal and the second capability value set. The one or more configuration parameters may indicate, for the second reference signal, the second reference signal index. The second TCI state may be associated with the second capability value set, for example, based on the association/mapping/correspondence between the second reference signal indicated by the second TCI state and the second capability value set. The second repetition of the PUSCH transmission may be associated with the second capability value set, for example, based on (e.g., in response to) sending (e.g., transmitting) the second repetition based on the second TCI state associated with the second capability value set.

The one or more wireless devices may receive, for example, from the base station, an acknowledgement for the report. The acknowledgement may be, for example, DCI.

The one or more wireless devices may send (e.g., transmit) the CSI report in the first repetition (e.g., Repetition 1 in FIG. 19) of the PUSCH transmission and the second repetition (e.g., Repetition 2 in FIG. 19) of the PUSCH transmission. The wireless device may send (e.g., transmit) the CSI report in the first transmission occasion (e.g., first TX occasion in FIG. 19) and the second transmission occasion (e.g., second TX occasion in FIG. 19).

The one or more wireless devices may multiplex the CSI report (or other information) in/on/with the first repetition of the PUSCH transmission and the second repetition of the PUSCH transmission. The one or more wireless devices may send (e.g., transmit) the CSI report in the first repetition of the PUSCH transmission and the second repetition of the PUSCH transmission, for example, based on the multiplexing the CSI report in the first repetition of the PUSCH transmission and the second repetition of the PUSCH transmission. The one or more wireless devices may send (e.g., transmit) the CSI report in the first transmission occasion (that the first repetition of the PUSCH transmission is sent (e.g., transmitted)) and the second transmission occasion (that the second repetition of the PUSCH transmission is sent (e.g., transmitted)), for example, based on the multiplexing the CSI report in the first repetition of the PUSCH transmission and the second repetition of the PUSCH transmission.

The one or more wireless devices may send (e.g., transmit) the CSI report in the first transmission occasion (or in the first repetition of the PUSCH transmission) and the second transmission occasion (or in the second repetition of the PUSCH transmission), for example, based on the one or more configuration parameters indicating the at least two SRS resource sets. The one or more wireless devices may multiplex the CSI report in the first repetition of the PUSCH transmission and the second repetition of the PUSCH transmission, for example, based on the one or more configuration parameters indicating the at least two SRS resource sets.

The one or more wireless devices may send (e.g., transmit) the CSI report in the first transmission occasion (or in the first repetition of the PUSCH transmission) and the second transmission occasion (or in the second repetition of the PUSCH transmission), for example, based on the field (or the value of the field) indicating the multi-TRP uplink repetition. The one or more wireless devices may send (e.g., transmit) the CSI report in the first transmission occasion (or in the first repetition of the PUSCH transmission) and the second transmission occasion (or in the second repetition of the PUSCH transmission), for example, based on the value of the field being equal to '10' or '11' or '1' (or any other value). The one or more wireless devices may send (e.g., transmit) the CSI report in the first transmission occasion (or in the first repetition of the PUSCH transmission) and the second transmission occasion (or in the second repetition of the PUSCH transmission), for example, based on the repetitions of the PUSCH transmission being associated with the at least two SRS resource sets.

The one or more wireless devices may multiplex the CSI report (or other information) in the first repetition of the PUSCH transmission and the second repetition of the PUSCH transmission, for example, based on the field (or the value of the field) indicating the multi-TRP uplink repetition. The one or more wireless devices may multiplex the CSI report in the first repetition of the PUSCH transmission and the second repetition of the PUSCH transmission, for example, based on the value of the field being equal to '10' or '11' or '1' (or any other value). The one or more wireless devices may multiplex the CSI report in the first repetition of the PUSCH transmission and the second repetition of the PUSCH transmission, for example, based on the repetitions of the PUSCH transmission being associated with the at least two SRS resource sets.

The one or more wireless devices may send (e.g., transmit) the CSI report (or other information) in the first transmission occasion (or in the first repetition of the PUSCH transmission) and the second transmission occasion (or in the second repetition of the PUSCH transmission), for example, based on the one or more configuration parameters comprising the CSI-Multiplexing-Mode parameter. The one or more wireless devices may send (e.g., transmit) the CSI report in the first transmission occasion (or in the first repetition of the PUSCH transmission) and the second transmission occasion (or in the second repetition of the PUSCH transmission), for example, based on the one or more configuration parameters comprising the CSI-Multiplexing-Mode parameter set to enabled.

The one or more wireless devices may multiplex the CSI report (or other information) in the first repetition of the PUSCH transmission and the second repetition of the PUSCH transmission, for example, based on the one or more configuration parameters comprising the CSI-Multiplexing-Mode parameter. The one or more wireless devices may multiplex the CSI report in the first repetition of the PUSCH transmission and the second repetition of the PUSCH transmission, for example, based on the one or more configuration parameters comprising the CSI-Multiplexing-Mode parameter set to enabled.

The one or more wireless devices may send (e.g., transmit) the CSI report (or other information) in the first transmission occasion (or in the first repetition of the PUSCH transmission) and the second transmission occasion (or in the second repetition of the PUSCH transmission), for example, based on the one or more configuration parameters comprising the CSI-Multiplexing-FDM-Mode parameter. The one or more wireless devices may send (e.g., transmit) the CSI report in the first transmission occasion (or in the first repetition of the PUSCH transmission) and the second transmission occasion (or in the second repetition of the PUSCH transmission), for example, based on the one or more configuration parameters comprising the CSI-Multiplexing-FDM-Mode parameter set to enabled.

The one or more wireless devices may multiplex the CSI report (or other information) in the first repetition of the PUSCH transmission and the second repetition of the PUSCH transmission, for example, based on the one or more configuration parameters comprising the CSI-Multiplexing-FDM-Mode parameter. The one or more wireless devices may multiplex the CSI report in the first repetition of the PUSCH transmission and the second repetition of the PUSCH transmission, for example, based on the one or more configuration parameters comprising the CSI-Multiplexing-FDM-Mode parameter set to enabled.

The one or more wireless devices may send (e.g., transmit) the CSI report (or other information) in the first transmission occasion (or in the first repetition of the PUSCH transmission) and the second transmission occasion (or in the second repetition of the PUSCH transmission), for example, based on the PUSCH transmission not comprising/carrying an uplink control information (UCI) that is different from the CSI report. The one or more wireless devices may send (e.g., transmit) the CSI report in the first transmission occasion (or in the first repetition of the PUSCH transmission) and the second transmission occasion (or in the second repetition of the PUSCH transmission), for example, based on not multiplexing, in the PUSCH transmission, an UCI that is different from the CSI report. The UCI may comprise, for example, HARQ-ACK. The UCI may comprise, for example, SR.

The one or more wireless devices may multiplex the CSI report (or other information) in the first repetition of the PUSCH transmission and the second repetition of the PUSCH transmission, for example, based on the PUSCH transmission not comprising/carrying an uplink control information (UCI) that is different from the CSI report. The one or more wireless devices may multiplex the CSI report in the first repetition of the PUSCH transmission and the second repetition of the PUSCH transmission, for example, based on not multiplexing, in the PUSCH transmission, an UCI that is different from the CSI report. The UCI may comprise, for example, HARQ-ACK. The UCI may comprise, for example, SR.

The one or more wireless devices may send (e.g., transmit) the CSI report (or other information in the first transmission occasion (or in the first repetition of the PUSCH transmission) and the second transmission occasion (or in the second repetition of the PUSCH transmission), for example, based on the UE capability message indicating support of sending (e.g., transmitting)/multiplexing a CSI report in/on at least two repetitions (or at least two transmission occasions) of a PUSCH transmission.

The one or more wireless devices may multiplex the CSI report (or other information) in the first repetition of the PUSCH transmission and the second repetition of the PUSCH transmission, for example, based on a capability message (e.g., UE capability message) indicating support of sending (e.g., transmitting)/multiplexing a CSI report in/on at least two repetitions (or at least two transmission occasions) of a PUSCH transmission.

The one or more wireless devices may send (e.g., transmit) the CSI report (or other information) in the first transmission occasion (or in the first repetition of the PUSCH transmission) and the second transmission occasion (or in the second repetition of the PUSCH transmission), for example, based on the one or more configuration parameters indicating the repetition scheme that is (set to) the frequency domain repetition. The one or more wireless devices may multiplex the CSI report (or other information) in the first repetition of the PUSCH transmission and the second repetition of the PUSCH transmission, for example, based on the one or more configuration parameters indicating the repetition scheme that is (set to) the frequency domain repetition.

The one or more wireless devices may send (e.g., transmit) the CSI report (or other information) in a repetition of the PUSCH transmission among the first repetition of the PUSCH transmission (e.g., Repetition 1 in FIG. 19) and the second repetition of the PUSCH transmission (e.g., Repetition 2 in FIG. 19). The one or more wireless devices may send (e.g., transmit) the CSI report in a transmission occasion among the first transmission occasion (e.g., first TX occasion in FIG. 19) and the second transmission occasion (e.g., second TX occasion in FIG. 19). The wireless device may send (e.g., transmit) the repetition of the PUSCH transmission in the transmission occasion. The one or more wireless devices may not send (e.g., transmit) the CSI report in any repetition of the PUSCH transmission, among the first repetition of the PUSCH transmission and the second repetition of the PUSCH transmission, that is different from the repetition of the PUSCH transmission. The one or more wireless devices may not send (e.g., transmit) the CSI report in any transmission occasion, among the first transmission occasion and the second transmission occasion, that is different from the transmission occasion.

The one or more wireless devices may determine/select, for transmission of the CSI report (or other information), the repetition of the PUSCH transmission among the first repetition of the PUSCH transmission and the second repetition of the PUSCH transmission. The one or more wireless devices may determine/select, for transmission of the CSI report, the transmission occasion among the first transmission occasion and the second transmission occasion.

The repetition of the PUSCH transmission may be, for example, a default repetition of the PUSCH transmission. The repetition of the PUSCH transmission may be, for example, a reference repetition of the PUSCH transmission.

For example, in FIG. 19, the repetition of the PUSCH transmission may be the first repetition of the PUSCH transmission (e.g., Repetition 1 in FIG. 19). The one or more wireless devices may send (e.g., transmit) the CSI report in the first repetition of the PUSCH transmission. The one or more wireless devices may send (e.g., transmit) the CSI report in the first transmission occasion (e.g., first TX occasion in FIG. 19). The one or more wireless devices may not send (e.g., transmit) the CSI report in the second repetition of the PUSCH transmission (e.g., Repetition 2 in FIG. 19). The one or more wireless devices may not send (e.g., transmit) the CSI report in the second transmission occasion (e.g., second TX occasion in FIG. 19).

For example, in FIG. 19, the repetition of the PUSCH transmission may be the second repetition of the PUSCH transmission (e.g., Repetition 2 in FIG. 19). The one or more wireless devices may send (e.g., transmit) the CSI report in the second repetition of the PUSCH transmission. The one or more wireless devices may send (e.g., transmit) the CSI report in the second transmission occasion (e.g., second TX occasion in FIG. 19). The one or more wireless devices may not send (e.g., transmit) the CSI report in the first repetition of the PUSCH transmission (e.g., Repetition 1 in FIG. 19). The one or more wireless devices may not send (e.g., transmit) the CSI report in the first transmission occasion (e.g., first TX occasion in FIG. 19).

The one or more wireless devices may multiplex the CSI report (or other information) in/on/with the repetition of the PUSCH transmission. The one or more wireless devices may send (e.g., transmit) the CSI report in the repetition of the PUSCH transmission, for example, based on the multiplexing the CSI report in the repetition of the PUSCH transmission. The one or more wireless devices may send (e.g., transmit) the CSI report in the transmission occasion (that the repetition of the PUSCH transmission is sent (e.g., transmitted)), for example, based on the multiplexing the CSI report in the repetition of the PUSCH transmission.

The one or more wireless devices may send (e.g., transmit) the CSI report (or other information) in the transmission occasion (or in the repetition of the PUSCH transmission), for example, based on the one or more configuration parameters indicating the at least two SRS resource sets. The one or more wireless devices may multiplex the CSI report (or other information) in the repetition of the PUSCH transmission, for example, based on the one or more configuration parameters indicating the at least two SRS resource sets.

The one or more wireless devices may send (e.g., transmit) the CSI report (or other information) in the transmission occasion (or in the repetition of the PUSCH transmission), for example, based on the one or more configuration parameters not indicating at least two SRS resource sets with codebook (or with a usage parameter set to codebook). The one or more wireless devices may send (e.g., transmit) the CSI report in the transmission occasion (or in the repetition of the PUSCH transmission), for example, based on the one or more configuration parameters not indicating at least two SRS resource sets with non-codebook (or with a usage parameter set to non-codebook). The one or more wireless devices may send (e.g., transmit) the CSI report in the transmission occasion (or in the repetition of the PUSCH transmission), for example, based on the one or more configuration parameters indicating an SRS resource set (or a single SRS resource set) with codebook (or with a usage parameter set to codebook). The one or more wireless devices may send (e.g., transmit) the CSI report in the transmission occasion (or in the repetition of the PUSCH transmission), for example, based on the one or more configuration parameters indicating an SRS resource set (or a single SRS resource set) with non-codebook (or with a usage parameter set to non-codebook).

The one or more wireless devices may multiplex the CSI report (or other information) in the repetition of the PUSCH transmission, for example, based on the one or more configuration parameters not indicating at least two SRS resource sets with codebook (or with a usage parameter set to codebook). The one or more wireless devices may multiplex the CSI report in the repetition of the PUSCH transmission, for example, based on the one or more configuration parameters not indicating at least two SRS resource sets with non-codebook (or with a usage parameter set to non-codebook). The one or more wireless devices may multiplex the CSI report in the repetition of the PUSCH transmission, for example, based on the one or more configuration parameters indicating an SRS resource set (or a single SRS resource set) with codebook (or with a usage parameter set to codebook). The one or more wireless devices may multiplex the CSI report in the repetition of the PUSCH transmission, for example, based on the one or more configuration parameters indicating an SRS resource set (or a single SRS resource set) with non-codebook (or with a usage parameter set to non-codebook).

The one or more wireless devices may send (e.g., transmit) the CSI report in the transmission occasion (or in the repetition of the PUSCH transmission), for example, based on the field (or the value of the field) indicating the multi-TRP uplink repetition. The one or more wireless devices may send (e.g., transmit) the CSI report in the transmission occasion (or in the repetition of the PUSCH transmission), for example, based on the value of the field being equal to '10' or '11' or '1' (or any other value). The one or more wireless devices may send (e.g., transmit) the CSI report in the transmission occasion (or in the repetition of the PUSCH transmission), for example, based on the repetitions of the PUSCH transmission being associated with the at least two SRS resource sets.

The one or more wireless devices may send (e.g., transmit) the CSI report (or other information) in the transmission occasion (or in the repetition of the PUSCH transmission), for example, based on the field (or the value of the field) indicating a single-TRP uplink repetition/transmission. The one or more wireless devices may send (e.g., transmit) the CSI report in the transmission occasion (or in the repetition of the PUSCH transmission), for example, based on the value of the field being equal to '00' or '01' or '0' (or any other value). The one or more wireless devices may send (e.g., transmit) the CSI report in the transmission occasion (or in the repetition of the PUSCH transmission), for example, based on the repetitions of the PUSCH transmission being associated with an SRS resource set (or a single SRS resource set) with codebook (or with a usage parameter set to codebook). The one or more wireless devices may send (e.g., transmit) the CSI report in the transmission occasion (or in the repetition of the PUSCH transmission), for example, based on the repetitions of the PUSCH transmission being associated with an SRS resource set (or a single SRS resource set) with non-codebook (or with a usage parameter set to non-codebook).

The one or more wireless devices may multiplex the CSI report (or other information) in the repetition of the PUSCH transmission, for example, based on the field (or the value of the field) indicating a single-TRP uplink repetition/transmission. The one or more wireless devices may multiplex the CSI report in the repetition of the PUSCH transmission, for example, based on the value of the field being equal to '00' or '01' or '0' (or any other value). The one or more wireless devices may multiplex the CSI report in the repetition of the PUSCH transmission, for example, based on the repetitions of the PUSCH transmission being associated with an SRS resource set (or a single SRS resource set) with codebook (or with a usage parameter set to codebook). The one or more wireless devices may multiplex the CSI report in the repetition of the PUSCH transmission, for example, based on the repetitions of the PUSCH transmission being associated with an SRS resource set (or a single SRS resource set) with non-codebook (or with a usage parameter set to non-codebook).

The one or more wireless devices may send (e.g., transmit) the CSI report (or other information) in the transmission occasion (or in the repetition of the PUSCH transmission), for example, based on the one or more configuration parameters not comprising the CSI-Multiplexing-Mode parameter. The one or more wireless devices may send (e.g., transmit) the CSI report in the transmission occasion (or in the repetition of the PUSCH transmission), for example, based on the one or more configuration parameters not comprising the CSI-Multiplexing-Mode parameter set to enabled.

The one or more wireless devices may multiplex the CSI report (or other information) in the repetition of the PUSCH transmission, for example, based on the one or more configuration parameters not comprising the CSI-Multiplexing-Mode parameter. The one or more wireless devices may multiplex the CSI report in the repetition of the PUSCH transmission, for example, based on the one or more configuration parameters not comprising the CSI-Multiplexing-Mode parameter set to enabled.

The one or more wireless devices may send (e.g., transmit) the CSI report (or other information) in the transmission occasion (or in the repetition of the PUSCH transmission), for example, based on the one or more configuration parameters not comprising the CSI-Multiplexing-FDM-Mode parameter. The one or more wireless devices may send (e.g., transmit) the CSI report in the transmission occasion (or in the repetition of the PUSCH transmission), for example, based on the one or more configuration parameters not comprising the CSI-Multiplexing-FDM-Mode parameter set to enabled.

The one or more wireless devices may multiplex the CSI report in the repetition of the PUSCH transmission, for example, based on the one or more configuration parameters not comprising the CSI-Multiplexing-FDM-Mode parameter. The one or more wireless devices may multiplex the CSI report in the repetition of the PUSCH transmission, for example, based on the one or more configuration parameters not comprising the CSI-Multiplexing-FDM-Mode parameter set to enabled.

The one or more wireless devices may send (e.g., transmit) the CSI report (or other information) in the transmission occasion (or in the repetition of the PUSCH transmission), for example, based on the PUSCH transmission comprising/carrying an uplink control information (UCI) that is different from the CSI report. The one or more wireless devices may send (e.g., transmit) the CSI report in the transmission occasion (or in the repetition of the PUSCH transmission), for example, based on multiplexing, in the PUSCH transmission, an UCI that is different from the CSI report. The UCI may comprise, for example, HARQ-ACK. The UCI may comprise, for example, SR.

The one or more wireless devices may multiplex the CSI report (or other information) in the repetition of the PUSCH transmission, for example, based on the PUSCH transmission comprising/carrying an uplink control information (UCI) that is different from the CSI report. The one or more wireless devices may multiplex the CSI report in the repetition of the PUSCH transmission, for example, based on multiplexing, in the PUSCH transmission, an UCI that is different from the CSI report. The UCI may comprise, for example, HARQ-ACK. The UCI may comprise, for example, SR.

The one or more wireless devices may send (e.g., transmit) the CSI report (or other information) in the transmission occasion (or in the repetition of the PUSCH transmission), for example, based on the UE capability message not indicating support of sending (e.g., transmitting)/multiplexing a CSI report in/on at least two repetitions (or at least two transmission occasions) of a PUSCH transmission. The one or more wireless devices may send (e.g., transmit) the CSI report in the transmission occasion (or in the repetition of the PUSCH transmission), for example, based on the UE capability message indicating support of sending (e.g., transmitting)/multiplexing a CSI report in/on a single repetition (or a single transmission occasion) of a PUSCH transmission.

The one or more wireless devices may multiplex the CSI report (or other information) in the repetition of the PUSCH transmission, for example, based on the UE capability message not indicating support of sending (e.g., transmitting)/multiplexing a CSI report in/on at least two repetitions (or at least two transmission occasions) of a PUSCH transmission. The one or more wireless devices may multiplex the CSI report in the repetition of the PUSCH transmission, for example, based on the UE capability message indicating support of sending (e.g., transmitting)/multiplexing a CSI report in/on a single repetition (or a single transmission occasion) of a PUSCH transmission.

The one or more wireless devices may send (e.g., transmit) the CSI report (or other information) in the transmission occasion (or in the repetition of the PUSCH transmission), for example, based on the one or more configuration parameters indicating the repetition scheme that is (set to) the frequency domain repetition. The one or more wireless devices may multiplex the CSI report in the repetition of the PUSCH transmission, for example, based on the one or more configuration parameters indicating the repetition scheme that is (set to) the frequency domain repetition.

The first repetition (or the first transmission occasion) of the PUSCH transmission may start in/from a first RB (or in a first PRB). The second repetition (or the second transmission occasion) of the PUSCH transmission may start in/from a second RB (or in a second PRB).

The repetition (or the transmission occasion) of the PUSCH transmission may be a repetition (among the first repetition and the second repetition), with a lowest/highest starting frequency/RB among the first frequency/RB and the second frequency/RB. A starting frequency/RB of the repetition (or the transmission occasion) of the PUSCH transmission may be lowest/highest among the first RB of the first repetition and the second RB of the second repetition. The one or more wireless devices may send (e.g., transmit) the CSI report (or other information) in the transmission occasion (or in the repetition of the PUSCH transmission), for example, based on the starting frequency/RB of the repetition (or the transmission occasion) of the PUSCH transmission being lowest/highest among the first RB of the first repetition and the second RB of the second repetition. The one or more wireless devices may multiplex the CSI report in the repetition of the PUSCH transmission, for example, based on the starting frequency/RB of the repetition (or the transmission occasion) of the PUSCH transmission being lowest/highest among the first RB of the first repetition and the second RB of the second repetition. The one or more wireless devices may determine/select, for transmission of the CSI report, the transmission occasion (or the repetition) of the PUSCH transmission among the first transmission occasion (or the first repetition) of the PUSCH transmission and the second transmission occasion (or the second repetition) of the PUSCH transmission, for example, based on the starting frequency/RB of the repetition (or the transmission occasion) of the PUSCH transmission being lowest/highest among the first RB of the first repetition and the second RB of the second repetition. The one or more wireless devices may determine/select, for transmission of the CSI report, the transmission occasion (or the repetition) of the PUSCH transmission, among the first transmission occasion (or the first repetition) of the PUSCH transmission and the second transmission occasion (or the second repetition) of the PUSCH transmission, with the lowest/highest starting frequency/RB among the first RB of the first repetition and the second RB of the second repetition.

For example, the first RB of the first repetition (or the first transmission occasion) of the PUSCH transmission may be lower/higher than the second RB of the second repetition (or the second transmission occasion) of the PUSCH transmission. The repetition of the PUSCH transmission may be the first repetition of the PUSCH transmission, for example, based on the first RB of the first repetition being lower/higher than the second RB of the second repetition. The one or more wireless devices may send (e.g., transmit) the CSI report (or other information) in the first transmission occasion (or in the first repetition of the PUSCH transmission), for example, based on the first RB of the first repetition being lower/higher than the second RB of the second repetition. The one or more wireless devices may multiplex the CSI report in the first repetition of the PUSCH transmission, for example, based on the first RB of the first repetition being lower/higher than the second RB of the second repetition.

For example, the second RB of the second repetition (or the second transmission occasion) of the PUSCH transmission may be lower/higher than the first RB of the first repetition (or the first transmission occasion) of the PUSCH transmission. The repetition of the PUSCH transmission may be the second repetition of the PUSCH transmission, for example, based on the second RB of the second repetition being lower/higher than the first RB of the first repetition. The one or more wireless devices may send (e.g., transmit) the CSI report in the second transmission occasion (or in the second repetition of the PUSCH transmission), for example, based on the second RB of the second repetition being lower/higher than the first RB of the first repetition. The one or more wireless devices may multiplex the CSI report in the second repetition of the PUSCH transmission, for example, based on the second RB of the second repetition being lower/higher than the first RB of the first repetition.

The first repetition (or the first transmission occasion) of the PUSCH transmission may end in/from/at a first RB (or in a first PRB). The second repetition (or the second transmission occasion) of the PUSCH transmission may end in/from/at a second RB (or in a second PRB).

The repetition (or the transmission occasion) of the PUSCH transmission may be a repetition (e.g., among the first repetition and the second repetition), with a lowest/highest ending frequency/RB among the first frequency/RB and the second frequency/RB. An ending frequency/RB of the repetition (or the transmission occasion) of the PUSCH transmission may be lowest/highest among the first RB of the first repetition and the second RB of the second repetition. The one or more wireless devices may send (e.g., transmit) the CSI report (or other information) in the transmission occasion (or in the repetition of the PUSCH transmission), for example, based on the ending frequency/RB of the repetition (or the transmission occasion) of the PUSCH transmission being lowest/highest among the first RB of the first repetition and the second RB of the second repetition. The one or more wireless devices may multiplex the CSI report in the repetition of the PUSCH transmission, for example, based on the ending frequency/RB of the repetition (or the transmission occasion) of the PUSCH transmission being lowest/highest among the first RB of the first repetition and the second RB of the second repetition. The wireless device may determine/select, for transmission of the CSI report, the transmission occasion (or the repetition) of the PUSCH transmission among the first transmission occasion (or the first repetition) of the PUSCH transmission and the second transmission occasion (or the second repetition) of the PUSCH transmission, for example, based on the ending frequency/RB of the repetition (or the transmission occasion) of the PUSCH transmission being lowest/highest among the first RB of the first repetition and the second RB of the second repetition. The one or more wireless devices may determine/select, for transmission of the CSI report, the transmission occasion (or the repetition) of the PUSCH transmission, among the first transmission occasion (or the first repetition) of the PUSCH transmission and the second transmission occasion (or the second repetition) of the PUSCH transmission, with the lowest/highest ending frequency/RB among the first RB of the first repetition and the second RB of the second repetition.

For example, the first RB of the first repetition (or the first transmission occasion) of the PUSCH transmission may be lower/higher than the second RB of the second repetition (or the second transmission occasion) of the PUSCH transmission. The repetition of the PUSCH transmission may be the first repetition of the PUSCH transmission, for example, based on the first RB of the first repetition being lower/higher than the second RB of the second repetition. The one or more wireless devices may send (e.g., transmit) the CSI report (or other information) in the first transmission occasion (or in the first repetition of the PUSCH transmission), for example, based on the first RB of the first repetition being lower/higher than the second RB of the second repetition. The one or more wireless devices may multiplex the CSI report in the first repetition of the PUSCH transmission, for example, based on the first RB of the first repetition being lower/higher than the second RB of the second repetition.

For example, the second RB of the second repetition (or the second transmission occasion) of the PUSCH transmission may be lower/higher than the first RB of the first repetition (or the first transmission occasion) of the PUSCH transmission. The repetition of the PUSCH transmission may be the second repetition of the PUSCH transmission, for example, based on the second RB of the second repetition being lower/higher than the first RB of the first repetition. The one or more wireless devices may send (e.g., transmit) the CSI report (or other information) in the second transmission occasion (or in the second repetition of the PUSCH transmission), for example, based on the second RB of the second repetition being lower/higher than the first RB of the first repetition. The one or more wireless devices may multiplex the CSI report in the second repetition of the PUSCH transmission, for example, based on the second RB of the second repetition being lower/higher than the first RB of the first repetition.

The repetition of the PUSCH transmission may be associated with a corresponding TCI state. For example, the first repetition of the PUSCH transmission may be associated with the first TCI state (e.g., the TCI state 26 in FIG. 17) of the at least two TCI states. The one or more wireless devices may send (e.g., transmit) the first repetition of the PUSCH transmission based on the first TCI state. The first repetition of the PUSCH transmission may be associated with the first TCI state, for example, based on (e.g., in response to) the sending (e.g., transmitting) the first repetition of the PUSCH transmission based on the first TCI state.

The second repetition of the PUSCH transmission may be associated with the second TCI state (e.g., the TCI state 61 in FIG. 17) of the at least two TCI states. The one or more wireless devices may send (e.g., transmit) the second repetition of the PUSCH transmission based on the second TCI state. The second repetition of the PUSCH transmission may be associated with the second TCI state, for example, based on (e.g., in response to) the sending (e.g., transmitting) the second repetition of the PUSCH transmission based on the second TCI state.

The repetition of the PUSCH transmission may be a repetition (e.g., among the first repetition associated with the first TCI state and the second repetition associated with the second TCI state), associated with a TCI state with a lowest/highest TCI state index (e.g., among the first TCI state index of the first TCI state and the second TCI state index of the second TCI state). A TCI state index of a TCI state associated with the repetition (or the transmission occasion) of the PUSCH transmission may be lowest/highest among the first TCI state index of the first TCI state associated with the first repetition and the second TCI state index of the second TCI state associated with the second repetition. The first TCI state and the second TCI state may comprise the TCI state associated with the repetition. The first TCI state index and the second TCI state index may comprise the TCI state index of the TCI state associated with the repetition. The one or more wireless devices may send (e.g., transmit) the CSI report in the transmission occasion (or in the repetition of the PUSCH transmission), for example, based on the TCI state index of the TCI state associated with the repetition (or the transmission occasion) of the PUSCH transmission being lowest/highest (e.g., among the first TCI state index of the first TCI state associated with the first repetition and the second TCI state index of the second TCI state associated with the second repetition). The one or more wireless devices may multiplex the CSI report in the repetition of the PUSCH transmission, for example, based on the TCI state index of the TCI state associated with the repetition (or the transmission occasion) of the PUSCH transmission being lowest/highest (e.g., among the first TCI state index of the first TCI state associated with the first repetition and the second TCI state index of the second TCI state associated with the second repetition). The one or more wireless devices may determine/select, for transmission of the CSI report, the transmission occasion (or the repetition) of the PUSCH transmission (e.g., among the first transmission occasion (or the first repetition) of the PUSCH transmission and the second transmission occasion (or the second repetition) of the PUSCH transmission), for example, based on the TCI state index of the TCI state associated with the repetition (or the transmission occasion) of the PUSCH transmission being lowest/highest (e.g., among the first TCI state index of the first TCI state associated with the first repetition and the second TCI state index of the second TCI state associated with the second repetition). The one or more wireless devices may determine/select, for transmission of the CSI report, the transmission occasion (or the repetition) of the PUSCH transmission, (e.g., among the first transmission occasion (or the first repetition) of the PUSCH transmission and the second transmission occasion (or the second repetition) of the PUSCH transmission), associated with the TCI state with the lowest/highest TCI state index (e.g., among the first TCI state index of the first TCI state associated with the first repetition and the second TCI state index of the second TCI state associated with the second repetition).

For example, the first TCI state index of the first TCI state associated with the first repetition (or the first transmission occasion) of the PUSCH transmission may be lower/higher than the second TCI state index of the second TCI state associated with the second repetition (or the second transmission occasion) of the PUSCH transmission. The repetition of the PUSCH transmission may be the first repetition of the PUSCH transmission, for example, based on the first TCI state index of the first TCI state associated with the first repetition being lower/higher than the second TCI state index of the second TCI state associated with the second repetition. The one or more wireless devices may send (e.g., transmit) the CSI report in the first transmission occasion (or in the first repetition of the PUSCH transmission), for example, based on the first TCI state index of the first TCI state associated with the first repetition being lower/higher than the second TCI state index of the second TCI state associated with the second repetition. The one or more wireless devices may multiplex the CSI report in the first repetition of the PUSCH transmission, for example, based on the first TCI state index of the first TCI state associated with the first repetition being lower/higher than the second TCI state index of the second TCI state associated with the second repetition.

For example, the second TCI state index of the second TCI state associated with the second repetition (or the second transmission occasion) of the PUSCH transmission may be lower/higher than the first TCI state index of the first TCI state associated with the first repetition (or the first transmission occasion) of the PUSCH transmission. The repetition of the PUSCH transmission may be the second repetition of the PUSCH transmission, for example, based on the second TCI state index of the second TCI state associated with the second repetition being lower/higher than the first TCI state index of the first TCI state associated with the first repetition. The one or more wireless devices may send (e.g., transmit) the CSI report in the second transmission occasion (or in the second repetition of the PUSCH transmission), for example, based on the second TCI state index of the second TCI state associated with the second repetition being lower/higher than the first TCI state index of the first TCI state associated with the first repetition. The one or more wireless devices may multiplex the CSI report in the second repetition of the PUSCH transmission, for example, based on the second TCI state index of the second TCI state associated with the second repetition being lower/higher than the first TCI state index of the first TCI state associated with the first repetition.

The repetition of the PUSCH transmission may be the first repetition of the PUSCH transmission, for example, based on the first TCI state associated with the first repetition being the first/starting/earliest/initial TCI state in the vector/set/list of the at least two TCI states. The one or more wireless devices may send (e.g., transmit) the CSI report in the first transmission occasion (or in the first repetition of the PUSCH transmission), for example, based on the first TCI state associated with the first repetition being the first/starting/earliest/initial TCI state in the vector/set/list of the at least two TCI states. The one or more wireless devices may multiplex the CSI report in the first repetition of the PUSCH transmission, for example, based on the first TCI state associated with the first repetition being the first/starting/earliest/initial TCI state in the vector/set/list of the at least two TCI states.

The repetition of the PUSCH transmission may be the first repetition of the PUSCH transmission, for example, based on the first repetition being associated with the first SRS resource set. The repetition of the PUSCH transmission may be the first repetition of the PUSCH transmission, for example, based on the first repetition being associated with the first SRS resource set with the first SRS resource set index that is lower than the second SRS resource set index of the second SRS resource set. The repetition of the PUSCH transmission may be the first repetition of the PUSCH transmission, for example, based on the first SRS resource set index of the first SRS resource set associated with the first repetition being lower than the second SRS resource set index of the second SRS resource set associated with the second repetition.

The one or more wireless devices may send (e.g., transmit) the CSI report in the first transmission occasion (or in the first repetition of the PUSCH transmission), for example, based on the first repetition being associated with the first SRS resource set. The one or more wireless devices may send (e.g., transmit) the CSI report in the first transmission occasion (or in the first repetition of the PUSCH transmission), for example, based on the first repetition being associated with the first SRS resource set with the first SRS resource set index that is lower than the second SRS resource set index of the second SRS resource set. The one or more wireless devices may send (e.g., transmit) the CSI report in the first transmission occasion (or in the first repetition of the PUSCH transmission), for example, based on the first SRS resource set index of the first SRS resource set associated with the first repetition being lower than the second SRS resource set index of the second SRS resource set associated with the second repetition.

The one or more wireless devices may multiplex the CSI report in the first repetition of the PUSCH transmission, for example, based on the first repetition being associated with the first SRS resource set. The one or more wireless devices may multiplex the CSI report in the first repetition of the PUSCH transmission, for example, based on the first repetition being associated with the first SRS resource set with the first SRS resource set index that is lower than the second SRS resource set index of the second SRS resource set. The one or more wireless devices may multiplex the CSI report in the first repetition of the PUSCH transmission, for example, based on the first SRS resource set index of the first SRS resource set associated with the first repetition being lower than the second SRS resource set index of the second SRS resource set associated with the second repetition.

The repetition of the PUSCH transmission may be associated with a corresponding antenna panel. For example, the first repetition of the PUSCH transmission may be associated with the first antenna panel. The one or more wireless devices may send (e.g., transmit) the first repetition of the PUSCH transmission with the first antenna panel. The first repetition of the PUSCH transmission may be associated with the first antenna panel, for example, based on (e.g., in response to) the sending (e.g., transmitting) the first repetition of the PUSCH transmission with the first antenna panel.

The second repetition of the PUSCH transmission may be associated with the second antenna panel. The one or more wireless devices may send (e.g., transmit) the second repetition of the PUSCH transmission with the second antenna panel. The second repetition of the PUSCH transmission may be associated with the second antenna panel, for example, based on (e.g., in response to) the sending (e.g., transmitting) the second repetition of the PUSCH transmission with the second antenna panel.

The repetition of the PUSCH transmission may be a repetition (e.g., among the first repetition associated with the first antenna panel and the second repetition associated with the second antenna panel) associated with an antenna panel with a lowest/highest antenna panel index (e.g., among the first antenna panel index of the first antenna panel and the second antenna panel index of the second antenna panel). An antenna panel index of an antenna panel associated with the repetition (or the transmission occasion) of the PUSCH transmission may be lowest/highest among the antenna panel indexes of antenna panels associated with the repetitions (e.g., first antenna panel index of the first antenna panel associated with the first repetition and the second antenna panel index of the second antenna panel associated with the second repetition). The first antenna panel and the second antenna panel may comprise the antenna panel associated with the repetition. The first antenna panel index and the second antenna panel index may comprise the antenna panel index of the antenna panel associated with the repetition. The one or more wireless devices may send (e.g., transmit) the CSI report in the transmission occasion (or in the repetition of the PUSCH transmission), for example, based on the antenna panel index of the antenna panel associated with the repetition (or the transmission occasion) of the PUSCH transmission being lowest/highest (e.g., among the first antenna panel index of the first antenna panel associated with the first repetition and the second antenna panel index of the second antenna panel associated with the second repetition). The one or more wireless devices may multiplex the CSI report in the repetition of the PUSCH transmission, for example, based on the antenna panel index of the antenna panel associated with the repetition (or the transmission occasion) of the PUSCH transmission being lowest/highest (e.g., among the first antenna panel index of the first antenna panel associated with the first repetition and the second antenna panel index of the second antenna panel associated with the second repetition). The one or more wireless devices may determine/select, for transmission of the CSI report, the transmission occasion (or the repetition) of the PUSCH transmission (e.g., among the first transmission occasion (or the first repetition) of the PUSCH transmission and the second transmission occasion (or the second repetition) of the PUSCH transmission), for example, based on the antenna panel index of the antenna panel associated with the repetition (or the transmission occasion) of the PUSCH transmission being lowest/highest (e.g., among the first antenna panel index of the first antenna panel associated with the first repetition and the second antenna panel index of the second antenna panel associated with the second repetition). The one or more wireless devices may determine/select, for transmission of the CSI report, the transmission occasion (or the repetition) of the PUSCH transmission, (e.g., among the first transmission occasion (or the first repetition) of the PUSCH transmission and the second transmission occasion (or the second repetition) of the PUSCH transmission), associated with the antenna panel with the lowest/highest antenna panel index (e.g., among the first antenna panel index of the first antenna panel associated with the first repetition and the second antenna panel index of the second antenna panel associated with the second repetition).

For example, the first antenna panel index of the first antenna panel associated with the first repetition (or the first transmission occasion) of the PUSCH transmission may be lower/higher than the second antenna panel index of the second antenna panel associated with the second repetition (or the second transmission occasion) of the PUSCH transmission. The repetition of the PUSCH transmission may be the first repetition of the PUSCH transmission, for example, based on the first antenna panel index of the first antenna panel associated with the first repetition being lower/higher than the second antenna panel index of the second antenna panel associated with the second repetition. The one or more wireless devices may send (e.g., transmit) the CSI report in the first transmission occasion (or in the first repetition of the PUSCH transmission), for example, based on the first antenna panel index of the first antenna panel associated with the first repetition being lower/higher than the second antenna panel index of the second antenna panel associated with the second repetition. The one or more wireless devices may multiplex the CSI report in the first repetition of the PUSCH transmission, for example, based on the first antenna panel index of the first antenna panel associated with the first repetition being lower/higher than the second antenna panel index of the second antenna panel associated with the second repetition.

For example, the second antenna panel index of the second antenna panel associated with the second repetition (or the second transmission occasion) of the PUSCH transmission may be lower/higher than the first antenna panel index of the first antenna panel associated with the first repetition (or the first transmission occasion) of the PUSCH transmission. The repetition of the PUSCH transmission may be the second repetition of the PUSCH transmission, for example, based on the second antenna panel index of the second antenna panel associated with the second repetition being lower/higher than the first antenna panel index of the first antenna panel associated with the first repetition. The one or more wireless devices may send (e.g., transmit) the CSI report in the second transmission occasion (or in the second repetition of the PUSCH transmission), for example, based on the second antenna panel index of the second antenna panel associated with the second repetition being lower/higher than the first antenna panel index of the first antenna panel associated with the first repetition. The one or more wireless devices may multiplex the CSI report in the second repetition of the PUSCH transmission, for example, based on the second antenna panel index of the second antenna panel associated with the second repetition being lower/higher than the first antenna panel index of the first antenna panel associated with the first repetition.

The repetition of the PUSCH transmission may be associated with the capability value set. For example, the first repetition of the PUSCH transmission may be associated with the first capability value set. The one or more wireless devices may send (e.g., transmit) the first repetition of the PUSCH transmission based on the first TCI state associated with the first capability value set. The first repetition of the PUSCH transmission may be associated with the first capability value set, for example, based on (e.g., in response to) the sending (e.g., transmitting) the first repetition of the PUSCH transmission based on the first TCI state associated with the first capability value set.

The second repetition of the PUSCH transmission may be associated with the second capability value set. The one or more wireless devices may send (e.g., transmit) the second repetition of the PUSCH transmission based on the second TCI state associated with the second capability value set. The second repetition of the PUSCH transmission may be associated with the second capability value set, for example, based on (e.g., in response to) the sending (e.g., transmitting) the second repetition of the PUSCH transmission based on the second TCI state associated with the second capability value set.

The repetition of the PUSCH transmission may be a repetition (e.g., among the first repetition associated with the first antenna panel and the second repetition associated with the second antenna panel) associated with a capability value set with a lowest/highest capability value set index (e.g., among the first capability value set index of the first capability value set and the second capability value set index of the second capability value set). A capability value set index of a capability value set associated with the repetition (or the transmission occasion) of the PUSCH transmission may be lowest/highest among the capability value set indexes of capability value sets associated with the repetitions (e.g., the first capability value set index of the first capability value set associated with the first repetition and the second capability value set index of the second capability value set associated with the second repetition). The first capability value set and the second capability value set may comprise the capability value set associated with the repetition. The first capability value set index and the second capability value set index may comprise the capability value set index of the capability value set associated with the repetition. The one or more wireless devices may send (e.g., transmit) the CSI report in the transmission occasion (or in the repetition of the PUSCH transmission), for example, based on the capability value set index of the capability value set associated with the repetition (or the transmission occasion) of the PUSCH transmission being lowest/highest (e.g., among the first capability value set index of the first capability value set associated with the first repetition and the second capability value set index of the second capability value set associated with the second repetition). The one or more wireless devices may multiplex the CSI report in the repetition of the PUSCH transmission, for example, based on the capability value set index of the capability value set associated with the repetition (or the transmission occasion) of the PUSCH transmission being lowest/highest (e.g., among the first capability value set index of the first capability value set associated with the first repetition and the second capability value set index of the second capability value set associated with the second repetition). The one or more wireless devices may determine/select, for transmission of the CSI report, the transmission occasion (or the repetition) of the PUSCH transmission (e.g., among the first transmission occasion (or the first repetition) of the PUSCH transmission and the second transmission occasion (or the second repetition) of the PUSCH transmission), for example, based on the capability value set index of the capability value set associated with the repetition (or the transmission occasion) of the PUSCH transmission being lowest/highest (e.g., among the first capability value set index of the first capability value set associated with the first repetition and the second capability value set index of the second capability value set associated with the second repetition). The one or more wireless devices may determine/select, for transmission of the CSI report, the transmission occasion (or the repetition) of the PUSCH transmission (e.g., among the first transmission occasion (or the first repetition) of the PUSCH transmission and the second transmission occasion (or the second repetition) of the PUSCH transmission) associated with the capability value set with the lowest/highest capability value set index (e.g., among the first capability value set index of the first capability value set associated with the first repetition and the second capability value set index of the second capability value set associated with the second repetition).

The first capability value set index of the first capability value set associated with the first repetition (or the first transmission occasion) of the PUSCH transmission may be lower/higher than the second capability value set index of the second capability value set associated with the second repetition (or the second transmission occasion) of the PUSCH transmission. The repetition of the PUSCH transmission may be the first repetition of the PUSCH transmission, for example, based on the first capability value set index of the first capability value set associated with the first repetition being lower/higher than the second capability value set index of the second capability value set associated with the second repetition. The one or more wireless devices may send (e.g., transmit) the CSI report in the first transmission occasion (or in the first repetition of the PUSCH transmission), for example, based on the first capability value set index of the first capability value set associated with the first repetition being lower/higher than the second capability value set index of the second capability value set associated with the second repetition. The one or more wireless devices may multiplex the CSI report in the first repetition of the PUSCH transmission, for example, based on the first capability value set index of the first capability value set associated with the first repetition being lower/higher than the second capability value set index of the second capability value set associated with the second repetition.

The second capability value set index of the second capability value set associated with the second repetition (or the second transmission occasion) of the PUSCH transmission may be lower/higher than the first capability value set index of the first capability value set associated with the first repetition (or the first transmission occasion) of the PUSCH transmission. The repetition of the PUSCH transmission may be the second repetition of the PUSCH transmission, for example, based on the second capability value set index of the second capability value set associated with the second repetition being lower/higher than the first capability value set index of the first capability value set associated with the first repetition. The one or more wireless devices may send (e.g., transmit) the CSI report in the second transmission occasion (or in the second repetition of the PUSCH transmission), for example, based on the second capability value set index of the second capability value set associated with the second repetition being lower/higher than the first capability value set index of the first capability value set associated with the first repetition. The one or more wireless devices may multiplex the CSI report in the second repetition of the PUSCH transmission, for example, based on the second capability value set index of the second capability value set associated with the second repetition being lower/higher than the first capability value set index of the first capability value set associated with the first repetition.

The repetition of the PUSCH transmission may be associated with a value of an index (e.g., TRP index, coreset pool index, SRS resource set index, antenna panel index, capability value set index, beam failure detection set index, Unified TCI state index, physical cell index (PCI), and/or the like). The repetition of the PUSCH transmission may be associated with the value of the index, for example, based on a TCI state (e.g., a reference signal indicated by the TCI state) associated with the value of the index. One or more wireless devices may send (e.g., transmit) the repetition of the PUSCH transmission based on the TCI state. One or more configuration parameters may indicate an association/mapping/correspondence between the TCI state and the value of the index. For example, the first repetition of the PUSCH transmission may be associated with a first value of an index (e.g., TRP index, coreset pool index, SRS resource set index, antenna panel index, capability value set index, beam failure detection set index, Unified TCI state index, physical cell index (PCI), and/or the like). The first repetition of the PUSCH transmission may be associated with the first value of the index, for example, based on the first TCI state being associated with the first value of the index. The one or more wireless devices may send (e.g., transmit) the first repetition of the PUSCH transmission based on the first TCI state. For example, the one or more configuration parameters may indicate, for the first TCI state, the first value of the index. The one or more configuration parameters may, for example, indicate an association/mapping/correspondence between the first TCI state and the first value of the index.

The first repetition of the PUSCH transmission may be associated with the first value of the index, for example, based on the first reference signal indicated by the first TCI state being associated with the first value of the index. The one or more wireless devices may send (e.g., transmit) the first repetition of the PUSCH transmission based on the first TCI state. For example, the one or more configuration parameters may indicate, for the first reference signal, the first value of the index. The one or more configuration parameters may, for example, indicate an association/mapping/correspondence between the first reference signal and the first value of the index.

The second repetition of the PUSCH transmission may be associated with a second value of the index (e.g., TRP index, coreset pool index, SRS resource set index, antenna panel index, capability value set index, beam failure detection set index, Unified TCI state index, physical cell index (PCI), and/or the like). The second repetition of the PUSCH transmission may be associated with the second value of the index, for example, based on the second TCI state being associated with the second value of the index. The one or more wireless devices may send (e.g., transmit) the second repetition of the PUSCH transmission based on the second TCI state. For example, the one or more configuration parameters may indicate, for the second TCI state, the second value of the index. The one or more configuration parameters may, for example, indicate an association/mapping/correspondence between the second TCI state and the second value of the index.

The second repetition of the PUSCH transmission may be associated with the second value of the index, for example, based on the second reference signal indicated by the second TCI state being associated with the second value of the index. The one or more wireless devices may send (e.g., transmit) the second repetition of the PUSCH transmission based on the second TCI state. For example, the one or more configuration parameters may indicate, for the second reference signal, the second value of the index. The one or more configuration parameters may, for example, indicate an association/mapping/correspondence between the second reference signal and the second value of the index.

The CSI report may be associated with a value of the index (e.g., TRP index, coreset pool index, SRS resource set index, antenna panel index, capability value set index, beam failure detection set index, Unified TCI state index, physical cell index (PCI), and/or the like). The one or more configuration parameters may indicate, for the CSI report, the value of the index. The CSI request field in the DCI may indicate a trigger state among a plurality of trigger states (e.g., aperiodic trigger states). The one or more configuration parameters may indicate the plurality of trigger states. The one or more configuration parameters may indicate, for the trigger state, the value of the index. The one or more wireless devices may measure radio link qualities (e.g., L1-RSRP, SINR, SNR, BLER, L3-RSRP) of one or more reference signals in the trigger state. The one or more configuration parameters may indicate, for the trigger state, the one or more reference signals. The one or more wireless devices may measure a respective radio link quality of each reference signal of the one or more reference signals. The CSI report may comprise/indicate the radio link qualities of the one or more reference signals.

For example, the value of the index of the CSI report may be equal to (or the same as) the first value of the index of the first repetition of the PUSCH transmission. The value of the index of the CSI report may be different from the second value of the index of the second repetition of the PUSCH transmission. The repetition of the PUSCH transmission may be the first repetition of the PUSCH transmission, for example, based on the value of the index of the CSI report being equal to (or the same as) the first value of the index of the first repetition. The one or more wireless devices may send (e.g., transmit) the CSI report in the first transmission occasion (or in the first repetition of the PUSCH transmission), for example, based on the value of the index of the CSI report being equal to (or the same as) the first value of the index of the first repetition. The one or more wireless devices may multiplex the CSI report in the first repetition of the PUSCH transmission, for example, based on the value of the index of the CSI report being equal to (or the same as) the first value of the index of the first repetition. For example, the first value may be equal to zero. For example, the value may be equal to zero.

For example, the value of the index of the CSI report (or other information) may be equal to (or the same as) the second value of the index of the second repetition of the PUSCH transmission. The value of the index of the CSI report may be different from the first value of the index of the first repetition of the PUSCH transmission. The repetition of the PUSCH transmission may be the second repetition of the PUSCH transmission, for example, based on the value of the index of the CSI report being equal to (or the same as) the second value of the index of the second repetition. The one or more wireless devices may send (e.g., transmit) the CSI report in the second transmission occasion (or in the second repetition of the PUSCH transmission), for example, based on the value of the index of the CSI report being equal to (or the same as) the second value of the index of the second repetition. The one or more wireless devices may multiplex the CSI report in the second repetition of the PUSCH transmission, for example, based on the value of the index of the CSI report being equal to (or the same as) the second value of the index of the second repetition. For example, the second value may be equal to one. For example, the value may be equal to one.

The DCI (e.g., at time T0 in FIG. 19) may indicate the repetition of the PUSCH transmission (e.g., among the first repetition of the PUSCH transmission and the second repetition of the PUSCH transmission). The DCI may comprise a field (e.g., TRP field, coreset pool index field, SRS resource set index field, antenna panel index field, capability value set index field, beam failure detection set index field, Unified TCI state index field, physical cell index (PCI) field, TCI state field, CSI request field, FDRA field, TDRA field, RV field, HARQ process number field, and/or the like) indicating the repetition of the PUSCH transmission. A value of the field may indicate the repetition of the PUSCH transmission.

The field may be a 1-bit field (or any other quantity of bits). For example, a size/length of the field may be more than 1-bit field. For example, the least significant bit (LSB) of the field may indicate repetition of the PUSCH transmission. For example, the most significant bit (MSB) of the field may indicate the repetition of the PUSCH transmission. For example, a reserved bit of the field may indicate the repetition of the PUSCH transmission A first value of the field may indicate the first repetition of the PUSCH transmission. The repetition of the PUSCH transmission may be the first repetition of the PUSCH transmission, for example, based on the value of the field being equal to the first value (e.g., 0). The one or more wireless devices may send (e.g., transmit) the CSI report in the first transmission occasion (or in the first repetition of the PUSCH transmission), for example, based on the value of the field being equal to the first value. The one or more wireless devices may multiplex the CSI report in the first repetition of the PUSCH transmission, for example, based on the value of the field being equal to the first value.

A second value of the field may indicate the second repetition of the PUSCH transmission. The repetition of the PUSCH transmission may be the second repetition of the PUSCH transmission, for example, based on the value of the field being equal to the second value (e.g., 1). The one or more wireless devices may send (e.g., transmit) the CSI report in the second transmission occasion (or in the second repetition of the PUSCH transmission), for example, based on the value of the field being equal to the second value. The one or more wireless devices may multiplex the CSI report in the second repetition of the PUSCH transmission, for example, based on the value of the field being equal to the second value.

The CSI report may be associated with a value of an index (e.g., TRP index, coreset pool index, SRS resource set index, antenna panel index, capability value set index, beam failure detection set index, Unified TCI state index, physical cell index (PCI), and/or the like). The value of the index may indicate the repetition of the PUSCH transmission (e.g., among the first repetition of the PUSCH transmission and the second repetition of the PUSCH transmission). The one or more configuration parameters may indicate, for the CSI report, the value of the index. The CSI request field in the DCI may indicate a trigger state among a plurality of trigger states (e.g., aperiodic trigger states, semi-persistent trigger states, etc.). The one or more configuration parameters may indicate the plurality of trigger states. The one or more configuration parameters may indicate, for the trigger state, the value of the index.

A first value of the index may indicate the first repetition of the PUSCH transmission. The repetition of the PUSCH transmission may be the first repetition of the PUSCH transmission, for example, based on the value of the index being equal to the first value (e.g., 0). The one or more wireless devices may send (e.g., transmit) the CSI report in the first transmission occasion (or in the first repetition of the PUSCH transmission), for example, based on the value of the index being equal to the first value. The one or more wireless devices may multiplex the CSI report in the first repetition of the PUSCH transmission, for example, based on the value of the index being equal to the first value.

A second value of the index may indicate the second repetition of the PUSCH transmission. The repetition of the PUSCH transmission may be the second repetition of the PUSCH transmission, for example, based on the value of the index being equal to the second value (e.g., 1). The one or more wireless devices may send (e.g., transmit) the CSI report in the second transmission occasion (or in the second repetition of the PUSCH transmission), for example, based on the value of the index being equal to the second value.

The one or more wireless devices may multiplex the CSI report in the second repetition of the PUSCH transmission, for example, based on the value of the index being equal to the second value.

Figure 20:
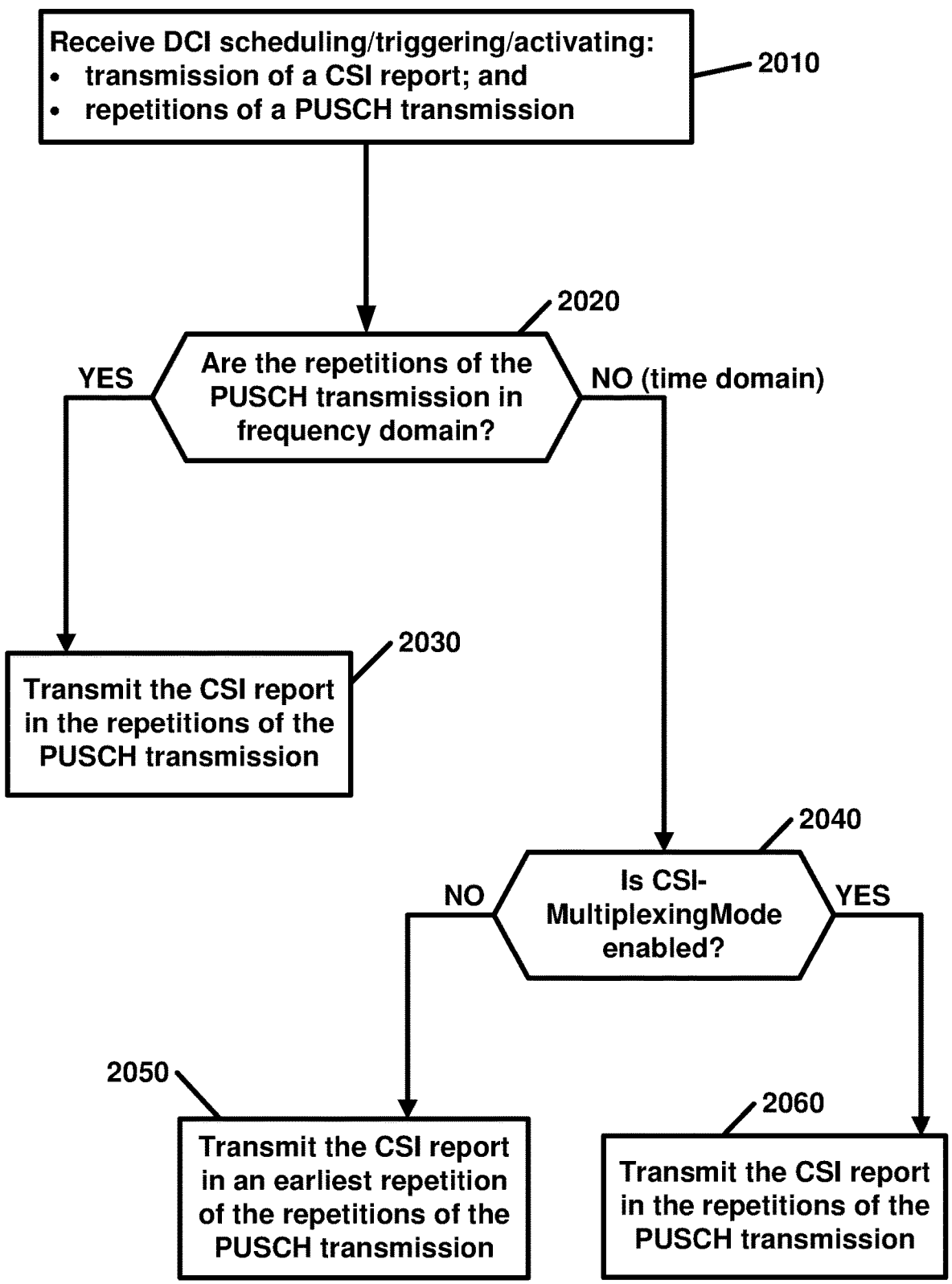
FIG. 20 shows an example of report multiplexing.
Figure 21A:
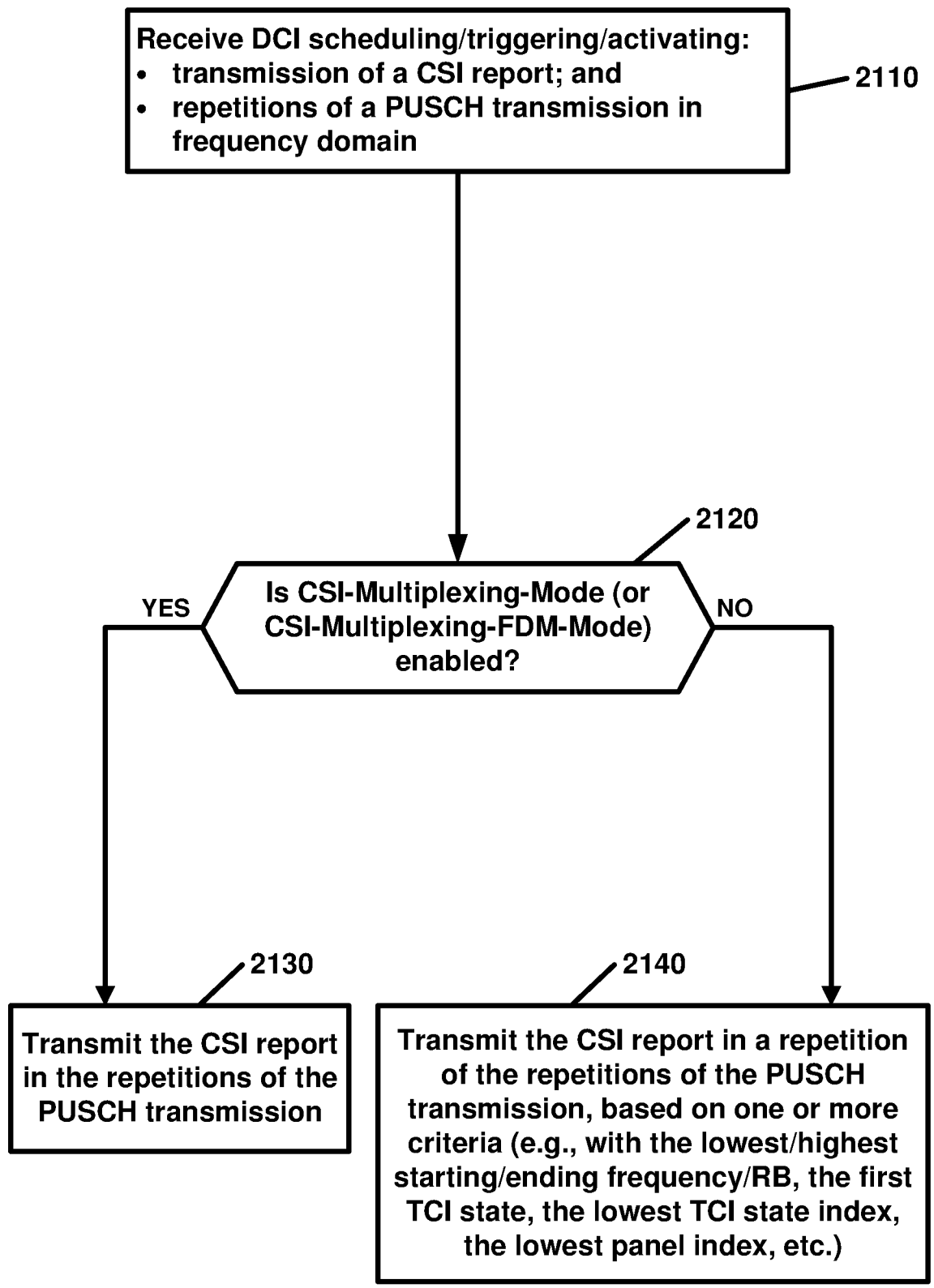
FIG. 21A and FIG. 21B show an example of report multiplexing.
Figure 21B:
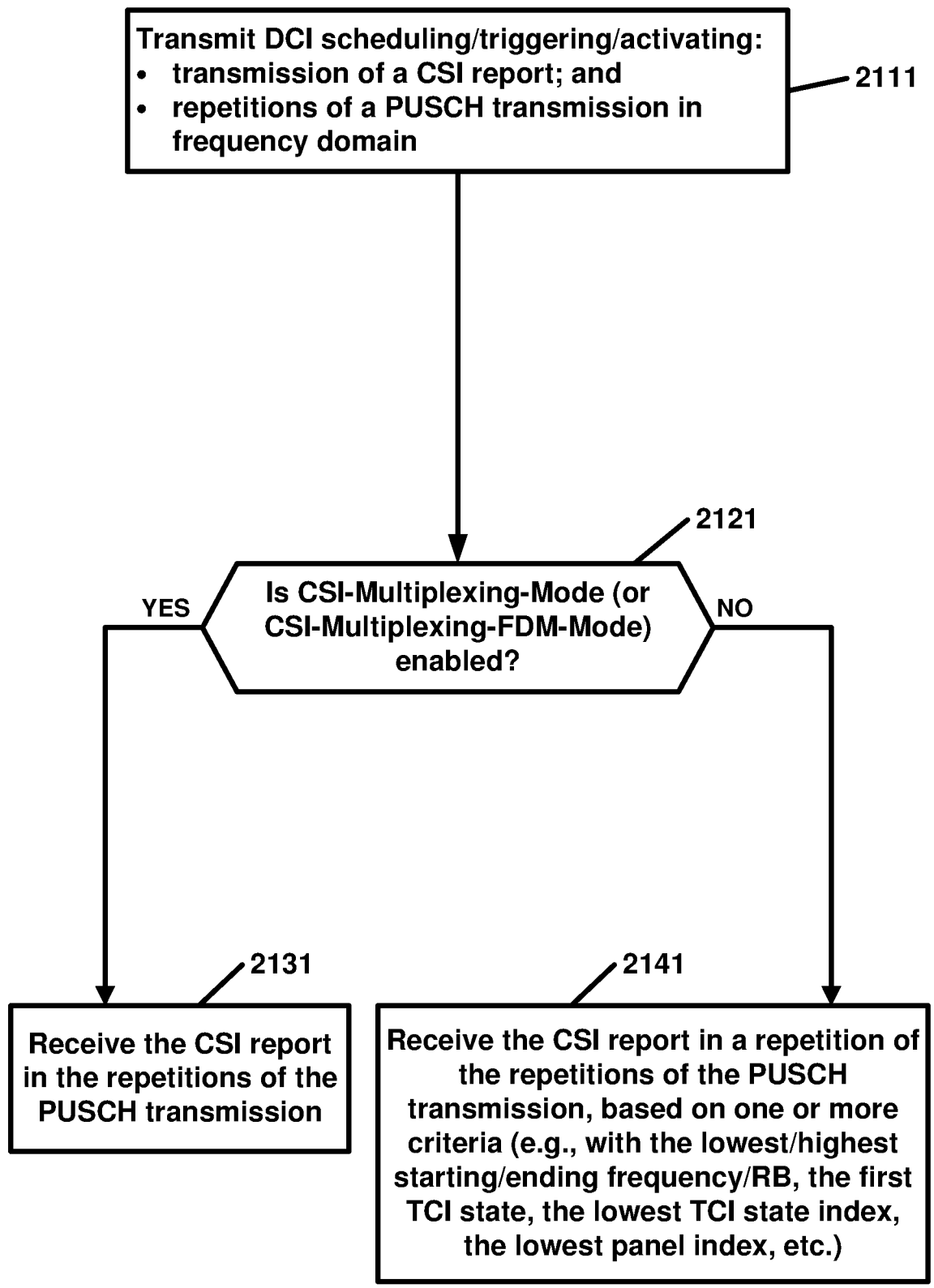

FIG. 20, FIG. 21A and FIG. 21B show examples of report multiplexing. One or more wireless devices may receive, for example, from a base station, one or more messages comprising one or more configuration parameters. The base station may send (e.g., transmit) the one or more messages to the one or more wireless devices.

As indicated at step 2010 in FIG. 20 and/or at step 2110 in FIG. 21A, the one or more wireless devices may receive DCI (e.g., DCI format 0-1, DCI format 0-2, DCI format 0-x, x=0, 1, 2, 3 . . . ). The DCI may schedule/trigger/activate transmission of a CSI report (e.g., aperiodic CSI report, semi-persistent CSI report). The DCI may schedule repetitions of a PUSCH transmission. For example, the DCI may schedule repetitions of a PUSCH transmission in frequency domain. For example, the DCI may schedule repetitions of a PUSCH transmission in time domain. As indicated at step 2111 in FIG. 21B, the base station may send (e.g., transmit) the DCI to the one or more wireless device.

The CSI report may be/comprise one or more CSI reports. The one or more CSI reports may be, for example, one or more aperiodic CSI reports. The one or more CSI reports may be, for example, one or more semi-persistent CSI reports.

The DCI may comprise a CSI request field scheduling/triggering transmission of the CSI report. The PUSCH transmission may, for example, comprise/carry a transport block. The PUSCH transmission may not, for example, comprise/carry a transport block.

The one or more configuration parameters may indicate at least two SRS resource sets comprising a first SRS resource set and a second SRS resource set. The one or more configuration parameters may indicate, for the at least two SRS resource sets, codebook. The one or more configuration parameters may indicate, for the at least two SRS resource sets, non-codebook.

The one or more wireless devices may receive a downlink message/command (e.g., MAC-CE, DCI) indicating activation of at least two TCI states comprising a first TCI state (e.g., TCI state 26 in FIG. 17) and a second TCI state (e.g., TCI state 61 in FIG. 17). The base station may send (e.g., transmit) the downlink message/command.

The repetitions of the PUSCH transmission may comprise one or more first repetitions and one or more second repetitions. The one or more first repetitions of the repetitions of the PUSCH transmission may be associated with the first SRS resource set. The one or more second repetitions of the repetitions of the PUSCH transmission may be associated with the second SRS resource set.

The one or more first repetitions of the repetitions of the PUSCH transmission may be associated with the first TCI state. The one or more second repetitions of the repetitions of the PUSCH transmission may be associated with the second TCI state. The wireless devices may send (e.g., transmit) the one or more first repetitions based on the first TCI state. The wireless device may send (e.g., transmit) the one or more first repetitions with a first spatial domain transmission filter/beam determined based on the first TCI state (or a first reference signal indicated by the first TCI state). The wireless device may send (e.g., transmit) the one or more first repetitions with a first transmission power determined based on the first TCI state. The base station may receive the one or more first repetitions based on the first TCI state.

The wireless device may send (e.g., transmit) the one or more second repetitions based on the second TCI state. The wireless device may send (e.g., transmit) the one or more second repetitions with a second spatial domain transmission filter/beam determined based on the second TCI state (or a second reference signal indicated by the second TCI state). The wireless device may send (e.g., transmit) the one or more second repetitions with a second transmission power determined based on the second TCI state. The base station may receive the one or more second repetitions based on the second TCI state.

The repetitions of the PUSCH transmission may be in a time domain (e.g., TDM in FIG. 18). The repetitions of the PUSCH transmission may not be in a frequency domain (e.g., FDM in FIG. 18). This may be shown by the direction "NO" at step 2020 in FIG. 20.

The one or more configuration parameters may comprise a CSI-Multiplexing-Mode parameter (e.g., at step 2040). The CSI-Multiplexing-Mode parameter may be (set to) enabled (e.g., the direction "YES" at step 2040). As indicated at step 2060, the wireless device may send (e.g., transmit) the CSI report in a first repetition (or a first transmission occasion) of the PUSCH transmission and a second repetition (or a second transmission occasion) of the PUSCH transmission. The base station may receive the CSI report in the first repetition (or the first transmission occasion) of the PUSCH transmission and the second repetition (or the second transmission occasion) of the PUSCH transmission. The repetitions of the PUSCH transmission may comprise the first repetition of the PUSCH transmission and the second repetition of the PUSCH transmission. The wireless device may send (e.g., transmit) the CSI report in the first repetition of the PUSCH transmission and the second repetition of the PUSCH transmission, for example, based on the one or more configuration parameters comprising the CSI-Multiplexing-Mode parameter (or comprising the CSI-Multiplexing-Mode parameter that is enabled). The base station may receive the CSI report in the first repetition of the PUSCH transmission and the second repetition of the PUSCH transmission, for example, based on the one or more configuration parameters comprising the CSI-Multiplexing-Mode parameter (or comprising the CSI-Multiplexing-Mode parameter that is enabled). The one or more first repetitions may comprise the first repetition. The first repetition may be an earliest/starting/initial repetition of/in/among the one or more first repetitions. The one or more second repetitions may comprise the second repetition. The second repetition may be an earliest/starting/initial repetition of/in/among the one or more second repetitions.

The one or more configuration parameters may not comprise a CSI-Multiplexing-Mode parameter (e.g., AP-CSI-MultiplexingMode, SP-CSI-MultiplexingMode). The one or more configuration parameters may not comprise the CSI-Multiplexing-Mode parameter set to enabled (e.g., the direction "NO" at step 2040).

As indicated at step 2050, the wireless device may send (e.g., transmit) the CSI report in a first repetition (or a first transmission occasion) of the PUSCH transmission. The base station may receive the CSI report in the first repetition (or the first transmission occasion) of the PUSCH transmission. The repetitions of the PUSCH transmission may comprise the first repetition of the PUSCH transmission. The wireless device may not send (e.g., transmit) the CSI report in a second repetition (or a second transmission occasion) of the PUSCH transmission. The base station may not receive the CSI report in the second repetition (or a second transmission occasion) of the PUSCH transmission. The repetitions of the PUSCH transmission may comprise the second repetition of the PUSCH transmission. The second repetition of the PUSCH transmission may be different from the first repetition of the PUSCH transmission. The wireless device may send (e.g., transmit) the CSI report in the first repetition of the PUSCH transmission, for example, based on the one or more configuration parameters not comprising the CSI-Multiplexing-Mode parameter (or not comprising the CSI-Multiplexing-Mode parameter that is enabled). The base station may receive the CSI report in the first repetition of the PUSCH transmission, for example, based on the one or more configuration parameters not comprising the CSI-Multiplexing-Mode parameter (or not comprising the CSI-Multiplexing-Mode parameter that is enabled). The first repetition may be an earliest/starting/initial repetition of/in/among the repetitions of the PUSCH transmission. The wireless device may not send (e.g., transmit) the CSI report in the second repetition that is different from the first repetition, for example, based on the one or more configuration parameters not comprising the CSI-Multiplexing-Mode parameter (or not comprising the CSI-Multiplexing-Mode parameter that is enabled). The base station may not receive the CSI report in the second repetition that is different from the first repetition, for example, based on the one or more configuration parameters not comprising the CSI-Multiplexing-Mode parameter (or not comprising the CSI-Multiplexing-Mode parameter that is enabled).

The repetitions of the PUSCH transmission may be in a frequency domain (e.g., FDM in FIG. 18 and FIG. 19). The repetitions of the PUSCH transmission may not be in a time domain (e.g., TDM in FIG. 18). The one or more configuration parameters may, for example, indicate a repetition scheme set to a frequency domain repetition (e.g., (e.g., FDM-Scheme). This may be shown by the direction "YES" at step 2020 in FIG. 20.

As indicated at step 2030, the wireless device may send (e.g., transmit) the CSI report in a first repetition (or a first transmission occasion) of the PUSCH transmission and a second repetition (or a second transmission occasion) of the PUSCH transmission. The repetitions of the PUSCH transmission may comprise the first repetition of the PUSCH transmission (e.g., Repetition 1 in FIG. 19) and the second repetition of the PUSCH transmission (e.g., Repetition 2 in FIG. 19). The one or more first repetitions may comprise the first repetition. The one or more second repetitions may comprise the second repetition. The wireless device may send (e.g., transmit) the CSI report in the first repetition of the PUSCH transmission and the second repetition of the PUSCH transmission, for example, based on the repetitions of the PUSCH transmission being in the frequency domain. The wireless device may send (e.g., transmit) the CSI report in the first repetition of the PUSCH transmission and the second repetition of the PUSCH transmission, for example, based on the one or more configuration parameters indicating the repetition scheme set to the frequency domain repetition. The base station may receive the CSI report in the first repetition of the PUSCH transmission and the second repetition of the PUSCH transmission. The base station may receive the CSI report in the first repetition of the PUSCH transmission and the second repetition of the PUSCH transmission, for example, based on the repetitions of the PUSCH transmission being in the frequency domain. The base station may receive the CSI report in the first repetition of the PUSCH transmission and the second repetition of the PUSCH transmission, for example, based on the one or more configuration parameters indicating the repetition scheme set to the frequency domain repetition.

In FIG. 21A and FIG. 21B, the one or more configuration parameters may, for example, comprise a CSI-Multiplexing-Mode parameter. The CSI-Multiplexing-Mode parameter may be (set to) enabled. This may be shown by the direction "YES" at step 2120 in FIG. 21A and at step 2121 in FIG. 21B. As indicated at step 2130 in FIG. 21A, the wireless device may send (e.g., transmit) the CSI report in the repetitions of the PUSCH transmission (e.g., the first repetition of the PUSCH transmission and the second repetition of the PUSCH transmission), for example, based on the one or more configuration parameters comprising the CSI-Multiplexing-Mode parameter (or comprising the CSI-Multiplexing-Mode parameter that is enabled). As indicated at step 2131 in FIG. 21B, the base station may receive the CSI report in the repetitions of the PUSCH transmission (e.g., the first repetition of the PUSCH transmission and the second repetition of the PUSCH transmission), for example, based on the one or more configuration parameters comprising the CSI-Multiplexing-Mode parameter (or comprising the CSI-Multiplexing-Mode parameter that is enabled).

In FIG. 21A and FIG. 21B, the one or more configuration parameters may, for example, comprise a CSI-Multiplexing-FDM-Mode parameter. The CSI-Multiplexing-FDM-Mode parameter may be, for example, different from the CSI-Multiplexing-Mode parameter. The CSI-Multiplexing-FDM-Mode parameter may be (set to) enabled. This may be shown by the direction "YES" at step 2120 in FIG. 21A and at step 2121 in FIG. 21B. As indicated at step 2130 in FIG. 21A, the wireless device may send (e.g., transmit) the CSI report in the repetitions of the PUSCH transmission (e.g., the first repetition of the PUSCH transmission and the second repetition of the PUSCH transmission), for example, based on the one or more configuration parameters comprising the CSI-Multiplexing-FDM-Mode parameter (or comprising the CSI-Multiplexing-FDM-Mode parameter that is enabled). As indicated at step 2131 in FIG. 21B, the base station may receive the CSI report in the repetitions of the PUSCH transmission (e.g., the first repetition of the PUSCH transmission and the second repetition of the PUSCH transmission), for example, based on the one or more configuration parameters comprising the CSI-Multiplexing-FDM-Mode parameter (or comprising the CSI-Multiplexing-FDM-Mode parameter that is enabled).

In FIG. 21A and FIG. 21B, the one or more configuration parameters may, for example, not comprise a CSI-Multiplexing-Mode parameter. The one or more configuration parameters may, for example, not comprise a CSI-Multiplexing-Mode parameter that is enabled. This may be shown by the direction "NO" at step 2120 in FIG. 21A and at step 2121 in FIG. 21B.

In FIG. 21A and FIG. 21B, the one or more configuration parameters may, for example, not comprise a CSI-Multiplexing-FDM-Mode parameter. The one or more configuration parameters may, for example, not comprise a CSI-Multiplexing-FDM-Mode parameter that is enabled. This may be shown by the direction "NO" at step 2120 in FIG. 21A and at step 2121 in FIG. 21B.

As shown at step 2140 in FIG. 21A and at step 2141 in FIG. 21B, the wireless device may send (e.g., transmit) the CSI report in a repetition (or a transmission occasion) of the PUSCH transmission among the repetitions of the PUSCH transmission. The base station may receive the CSI report in the repetition (or the transmission occasion) of the PUSCH transmission among the repetitions of the PUSCH transmission. The repetition of the PUSCH transmission may be a single repetition of the PUSCH transmission. The repetition of the PUSCH transmission may be a default/reference repetition of the PUSCH transmission.

The wireless device may send (e.g., transmit) the CSI report in the repetition of the PUSCH, for example, based on the one or more configuration parameters not comprising the CSI-Multiplexing-Mode parameter (or not comprising the CSI-Multiplexing-Mode parameter that is enabled). The base station may receive the CSI report in the repetition of the PUSCH, for example, based on the one or more configuration parameters not comprising the CSI-Multiplexing-Mode parameter (or not comprising the CSI-Multiplexing-Mode parameter that is enabled).

The wireless device may send (e.g., transmit) the CSI report in the repetition of the PUSCH, for example, based on the one or more configuration parameters not comprising the CSI-Multiplexing-FDM-Mode parameter (or not comprising the CSI-Multiplexing-FDM-Mode parameter that is enabled). The base station may receive the CSI report in the repetition of the PUSCH, for example, based on the one or more configuration parameters not comprising the CSI-Multiplexing-FDM-Mode parameter (or not comprising the CSI-Multiplexing-FDM-Mode parameter that is enabled).

The wireless device may determine, for transmission/multiplexing of the CSI report, the repetition (or the transmission occasion) of the PUSCH transmission among the repetitions of the PUSCH transmission, for example, based on one or more criteria discussed in FIG. 19 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like). The wireless device may send (e.g., transmit) the CSI report in the repetition (or the transmission occasion) of the PUSCH transmission among the repetitions of the PUSCH transmission, for example, based on the one or more criteria discussed in FIG. 19.

The base station may determine, for transmission/multiplexing of the CSI report, the repetition (or the transmission occasion) of the PUSCH transmission among the repetitions of the PUSCH transmission, for example, based on one or more criteria discussed in FIG. 19 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like). The base station may receive the CSI report in the repetition (or the transmission occasion) of the PUSCH transmission among the repetitions of the PUSCH transmission, for example, based on the one or more criteria discussed in FIG. 19.

The wireless device may send (e.g., transmit) the repetitions of the PUSCH transmission in a plurality of transmission occasions. The wireless device may send (e.g., transmit) each repetition of the repetitions of the PUSCH transmission in a respective transmission occasion of the plurality of transmission occasions.

Sending (e.g., transmitting) the CSI report in a repetition of the PUSCH transmission may comprise sending (e.g., transmitting) the CSI report on/in a transmission occasion of the plurality of transmission occasions. The repetitions of the PUSCH transmission may comprise the repetition of the PUSCH transmission. The wireless device may send (e.g., transmit), in/on the transmission occasion, the repetition of the PUSCH transmission.

The examples discussed in FIG. 17-FIGS. 21A and 21B may also be applicable, for example, if the at least two TCI states is a single TCI state (e.g., the DCI in FIG. 17 indicates activation of a single TCI state, for example, if the TCI field is equal to 000 or 111). The wireless device may send (e.g., transmit) the repetitions of the PUSCH transmission based on the single TCI state (e.g., TCI state 4 if the TCI field is equal to 000 or TCI state 42 if the TCI field is equal to 111 in FIG. 17).

A wireless device may receive DCI, for example, from a base station. The DCI (e.g., a field in the DCI) may schedule/trigger repetitions of a PUSCH transmission. The wireless device may send (e.g., transmit) repetition(s) of the repetitions of the PUSCH transmission to at least one TRP. For example, the wireless device may send (e.g., transmit) first repetition(s) of the repetitions of the PUSCH transmission to a first TRP. The wireless device may send (e.g., transmit) second repetition(s) of the repetitions of the PUSCH transmission to a second TRP. At least two repetitions of the repetitions of the PUSCH transmission may overlap in time with a PUCCH transmission with/carrying an UCI (e.g., HARQ-ACK, SR, CSI report, and/or the like). The repetitions of the PUSCH transmission may be, for example, in a time domain. The repetitions of the PUSCH transmission may be time domain repetitions (e.g., PUSCH Type B repetitions).

The wireless device may receive one or more messages comprising one or more configuration parameters. In at least some wireless communications, the wireless device may send (e.g., transmit)/multiplex the UCI in a first repetition (or a first transmission occasion) of the PUSCH transmission. The wireless device may send (e.g., transmit), in the first transmission occasion, the first repetition of the PUSCH transmission. The wireless device may not send (e.g., transmit) the UCI in a second repetition (or a second transmission occasion) of the PUSCH transmission. The wireless device may not send (e.g., transmit), in the second transmission occasion, the second repetition of the PUSCH transmission. The at least two repetitions of the PUSCH transmission may comprise the first repetition. The first repetition may be an earliest/starting/first/initial repetition of/among the at least two repetitions of the PUSCH transmission.

The repetitions of the PUSCH transmission may be, for example, in a frequency domain. The repetitions of the PUSCH transmission may be frequency domain repetitions. The at least two repetitions of the PUSCH transmission may start at the same time/symbol, for example, based on the repetitions of the PUSCH transmission being in the frequency domain. A first repetition of the at least two repetitions of the PUSCH transmission may start in a first symbol. A second repetition of the at least two repetitions of the PUSCH transmission may start in a second symbol. The first symbol and the second symbol may be the same, for example, based on the repetitions being in the frequency domain. At least some wireless communications, where the wireless device sends (e.g., transmits)/multiplexes the UCI in the earliest/starting/first/initial repetition of the at least two repetitions of the PUSCH transmission may not be efficient for the frequency domain repetitions, for example, based on the at least two repetitions of the PUSCH transmission starting at the same time/symbol in the frequency domain repetitions. Each repetition of the at least two repetitions of the PUSCH transmission may be the earliest/starting/first/initial repetition of the at least two repetitions of the PUSCH transmission. The base station may not receive/decode the repetition of the PUSCH transmission, for example, if the base station and the wireless device are not aligned on which, and/or whether, repetition of the PUSCH transmission that the wireless device sends (e.g., transmits)/multiplexes the UCI. For example, the wireless device may send (e.g., transmit) the UCI in a first repetition of the at least two repetitions of the PUSCH transmission. The wireless device may not send (e.g., transmit) the UCI in a second repetition of the at least two repetitions of the PUSCH transmission. The base station may not have information on which repetition the wireless device sends (e.g., transmits) the UCI. The base station may decode a/each repetition of the at least two repetitions of the PUSCH transmission under two different assumptions (e.g., (1) the repetition is multiplexed with the UCI, and (2) no UCI is multiplexed in the repetition). This operation of the base station may increase the power consumption at the base station.

Examples described herein may enhance transmission/multiplexing of an UCI for/in frequency domain repetitions by, for example, aligning the base station and the wireless device. The wireless device may send (e.g., transmit) the UCI in a repetition, among the at least two repetitions of the PUSCH transmission that overlap with a PUCCH transmission with the UCI, with a lowest/highest starting/ending frequency/resource block (RB). The wireless device may send (e.g., transmit) the UCI in a repetition, among the at least two repetitions of the PUSCH transmission, sent (e.g., transmitted) with an antenna panel with a lowest/highest antenna panel index/identifier. The wireless device may send (e.g., transmit) the UCI in a repetition, among the at least two repetitions of the PUSCH transmission, sent (e.g., transmitted) based on a TCI state (e.g., transmitting beam) with a lowest TCI state index. The wireless device may send (e.g., transmit) the UCI in a repetition, among the at least two repetitions of the PUSCH transmission, sent (e.g., transmitted) based on a first TCI state (or a first SRS resource set).

The wireless device may send (e.g., transmit)/multiplex the UCI in the at least two repetitions of the PUSCH transmission in the frequency domain. The wireless device may send (e.g., transmit) the UCI in each repetition of the at least two repetitions of the PUSCH transmission in the frequency domain. Sending (e.g., transmitting) the UCI in each repetition of the at least two repetitions of the PUSCH transmission may increase robustness and diversity.

The examples may align the base station and the wireless device on the repetition that the wireless device sends (e.g., transmits)/multiplexes the UCI. This alignment may achieve advantages such as reducing the power consumption at the base station, increasing successful decoding probability of the PUSCH transmission, avoiding cancellation of transmission of UCI, and/or other advantages evident from descriptions herein.

Figure 22:
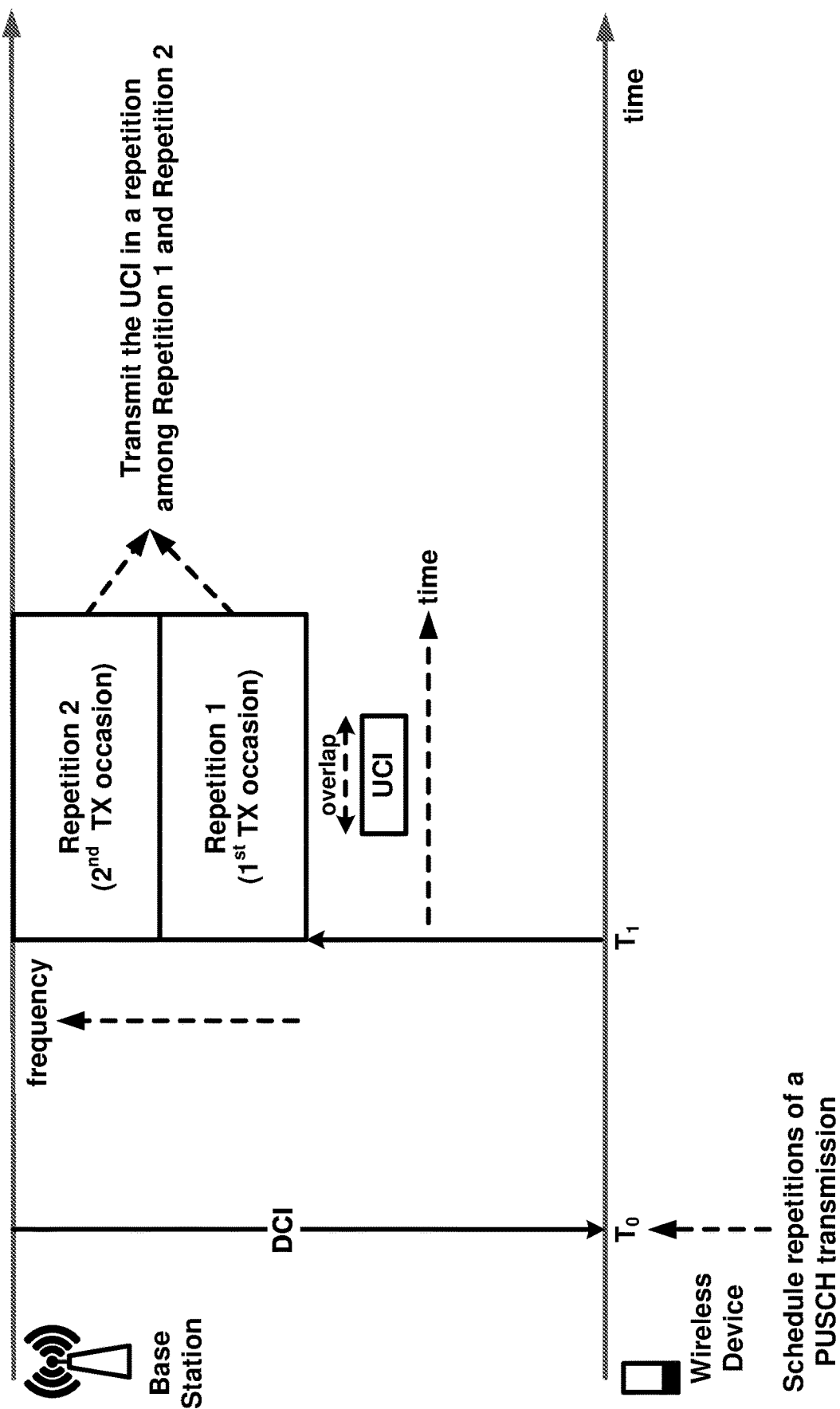
FIG. 22 shows an example of uplink control information multiplexing.

FIG. 22 shows an example of uplink control information multiplexing. The one or more configuration parameters may indicate at least two SRS resource sets. The at least two SRS resource sets may comprise a first SRS resource set and a second SRS resource set. The one or more configuration parameters may comprise, for each SRS resource set of the at least two SRS resource sets, a respective usage parameter.

The usage parameter may be set to codebook. The usage parameter of each SRS resource set of the at least two SRS resource sets may be set to codebook. The one or more configuration parameters may indicate codebook, for example, for each SRS resource set of the at least two SRS resource sets. The one or more configuration parameters may indicate, for the first SRS resource set, codebook (or a usage parameter set to codebook). The one or more configuration parameters may indicate, for the second SRS resource set, codebook (or a usage parameter set to codebook).

The usage parameter may be set to non-codebook. The usage parameter of each SRS resource set of the at least two SRS resource sets may be set to non-codebook. The one or more configuration parameters may indicate non-codebook, for example, for each SRS resource set of the at least two SRS resource sets. The one or more configuration parameters may indicate, for the first SRS resource set, non-codebook (or a usage parameter set to non-codebook). The one or more configuration parameters may indicate, for the second SRS resource set, non-codebook (or a usage parameter set to non-codebook).

The one or more configuration parameters may indicate, for the at least two SRS resource sets, at least two SRS resource set indexes. The one or more configuration parameters may indicate, for each SRS resource set of the at least two SRS resource sets, a respective SRS resource set index of the at least two SRS resource set indexes. Each SRS resource set of the at least two SRS resource sets may be identified/indicated by a respective SRS resource set index of the at least two SRS resource set indexes. The first SRS resource set of the at least two SRS resource sets may be identified/indicated by a first SRS resource set index of the at least two SRS resource set indexes. The second SRS resource set of the at least two SRS resource sets may be identified/indicated by a second SRS resource set index of the at least two SRS resource set indexes. The first SRS resource set index of the first SRS resource set may be lower than the second SRS resource set index of the second SRS resource set.

The wireless device may receive DCI (e.g., at time T0 in FIG. 22). The DCI may be, for example, DCI format 0_1. The DCI may be, for example, DCI format 0_2. The DCI may be, for example, DCI format 0_x, x=0, 1, 2, 3, . . . . The DCI (e.g., at time T0 in FIG. 22) may be, for example, the same as the DCI indicating activation of the at least two TCI states (e.g., at time T2 in FIG. 17). The DCI (e.g., at time T0 in FIG. 22) may be, for example, different from the DCI indicating activation of the at least two TCI states (e.g., at time T2 in FIG. 17).

The DCI may comprise a field (e.g., SRS resource set indicator, TCI field, Unified TCI state(s) field, TRP indicator field(s), and/or the like). The field may indicate, for example, a multi-TRP uplink repetition (e.g., multi-TRP PUSCH repetition, multi-TRP PUCCH repetition). A value of the field may indicate the multi-TRP uplink repetition. A value of the field may indicate the multi-TRP PUSCH repetition. A value of the field may indicate the multi-TRP PUCCH repetition. A size/length of the field may be, for example, two bits. For example, the value of the field (e.g., SRS resource set indicator) may be equal to '10'. For example, the value of the field (e.g., SRS resource set indicator) may be equal to '11'. A size/length of the field may be, for example, one bit. For example, the value of the field (e.g., SRS resource set indicator) may be equal to '1'.

The DCI may schedule repetitions of a PUSCH transmission. The wireless device may send (e.g., transmit) the repetitions of the PUSCH transmission in a plurality of transmission occasions. The wireless device may send (e.g., transmit) each repetition of the repetitions of the PUSCH transmission in a respective transmission occasion of the plurality of transmission occasions.

The wireless device may send (e.g., transmit) a first repetition of the repetitions of the PUSCH transmission in a first transmission occasion of the plurality of transmission occasions. The wireless device may send (e.g., transmit) a second repetition of the repetitions of the PUSCH transmission in a second transmission occasion of the plurality of transmission occasions.

The repetitions of the PUSCH transmission may be associated with the at least two SRS resource sets. One or more first repetitions of the repetitions of the PUSCH transmission may be associated with the first SRS resource set of the at least two SRS resource sets. One or more second repetitions of the repetitions of the PUSCH transmission may be associated with the second SRS resource set of the at least two SRS resource sets. The repetitions of the PUSCH transmission may be associated with the at least two SRS resource sets, for example, based on the value of the field (e.g., SRS resource set indicator) being equal to '10'. The repetitions of the PUSCH transmission may be associated with the at least two SRS resource sets, for example, based on the value of the field (e.g., SRS resource set indicator) being equal to '11'. The repetitions of the PUSCH transmission may be associated with the at least two SRS resource sets, for example, based on the value of the field (e.g., SRS resource set indicator) indicating the multi-TRP uplink repetition.

At least two repetitions of the PUSCH transmission may overlap in time (e.g., overlap in FIG. 22) with a PUCCH transmission (e.g., UCI in FIG. 22). The at least two repetitions of the PUSCH transmission may overlap, for example, in at least one symbol (e.g., OFDM symbol) with the PUCCH transmission. The at least two repetitions of the PUSCH transmission may overlap, for example, in at least one time slot with the PUCCH transmission. The repetitions of the PUSCH transmission may comprise the at least two repetitions of the PUSCH transmission.

The PUCCH transmission may comprise/carry (or be with) uplink control information (UCI). The UCI may comprise, for example, a HARQ-ACK. The UCI may comprise, for example, a CSI report (or CSI information). The UCI may comprise, for example, an SR.

The PUCCH transmission may be over/in a time slot (e.g., a single time slot). The one or more configuration parameters may indicate the time slot for transmission of the PUCCH transmission. The wireless device may receive DCI triggering the PUCCH transmission over the time slot. The time slot may be, for example, a single/one time slot.

The at least two repetitions of the PUSCH transmission overlapping in time with the PUCCH transmission may comprise, for example, the at least two repetitions of the PUSCH transmission overlapping in time with a configured transmission of the PUCCH transmission. The one or more configuration parameters may indicate the configured transmission of the PUCCH transmission. The at least two repetitions of the PUSCH transmission overlapping in time with the PUCCH transmission may comprise, for example, the at least two repetitions of the PUSCH transmission overlapping in time with a scheduled transmission of the PUCCH transmission. The DCI triggering the PUCCH transmission may indicate the scheduled transmission of the PUCCH transmission. For example, the wireless device may determine in advance (e.g., before the time slot of the PUCCH transmission) that the at least two repetitions of the PUSCH transmission overlap in time with the PUCCH transmission. The PUCCH transmission may be configured/scheduled to be sent (e.g., transmitted) in/via a PUCCH resource. The (active) uplink BWP of the cell may comprise the PUCCH resource.

The one or more configuration parameters may comprise an UCI-Multiplexing-Mode parameter. The UCI-Multiplexing-Mode parameter may be (set to) enabled. The one or more configuration parameters may comprise/indicate, for the cell, the UCI-Multiplexing-Mode parameter. The one or more configuration parameters may comprise/indicate, for the uplink BWP of the cell, the UCI-Multiplexing-Mode parameter. The one or more configuration parameters may comprise/indicate, for the PUCCH resource of the uplink BWP of the cell, the UCI-Multiplexing-Mode parameter.

The UCI-Multiplexing-Mode parameter may indicate whether sending (e.g., transmitting)/multiplexing an UCI on/in/with/via at least two repetitions of a PUSCH transmission is enabled or not. The at least two repetitions of the PUSCH transmission may be, for example, in a frequency domain (e.g., FDM in FIG. 18). The UCI-Multiplexing-Mode parameter may be used/applicable for frequency domain repetitions (e.g., FDM in FIG. 18). The at least two repetitions of the PUSCH transmission may be associated with the at least two SRS resource sets. A first repetition of the at least two repetitions of the PUSCH transmission may be associated with the first SRS resource set of the at least two SRS resource sets. A second repetition of the at least two repetitions of the PUSCH transmission may be associated with the second SRS resource set of the at least two SRS resource sets. The UCI-Multiplexing-Mode parameter may be, for example, an HARQ-ACK-MultiplexingMode parameter. The UCI-Multiplexing-Mode parameter may be, for example, a CSI-MultiplexingMode parameter. The UCI-Multiplexing-Mode parameter may be, for example, an SR parameter.

The wireless device may send (e.g., transmit) a message (e.g., UE capability message), for example, to a base station. The message (e.g., UE capability message) may indicate, for example, support of sending (e.g., transmitting)/multiplexing an UCI in/on at least two repetitions of a PUSCH transmission. The UE capability message may indicate, for example, support of sending (e.g., transmitting)/multiplexing the UCI in/on at least two transmission occasions of the at least two repetitions of the PUSCH transmission. The UE capability message may indicate, for example, support of multiplexing an UCI in/on at least two repetitions of a PUSCH transmission. The one or more configuration parameters may comprise the UCI-Multiplexing-Mode parameter (or the UCI-Multiplexing-Mode parameter set to enabled), for example, based on the UE capability message indicating support of sending (e.g., transmitting)/multiplexing an UCI in/on at least two repetitions (or at least two transmission occasions) of a PUSCH transmission.

The one or more configuration parameters may not comprise an UCI-Multiplexing-Mode parameter. The one or more configuration parameters may not comprise the UCI-Multiplexing-Mode parameter set to enabled.

The wireless device may send (e.g., transmit) a message (e.g., UE capability message), for example, to the base station. The message (e.g., UE capability message) may not indicate, for example, support of sending (e.g., transmitting)/multiplexing an UCI in/on at least two repetitions of a PUSCH transmission. The UE capability message may not indicate, for example, support of sending (e.g., transmitting) the UCI in/on at least two transmission occasions of the at least two repetitions of the PUSCH transmission. The UE capability message may not indicate, for example, support of multiplexing an UCI in/on at least two repetitions of a PUSCH transmission. The one or more configuration parameters may not comprise the UCI-Multiplexing-Mode parameter (or the UCI-Multiplexing-Mode parameter set to enabled), for example, based on the UE capability message not indicating support of sending (e.g., transmitting)/multiplexing an UCI in/on at least two repetitions (or at least two transmission occasions) of a PUSCH transmission.

The one or more configuration parameters may indicate a repetition scheme. The repetition scheme may be (or set to) a frequency domain repetition (or frequency-domain-multiplexing (FDM) repetition). The repetitions of the PUSCH transmission may be in a frequency domain. The repetitions of the PUSCH transmission may be in the frequency domain, for example, based on the one or more configuration parameters indicating the repetition scheme that is (set to) the frequency domain repetition.

The at least two repetitions of the PUSCH transmission that overlap with the PUCCH transmission may comprise a first repetition of the PUSCH transmission (e.g., Repetition 1 in FIG. 22) and a second repetition of the PUSCH transmission (Repetition 2 in FIG. 22). The first repetition of the PUSCH transmission may overlap in time with the PUCCH transmission. The second repetition of the PUSCH transmission may overlap in time with the PUCCH transmission.

The first repetition and the second repetition may overlap in time (e.g., in at least one symbol, fully in time, partially in time). A starting symbol of the first repetition and a starting symbol of the second repetition may be, for example, the same. An ending symbol of the first repetition and an ending symbol of the second repetition may be, for example, the same. The first repetition and the second repetition may not overlap in frequency. The first repetition and the second repetition may be in different frequencies (or different RBs or different PRBs). The first repetition and the second repetition may not overlap in at least one RB (or PRB).

The first repetition of the PUSCH transmission may comprise a plurality of symbols (e.g., more than one symbol). The second repetition of the PUSCH transmission may comprise a plurality of symbols (e.g., more than one symbol).

The one or more first repetitions of the PUSCH transmission may comprise the first repetition (e.g., Repetition 1 in FIG. 22). The first repetition may be associated with the first SRS resource set of the at least two SRS resource sets. The wireless device may send (e.g., transmit) the first repetition of the PUSCH transmission, for example, based on the first SRS resource set. The wireless device may send (e.g., transmit) the first repetition of the PUSCH transmission, for example, based on a first SRS resource in the first SRS resource set. The one or more configuration parameters may indicate, for the first SRS resource, a first number of SRS ports (e.g., nrofSRS-Ports). The wireless device may send (e.g., transmit) the first repetition of the PUSCH transmission, for example, based on the first number of SRS ports of the first SRS resource in the first SRS resource set. For example, the wireless device may send (e.g., transmit) the first repetition with a first transmission precoder that is determined based on the first number of SRS ports.

The one or more second repetitions of the PUSCH transmission may comprise the second repetition (e.g., Repetition 2 in FIG. 22). The second repetition may be associated with the second SRS resource set of the at least two SRS resource sets. The wireless device may send (e.g., transmit) the second repetition of the PUSCH transmission, for example, based on the second SRS resource set. The wireless device may send (e.g., transmit) the second repetition of the PUSCH transmission, for example, based on a second SRS resource in the second SRS resource set. The one or more configuration parameters may indicate, for the second SRS resource, a second number of SRS ports (e.g., nrofSRS-Ports). The wireless device may send (e.g., transmit) the second repetition of the PUSCH transmission, for example, based on the second number of SRS ports of the second SRS resource in the second SRS resource set. For example, the wireless device may send (e.g., transmit) the second repetition with a second transmission precoder that is determined based on the second number of SRS ports.

The wireless device may send (e.g., transmit) the first repetition (e.g., Repetition 1 in FIG. 22) of the repetitions of the PUSCH transmission in a first transmission occasion (e.g., first TX occasion in FIG. 22) of the plurality of transmission occasions (e.g., at time T1 in FIG. 22). The wireless device may send (e.g., transmit) a second repetition (e.g., Repetition 2 in FIG. 22) of the repetitions of the PUSCH transmission in a second transmission occasion (e.g., second TX occasion in FIG. 22) of the plurality of transmission occasions (e.g., at time T1 in FIG. 22).

The first repetition of the PUSCH transmission overlapping in time with the PUCCH transmission may comprise the first transmission occasion, that the wireless device sends (e.g., transmits) the first repetition, overlapping in time with the PUCCH transmission. The second repetition of the PUSCH transmission overlapping in time with the PUCCH transmission may comprise the second transmission occasion, that the wireless device sends (e.g., transmits) the second repetition, overlapping in time with the PUCCH transmission.

The wireless device may send (e.g., transmit) the first repetition of the PUSCH transmission based on the first TCI state (e.g., the TCI state 26 in FIG. 17) of the at least two TCI states. The wireless device may send (e.g., transmit) the first repetition of the PUSCH transmission with a first spatial domain transmission filter/beam that is determined based on a first reference signal indicated by the first TCI state. The first spatial domain transmitting/transmission filter/beam may be, for example, same as (or substantially same as, x degrees apart, x=0, 1, 5, 10, and/or the like) a spatial domain reception/receiving filter/beam used to receive the first reference signal. The first spatial domain transmitting/transmission filter/beam may be, for example, same as (or substantially same as, x degrees apart, x=0, 1, 5, 10, and/or the like) a spatial domain transmission/transmitting filter/beam used to send (e.g., transmit) the first reference signal.

The wireless device may send (e.g., transmit) the first repetition of the PUSCH transmission with a first transmission power that is determined based on one or more first power control parameters (e.g., target received power, closed-loop index, pathloss compensation factor, alpha, pathloss reference signal, and/or the like) indicated by (or included in or associated with or mapped to) the first TCI state. The one or more configuration parameters may indicate, for the first TCI state, the one or more first power control parameters.

The wireless device may send (e.g., transmit) the second repetition of the PUSCH transmission based on the second TCI state (e.g., the TCI state 61 in FIG. 17) of the at least two TCI states. The wireless device may send (e.g., transmit) the second repetition of the PUSCH transmission with a second spatial domain transmission filter/beam that is determined based on a second reference signal indicated by the second TCI state. The second spatial domain transmitting/transmission filter/beam may be, for example, same as (or substantially same as, x degrees apart, x=0, 1, 5, 10, and/or the like) a spatial domain reception/receiving filter/beam used to receive the second reference signal. The second spatial domain transmitting/transmission filter/beam may be, for example, same as (or substantially same as, x degrees apart, x=0, 1, 5, 10, and/or the like) a spatial domain transmission/transmitting filter/beam used to send (e.g., transmit) the second reference signal.

The wireless device may send (e.g., transmit) the second repetition of the PUSCH transmission with a second transmission power that is determined based on one or more second power control parameters (e.g., target received power, closed-loop index, pathloss compensation factor, alpha, pathloss reference signal, and/or the like) indicated by (or included in or associated with or mapped to) the second TCI state. The one or more configuration parameters may indicate, for the second TCI state, the one or more second power control parameters.

The wireless device may be equipped with a plurality of antenna panels. The plurality of antenna panels may comprise a first antenna panel and a second antenna panel. The first antenna panel may be identified/indicated by a first antenna panel index/identifier. The one or more configuration parameters may, for example, indicate the first antenna panel index for the first antenna panel. For example, the wireless device may send (e.g., transmit) an uplink signal (e.g., Beam report, CSI report, UE capability message, PUCCH transmission) indicating the first antenna panel index for the first antenna panel. The second antenna panel may be identified/indicated by a second antenna panel index/identifier. The one or more configuration parameters may, for example, indicate the second antenna panel index for the second antenna panel. For example, the wireless device may send (e.g., transmit) an uplink signal (e.g., Beam report, CSI report, UE capability message, PUCCH transmission) indicating the second antenna panel index for the second antenna panel.

The wireless device may send (e.g., transmit) the first repetition of the PUSCH transmission with the first antenna panel. The first repetition of the PUSCH transmission may be associated with the first antenna panel, for example, based on sending (e.g., transmitting) the first repetition of the PUSCH transmission with the first antenna panel. The wireless device may send (e.g., transmit) the second repetition of the PUSCH transmission with the second antenna panel. The second repetition of the PUSCH transmission may be associated with the second antenna panel, for example, based on sending (e.g., transmitting) the second repetition of the PUSCH transmission with the second antenna panel.

The UE capability message may comprise/indicate a list of capability value sets (or a list of UE capability value sets or a list of capability value sets of the wireless device). Each capability value set of the list of capability value sets may comprise/indicate a respective maximum number of SRS ports. For example, a first capability value set of the list of capability value sets may comprise/indicate a first maximum number of SRS ports. A second capability value set of the list of capability value sets may comprise/indicate a second maximum number of SRS ports.

Each capability value set of the list of capability value sets may be identified/indicated by a respective capability value set index. For example, the first capability value set may be identified/indicated by a first capability value set index. The second capability value set may be identified/indicated by a second capability value set index.

The wireless device may send (e.g., transmit) a report (e.g., beam reporting, CSI reporting, L1-RSRP reporting, SINR reporting), for example, to a base station. The wireless device may send (e.g., transmit) the report via PUCCH. The report may indicate an association/mapping/correspondence between the first reference signal indicated by the first TCI state and the first capability value set. The report may comprise a first reference signal index (e.g., CSI-RS and/or SSB resource index) of the first reference signal and the first capability value set index of the first capability value set. The wireless device may determine the association/mapping/correspondence between the first reference signal and the first capability value set. The one or more configuration parameters may indicate, for the first reference signal, the first reference signal index. The first TCI state may be associated with the first capability value set, for example, based on the association/mapping/correspondence between the first reference signal indicated by the first TCI state and the first capability value set. The first repetition of the PUSCH transmission may be associated with the first capability value set, for example, based on (e.g., in response to) sending (e.g., transmitting) the first repetition based on the first TCI state associated with the first capability value set.

The report may indicate an association/mapping/correspondence between the second reference signal indicated by the second TCI state and the second capability value set. The report may comprise a second reference signal index (e.g., CSI-RS and/or SSB resource index) of the second reference signal and the second capability value set index of the second capability value set. The wireless device may determine the association/mapping/correspondence between the second reference signal and the second capability value set. The one or more configuration parameters may indicate, for the second reference signal, the second reference signal index. The second TCI state may be associated with the second capability value set, for example, based on the association/mapping/correspondence between the second reference signal indicated by the second TCI state and the second capability value set. The second repetition of the PUSCH transmission may be associated with the second capability value set, for example, based on (e.g., in response to) sending (e.g., transmitting) the second repetition based on the second TCI state associated with the second capability value set.

The wireless device may receive, for example, from the base station, an acknowledgement for the report. The acknowledgement may be, for example, DCI. The wireless device may send (e.g., transmit) the UCI in the first repetition (e.g., Repetition 1 in FIG. 22) of the PUSCH transmission and the second repetition (e.g., Repetition 2 in FIG. 22) of the PUSCH transmission (e.g., at time T1 in FIG. 22). The wireless device may send (e.g., transmit) the UCI in the first transmission occasion (e.g., first TX occasion in FIG. 22) and the second transmission occasion (e.g., second TX occasion in FIG. 22).

The wireless device may multiplex the UCI in/on/with the first repetition of the PUSCH transmission and the second repetition of the PUSCH transmission. The wireless device may send (e.g., transmit) the UCI in the first repetition of the PUSCH transmission and the second repetition of the PUSCH transmission, for example, based on the multiplexing the UCI in the first repetition of the PUSCH transmission and the second repetition of the PUSCH transmission. The wireless device may send (e.g., transmit) the UCI in the first transmission occasion (that the first repetition of the PUSCH transmission is sent (e.g., transmitted)) and the second transmission occasion (that the second repetition of the PUSCH transmission is sent (e.g., transmitted)), for example, based on the multiplexing the UCI in the first repetition of the PUSCH transmission and the second repetition of the PUSCH transmission.

The wireless device may not send (e.g., transmit) the UCI in the PUCCH transmission, for example, based on the multiplexing the UCI in the first repetition of the PUSCH transmission and the second repetition of the PUSCH transmission. The wireless device may drop the PUCCH transmission via the PUCCH resource. The wireless device may not send (e.g., transmit) the UCI in the PUCCH transmission, for example, based on the sending (e.g., transmitting) the UCI in the first repetition (or the first transmission occasion) of the PUSCH transmission and the second repetition (or the second transmission occasion) of the PUSCH transmission.

The wireless device may send (e.g., transmit) the UCI in the first transmission occasion (or in the first repetition of the PUSCH transmission) and the second transmission occasion (or in the second repetition of the PUSCH transmission), for example, based on the first repetition of the PUSCH transmission comprising a plurality of symbols (e.g., more than one symbol). The wireless device may send (e.g., transmit) the UCI in the first transmission occasion (or in the first repetition of the PUSCH transmission) and the second transmission occasion (or in the second repetition of the PUSCH transmission), for example, based on the second repetition of the PUSCH transmission comprising a plurality of symbols (e.g., more than one symbol).

The wireless device may send (e.g., transmit) the UCI in the first transmission occasion (or in the first repetition of the PUSCH transmission) and the second transmission occasion (or in the second repetition of the PUSCH transmission), for example, based on the one or more configuration parameters indicating the at least two SRS resource sets. The wireless device may multiplex the UCI in the first repetition of the PUSCH transmission and the second repetition of the PUSCH transmission, for example, based on the one or more configuration parameters indicating the at least two SRS resource sets.

The wireless device may send (e.g., transmit) the UCI in the first transmission occasion (or in the first repetition of the PUSCH transmission) and the second transmission occasion (or in the second repetition of the PUSCH transmission), for example, based on the field (or the value of the field) indicating the multi-TRP uplink repetition. The wireless device may send (e.g., transmit) the UCI in the first transmission occasion (or in the first repetition of the PUSCH transmission) and the second transmission occasion (or in the second repetition of the PUSCH transmission), for example, based on the value of the field being equal to '10' or '11' or '1'. The wireless device may send (e.g., transmit) the UCI in the first transmission occasion (or in the first repetition of the PUSCH transmission) and the second transmission occasion (or in the second repetition of the PUSCH transmission), for example, based on the repetitions of the PUSCH transmission being associated with the at least two SRS resource sets.

The wireless device may multiplex the UCI in the first repetition of the PUSCH transmission and the second repetition of the PUSCH transmission, for example, based on the field (or the value of the field) indicating the multi-TRP uplink repetition. The wireless device may multiplex the UCI in the first repetition of the PUSCH transmission and the second repetition of the PUSCH transmission, for example, based on the value of the field being equal to '10' or '11' or '1' (or any other value). The wireless device may multiplex the UCI in the first repetition of the PUSCH transmission and the second repetition of the PUSCH transmission, for example, based on the repetitions of the PUSCH transmission being associated with the at least two SRS resource sets.

The wireless device may send (e.g., transmit) the UCI in the first transmission occasion (or in the first repetition of the PUSCH transmission) and the second transmission occasion (or in the second repetition of the PUSCH transmission), for example, based on the one or more configuration parameters comprising the UCI-Multiplexing-Mode parameter. The wireless device may send (e.g., transmit) the UCI in the first transmission occasion (or in the first repetition of the PUSCH transmission) and the second transmission occasion (or in the second repetition of the PUSCH transmission), for example, based on the one or more configuration parameters comprising the UCI-Multiplexing-Mode parameter set to enabled.

The wireless device may multiplex the UCI in the first repetition of the PUSCH transmission and the second repetition of the PUSCH transmission, for example, based on the one or more configuration parameters comprising the UCI-Multiplexing-Mode parameter. The wireless device may multiplex the UCI in the first repetition of the PUSCH transmission and the second repetition of the PUSCH transmission, for example, based on the one or more configuration parameters comprising the UCI-Multiplexing-Mode parameter set to enabled.

The wireless device may send (e.g., transmit) the UCI in the first transmission occasion (or in the first repetition of the PUSCH transmission) and the second transmission occasion (or in the second repetition of the PUSCH transmission), for example, based on the PUSCH transmission not comprising/carrying a second UCI that is different (or has a different UCI type) from the UCI. The wireless device may send (e.g., transmit) the UCI in the first transmission occasion (or in the first repetition of the PUSCH transmission) and the second transmission occasion (or in the second repetition of the PUSCH transmission), for example, based on not multiplexing, in the PUSCH transmission, a second UCI that is different from the UCI. The second UCI may comprise, for example, HARQ-ACK. The second UCI may comprise, for example, SR. The second UCI may comprise, for example, CSI report.

The wireless device may multiplex the UCI in the first repetition of the PUSCH transmission and the second repetition of the PUSCH transmission, for example, based on the PUSCH transmission not comprising/carrying a second UCI that is different from the UCI. The wireless device may multiplex the UCI in the first repetition of the PUSCH transmission and the second repetition of the PUSCH transmission, for example, based on not multiplexing, in the PUSCH transmission, a second UCI that is different from the UCI. The second UCI may comprise, for example, HARQ-ACK. The second UCI may comprise, for example, SR. The second UCI may comprise, for example, CSI report.

The wireless device may send (e.g., transmit) the UCI in at least two repetitions (or at least two transmission occasions) of a PUSCH transmission (e.g., the first transmission occasion (or in the first repetition of the PUSCH transmission) and the second transmission occasion (or in the second repetition of the PUSCH transmission)), for example, based on the message (e.g., UE capability message) indicating support of sending (e.g., transmitting)/multiplexing an UCI in/on at least two repetitions (or at least two transmission occasions) of a PUSCH transmission. The wireless device may multiplex the UCI in at least two repetitions (or at least two transmission occasions) of a PUSCH transmission (e.g., the first repetition of the PUSCH transmission and the second repetition of the PUSCH transmission), for example, based on the message (e.g., UE capability message) indicating support of sending (e.g., transmitting)/multiplexing an UCI in/on at least two repetitions (or at least two transmission occasions) of a PUSCH transmission.

The wireless device may send (e.g., transmit) the UCI in at least two transmission occasions (or at least two repetitions) of a PUSCH transmission (e.g., the first transmission occasion (or in the first repetition of the PUSCH transmission) and the second transmission occasion (or in the second repetition of the PUSCH transmission)), for example, based on the one or more configuration parameters indicating the repetition scheme that is (set to) the frequency domain repetition. The wireless device may multiplex the UCI in at least two repetitions of a PUSCH transmission (e.g., the first repetition of the PUSCH transmission and the second repetition of the PUSCH transmission), for example, based on the one or more configuration parameters indicating the repetition scheme that is (set to) the frequency domain repetition.

The wireless device may send (e.g., transmit)/multiplex the UCI in a repetition of the PUSCH transmission among at least two repetitions (e.g., the first repetition of the PUSCH transmission (e.g., Repetition 1 in FIG. 22) and the second repetition of the PUSCH transmission (e.g., Repetition 2 in FIG. 22)). The wireless device may send (e.g., transmit) the UCI in a transmission occasion among at least two transmission occasions (e.g., the first transmission occasion (e.g., first TX occasion in FIG. 22) and the second transmission occasion (e.g., second TX occasion in FIG. 22)). The wireless device may send (e.g., transmit)/multiplex the repetition of the PUSCH transmission in the transmission occasion. The wireless device may not send (e.g., transmit) the UCI in any repetition of the PUSCH transmission, among the at least two repetitions (e.g., first repetition of the PUSCH transmission and the second repetition) of the PUSCH transmission, that is different from the repetition of the PUSCH transmission. The wireless device may not send (e.g., transmit) the UCI in any transmission occasion, among the at least two transmission occasions (e.g., the first transmission occasion and the second transmission occasion), that is different from the transmission occasion.

The wireless device may not send (e.g., transmit) the UCI in the PUCCH transmission, for example, based on the multiplexing the UCI in the repetition of the PUSCH transmission. The wireless device may drop the PUCCH transmission via the PUCCH resource. The wireless device may not send (e.g., transmit) the UCI in the PUCCH transmission, for example, based on the sending (e.g., transmitting) the UCI in the repetition (or the transmission occasion) of the PUSCH transmission.

The wireless device may determine/select, for transmission of the UCI, the repetition of the PUSCH transmission among the at least two repetitions (e.g., the first repetition of the PUSCH transmission and the second repetition of the PUSCH transmission). The wireless device may determine/select, for transmission of the UCI, the transmission occasion among the at least two transmission occasions (e.g., the first transmission occasion and the second transmission occasion).

The repetition of the PUSCH transmission may be, for example, a default repetition of the PUSCH transmission. The repetition of the PUSCH transmission may be, for example, a reference repetition of the PUSCH transmission.

For example, in FIG. 22, the repetition of the PUSCH transmission may be the first repetition of the PUSCH transmission (e.g., Repetition 1 in FIG. 22). The wireless device may send (e.g., transmit)/multiplex the UCI in the first repetition of the PUSCH transmission (e.g., at time T1 in FIG. 22). The wireless device may send (e.g., transmit) the UCI in the first transmission occasion (e.g., first TX occasion in FIG. 22). The wireless device may not send (e.g., transmit)/multiplex the UCI in the second repetition of the PUSCH transmission (e.g., Repetition 2 in FIG. 22). The wireless device may not send (e.g., transmit) the UCI in the second transmission occasion (e.g., second TX occasion in FIG. 22). The wireless device may send (e.g., transmit) the UCI in the first transmission occasion (or in the first repetition of the PUSCH transmission), for example, based on the first repetition of the PUSCH transmission comprising a plurality of symbols (e.g., more than one symbol).

For example, in FIG. 22, the repetition of the PUSCH transmission may be the second repetition of the PUSCH transmission (e.g., Repetition 2 in FIG. 22). The wireless device may send (e.g., transmit)/multiplex the UCI in the second repetition of the PUSCH transmission (e.g., at time T1 in FIG. 22). The wireless device may send (e.g., transmit) the UCI in the second transmission occasion (e.g., second TX occasion in FIG. 22). The wireless device may not send (e.g., transmit)/multiplex the UCI in the first repetition of the PUSCH transmission (e.g., Repetition 1 in FIG. 22). The wireless device may not send (e.g., transmit) the UCI in the first transmission occasion (e.g., first TX occasion in FIG. 22). The wireless device may send (e.g., transmit) the UCI in the second transmission occasion (or in the second repetition of the PUSCH transmission), for example, based on the second repetition of the PUSCH transmission comprising a plurality of symbols (e.g., more than one symbol).

The wireless device may multiplex the UCI in/on/with the repetition of the PUSCH transmission. The wireless device may send (e.g., transmit) the UCI in the repetition of the PUSCH transmission, for example, based on the multiplexing the UCI in the repetition of the PUSCH transmission. The wireless device may send (e.g., transmit) the UCI in the transmission occasion (that the repetition of the PUSCH transmission is sent (e.g., transmitted)), for example, based on the multiplexing the UCI in the repetition of the PUSCH transmission.

The wireless device may send (e.g., transmit) the UCI in the transmission occasion (or in the repetition of the PUSCH transmission), for example, based on the one or more configuration parameters indicating the at least two SRS resource sets. The wireless device may multiplex the UCI in the repetition of the PUSCH transmission, for example, based on the one or more configuration parameters indicating the at least two SRS resource sets.

The wireless device may send (e.g., transmit) the UCI in the transmission occasion (or in the repetition of the PUSCH transmission), for example, based on the one or more configuration parameters not indicating at least two SRS resource sets with codebook (or with a usage parameter set to codebook). The wireless device may send (e.g., transmit) the UCI in the transmission occasion (or in the repetition of the PUSCH transmission), for example, based on the one or more configuration parameters not indicating at least two SRS resource sets with non-codebook (or with a usage parameter set to non-codebook). The wireless device may send (e.g., transmit) the UCI in the transmission occasion (or in the repetition of the PUSCH transmission), for example, based on the one or more configuration parameters indicating an SRS resource set (or a single SRS resource set) with codebook (or with a usage parameter set to codebook). The wireless device may send (e.g., transmit) the UCI in the transmission occasion (or in the repetition of the PUSCH transmission), for example, based on the one or more configuration parameters indicating an SRS resource set (or a single SRS resource set) with non-codebook (or with a usage parameter set to non-codebook).

The wireless device may multiplex the UCI in the repetition of the PUSCH transmission, for example, based on the one or more configuration parameters not indicating at least two SRS resource sets with codebook (or with a usage parameter set to codebook). The wireless device may multiplex the UCI in the repetition of the PUSCH transmission, for example, based on the one or more configuration parameters not indicating at least two SRS resource sets with non-codebook (or with a usage parameter set to non-codebook). The wireless device may multiplex the UCI in the repetition of the PUSCH transmission, for example, based on the one or more configuration parameters indicating an SRS resource set (or a single SRS resource set) with codebook (or with a usage parameter set to codebook). The wireless device may multiplex the UCI in the repetition of the PUSCH transmission, for example, based on the one or more configuration parameters indicating an SRS resource set (or a single SRS resource set) with non-codebook (or with a usage parameter set to non-codebook).

The wireless device may send (e.g., transmit) the UCI in the transmission occasion (or in the repetition of the PUSCH transmission), for example, based on the field (or the value of the field) indicating the multi-TRP uplink repetition. The wireless device may send (e.g., transmit) the UCI in the transmission occasion (or in the repetition of the PUSCH transmission), for example, based on the value of the field being equal to '10' or '11' or '1' (or any other value). The wireless device may send (e.g., transmit) the UCI in the transmission occasion (or in the repetition of the PUSCH transmission), for example, based on the repetitions of the PUSCH transmission being associated with the at least two SRS resource sets.

The wireless device may send (e.g., transmit) the UCI in the transmission occasion (or in the repetition of the PUSCH transmission), for example, based on the field (or the value of the field) indicating a single-TRP uplink repetition/transmission. The wireless device may send (e.g., transmit) the UCI in the transmission occasion (or in the repetition of the PUSCH transmission), for example, based on the value of the field being equal to '00' or '01' or '0'. The wireless device may send (e.g., transmit) the UCI in the transmission occasion (or in the repetition of the PUSCH transmission), for example, based on the repetitions of the PUSCH transmission being associated with an SRS resource set (or a single SRS resource set) with codebook (or with a usage parameter set to codebook). The wireless device may send (e.g., transmit) the UCI in the transmission occasion (or in the repetition of the PUSCH transmission), for example, based on the repetitions of the PUSCH transmission being associated with an SRS resource set (or a single SRS resource set) with non-codebook (or with a usage parameter set to non-codebook).

The wireless device may multiplex the UCI in the repetition of the PUSCH transmission, for example, based on the field (or the value of the field) indicating a single-TRP uplink repetition/transmission. The wireless device may multiplex the UCI in the repetition of the PUSCH transmission, for example, based on the value of the field being equal to '00' or '01' or '0' (or any other value). The wireless device may multiplex the UCI in the repetition of the PUSCH transmission, for example, based on the repetitions of the PUSCH transmission being associated with an SRS resource set (or a single SRS resource set) with codebook (or with a usage parameter set to codebook). The wireless device may multiplex the UCI in the repetition of the PUSCH transmission, for example, based on the repetitions of the PUSCH transmission being associated with an SRS resource set (or a single SRS resource set) with non-codebook (or with a usage parameter set to non-codebook).

The wireless device may send (e.g., transmit) the UCI in the transmission occasion (or in the repetition of the PUSCH transmission), for example, based on the one or more configuration parameters not comprising the UCI-Multiplexing-Mode parameter. The wireless device may send (e.g., transmit) the UCI in the transmission occasion (or in the repetition of the PUSCH transmission), for example, based on the one or more configuration parameters not comprising the UCI-Multiplexing-Mode parameter set to enabled.

The wireless device may multiplex the UCI in the repetition of the PUSCH transmission, for example, based on the one or more configuration parameters not comprising the UCI-Multiplexing-Mode parameter. The wireless device may multiplex the UCI in the repetition of the PUSCH transmission, for example, based on the one or more configuration parameters not comprising the UCI-Multiplexing-Mode parameter set to enabled.

The wireless device may send (e.g., transmit) the UCI in the transmission occasion (or in the repetition of the PUSCH transmission), for example, based on the PUSCH transmission comprising/carrying a second UCI that is different from the UCI. The wireless device may send (e.g., transmit) the UCI in the transmission occasion (or in the repetition of the PUSCH transmission), for example, based on multiplexing, in the PUSCH transmission, a second UCI that is different from the UCI. The second UCI may comprise, for example, HARQ-ACK. The second UCI may comprise, for example, SR. The second UCI may comprise, for example, CSI report.

The wireless device may multiplex the UCI in the repetition of the PUSCH transmission, for example, based on the PUSCH transmission comprising/carrying a second UCI that is different from the UCI. The wireless device may multiplex the UCI in the repetition of the PUSCH transmission, for example, based on multiplexing, in the PUSCH transmission, a second UCI that is different from the UCI. The second UCI may comprise, for example, HARQ-ACK. The second UCI may comprise, for example, SR. The second UCI may comprise, for example, CSI report.

The wireless device may send (e.g., transmit) the UCI in the transmission occasion (or in the repetition of the PUSCH transmission), for example, based on the UE capability message not indicating support of sending (e.g., transmitting)/multiplexing an UCI in/on at least two repetitions (or at least two transmission occasions) of a PUSCH transmission. The wireless device may send (e.g., transmit) the UCI in the transmission occasion (or in the repetition of the PUSCH transmission), for example, based on the UE capability message indicating support of sending (e.g., transmitting)/multiplexing an UCI in/on a single repetition (or a single transmission occasion) of a PUSCH transmission.

The wireless device may multiplex the UCI in the repetition of the PUSCH transmission, for example, based on the UE capability message not indicating support of sending (e.g., transmitting)/multiplexing an UCI in/on at least two repetitions (or at least two transmission occasions) of a PUSCH transmission. The wireless device may multiplex the UCI in the repetition of the PUSCH transmission, for example, based on the UE capability message indicating support of sending (e.g., transmitting)/multiplexing an UCI in/on a single repetition (or a single transmission occasion) of a PUSCH transmission.

The wireless device may send (e.g., transmit) the UCI in the transmission occasion (or in the repetition of the PUSCH transmission), for example, based on the one or more configuration parameters indicating the repetition scheme that is (set to) the frequency domain repetition. The wireless device may multiplex the UCI in the repetition of the PUSCH transmission, for example, based on the one or more configuration parameters indicating the repetition scheme that is (set to) the frequency domain repetition.

The first repetition (or the first transmission occasion) of the PUSCH transmission may start in/from a first RB (or in a first PRB). The second repetition (or the second transmission occasion) of the PUSCH transmission may start in/from a second RB (or in a second PRB).

The repetition (or the transmission occasion) of the PUSCH transmission may be a repetition (e.g., among the first repetition and the second repetition), with a lowest/highest starting frequency/RB among the frequencies/RBs (e.g., the first frequency/RB and the second frequency/RB). A starting frequency/RB of the repetition (or the transmission occasion) of the PUSCH transmission may be lowest/highest among the frequencies/RBs of at least two repetitions (e.g., the first frequency/RB of the first repetition and the second frequency/RB of the second repetition). The wireless device may send (e.g., transmit) the UCI in the transmission occasion (or in the repetition of the PUSCH transmission), for example, based on the starting frequency/RB of the repetition (or the transmission occasion) of the PUSCH transmission being lowest/highest among the first frequency/RB of the first repetition and the second frequency/RB of the second repetition. The wireless device may multiplex the UCI in the repetition of the PUSCH transmission, for example, based on the starting frequency/RB of the repetition (or the transmission occasion) of the PUSCH transmission being lowest/highest among the first frequency/RB of the first repetition and the second frequency/RB of the second repetition. The wireless device may determine/select, for transmission of the UCI, the transmission occasion (or the repetition) of the PUSCH transmission among the first transmission occasion (or the first repetition) of the PUSCH transmission and the second transmission occasion (or the second repetition) of the PUSCH transmission, for example, based on the starting frequency/RB of the repetition (or the transmission occasion) of the PUSCH transmission being lowest/highest among the first frequency/RB of the first repetition and the second frequency/RB of the second repetition. The wireless device may determine/select, for transmission of the UCI, the transmission occasion (or the repetition) of the PUSCH transmission, among the first transmission occasion (or the first repetition) of the PUSCH transmission and the second transmission occasion (or the second repetition) of the PUSCH transmission, with the lowest/highest starting frequency/RB among the first frequency/RB of the first repetition and the second frequency/RB of the second repetition.

For example, the first RB of the first repetition (or the first transmission occasion) of the PUSCH transmission may be lower/higher than the second RB of the second repetition (or the second transmission occasion) of the PUSCH transmission. The repetition of the PUSCH transmission may be the first repetition of the PUSCH transmission, for example, based on the first RB of the first repetition being lower/higher than the second RB of the second repetition. The wireless device may send (e.g., transmit) the UCI in the first transmission occasion (or in the first repetition of the PUSCH transmission), for example, based on the first RB of the first repetition being lower/higher than the second RB of the second repetition. The wireless device may multiplex the UCI in the first repetition of the PUSCH transmission, for example, based on the first RB of the first repetition being lower/higher than the second RB of the second repetition.

For example, the second RB of the second repetition (or the second transmission occasion) of the PUSCH transmission may be lower/higher than the first RB of the first repetition (or the first transmission occasion) of the PUSCH transmission. The repetition of the PUSCH transmission may be the second repetition of the PUSCH transmission, for example, based on the second RB of the second repetition being lower/higher than the first RB of the first repetition. The wireless device may send (e.g., transmit) the UCI in the second transmission occasion (or in the second repetition of the PUSCH transmission), for example, based on the second RB of the second repetition being lower/higher than the first RB of the first repetition. The wireless device may multiplex the UCI in the second repetition of the PUSCH transmission, for example, based on the second RB of the second repetition being lower/higher than the first RB of the first repetition.

The first repetition (or the first transmission occasion) of the PUSCH transmission may end in/from/at a first RB (or in a first PRB). The second repetition (or the second transmission occasion) of the PUSCH transmission may end in/from/at a second RB (or in a second PRB).

The repetition (or the transmission occasion) of the PUSCH transmission may be a repetition (e.g., among the first repetition and the second repetition), with a lowest/highest ending frequency/RB among the frequencies/RBs (e.g., the first frequency/RB and the second frequency/RB). An ending frequency/RB of the repetition (or the transmission occasion) of the PUSCH transmission may be lowest/highest among the frequencies/RBs of at least two repetitions (e.g., the first frequency/RB of the first repetition and the second frequency/RB of the second repetition). The wireless device may send (e.g., transmit) the UCI in the transmission occasion (or in the repetition of the PUSCH transmission), for example, based on the ending frequency/RB of the repetition (or the transmission occasion) of the PUSCH transmission being lowest/highest among the first frequency/RB of the first repetition and the second frequency/RB of the second repetition. The wireless device may multiplex the UCI in the repetition of the PUSCH transmission, for example, based on the ending frequency/RB of the repetition (or the transmission occasion) of the PUSCH transmission being lowest/highest among the first frequency/RB of the first repetition and the second frequency/RB of the second repetition. The wireless device may determine/select, for transmission of the UCI, the transmission occasion (or the repetition) of the PUSCH transmission among the first transmission occasion (or the first repetition) of the PUSCH transmission and the second transmission occasion (or the second repetition) of the PUSCH transmission, for example, based on the ending frequency/RB of the repetition (or the transmission occasion) of the PUSCH transmission being lowest/highest among the first frequency/RB of the first repetition and the second frequency/RB of the second repetition. The wireless device may determine/select, for transmission of the UCI, the transmission occasion (or the repetition) of the PUSCH transmission, among the first transmission occasion (or the first repetition) of the PUSCH transmission and the second transmission occasion (or the second repetition) of the PUSCH transmission, with the lowest/highest ending frequency/RB among the first frequency/RB of the first repetition and the second frequency/RB of the second repetition.

The first RB of the first repetition (or the first transmission occasion) of the PUSCH transmission may be lower/higher than the second RB of the second repetition (or the second transmission occasion) of the PUSCH transmission. The repetition of the PUSCH transmission may be the first repetition of the PUSCH transmission, for example, based on the first RB of the first repetition being lower/higher than the second RB of the second repetition. The wireless device may send (e.g., transmit) the UCI in the first transmission occasion (or in the first repetition of the PUSCH transmission), for example, based on the first RB of the first repetition being lower/higher than the second RB of the second repetition. The wireless device may multiplex the UCI in the first repetition of the PUSCH transmission, for example, based on the first RB of the first repetition being lower/higher than the second RB of the second repetition.

The second RB of the second repetition (or the second transmission occasion) of the PUSCH transmission may be lower/higher than the first RB of the first repetition (or the first transmission occasion) of the PUSCH transmission. The repetition of the PUSCH transmission may be the second repetition of the PUSCH transmission, for example, based on the second RB of the second repetition being lower/higher than the first RB of the first repetition. The wireless device may send (e.g., transmit) the UCI in the second transmission occasion (or in the second repetition of the PUSCH transmission), for example, based on the second RB of the second repetition being lower/higher than the first RB of the first repetition. The wireless device may multiplex the UCI in the second repetition of the PUSCH transmission, for example, based on the second RB of the second repetition being lower/higher than the first RB of the first repetition.

The first repetition of the PUSCH transmission may be associated with the first TCI state (e.g., the TCI state 26 in FIG. 17) of the at least two TCI states. The wireless device may send (e.g., transmit) the first repetition of the PUSCH transmission based on the first TCI state. The first repetition of the PUSCH transmission may be associated with the first TCI state, for example, based on (e.g., in response to) the sending (e.g., transmitting) the first repetition of the PUSCH transmission based on the first TCI state.

The second repetition of the PUSCH transmission may be associated with the second TCI state (e.g., the TCI state 61 in FIG. 17) of the at least two TCI states. The wireless device may send (e.g., transmit) the second repetition of the PUSCH transmission based on the second TCI state. The second repetition of the PUSCH transmission may be associated with the second TCI state, for example, based on (e.g., in response to) the sending (e.g., transmitting) the second repetition of the PUSCH transmission based on the second TCI state.

The repetition of the PUSCH transmission may be a repetition, among at least two repetitions associated with at least two TCI states (e.g., the first repetition associated with the first TCI state and the second repetition associated with the second TCI state), associated with a TCI state with a lowest/highest TCI state index among at least two TCI state indexes (e.g., the first TCI state index of the first TCI state and the second TCI state index of the second TCI state). A TCI state index of a TCI state associated with the repetition (or the transmission occasion) of the PUSCH transmission may be lowest/highest among at least two TCI state indexes (e.g., the first TCI state index of the first TCI state associated with the first repetition and the second TCI state index of the second TCI state associated with the second repetition). The first TCI state and the second TCI state may comprise the TCI state associated with the repetition. The first TCI state index and the second TCI state index may comprise the TCI state index of the TCI state associated with the repetition. The wireless device may send (e.g., transmit) the UCI in the transmission occasion (or in the repetition of the PUSCH transmission), for example, based on the TCI state index of the TCI state associated with the repetition (or the transmission occasion) of the PUSCH transmission being lowest/highest among the at least two TCI state indexes (e.g., the first TCI state index of the first TCI state associated with the first repetition and the second TCI state index of the second TCI state associated with the second repetition). The wireless device may multiplex the UCI in the repetition of the PUSCH transmission, for example, based on the TCI state index of the TCI state associated with the repetition (or the transmission occasion) of the PUSCH transmission being lowest/highest among the at least two TCI state indexes (e.g., the first TCI state index of the first TCI state associated with the first repetition and the second TCI state index of the second TCI state associated with the second repetition). The wireless device may determine/select, for transmission of the UCI, the transmission occasion (or the repetition) of the PUSCH transmission among the at least two transmission occasions (or repetitions) (e.g., the first transmission occasion (or the first repetition) of the PUSCH transmission and the second transmission occasion (or the second repetition) of the PUSCH transmission), for example, based on the TCI state index of the TCI state associated with the repetition (or the transmission occasion) of the PUSCH transmission being lowest/highest among the at least two TCI state indexes (e.g., the first TCI state index of the first TCI state associated with the first repetition and the second TCI state index of the second TCI state associated with the second repetition). The wireless device may determine/select, for transmission of the UCI, the transmission occasion (or the repetition) of the PUSCH transmission, among the first transmission occasion (or the first repetition) of the PUSCH transmission and the second transmission occasion (or the second repetition) of the PUSCH transmission, associated with the TCI state with the lowest/highest TCI state index among the first TCI state index of the first TCI state associated with the first repetition and the second TCI state index of the second TCI state associated with the second repetition.

The first TCI state index of the first TCI state associated with the first repetition (or the first transmission occasion) of the PUSCH transmission may be lower/higher than the second TCI state index of the second TCI state associated with the second repetition (or the second transmission occasion) of the PUSCH transmission. The repetition of the PUSCH transmission may be the first repetition of the PUSCH transmission, for example, based on the first TC state index of the first TC state associated with the first repetition being lower/higher than the second TCI state index of the second TCI state associated with the second repetition. The wireless device may send (e.g., transmit) the UCI in the first transmission occasion (or in the first repetition of the PUSCH transmission), for example, based on the first TCI state index of the first TCI state associated with the first repetition being lower/higher than the second TCI state index of the second TCI state associated with the second repetition. The wireless device may multiplex the UCI in the first repetition of the PUSCH transmission, for example, based on the first TCI state index of the first TCI state associated with the first repetition being lower/higher than the second TCI state index of the second TCI state associated with the second repetition.

The second TCI state index of the second TCI state associated with the second repetition (or the second transmission occasion) of the PUSCH transmission may be lower/higher than the first TCI state index of the first TCI state associated with the first repetition (or the first transmission occasion) of the PUSCH transmission. The repetition of the PUSCH transmission may be the second repetition of the PUSCH transmission, for example, based on the second TCI state index of the second TCI state associated with the second repetition being lower/higher than the first TCI state index of the first TCI state associated with the first repetition. The wireless device may send (e.g., transmit) the UCI in the second transmission occasion (or in the second repetition of the PUSCH transmission), for example, based on the second TCI state index of the second TCI state associated with the second repetition being lower/higher than the first TCI state index of the first TCI state associated with the first repetition. The wireless device may multiplex the UCI in the second repetition of the PUSCH transmission, for example, based on the second TCI state index of the second TCI state associated with the second repetition being lower/higher than the first TCI state index of the first TCI state associated with the first repetition.

The repetition of the PUSCH transmission may be a repetition based on a TCI state associated with the repetition being the first/starting/earliest/initial TCI state in the vector/set/list of the at least two TCI states. For example, the repetition of the PUSCH transmission may be the first repetition of the PUSCH transmission, for example, based on the first TCI state associated with the first repetition being the first/starting/earliest/initial TCI state in the vector/set/list of the at least two TCI states. The wireless device may send (e.g., transmit) the UCI in the first transmission occasion (or in the first repetition of the PUSCH transmission), for example, based on the first TCI state associated with the first repetition being the first/starting/earliest/initial TCI state in the vector/set/list of the at least two TCI states. The wireless device may multiplex the UCI in the first repetition of the PUSCH transmission, for example, based on the first TCI state associated with the first repetition being the first/starting/earliest/initial TCI state in the vector/set/list of the at least two TCI states.

The repetition of the PUSCH transmission may be a repetition based on the repetition associated with the first SRS resource set. For example, the repetition of the PUSCH transmission may be the first repetition of the PUSCH transmission, for example, based on the first repetition being associated with the first SRS resource set. The repetition of the PUSCH transmission may be the first repetition of the PUSCH transmission, for example, based on the first repetition being associated with the first SRS resource set with the first SRS resource set index that is lower than the second SRS resource set index of the second SRS resource set. The repetition of the PUSCH transmission may be the first repetition of the PUSCH transmission, for example, based on the first SRS resource set index of the first SRS resource set associated with the first repetition being lower than the second SRS resource set index of the second SRS resource set associated with the second repetition.

The wireless device may send (e.g., transmit) the UCI in the first transmission occasion (or in the first repetition of the PUSCH transmission), for example, based on the first repetition being associated with the first SRS resource set. The wireless device may send (e.g., transmit) the UCI in the first transmission occasion (or in the first repetition of the PUSCH transmission), for example, based on the first repetition being associated with the first SRS resource set with the first SRS resource set index that is lower than the second SRS resource set index of the second SRS resource set. The wireless device may send (e.g., transmit) the UCI in the first transmission occasion (or in the first repetition of the PUSCH transmission), for example, based on the first SRS resource set index of the first SRS resource set associated with the first repetition being lower than the second SRS resource set index of the second SRS resource set associated with the second repetition.

The wireless device may multiplex the UCI in the first repetition of the PUSCH transmission, for example, based on the first repetition being associated with the first SRS resource set. The wireless device may multiplex the UCI in the first repetition of the PUSCH transmission, for example, based on the first repetition being associated with the first SRS resource set with the first SRS resource set index that is lower than the second SRS resource set index of the second SRS resource set. The wireless device may multiplex the UCI in the first repetition of the PUSCH transmission, for example, based on the first SRS resource set index of the first SRS resource set associated with the first repetition being lower than the second SRS resource set index of the second SRS resource set associated with the second repetition.

The first repetition of the PUSCH transmission may be associated with the first antenna panel. The wireless device may send (e.g., transmit) the first repetition of the PUSCH transmission with the first antenna panel. The first repetition of the PUSCH transmission may be associated with the first antenna panel, for example, based on (e.g., in response to) the sending (e.g., transmitting) the first repetition of the PUSCH transmission with the first antenna panel.

The second repetition of the PUSCH transmission may be associated with the second antenna panel. The wireless device may send (e.g., transmit) the second repetition of the PUSCH transmission with the second antenna panel. The second repetition of the PUSCH transmission may be associated with the second antenna panel, for example, based on (e.g., in response to) the sending (e.g., transmitting) the second repetition of the PUSCH transmission with the second antenna panel.

The repetition of the PUSCH transmission may be a repetition (e.g., among the first repetition associated with the first antenna panel and the second repetition associated with the second antenna panel) associated with an antenna panel with a lowest/highest antenna panel index/identifier (e.g., among the first antenna panel index of the first antenna panel and the second antenna panel index of the second antenna panel). An antenna panel index/identifier of an antenna panel associated with the repetition (or the transmission occasion) of the PUSCH transmission may be lowest/highest among the antenna panel indexes/identifiers of the antenna panels associated with at least two repetitions (e.g., the first antenna panel index of the first antenna panel associated with the first repetition and the second antenna panel index of the second antenna panel associated with the second repetition). The first antenna panel and the second antenna panel may comprise the antenna panel associated with the repetition. The first antenna panel index and the second antenna panel index may comprise the antenna panel index of the antenna panel associated with the repetition. The wireless device may send (e.g., transmit) the UCI in the transmission occasion (or in the repetition of the PUSCH transmission), for example, based on the antenna panel index of the antenna panel associated with the repetition (or the transmission occasion) of the PUSCH transmission being lowest/highest among the antenna panel indexes/identifiers of the antenna panels associated with at least two repetitions (e.g., the first antenna panel index of the first antenna panel associated with the first repetition and the second antenna panel index of the second antenna panel associated with the second repetition). The wireless device may multiplex the UCI in the repetition of the PUSCH transmission, for example, based on the antenna panel index of the antenna panel associated with the repetition (or the transmission occasion) of the PUSCH transmission being lowest/highest among the antenna panel indexes/identifiers of the antenna panels associated with at least two repetitions (e.g., the first antenna panel index of the first antenna panel associated with the first repetition and the second antenna panel index of the second antenna panel associated with the second repetition). The wireless device may determine/select, for transmission of the UCI, the transmission occasion (or the repetition) of the PUSCH transmission among the first transmission occasion (or the first repetition) of the PUSCH transmission and the second transmission occasion (or the second repetition) of the PUSCH transmission, for example, based on the antenna panel index of the antenna panel associated with the repetition (or the transmission occasion) of the PUSCH transmission being lowest/highest among the first antenna panel index of the first antenna panel associated with the first repetition and the second antenna panel index of the second antenna panel associated with the second repetition. The wireless device may determine/select, for transmission of the UCI, the transmission occasion (or the repetition) of the PUSCH transmission, among the first transmission occasion (or the first repetition) of the PUSCH transmission and the second transmission occasion (or the second repetition) of the PUSCH transmission, associated with the antenna panel with the lowest/highest antenna panel index among the first antenna panel index of the first antenna panel associated with the first repetition and the second antenna panel index of the second antenna panel associated with the second repetition.

The first antenna panel index of the first antenna panel associated with the first repetition (or the first transmission occasion) of the PUSCH transmission may be lower/higher than the second antenna panel index of the second antenna panel associated with the second repetition (or the second transmission occasion) of the PUSCH transmission. The repetition of the PUSCH transmission may be the first repetition of the PUSCH transmission, for example, based on the first antenna panel index of the first antenna panel associated with the first repetition being lower/higher than the second antenna panel index of the second antenna panel associated with the second repetition. The wireless device may send (e.g., transmit) the UCI in the first transmission occasion (or in the first repetition of the PUSCH transmission), for example, based on the first antenna panel index of the first antenna panel associated with the first repetition being lower/higher than the second antenna panel index of the second antenna panel associated with the second repetition. The wireless device may multiplex the UCI in the first repetition of the PUSCH transmission, for example, based on the first antenna panel index of the first antenna panel associated with the first repetition being lower/higher than the second antenna panel index of the second antenna panel associated with the second repetition.

The second antenna panel index of the second antenna panel associated with the second repetition (or the second transmission occasion) of the PUSCH transmission may be lower/higher than the first antenna panel index of the first antenna panel associated with the first repetition (or the first transmission occasion) of the PUSCH transmission. The repetition of the PUSCH transmission may be the second repetition of the PUSCH transmission, for example, based on the second antenna panel index of the second antenna panel associated with the second repetition being lower/higher than the first antenna panel index of the first antenna panel associated with the first repetition. The wireless device may send (e.g., transmit) the UCI in the second transmission occasion (or in the second repetition of the PUSCH transmission), for example, based on the second antenna panel index of the second antenna panel associated with the second repetition being lower/higher than the first antenna panel index of the first antenna panel associated with the first repetition. The wireless device may multiplex the UCI in the second repetition of the PUSCH transmission, for example, based on the second antenna panel index of the second antenna panel associated with the second repetition being lower/higher than the first antenna panel index of the first antenna panel associated with the first repetition.

The repetition of the PUSCH transmission may be a repetition associated with a capability value set. For example, the first repetition of the PUSCH transmission may be associated with the first capability value set. The wireless device may send (e.g., transmit) the repetition (e.g., the first repetition) of the PUSCH transmission based on the TCI state (e.g., the first TCI state) associated with the capability value set (e.g., the first capability value set). The repetition (e.g., the first repetition) of the PUSCH transmission may be associated with the capability value set (e.g., the first capability value set), for example, based on (e.g., in response to) the sending (e.g., transmitting) the repetition (e.g., the first repetition) of the PUSCH transmission based on the TCI state (e.g., the first TCI state) associated with the capability value set (e.g., the first capability value set).

The second repetition of the PUSCH transmission may be associated with the second capability value set. The wireless device may send (e.g., transmit) the second repetition of the PUSCH transmission based on the second TCI state associated with the second capability value set. The second repetition of the PUSCH transmission may be associated with the second capability value set, for example, based on (e.g., in response to) the sending (e.g., transmitting) the second repetition of the PUSCH transmission based on the second TCI state associated with the second capability value set.

The repetition of the PUSCH transmission may be a repetition, among the repetitions associated with the antenna panels (e.g., the first repetition associated with the first antenna panel and the second repetition associated with the second antenna panel), associated with a capability value set with a lowest/highest capability value set index among the capability value set indexes of the capability value sets (e.g., the first capability value set index of the first capability value set and the second capability value set index of the second capability value set). A capability value set index of a capability value set associated with the repetition (or the transmission occasion) of the PUSCH transmission may be lowest/highest among the capability value set indexes of the capability value sets associated with the repetitions (e.g., the first capability value set index of the first capability value set associated with the first repetition and the second capability value set index of the second capability value set associated with the second repetition). The first capability value set and the second capability value set may comprise the capability value set associated with the repetition. The first capability value set index and the second capability value set index may comprise the capability value set index of the capability value set associated with the repetition. The wireless device may send (e.g., transmit) the UCI in the transmission occasion (or in the repetition of the PUSCH transmission), for example, based on the capability value set index of the capability value set associated with the repetition (or the transmission occasion) of the PUSCH transmission being lowest/highest among the capability value set indexes of the capability value sets associated with the repetitions (e.g., the first capability value set index of the first capability value set associated with the first repetition and the second capability value set index of the second capability value set associated with the second repetition). The wireless device may multiplex the UCI in the repetition of the PUSCH transmission, for example, based on the capability value set index of the capability value set associated with the repetition (or the transmission occasion) of the PUSCH transmission being lowest/highest among the capability value set indexes of the capability value sets associated with the repetitions (e.g., the first capability value set index of the first capability value set associated with the first repetition and the second capability value set index of the second capability value set associated with the second repetition). The wireless device may determine/select, for transmission of the UCI, the transmission occasion (or the repetition) of the PUSCH transmission (e.g., among the first transmission occasion (or the first repetition) of the PUSCH transmission and the second transmission occasion (or the second repetition) of the PUSCH transmission), for example, based on the capability value set index of the capability value set associated with the repetition (or the transmission occasion) of the PUSCH transmission being lowest/highest (e.g., among the first capability value set index of the first capability value set associated with the first repetition and the second capability value set index of the second capability value set associated with the second repetition). The wireless device may determine/select, for transmission of the UCI, the transmission occasion (or the repetition) of the PUSCH transmission, among the first transmission occasion (or the first repetition) of the PUSCH transmission and the second transmission occasion (or the second repetition) of the PUSCH transmission, associated with the capability value set with the lowest/highest capability value set index among the first capability value set index of the first capability value set associated with the first repetition and the second capability value set index of the second capability value set associated with the second repetition.

The first capability value set index of the first capability value set associated with the first repetition (or the first transmission occasion) of the PUSCH transmission may be lower/higher than the second capability value set index of the second capability value set associated with the second repetition (or the second transmission occasion) of the PUSCH transmission. The repetition of the PUSCH transmission may be the first repetition of the PUSCH transmission, for example, based on the first capability value set index of the first capability value set associated with the first repetition being lower/higher than the second capability value set index of the second capability value set associated with the second repetition. The wireless device may send (e.g., transmit) the UCI in the first transmission occasion (or in the first repetition of the PUSCH transmission), for example, based on the first capability value set index of the first capability value set associated with the first repetition being lower/higher than the second capability value set index of the second capability value set associated with the second repetition. The wireless device may multiplex the UCI in the first repetition of the PUSCH transmission, for example, based on the first capability value set index of the first capability value set associated with the first repetition being lower/higher than the second capability value set index of the second capability value set associated with the second repetition.

The second capability value set index of the second capability value set associated with the second repetition (or the second transmission occasion) of the PUSCH transmission may be lower/higher than the first capability value set index of the first capability value set associated with the first repetition (or the first transmission occasion) of the PUSCH transmission. The repetition of the PUSCH transmission may be the second repetition of the PUSCH transmission, for example, based on the second capability value set index of the second capability value set associated with the second repetition being lower/higher than the first capability value set index of the first capability value set associated with the first repetition. The wireless device may send (e.g., transmit) the UCI in the second transmission occasion (or in the second repetition of the PUSCH transmission), for example, based on the second capability value set index of the second capability value set associated with the second repetition being lower/higher than the first capability value set index of the first capability value set associated with the first repetition. The wireless device may multiplex the UCI in the second repetition of the PUSCH transmission, for example, based on the second capability value set index of the second capability value set associated with the second repetition being lower/higher than the first capability value set index of the first capability value set associated with the first repetition.

The first repetition of the PUSCH transmission may be associated with a first value of an index (e.g., TRP index, coreset pool index, SRS resource set index, antenna panel index, capability value set index, beam failure detection set index, Unified TCI state index, physical cell index (PCI), and/or the like).

The first repetition of the PUSCH transmission may be associated with the first value of the index, for example, based on the first TCI state being associated with the first value of the index. The wireless device may send (e.g., transmit) the first repetition of the PUSCH transmission based on the first TCI state. For example, the one or more configuration parameters may indicate, for the first TCI state, the first value of the index. The one or more configuration parameters may, for example, indicate an association/mapping/correspondence between the first TCI state and the first value of the index.

The first repetition of the PUSCH transmission may be associated with the first value of the index, for example, based on the first reference signal indicated by the first TCI state being associated with the first value of the index. The wireless device may send (e.g., transmit) the first repetition of the PUSCH transmission based on the first TCI state. For example, the one or more configuration parameters may indicate, for the first reference signal, the first value of the index. The one or more configuration parameters may, for example, indicate an association/mapping/correspondence between the first reference signal and the first value of the index.

The second repetition of the PUSCH transmission may be associated with a second value of the index (e.g., TRP index, coreset pool index, SRS resource set index, antenna panel index, capability value set index, beam failure detection set index, Unified TCI state index, physical cell index (PCI), and/or the like).

The second repetition of the PUSCH transmission may be associated with the second value of the index, for example, based on the second TCI state being associated with the second value of the index. The wireless device may send (e.g., transmit) the second repetition of the PUSCH transmission based on the second TCI state. For example, the one or more configuration parameters may indicate, for the second TCI state, the second value of the index. The one or more configuration parameters may, for example, indicate an association/mapping/correspondence between the second TCI state and the second value of the index.

The second repetition of the PUSCH transmission may be associated with the second value of the index, for example, based on the second reference signal indicated by the second TCI state being associated with the second value of the index. The wireless device may send (e.g., transmit) the second repetition of the PUSCH transmission based on the second TCI state. For example, the one or more configuration parameters may indicate, for the second reference signal, the second value of the index. The one or more configuration parameters may, for example, indicate an association/mapping/correspondence between the second reference signal and the second value of the index.

The UCI may be associated with a value of the index (e.g., TRP index, coreset pool index, SRS resource set index, antenna panel index, capability value set index, beam failure detection set index, Unified TCI state index, physical cell index (PCI), and/or the like). For example, the one or more configuration parameters may indicate, for the UCI, the value of the index. For example, the one or more configuration parameters may indicate, for the PUCCH resource of the uplink BWP of the cell, the value of the index. For example, the one or more configuration parameters may indicate, for the uplink BWP of the cell, the value of the index. For example, the one or more configuration parameters may indicate, for the cell, the value of the index.

The value of the index of the UCI may be equal to (or the same as) the first value of the index of the first repetition of the PUSCH transmission. The value of the index of the UCI may be different from the second value of the index of the second repetition of the PUSCH transmission. The repetition of the PUSCH transmission may be the first repetition of the PUSCH transmission, for example, based on the value of the index of the UCI being equal to (or the same as) the first value of the index of the first repetition. The wireless device may send (e.g., transmit) the UCI in the first transmission occasion (or in the first repetition of the PUSCH transmission), for example, based on the value of the index of the UCI being equal to (or the same as) the first value of the index of the first repetition. The wireless device may multiplex the UCI in the first repetition of the PUSCH transmission, for example, based on the value of the index of the UCI being equal to (or the same as) the first value of the index of the first repetition. For example, the first value may be equal to zero. For example, the value may be equal to zero.

The value of the index of the UCI may be equal to (or the same as) the second value of the index of the second repetition of the PUSCH transmission. The value of the index of the UCI may be different from the first value of the index of the first repetition of the PUSCH transmission. The repetition of the PUSCH transmission may be the second repetition of the PUSCH transmission, for example, based on the value of the index of the UCI being equal to (or the same as) the second value of the index of the second repetition. The wireless device may send (e.g., transmit) the UCI in the second transmission occasion (or in the second repetition of the PUSCH transmission), for example, based on the value of the index of the UCI being equal to (or the same as) the second value of the index of the second repetition. The wireless device may multiplex the UCI in the second repetition of the PUSCH transmission, for example, based on the value of the index of the UCI being equal to (or the same as) the second value of the index of the second repetition. For example, the second value may be equal to one. For example, the value may be equal to one.

The DCI (e.g., at time T0 in FIG. 22) may indicate the repetition of the PUSCH transmission among the at least two repetitions of the PUSCH transmission (e.g., first repetition of the PUSCH transmission and the second repetition of the PUSCH transmission). The DCI may comprise a field (e.g., TRP field, coreset pool index field, SRS resource set index field, antenna panel index field, capability value set index field, beam failure detection set index field, Unified TCI state index field, physical cell index (PCI) field, TCI state field, CSI request field, FDRA field, TDRA field, RV field, HARQ process number field, and/or the like) indicating the repetition of the PUSCH transmission. A value of the field may indicate the repetition of the PUSCH transmission.

For example, the field may be a 1-bit field. For example, a size/length of the field may be more than 1-bit field. For example, the least significant bit (LSB) of the field may indicate repetition of the PUSCH transmission. For example, the most significant bit (MSB) of the field may indicate the repetition of the PUSCH transmission. For example, a reserved bit of the field may indicate the repetition of the PUSCH transmission A first value of the field may indicate the first repetition of the PUSCH transmission. The repetition of the PUSCH transmission may be the first repetition of the PUSCH transmission, for example, based on the value of the field being equal to the first value (e.g., 0). The wireless device may send (e.g., transmit) the UCI in the first transmission occasion (or in the first repetition of the PUSCH transmission), for example, based on the value of the field being equal to the first value. The wireless device may multiplex the UCI in the first repetition of the PUSCH transmission, for example, based on the value of the field being equal to the first value.

A second value of the field may indicate the second repetition of the PUSCH transmission. The repetition of the PUSCH transmission may be the second repetition of the PUSCH transmission, for example, based on the value of the field being equal to the second value (e.g., 1). The wireless device may send (e.g., transmit) the UCI in the second transmission occasion (or in the second repetition of the PUSCH transmission), for example, based on the value of the field being equal to the second value. The wireless device may multiplex the UCI in the second repetition of the PUSCH transmission, for example, based on the value of the field being equal to the second value.

The UCI may be associated with a value of an index (e.g., TRP index, coreset pool index, SRS resource set index, antenna panel index, capability value set index, beam failure detection set index, Unified TCI state index, physical cell index (PCI), and/or the like). The value of the index may indicate the repetition of the PUSCH transmission among the repetitions of the PUSCH transmission (e.g., the first repetition of the PUSCH transmission and the second repetition of the PUSCH transmission). For example, the one or more configuration parameters may indicate, for the UCI, the value of the index. For example, the one or more configuration parameters may indicate, for the PUCCH resource of the uplink BWP of the cell, the value of the index. For example, the one or more configuration parameters may indicate, for the uplink BWP of the cell, the value of the index. For example, the one or more configuration parameters may indicate, for the cell, the value of the index.

A first value of the index may indicate the first repetition of the PUSCH transmission. The repetition of the PUSCH transmission may be the first repetition of the PUSCH transmission, for example, based on the value of the index being equal to the first value (e.g., 0). The wireless device may send (e.g., transmit) the UCI in the first transmission occasion (or in the first repetition of the PUSCH transmission), for example, based on the value of the index being equal to the first value. The wireless device may multiplex the UCI in the first repetition of the PUSCH transmission, for example, based on the value of the index being equal to the first value.

A second value of the index may indicate the second repetition of the PUSCH transmission. The repetition of the PUSCH transmission may be the second repetition of the PUSCH transmission, for example, based on the value of the index being equal to the second value (e.g., 1). The wireless device may send (e.g., transmit) the UCI in the second transmission occasion (or in the second repetition of the PUSCH transmission), for example, based on the value of the index being equal to the second value. The wireless device may multiplex the UCI in the second repetition of the PUSCH transmission, for example, based on the value of the index being equal to the second value.

Figure 23:
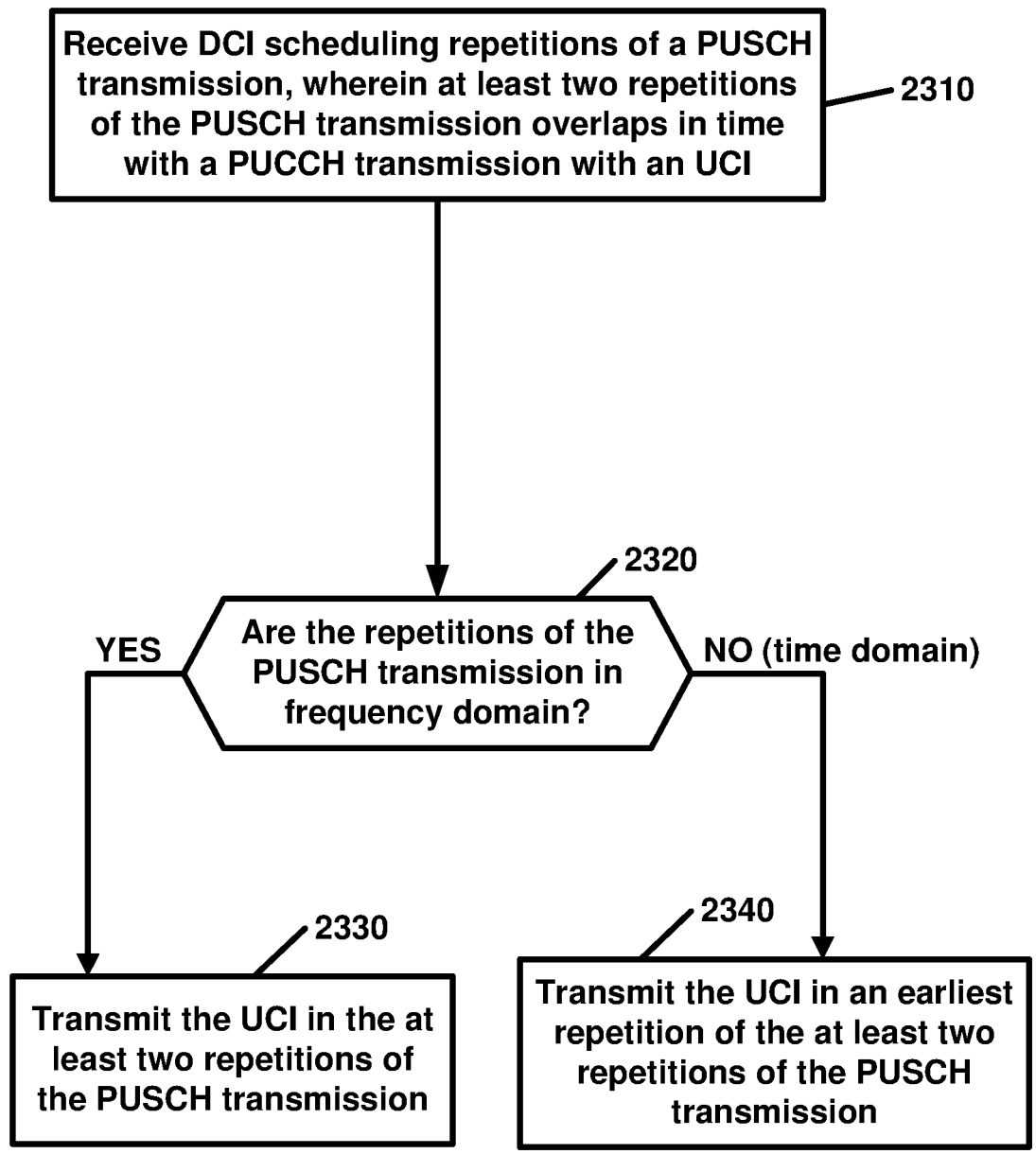
FIG. 23 shows an example of uplink control information multiplexing.
Figure 24A:
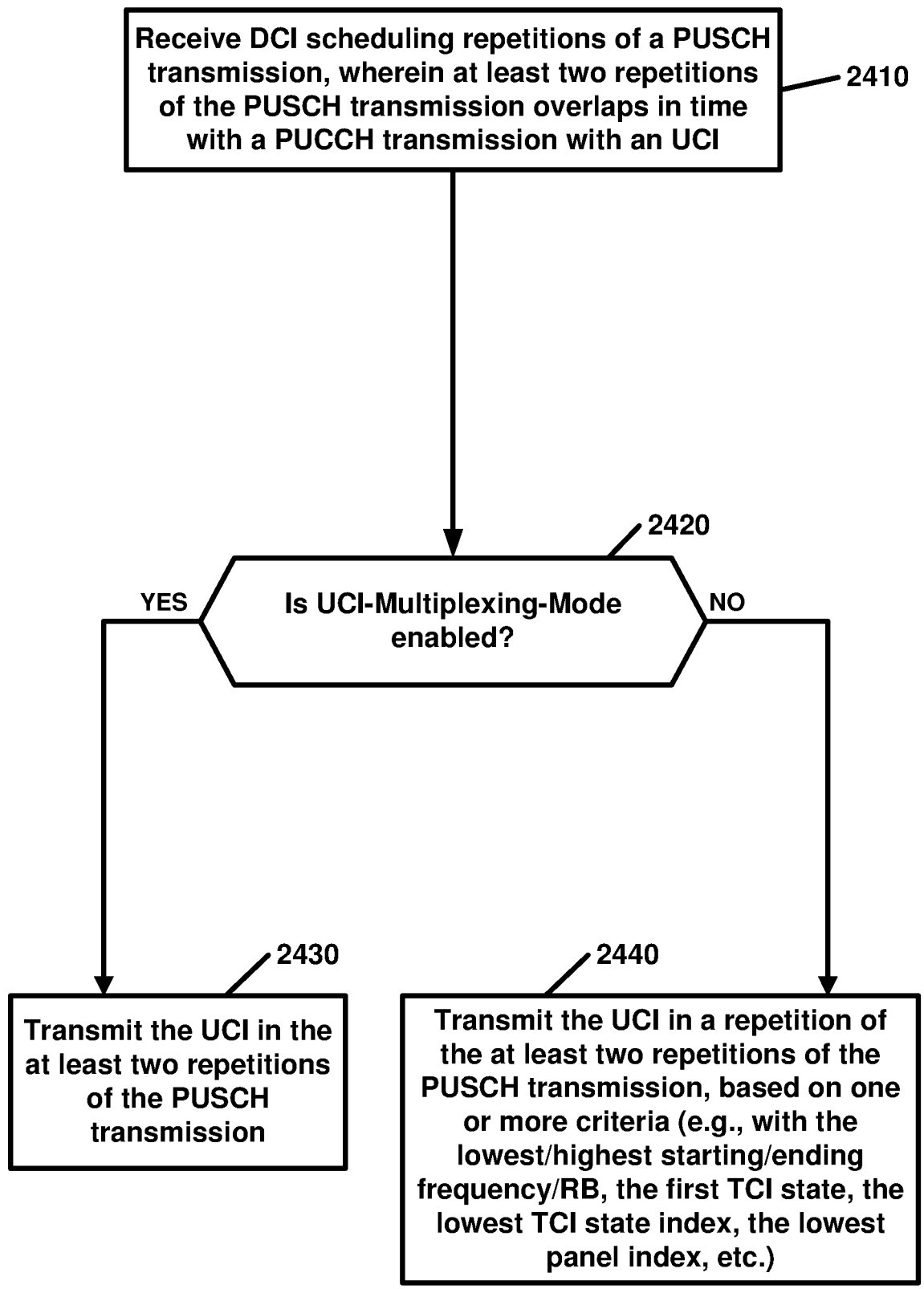
FIG. 24A and FIG. 24B show an example of uplink control information multiplexing.
Figure 24B:
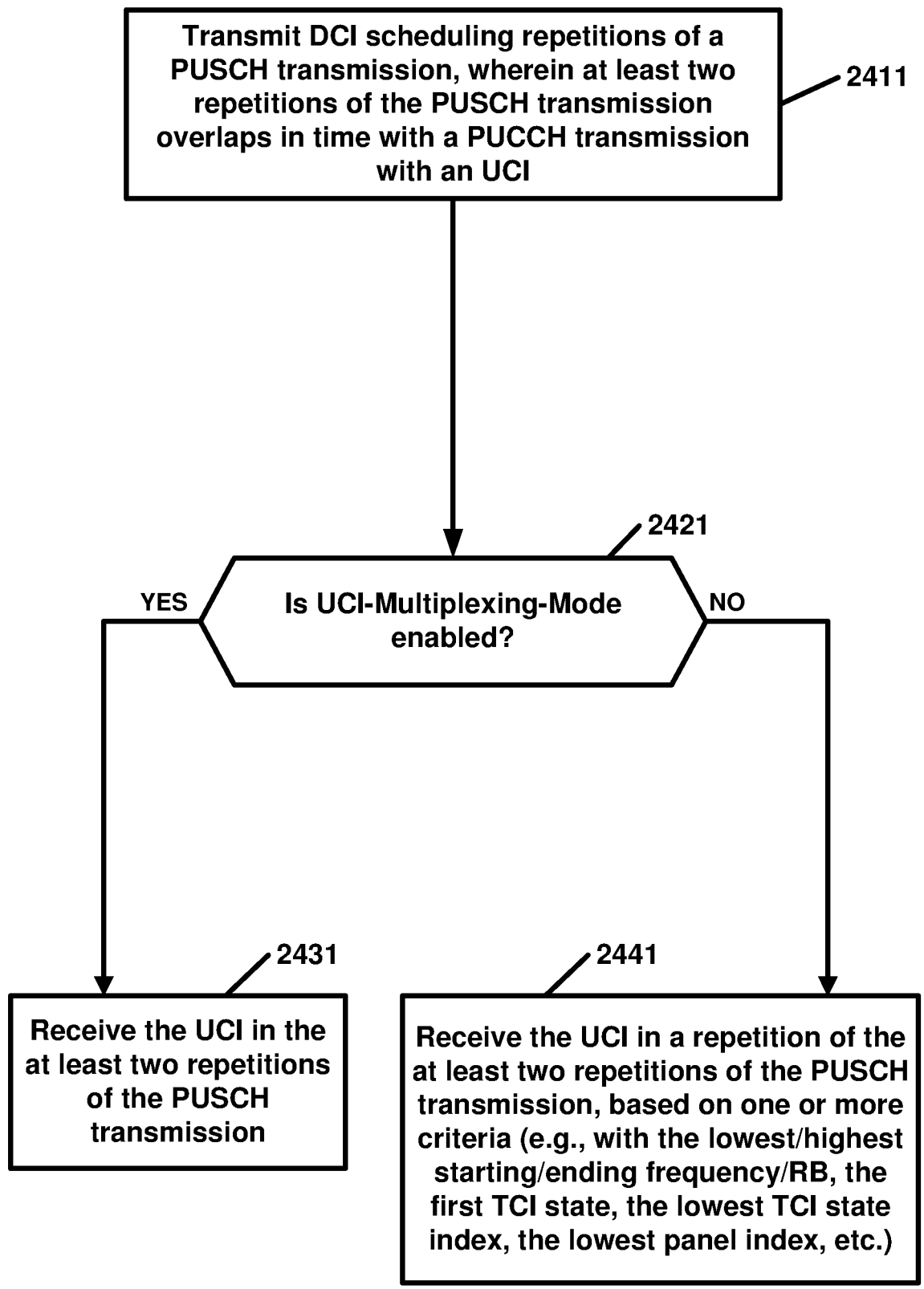

FIG. 23, FIG. 24A and FIG. 24B show examples of uplink control information multiplexing. A wireless device may receive, for example, from a base station, one or more messages comprising one or more configuration parameters. The base station may send (e.g., transmit) the one or more messages to the wireless device.

As indicated at step 2310 in FIG. 23 and at step 2410 in FIG. 24A, the wireless device may receive DCI (e.g., DCI format 0-1, DCI format 0-2, DCI format 0-x, x=0, 1, 2, 3 . . . ). The DCI may schedule repetitions of a PUSCH transmission. As indicated at step 2411 in FIG. 24B, the base station may send (e.g., transmit) the DCI to the wireless device.

At least two repetitions of the repetitions of the PUSCH transmission may overlap in time with a (scheduled/configured) PUCCH transmission carrying/comprising/with an UCI (e.g., HARQ-ACK, CSI report, CSI information).

The one or more configuration parameters may indicate at least two SRS resource sets comprising a first SRS resource set and a second SRS resource set. The one or more configuration parameters may indicate, for the at least two SRS resource sets, codebook. The one or more configuration parameters may indicate, for the at least two SRS resource sets, non-codebook.

The wireless device may receive a downlink message/command (e.g., MAC-CE, DCI) indicating activation of at least two TCI states comprising a first TCI state (e.g., TCI state 26 in FIG. 17) and a second TCI state (e.g., TCI state 61 in FIG. 17). The base station may send (e.g., transmit) the downlink message/command to the wireless device.

The repetitions of the PUSCH transmission may comprise one or more first repetitions and one or more second repetitions. The one or more first repetitions of the repetitions of the PUSCH transmission may be associated with the first SRS resource set. The one or more second repetitions of the repetitions of the PUSCH transmission may be associated with the second SRS resource set.

The one or more first repetitions of the repetitions of the PUSCH transmission may be associated with the first TCI state. The one or more second repetitions of the repetitions of the PUSCH transmission may be associated with the second TCI state. The wireless device may send (e.g., transmit) the one or more first repetitions based on the first TCI state. The wireless device may send (e.g., transmit) the one or more first repetitions with a first spatial domain transmission filter/beam determined based on the first TCI state (or a first reference signal indicated by the first TCI state). The wireless device may send (e.g., transmit) the one or more first repetitions with a first transmission power determined based on the first TCI state. The base station may receive the one or more first repetitions based on the first TCI state.

The wireless device may send (e.g., transmit) the one or more second repetitions based on the second TCI state. The wireless device may send (e.g., transmit) the one or more second repetitions with a second spatial domain transmission filter/beam determined based on the second TCI state (or a second reference signal indicated by the second TCI state). The wireless device may send (e.g., transmit) the one or more second repetitions with a second transmission power determined based on the second TCI state. The base station may receive the one or more second repetitions based on the second TCI state.

The repetitions of the PUSCH transmission may be in a time domain (e.g., TDM in FIG. 18). The repetitions of the PUSCH transmission may not be in a frequency domain (e.g., FDM in FIG. 18). This may be shown by the direction "NO" at step 2320 in FIG. 23.

As indicated at step 2340, the wireless device may send (e.g., transmit) the UCI in a first repetition (or a first transmission occasion) of the PUSCH transmission and a second repetition (or a second transmission occasion) of the PUSCH transmission. The base station may receive the UCI in the first repetition (or the first transmission occasion) of the PUSCH transmission and the second repetition (or the second transmission occasion) of the PUSCH transmission. The at least two repetitions of the PUSCH transmission may comprise the first repetition of the PUSCH transmission and the second repetition of the PUSCH transmission.

The one or more first repetitions may comprise the first repetition. The first repetition may be an earliest/starting/initial repetition of/in/among the one or more first repetitions. The first repetition may be an earliest/starting/initial repetition, of/in/among the at least two repetitions, that is in the one or more first repetitions. The one or more second repetitions may comprise the second repetition. The second repetition may be an earliest/starting/initial repetition of/in/among the one or more second repetitions. The second repetition may be an earliest/starting/initial repetition, of/in/among the at least two repetitions, that is in the one or more second repetitions.

The one or more configuration parameters may comprise an UCI-Multiplexing-Mode parameter. The UCI-Multiplexing-Mode parameter may be (set to) enabled. This may be shown by the direction "YES" at step 2420 in FIG. 24A and at step 2421 in FIG. 24B. As shown at step 2430 in FIG. 24A, the wireless device may send (e.g., transmit) the UCI in the at least two repetitions of the PUSCH transmission (e.g., the first repetition of the PUSCH transmission and the second repetition of the PUSCH transmission), for example, based on the one or more configuration parameters comprising the UCI-Multiplexing-Mode parameter (or comprising the UCI-Multiplexing-Mode parameter that is enabled). As shown at step 2431 in FIG. 24B, the base station may receive the UCI in the at least two repetitions of the PUSCH transmission (e.g., the first repetition of the PUSCH transmission and the second repetition of the PUSCH transmission), for example, based on the one or more configuration parameters comprising the UCI-Multiplexing-Mode parameter (or comprising the UCI-Multiplexing-Mode parameter that is enabled).

The wireless device may send (e.g., transmit) the UCI in a first repetition (or a first transmission occasion) of the PUSCH transmission. The base station may receive the UCI in the first repetition (or the first transmission occasion) of the PUSCH transmission. The at least two repetitions of the PUSCH transmission may comprise the first repetition of the PUSCH transmission. The wireless device may not send (e.g., transmit) the UCI in a second repetition (or a second transmission occasion) of the PUSCH transmission. The base station may not receive the UCI in the second repetition (or a second transmission occasion) of the PUSCH transmission. The at least two repetitions of the PUSCH transmission may comprise the second repetition of the PUSCH transmission. The second repetition of the PUSCH transmission may be different from the first repetition of the PUSCH transmission. The first repetition may be an earliest/starting/initial repetition of/in/among the at least two repetitions of the PUSCH transmission. This may be shown at step 2340 in FIG. 23.

The one or more configuration parameters may not comprise an UCI-Multiplexing-Mode parameter. The one or more configuration parameters may not comprise the UCI-Multiplexing-Mode parameter set to enabled. This may be shown by the direction "NO" at step 2420 in FIG. 24A and at step 2421 in FIG. 24B. The wireless device may send (e.g., transmit) the UCI in the first repetition of the PUSCH transmission, for example, based on the one or more configuration parameters not comprising the UCI-Multiplexing-Mode parameter (or not comprising the UCI-Multiplexing-Mode parameter that is enabled). The base station may receive the UCI in the first repetition of the PUSCH transmission, for example, based on the one or more configuration parameters not comprising the UCI-Multiplexing-Mode parameter (or not comprising the UCI-Multiplexing-Mode parameter that is enabled). The wireless device may not send (e.g., transmit) the UCI in the second repetition that is different from the first repetition, for example, based on the one or more configuration parameters not comprising the UCI-Multiplexing-Mode parameter (or not comprising the UCI-Multiplexing-Mode parameter that is enabled). The base station may not receive the UCI in the second repetition that is different from the first repetition, for example, based on the one or more configuration parameters not comprising the UCI-Multiplexing-Mode parameter (or not comprising the UCI-Multiplexing-Mode parameter that is enabled).

The repetitions of the PUSCH transmission may be in a frequency domain (e.g., FDM in FIG. 18 and FIG. 22). The repetitions of the PUSCH transmission may not be in a time domain (e.g., TDM in FIG. 18). The one or more configuration parameters may, for example, indicate a repetition scheme set to a frequency domain repetition (e.g., (e.g., FDM-Scheme). This may be shown by the direction "YES" at step 2320 in FIG. 23.

As shown at step 2330 in FIG. 23, the wireless device may send (e.g., transmit) the UCI in a first repetition (or a first transmission occasion) of the PUSCH transmission and a second repetition (or a second transmission occasion) of the PUSCH transmission. The at least two repetitions of the PUSCH transmission may comprise the first repetition of the PUSCH transmission (e.g., Repetition 1 in FIG. 22) and the second repetition of the PUSCH transmission (e.g., Repetition 2 in FIG. 22). The one or more first repetitions may comprise the first repetition. The one or more second repetitions may comprise the second repetition.

The wireless device may send (e.g., transmit) the UCI in the first repetition of the PUSCH transmission and the second repetition of the PUSCH transmission, for example, based on the repetitions of the PUSCH transmission being in the frequency domain. The wireless device may send (e.g., transmit) the UCI in the first repetition of the PUSCH transmission and the second repetition of the PUSCH transmission, for example, based on the one or more configuration parameters indicating the repetition scheme set to the frequency domain repetition. The base station may receive the UCI in the first repetition of the PUSCH transmission and the second repetition of the PUSCH transmission. The base station may receive the UCI in the first repetition of the PUSCH transmission and the second repetition of the PUSCH transmission, for example, based on the repetitions of the PUSCH transmission being in the frequency domain. The base station may receive the UCI in the first repetition of the PUSCH transmission and the second repetition of the PUSCH transmission, for example, based on the one or more configuration parameters indicating the repetition scheme set to the frequency domain repetition.

In FIG. 24A and FIG. 24B, the one or more configuration parameters may, for example, comprise an UCI-Multiplexing-Mode parameter. The UCI-Multiplexing-Mode parameter may be (set to) enabled. As shown at step 2430 in FIG. 24A, the wireless device may send (e.g., transmit) the UCI in the first repetition of the PUSCH transmission and the second repetition of the PUSCH transmission, for example, based on the one or more configuration parameters comprising the UCI-Multiplexing-Mode parameter (or comprising the UCI-Multiplexing-Mode parameter that is enabled). As shown at step 2431 in FIG. 24B, the base station may receive the UCI in the first repetition of the PUSCH transmission and the second repetition of the PUSCH transmission, for example, based on the one or more configuration parameters comprising the UCI-Multiplexing-Mode parameter (or comprising the UCI-Multiplexing-Mode parameter that is enabled).

The wireless device may send (e.g., transmit) the UCI in a repetition (or a transmission occasion) of the PUSCH transmission among the at least two repetitions of the PUSCH transmission. The base station may receive the UCI in the repetition (or the transmission occasion) of the PUSCH transmission among the at least two repetitions of the PUSCH transmission. The repetition of the PUSCH transmission may be a single repetition of the PUSCH transmission. The repetition of the PUSCH transmission may be a default/reference repetition of the PUSCH transmission.

In FIG. 24A and FIG. 24B, the one or more configuration parameters may, for example, not comprise an UCI-Multiplexing-Mode parameter. The one or more configuration parameters may, for example, not comprise an UCI-Multiplexing-Mode parameter that is enabled. The wireless device may send (e.g., transmit) the UCI in the repetition of the PUSCH, for example, based on the one or more configuration parameters not comprising the UCI-Multiplexing-Mode parameter (or not comprising the UCI-Multiplexing-Mode parameter that is enabled). The base station may receive the UCI in the repetition of the PUSCH, for example, based on the one or more configuration parameters not comprising the UCI-Multiplexing-Mode parameter (or not comprising the UCI-Multiplexing-Mode parameter that is enabled).

As shown at step 2440 in FIG. 24A, the wireless device may determine, for transmission/multiplexing of the UCI, the repetition (or the transmission occasion) of the PUSCH transmission among the at least two repetitions of the PUSCH transmission, for example, based on one or more criteria discussed in FIG. 22 (e.g., the lowest/highest starting RB, lowest/highest ending RB, lowest/highest TCI state index, the first (starting) TCI state, the lowest/highest panel index, the lowest/highest capability value set index, with the same value of the index, and/or the like). The wireless device may send (e.g., transmit) the UCI in the repetition of the PUSCH, for example, based on the one or more criteria discussed in FIG. 22.

As shown at step 2441 in FIG. 24B, the base station may determine, for transmission/multiplexing of the UCI, the repetition (or the transmission occasion) of the PUSCH transmission among the at least two repetitions of the PUSCH transmission, for example, based on one or more criteria discussed in FIG. 22 (e.g., the lowest/highest starting RB, lowest/highest ending RB, lowest/highest TCI state index, the first (starting) TCI state, the lowest/highest panel index, the lowest/highest capability value set index, with the same value of the index, and/or the like). The base station may receive the UCI in the repetition of the PUSCH, for example, based on the one or more criteria discussed in FIG. 22.

The wireless device may send (e.g., transmit) the repetitions of the PUSCH transmission in a plurality of transmission occasions. The wireless device may send (e.g., transmit) each repetition of the repetitions of the PUSCH transmission in a respective transmission occasion of the plurality of transmission occasions.

Sending (e.g., transmitting) the UCI in a repetition of the PUSCH transmission may comprise sending (e.g., transmitting) the UCI on/in a transmission occasion of the plurality of transmission occasions. The repetitions of the PUSCH transmission may comprise the repetition of the PUSCH transmission. The wireless device may send (e.g., transmit), in/on the transmission occasion, the repetition of the PUSCH transmission.

The examples discussed in FIG. 17, FIG. 18, FIG. 22, FIG. 23, FIG. 24A and FIG. 24B may also be applicable, for example, if the at least two TCI states are a single TCI state (e.g., the DCI in FIG. 17 indicates activation of a single TCI state, for example, if the TCI field is equal to 000 or 111). The wireless device may send (e.g., transmit) the repetitions of the PUSCH transmission based on the single TCI state (e.g., TCI state 4 if the TCI field is equal to 000 or TCI state 42 if the TCI field is equal to 111 in FIG. 17).

A wireless device may receive, for example, from a base station, one or more messages comprising one or more configuration parameters. The wireless device may trigger a power headroom report (PHR). The wireless device may send (e.g., transmit), in a time slot, a PUSCH transmission carrying/comprising/with the PHR. The PUSCH transmission may overlap in time with at least two uplink transmissions (e.g., a first uplink transmission and a second uplink transmission). The at least two uplink transmissions may be associated with TCI states and the wireless device may send (e.g., transmit) the uplink transmission based on a corresponding TCI state. The first uplink transmission may be associated with a first TCI state. The wireless device may send (e.g., transmit) the first uplink transmission based on the first TCI state. The second uplink transmission may be associated with a second TCI state. The wireless device may send (e.g., transmit) the second uplink transmission based on the second TCI state.

The uplink transmission may be associated with coreset pool indexes. The first uplink transmission may be associated with a first coreset pool index. The second uplink transmission may be associated with a second coreset pool index. The uplink transmission may be repetition of an uplink transmission/signal. The first uplink transmission and the second uplink transmission may be repetitions of an uplink transmission/signal. The first uplink transmission may be a first repetition of the uplink transmission. The second uplink transmission may be a second repetition of the uplink transmission.

The uplink transmission may be a portion (e.g., layer(s), data stream(s), antenna port(s)) of an uplink transmission. The first uplink transmission may be a first portion (e.g., layer(s), data stream(s), antenna port(s)) of an uplink transmission. The second uplink transmission may be a second portion (e.g., layer(s), data stream(s), antenna port(s)) of the uplink transmission.

An uplink transmission may be associated with at least two TCI states (e.g., the first TCI state and the second TCI state). The wireless device may send (e.g., transmit) the uplink transmission based on the at least two TCI states (e.g., first TCI state and the second TCI state). The first uplink transmission may be the uplink transmission associated with the first TCI state. The second uplink transmission may be the uplink transmission associated with the second TCI state.

The wireless device may send (e.g., transmit) the uplink transmission to a TRP. The wireless device may send (e.g., transmit) the first uplink transmission to a first TRP. The wireless device may send (e.g., transmit) the second uplink transmission to a second TRP.

Repetitions of an uplink transmission may comprise at least two uplink transmissions (e.g., the first uplink transmission and the second uplink transmission). The repetitions of the uplink transmission may be in a time domain. The repetitions of the uplink transmission may be time domain repetitions. The first uplink transmission may be a first repetition of the repetitions of the uplink transmission. The second uplink transmission may be a second repetition of the repetitions of the uplink transmission. The repetitions of an uplink transmission may overlap in time (e.g., in the time slot) with the PUSCH transmission carrying/indicating the PHR.

The repetitions of the uplink transmission may be associated with the TCI states. The wireless device may send (e.g., transmit) each repetition based on a corresponding TCI state. A repetition may overlap in the time slot with the PUSCH transmission carrying/comprising the PHR. The first repetition(s) of the repetitions of the uplink transmission may be associated with the first TCI state. The wireless device may send (e.g., transmit) the first repetition(s) (or each repetition of the first repetition(s)) based on the first TCI state. The first repetition(s) may overlap in the time slot with the PUSCH transmission carrying/comprising the PHR. The first uplink transmission (or the first repetition) may be an earliest/starting/first/initial uplink transmission among the first repetition(s).

The second repetition(s) of the repetitions of the uplink transmission may be associated with the second TCI state. The wireless device may send (e.g., transmit) the second repetition(s) (or each repetition of the second repetition(s)) based on the second TCI state. The second repetition(s) may overlap in the time slot with the PUSCH transmission carrying/comprising the PHR. The second uplink transmission (or the second repetition) may be an earliest/starting/first/initial uplink transmission among the second repetition(s).

The one or more configuration parameters may comprise a two-PHR-Mode parameter. The two-PHR-Mode parameter may be (set to) enabled. In at least some wireless communications, the wireless device may determine/calculate two power headroom values comprising a first power headroom value and a second power headroom value. The wireless device may determine/calculate the two power headroom values, for example, based on the one or more configuration parameters comprising the two-PHR-Mode parameter set to enabled. The wireless device may send (e.g., transmit) the PUSCH transmission comprising the PHR with/comprising/indicating the two power headroom values.

The wireless device may determine the first power headroom value based on a first pathloss reference signal indicated by the first TCI state. The wireless device may determine, for the first uplink transmission (or for the first repetition) associated with the first pathloss reference signal, the first power headroom value. The wireless device may determine the second power headroom value based on a second pathloss reference signal indicated by the second TCI state. The wireless device may determine, for the second uplink transmission (or for the second repetition) associated with the second pathloss reference signal, the second power headroom value.

The one or more configuration parameters may not comprise a two-PHR-Mode parameter (or may not comprise a two-PHR-Mode parameter set to enabled). In at least some wireless communications, the wireless device may determine/calculate a (single) power headroom value/level/quantity, for example, based on the one or more configuration parameters not comprising the two-PHR-Mode parameter. The wireless device may send (e.g., transmit) the PUSCH transmission comprising the PHR with/comprising/indicating the (single) power headroom value. The wireless device may not determine/calculate more than one power headroom value/level/quantity, for example, based on the one or more configuration parameters not comprising the two-PHR-Mode parameter.

The wireless device may determine/calculate the (single) power headroom value/level/quantity, for example, based on the first pathloss reference signal indicated by the first TCI state. The wireless device may determine, for the first uplink transmission (or for the first repetition) associated with the first pathloss reference signal, the first power headroom value, for example, based on the first uplink transmission (or for the first repetition) being an earliest/starting/first/initial repetition among the repetitions of the uplink transmission.

The at least two uplink transmissions (e.g., the first uplink transmission and the second transmission) may overlap in time. The at least two uplink transmissions (e.g., the first uplink transmission and the second transmission) may not be time domain repetitions.

The at least two uplink transmissions (e.g., the first uplink transmission and the second transmission) may or may not overlap in frequency. For example, repetitions of an uplink transmission may comprise at least two uplink transmissions (e.g., the first uplink transmission and the second uplink transmission). The repetitions of the uplink transmission may be, for example, in a frequency domain. The repetitions of the uplink transmission may be frequency domain repetitions. The first uplink transmission may be a first repetition of the repetitions of the uplink transmission. The second uplink transmission may be a second repetition of the repetitions of the uplink transmission. The first uplink transmission (or the first repetition) and the second transmission (or the second repetition) may or may not overlap in frequency. The at least two uplink transmissions (e.g., the first uplink transmission (or the first repetition) and the second transmission (or the second repetition)) may start at the same time/symbol, for example, based on the repetitions being in the frequency domain.

At least some wireless communications, where the wireless device determines/calculates a (single) power headroom value based on an earliest/starting/first/initial repetition of repetitions of an uplink transmission may not be efficient for the frequency domain repetitions, for example, based on the repetitions of the uplink transmission starting at the same time/symbol in the frequency domain repetitions. Each repetition of the repetitions of the uplink transmission may be the earliest/starting/first/initial repetition of the repetitions of the uplink transmission. The base station may not have information on the power status of the cell (or a TRP), for example, if the base station and the wireless device are not aligned on a repetition of the uplink transmission that the wireless device determines/calculates the power headroom value. For example, the wireless device may determine/calculate the power headroom value based on the first uplink transmission (or the first repetition) associated with the first TRP. The wireless device may not determine/calculate a power headroom value based on the second uplink transmission (or the second repetition) associated with the second TRP. The base station may not have information based on which repetition the wireless device determines/calculates the power headroom value, for example, if the base station receives the PHR indicating the power headroom value. The base station may not know whether the base station should increase or decrease the transmission power on the first TRP and/or the second TRP. The base station may not know if the (received) power headroom value indicates the power status at the first TRP or the second TRP. This lack of alignment between the base station and the wireless device may result in an inefficient power control mechanism.

Examples described herein may enhance PHR mechanism for uplink transmissions overlapping in time within the same uplink carrier of the same cell (e.g., frequency domain repetitions, uplink transmission associated with different coreset pool indexes). The examples enhance PHR mechanism for an uplink transmission associated with two TCI states (e.g., SFN/SDM based uplink transmission).

A wireless device may determine/calculate a PHR for an uplink transmission, among at least two uplink transmissions (e.g., the first uplink transmission and the second uplink transmission), with a lowest/highest starting/ending frequency/resource block (RB). The wireless device may determine/calculate a PHR for an uplink transmission, among at least two uplink transmissions (e.g., the first uplink transmission and the second uplink transmission), sent (e.g., transmitted) with an antenna panel with a lowest/highest antenna panel index/identifier. The wireless device may determine/calculate a PHR for an uplink transmission, among at least two uplink transmissions (e.g., the first uplink transmission and the second uplink transmission), sent (e.g., transmitted) based on a TCI state (e.g., transmitting beam) with a lowest TCI state index. The wireless device may determine/calculate the PHR based on a pathloss reference signal associated with the uplink transmission. The wireless device may send (e.g., transmit) the uplink transmission based on a TCI state indicating the pathloss reference signal.

The wireless device may determine/calculate at least two power headroom values, for example, two power headroom values comprising a first power headroom value and a second power headroom value. For uplink transmissions overlapping in time within the same uplink carrier of the same cell (e.g., frequency domain repetitions, uplink transmission associated with different coreset pool indexes), the wireless device may not determine/check whether the one or more configuration parameters comprise the two-PHR-Mode parameter set to enabled or not. For the uplink transmissions overlapping in time within the same uplink carrier of the same cell, the wireless device may determine/calculate two power headroom values, regardless of the two-PHR-Mode parameter set is configured/enabled or not. In the time domain repetitions, the wireless device may determine/check whether the one or more configuration parameters comprise the two-PHR-Mode parameter set to enabled or not. In the time domain repetitions, the wireless device may determine/calculate two power headroom values based on the one or more configuration parameters comprising the two-PHR-Mode parameter set is enabled or not.

Examples described herein may align the base station and the wireless device on the repetition that the wireless device determines/calculates power headroom value(s). The base station may have information based on which TRP (or uplink transmission or pathloss reference signal or TCI state) the (received) power headroom value is calculated/determined. The base station may know about the power status of the TRP(s). The base station may schedule/indicate correct transmission powers for uplink transmissions leading to an efficient power control mechanism.

A wireless device may perform a power headroom reporting procedure to indicate, to a base station, at least one of following information: Type 1 power headroom (PH) indicating a difference between a nominal maximum send (e.g., transmit) power and an estimated power for UL-SCH transmission per activated serving cell configured with the wireless device; Type 2 PH indicating a difference between a nominal maximum send (e.g., transmit) power and an estimated power for UL-SCH and PUCCH transmission on SpCell of another MAC entity (e.g., E-UTRA MAC entity in EN-DC); Type 3 PH indicating a difference between a nominal maximum send (e.g., transmit) power and an estimated power for SRS transmission per activated serving cell.

A wireless device may receive a message (e.g., an RRC message) indicating one or more parameters for the power headroom reporting procedure. A MAC entity of the wireless device may determine, for example, when to send (e.g., transmit), to a base station, a PHR based on the one or more parameters. The wireless device may determine which cell and/or which type of power headroom need to be reported via the PHR. For example, the one or more parameters may indicate a first value of a PHR periodic timer (e.g., phr-PeriodicTimer), a second value of a PHR prohibit timer (e.g., phr-ProhibitTimer), a PHR pathloss change threshold (e.g., phr-Tx-PowerFactorChange), a presence/absence indicator of a PH value for other cell in the PHR (e.g., phr-Type2OtherCell), a mode (e.g., real or virtual) indicator of a PH (e.g., phr-ModeOtherCG), and/or a multiple PHR indicator (e.g., multiplePHR).

A MAC entity of a wireless device may trigger a PHR based on one or more conditions. For example, the wireless derive may trigger a PHR at least one of following events: a first timer (e.g., phr-PeriodicTimer) expires; upon configuration or reconfiguration of the power headroom reporting functionality by upper layers, which may not be used to disable the function; activation of an SCell of any MAC entity with configured uplink; and/or addition of the PSCell (e.g., a PSCell may be added or changed).

A MAC entity of a wireless device may, for example, if the wireless device has UL resources allocated for a new transmission, start a PHR periodic timer if a first UL resource is firstly allocated for a new transmission since a last MAC reset. A wireless device may send (e.g., transmit), for example, if a PHR procedure determines that at least one PHR has been triggered and not cancelled and/or if allocated UL resources accommodate at least one PHR (e.g., a MAC CE for the PHR which the MAC entity is configured to send (e.g., transmit), plus its subheader, as a result of logical channel prioritization), at least one PHR to a base station. A PHR procedure and/or a PHR format may be determined, for example on whether a base station configures a wireless device with a single entry PHR format (e.g., a multiple PHR indicator (e.g., multiplePHR) is not configured) or a multiple entry PHR format (e.g., a multiple PHR indicator (e.g., multiplePHR) is configured).

A MAC entity of the wireless device may determine, for each of one or more activated cells with configured uplink(s) associated with the wireless device, a first value of a first type power headroom (PH) (e.g., Type 1 PH) determined based on a PUSCH transmission, or a third type PH (e.g., Type 3 PH) determined based on an SRS transmission, for example, if a base station configures a wireless device with a multiple PHR indicator (e.g., by sending (e.g., transmitting) an RRC configuration parameter indicating the multiple entry PHR format (e.g., multiplePHR)). A wireless device may determine, for example, if the wireless device has UL resources allocated for a transmission on the at least one cell, or if one or more other cells of the one or more activated cells have UL resources allocated for transmission on the at least one cell and PHR configuration parameters sent (e.g., transmitted) for indicating a PHR mode of the one or more cells indicates a real PH value (e.g., a mode (e.g., real or virtual) indicator of a PH (e.g., phr-ModeOtherCG)) indicate a real PH value), a second value corresponding to PCMAX, c (described elsewhere in this specification) and send (e.g., transmit) the first value and the second value via corresponding one or more fields in a PHR.

A MAC entity of the wireless device may determine a first value corresponding to a second type PH (e.g., Type 2 PH) for an SpCell of the other MAC entity, for example, if a presence/absence indicator of a PH value for other cell in the PHR (e.g., phr-Type2OtherCell) is configured to a wireless device, and/or if other MAC entity is a particular radio access technology (e.g., 4G) MAC entity. A wireless device may determine a second value corresponding to PCMAX, c, for example, if a PHR mode of the one or more cells indicates a real PH value (e.g., a mode (e.g., real or virtual) indicator of a PH (e.g., phr-ModeOtherCG)) indicate a real PH value). The wireless device may send (e.g., transmit) the first value and the second value via one or more corresponding fields in a PHR.

A MAC entity of a wireless device may trigger a multiplexing and assembly procedure for generating and sending (e.g., transmitting) a PHR (e.g., in a form of a power headroom report medium access control control element (PHR MAC CE)). The PHR may comprise a first value of a first type PH, a second type PH, and/or a third type PH of at least one cell. The PHR may comprise a second value, corresponding to PCMAX, c, for example, based on a configured serving cell index (e.g., ServCellIndex) and/or configured PUCCH(s) for the wireless device. A wireless device may start or restart a PHR periodic timer (e.g., periodicPHR-Timer) and/or a PHR prohibit timer (e.g., prohibitPHR-Timer), for example, based on sending (e.g., transmitting) a PHR. A wireless device may cancel one or more triggered PHRs, for example, based on sending (e.g., transmitting) a PHR.

The wireless device may, for example, determine a first value, of a first type PH or of a third type PH, for a corresponding uplink carrier of a cell (e.g., a PCell), for example, if a base station configures a wireless device with a single entry PHR format (e.g., by sending (e.g., transmitting) a PHR configuration parameter indicating the single entry PHR format, and/or by not configuring a PHR configuration parameter indicating a multiple entry PHR format (e.g., if multiplePHR is absent)). The wireless device may, determine a second value corresponding to PCMAX, c. The wireless device may send (e.g., transmit) a PHR to a base station (e.g., a gNB), for example, based on determining the first value and the second value. The PHR may comprise one or more fields indicating the first value and the second value. A wireless device may trigger a multiplexing and assembly procedure for generating and sending (e.g., transmitting) a PHR MAC CE comprising a value of a first type PH or of a third type PH. A wireless device may start or restart a PHR periodic timer (e.g., periodicPHR-Timer) and/or a PHR prohibit timer (e.g., prohibitPHR-Timer), for example, based on sending (e.g., transmitting) a PHR. A wireless device may cancel one or more triggered PHRs, for example, based on sending (e.g., transmitting) a PHR.

A MAC entity may determine whether PH value for an activated serving cell is based on real transmission or a (uplink) reference format based on configured grant(s) and DCI that may have been received until and including the PDCCH occasion in which a first UL grant for a new transmission is received since a PHR has been triggered if a PHR MAC CE is reported on an uplink grant received on the PDCCH or until the first uplink symbol of PUSCH transmission minus PUSCH reparation time predefined, for example, if the PHR MAC CE is reported on a configured grant.

The PHR MAC CEs may comprise at least one of the following fields. One field may be a presence/absence indication field (e.g., Ci) that indicates a presence of a PH field for a serving cell with a cell ID i (e.g., ServCellIndex i). The Ci field set to "1" may indicate that a PH field for the serving cell with the cell ID i (e.g., ServCellIndex i) is reported. The Ci field set to "0" may indicate that a PH field for the serving cell with a cell ID i (e.g., ServCellIndex i) is not reported. One field may be a reservation field (e.g., R) indicating one or more reserved bit (e.g., R set to "0"). One field may be a PH mode indicator (e.g., V) that indicate if the PH value is based on a real transmission or a reference format. For Type 1 PH, V=0 may indicate a real transmission on PUSCH and V=1 may indicate that a PUSCH reference format is used. For Type 2 PH, V=0 may indicate a real transmission on PUCCH and V=1 may indicate that a PUCCH reference format is used. For Type 3 PH, V=0 may indicate a real transmission on SRS and V=1 may indicate that an SRS reference format is used. For Type 1, Type 2, and Type 3 PH, V=0 may indicate a presence of an octet comprising an associated $P_{CMAX,f,c}$ field, and V=1 may indicate that the octet comprising the associated $P_{CMAX,f,c}$ field is omitted. One field may be a PH field indicating a power headroom level. One field may be a power backoff indicator field (e.g., a P field) indicating whether the MAC entity applies power backoff due to power management. The MAC entity may set P=1 if a corresponding $P_{CMAX,f,c}$ field have had a different value if no power backoff due to power management had been applied. If present, this field may indicate the $P_{CMAX,f,c}$ or $P_{CMAX,f,c}$ for a serving cell used for determining a preceding PH field.

A wireless device may determine whether a PHR, for an activated serving cell, is based on an actual uplink transmission or a reference uplink transmission based on a higher layer signaling of a configured grant. The wireless device may further determine whether the PHR is based on the actual uplink transmission or the reference uplink transmission based on one or more periodic/semi-persistent sounding reference signal transmissions. The wireless device may further determine whether the PHR is based on the actual uplink transmission or the reference uplink transmission based on DCI.

The wireless device may report the PHR on a PUSCH triggered/scheduled by the first DCI. The wireless device may receive the DCI until and including a PDCCH monitoring occasion where the wireless device detects a first DCI (e.g., DCI format 0_0 or DCI format 0_1) scheduling an initial transmission of a transport block since a PHR was triggered.

The wireless device may report the PHR on a PUSCH using a configured grant. The wireless device may receive the DCI until a first uplink symbol of a configured PUSCH transmission minus a processing time (e.g., Tproc,2). The processing time may be based on a capability of the wireless device. The processing time may be based on a subcarrier spacing of an active downlink BWP of a scheduling cell for the configured grant.

A wireless device may determine/calculate/compute a PHR (or a power headroom value/quantity/level) for a PUSCH transmission occasion i on an active uplink BWP b of carrier f of a serving cell c, for example, based on the equation below:

$$PH_{type1,b,f,c}(i,j,q_d,l) = P_{CMAX,f,c}(i) - \{P_{O\_PUSCH,b,f,c}(j) + 10\log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\} \text{ [dB], where}$$

$P_{CMAX,f,c}(i)$ is the wireless device configured maximum output power for carrier f of serving cell C in PUSCH transmission occasion i $P_{O\_PUSCH,b,f,c}(j)$ is a parameter composed of the sum of a component $P_{O\_NOMINAL\_PUSCH,f,c}(j)$ and a component $P_{O\_UE\_PUSCH,b,f,c}(j)$ $M_{RB,b,f,c}^{PUSCH}(i)$ is the bandwidth of the PUSCH resource assignment expressed in number of resource blocks for PUSCH transmission occasion i on active UL BWP b of carrier f of serving cell c and μ is a SCS configuration $PL_{b,f,c}(q_d)$ is a downlink pathloss estimate in dB calculated by the wireless device using reference signal (RS) index $q_d$ for the active DL BWP of carrier f of serving cell c $\Delta_{TF,b,f,c}(i) = 10\log_{10}((2^{BPRE \cdot K_s} - 1) \cdot \beta_{offset}^{PUSCH})$ for $K_s = 1.25$ and $\Delta_{TF,b,f,c}(i) = 0$ for $K_s = 0$ where $K_s$ is provided by deltaMCS for each UL BWP b of each carrier f and serving cell C. $\Delta_{TF,b,f,c}(i) = 0$, for example, if the PUSCH transmission is over more than one layer $$f_{b,f,c}(i, l) = f_{b,f,c}(i - i_0, l) + \sum_{m=0}^{C(D_i)-1} \delta_{PUSCH,b,f,c}(m, l)$$

is the PUSCH power control adjustment state l for active UL BWP b of carrier f of serving cell c and PUSCH transmission occasion i.

Determining/computing/calculating a power headroom value/quantity/level based on a pathloss reference signal may comprise determining/computing/calculating, for a PHR, a downlink pathloss estimate (or a pathloss measurement) based on one or more measurement qualities (or one or more radio link qualities) (e.g., L1-RSRP, L3-RSRP, or a higher filtered RSRP measurement(s)) of the pathloss reference signal. The wireless device may determine the power headroom value/quantity/level based on the downlink pathloss estimate of the pathloss reference signal. The wireless device may use the downlink pathloss estimate in determining/computing/calculating the power headroom value/quantity/level. The PHR may comprise/indicate the downlink pathloss estimate. The wireless device may determine/calculate/compute/measure, for the downlink pathloss estimate, a filtered RSRP value (e.g., L1-RSRP, L3-RSRP) of the pathloss reference signal. The wireless device may determine/calculate/compute/measure the filtered RSRP value for transmission of the PHR.

The wireless device may determine/compute/calculate a power headroom value based on one or more power terms (e.g., by adding/subtracting/multiplying/dividing/taking a logarithm, power, and any mathematical expression of the one or more power terms). The one or more power terms may comprise, for example, a pathloss reference signal (or a downlink pathloss estimate of the pathloss reference signal). The one or more power terms may comprise, for example, a target received power. The one or more power terms may comprise, for example, a pathloss compensation factor. The one or more power terms may comprise, for example, a closed-loop process number/index, and/or the like.

Figure 25:
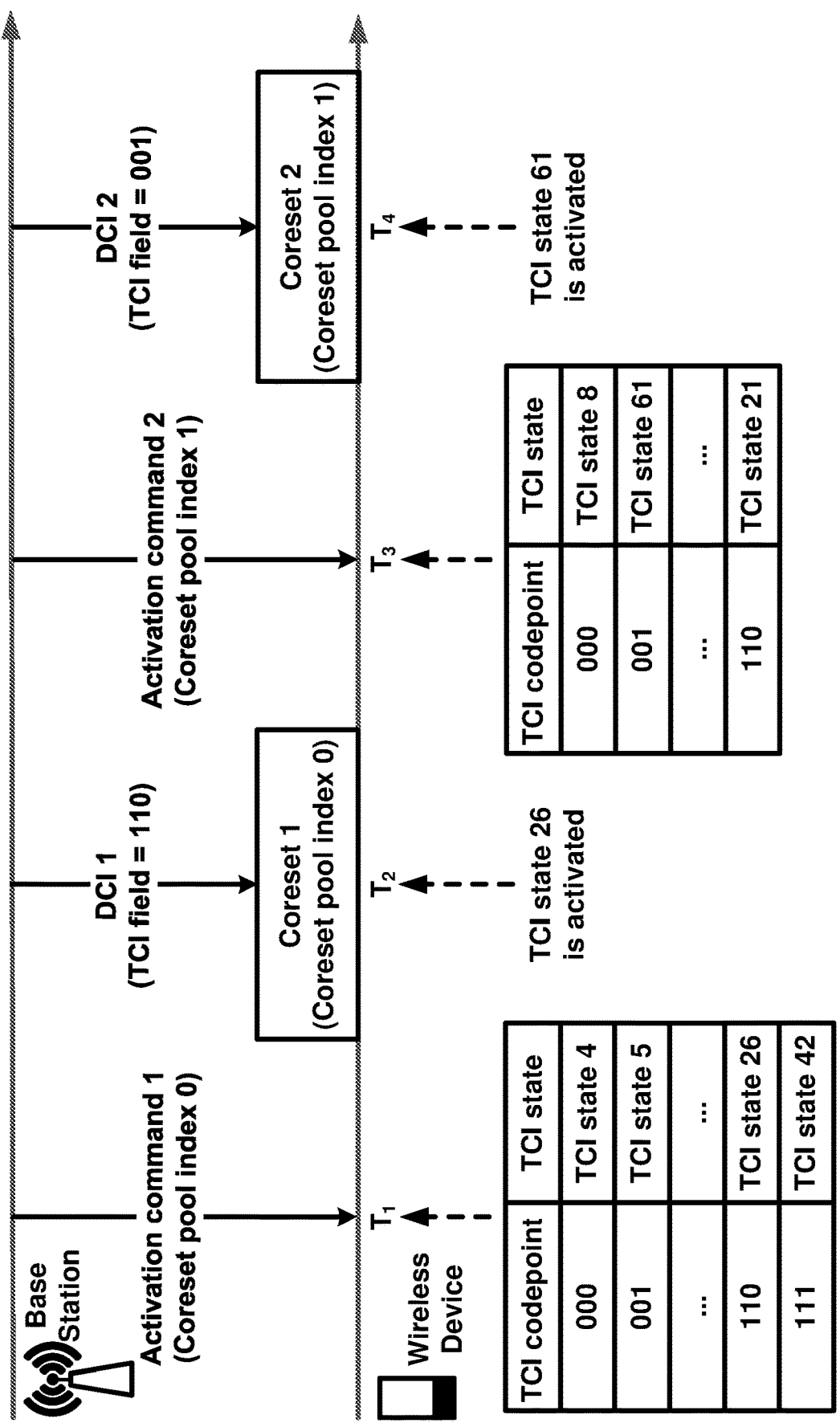
FIG. 25 shows an example of unified beam update.

FIG. 25 shows an example of unified beam update. The wireless device may receive a first activation command (e.g., DCI, MAC-CE, TCI States Activation/Deactivation for UE-specific MAC CE, Activation command 1 at time T1 in FIG. 25) indicating activation of a first subset of the plurality of TCI states. The first activation command may activate/select/indicate/update the first subset of the plurality of TCI states. The first subset of the plurality of TCI states may comprise/be, for example, one or more TCI states of the plurality of TCI states. The first subset of the plurality of TCI states may comprise/be, for example, a first plurality of TCI states of the plurality of TCI states. For example, in FIG. 25, the first subset of the plurality of TCI states are TCI state 4, TCI state 5, TCI state 26, and TCI state 42.

The first activation command may comprise a field (e.g., CoresetPoolID) with a first coreset pool index/indicator/identifier (e.g., Coreset pool index 0 in FIG. 25). A value in/of the field may be equal to the first coreset pool index. The first coreset pool index may be, for example, equal to zero. The first subset of the plurality of TCI states may be associated with the first coreset pool index. The first subset of the plurality of TCI states may be associated with the first coreset pool index, for example, based on the first activation command indicating activation of the first subset of the plurality of TCI states comprising the field with the first coreset pool index. The wireless device may activate the first subset of the plurality of TCI states for the first coreset pool index.

The wireless device may map the first subset of the plurality of TCI states to one or more first TCI codepoints (e.g., 000, 001, . . . , 110, and 011 in TCI Codepoint at time T1 in FIG. 25). The one or more first TCI codepoints may be associated with the first coreset pool index. The discussion on the subset of the plurality of TCI states in FIG. 17 is also applicable for the first subset of the plurality of TCI states.

A number of the one or more first TCI codepoints may be equal to one. The one or more first TCI codepoints may be a (single) TCI codepoint. The (single) TCI codepoint may indicate a first TCI state of the plurality of TCI states. The first subset of the plurality of TCI states may be the first TCI state. The wireless device may not receive DCI indicating activation of one or more TCI states among the first TCI state, for example, based on the number of the one or more first TCI codepoints being equal to one. The wireless device may not receive DCI indicating activation of one or more TCI states among the first TCI state, for example, based on the first activation command indicating activation of the first TCI state.

A number of the one or more first TCI codepoints may be greater than one. The wireless device may receive, via a first coreset (e.g., Coreset 1 in FIG. 25) with the first coreset pool index (e.g., Coreset pool index 0), a first DCI (e.g., DCI 1 at time T2 in FIG. 25). The first DCI may be, for example, DCI format 1_1. The first DCI may be, for example, DCI format 1_2. The first DCI may be, for example, DCI format 1_x, where x=0, 1, 2 . . . . The first DCI may be, for example, DCI format 0_x, where x=0, 1, 2 . . . . The plurality of coresets may comprise the first coreset. The one or more configuration parameters may indicate, for the first coreset, the first coreset pool index.

The first DCI may comprise a TCI field. The TCI field may indicate a TCI codepoint in/of the one or more first TCI codepoints. The TCI field may indicate the TCI codepoint of the one or more first TCI codepoints associated with the first coreset pool index, for example, based on the receiving the first DCI via the first coreset with the first coreset pool index. A value of the TCI field (e.g., 110 in FIG. 25) may be, for example, equal to the TCI codepoint. The value of the TCI field may be, for example, indicate the TCI codepoint. The TCI codepoint (e.g., 110) may indicate/comprise a first TCI state (e.g., TCI state 26 in FIG. 25). The first subset of the plurality of TCI states may comprise the first TCI state. The first DCI may indicate activation of (or may activate) the first TCI state. The first DCI may indicate activation of the first TCI state. The TCI field in/of the first DCI may indicate the first TCI state in the first subset of the plurality of TCI states, for example, based on the receiving the first DCI via the first coreset with the first coreset pool index. The TCI field in/of the first DCI may indicate the first TCI state in the first subset of the plurality of TCI states, for example, based on the first activation command, that indicates activation of the first subset of the plurality of TCI states, comprising the field with the first coreset pool index (that is the same as that of the first coreset).

The discussion on the first TCI state (e.g., TCI state 26) in FIG. 17 is also applicable for the first TCI state (e.g., TCI state 26) in FIG. 25. The discussion on beam application time of the at least two TCI states in FIG. 17 is also applicable for beam application time of the first TCI state in FIG. 25.

The first TCI state may be associated with downlink/uplink receptions/transmissions associated with the first coreset pool index. The first TCI state may be associated with the downlink/uplink receptions/transmissions associated with the first coreset pool index, for example, based on the receiving, via the first coreset with the first coreset pool index, the first DCI indicating activation of the first TCI state.

The wireless device may use/apply the first TCI state for/to downlink receptions (e.g., PDSCH receptions, transport block, PDCCH receptions, CSI-RS, DM-RS, and/or the like) associated with the first coreset pool index. For example, the one or more configuration parameters may indicate, for a coreset of the plurality of coresets, the first coreset pool index. The wireless device may monitor downlink control channels in the coreset based on the first TCI state, for example, based on (e.g., in response to) the one or more configuration parameters indicating, for the coreset, the first coreset pool index. For example, the wireless device may receive, via a coreset with the first coreset pool index, DCI scheduling a downlink signal (e.g., PDSCH transmission, transport block, DM-RS, CSI-RS, aperiodic CSI-RS, and/or the like). The plurality of coresets may comprise the coreset. The downlink signal may be associated with the first coreset pool index, for example, based on the receiving the DCI via the coreset with the first coreset pool index. The wireless device may receive the downlink signal based on the first TCI state, for example, based on (e.g., in response to) the downlink signal being associated with the first coreset pool index. For example, the wireless device may receive a downlink signal (e.g., PDSCH transmission, transport block, DM-RS, CSI-RS, aperiodic CSI-RS, and/or the like) based on the first TCI state, for example, based on (e.g., in response to) the one or more configuration parameters indicating, for the downlink signal (or a resource set comprising the downlink signal), the first coreset pool index.

The wireless device may use/apply the first TCI state for/to uplink transmissions (e.g., PUSCH transmissions, transport block, PUCCH transmissions, SRS, and/or the like) associated with the first coreset pool index. The one or more configuration parameters may indicate, for an uplink resource (or an uplink resource group/set comprising an uplink resource), the first coreset pool index. The wireless device may send (e.g., transmit), via the uplink resource, an uplink signal (e.g., UCI, HARQ-ACK, SR, CSI report, SRS, and/or the like) based on the first TCI state, for example, based on (e.g., in response to) the one or more configuration parameters indicating, for the uplink resource (or the uplink resource group/set comprising the uplink resource), the first coreset pool index. The (active) uplink BWP of the cell may comprise the uplink resource. The uplink resource may be, for example, a PUCCH resource. The uplink signal may be a UCI (e.g., UCI, HARQ-ACK, SR, CSI report). The uplink resource may be, for example, an SRS resource. The uplink signal may be an SRS. Transmission of the uplink signal via the uplink resource may be associated with the first coreset pool index, for example, based on the one or more configuration parameters indicating, for the uplink resource (or the uplink resource group/set comprising the uplink resource), the first coreset pool index.

The wireless device may receive, via a coreset with the first coreset pool index, DCI triggering/scheduling transmission of an uplink signal (e.g., PUSCH transmission, transport block, SRS, HARQ-ACK, and/or the like). The plurality of coresets may comprise the coreset. The uplink signal may be associated with the first coreset pool index, for example, based on the receiving the DCI via the coreset with the first coreset pool index. The wireless device may send (e.g., transmit) the uplink signal based on the first TCI state, for example, based on (e.g., in response to) the uplink signal being associated with the first coreset pool index.

The wireless device may receive a second activation command (e.g., DCI, MAC-CE, TCI States Activation/Deactivation for UE-specific MAC CE, Activation command 2 at time T3 in FIG. 25) indicating activation of a second subset of the plurality of TCI states. The second activation command may activate/select/indicate/update the second subset of the plurality of TCI states. The second subset of the plurality of TCI states may comprise/be, for example, one or more TCI states of the plurality of TCI states. The second subset of the plurality of TCI states may comprise/be, for example, a second plurality of TCI states of the plurality of TCI states. For example, in FIG. 25, the second subset of the plurality of TCI states are TCI state 8, TCI state 61, and TCI state 21.

The second activation command may comprise a field (e.g., CoresetPoolID) with a second coreset pool index/indicator/identifier (e.g., Coreset pool index 1 in FIG. 25). A value in/of the field may be equal to the second coreset pool index. The second coreset pool index may be, for example, equal to one. The second subset of the plurality of TCI states may be associated with the second coreset pool index. The second subset of the plurality of TCI states may be associated with the second coreset pool index, for example, based on the second activation command indicating activation of the second subset of the plurality of TCI states comprising the field with the second coreset pool index. The wireless device may activate the second subset of the plurality of TCI states for the second coreset pool index.

The wireless device may map the second subset of the plurality of TCI states to one or more second TCI codepoints (e.g., 000, 001, . . . , and 110 in TCI Codepoint at time T3 in FIG. 25). The one or more second TCI codepoints may be associated with the second coreset pool index. The discussion on the subset of the plurality of TCI states in FIG. 17 is also applicable for the second subset of the plurality of TCI states.

A number of the one or more second TCI codepoints may be equal to one. The one or more second TCI codepoints may be a (single) TCI codepoint. The (single) TCI codepoint may indicate a second TCI state of the plurality of TCI states. The second subset of the plurality of TCI states may be the second TCI state. The wireless device may not receive DCI indicating activation of one or more TCI states among the second TCI state, for example, based on the number of the one or more second TCI codepoints being equal to one. The wireless device may not receive DCI indicating activation of one or more TCI states among the second TCI state, for example, based on the second activation command indicating activation of the second TCI state.

A number/quantity of the one or more second TCI codepoints may be greater than one. The wireless device may receive, via a second coreset (e.g., Coreset 2 in FIG. 25) with the second coreset pool index (e.g., Coreset pool index 1), a second DCI (e.g., DCI 2 at time T4 in FIG. 25). The second DCI may be, for example, DCI format 1_1. The second DCI may be, for example, DCI format 1_2. The second DCI may be, for example, DCI format 1_x, where x=0, 1, 2 . . . . The second DCI may be, for example, DCI format 0_x, where x=0, 1, 2 . . . . The plurality of coresets may comprise the second coreset. The one or more configuration parameters may indicate, for the second coreset, the second coreset pool index.

The second DCI may comprise a TCI field. The TCI field may indicate a TCI codepoint in/of the one or more second TCI codepoints. The TCI field may indicate the TCI codepoint of the one or more second TCI codepoints associated with the second coreset pool index, for example, based on the receiving the second DCI via the second coreset with the second coreset pool index. A value of the TCI field (e.g., 001 in FIG. 25) may be, for example, equal to the TCI codepoint. The value of the TCI field may be, for example, indicate the TCI codepoint. The TCI codepoint (e.g., 001) may indicate/comprise a second TCI state (e.g., TCI state 61 in FIG. 25). The second subset of the plurality of TCI states may comprise the second TCI state. The second DCI may indicate activation of (or may activate) the second TCI state. The second DCI may indicate activation of the second TCI state. The TCI field in/of the second DCI may indicate the second TCI state in the second subset of the plurality of TCI states, for example, based on the receiving the second DCI via the second coreset with the second coreset pool index. The TCI field in/of the second DCI may indicate the second TCI state in the second subset of the plurality of TCI states, for example, based on the second activation command, that indicates activation of the second subset of the plurality of TCI states, comprising the field with the second coreset pool index (that is the same as that of the second coreset).

The discussion on the second TCI state (e.g., TCI state 61) in FIG. 17 is also applicable for the second TCI state (e.g., TCI state 61) in FIG. 25. The discussion on beam application time of the at least two TCI states in FIG. 17 is also applicable for beam application time of the second TCI state in FIG. 25.

The second TCI state may be associated with downlink/uplink receptions/transmissions associated with the second coreset pool index. The second TCI state may be associated with the downlink/uplink receptions/transmissions associated with the second coreset pool index, for example, based on the receiving, via the second coreset with the second coreset pool index, the second DCI indicating activation of the second TCI state.

The wireless device may use/apply the second TCI state for/to downlink receptions (e.g., PDSCH receptions, transport block, PDCCH receptions, CSI-RS, DM-RS, and/or the like) associated with the second coreset pool index. For example, the one or more configuration parameters may indicate, for a coreset of the plurality of coresets, the second coreset pool index. The wireless device may monitor downlink control channels in the coreset based on the second TCI state, for example, based on (e.g., in response to) the one or more configuration parameters indicating, for the coreset, the second coreset pool index. For example, the wireless device may receive, via a coreset with the second coreset pool index, DCI scheduling a downlink signal (e.g., PDSCH transmission, transport block, DM-RS, CSI-RS, aperiodic CSI-RS). The plurality of coresets may comprise the coreset. The downlink signal may be associated with the second coreset pool index, for example, based on the receiving the DCI via the coreset with the second coreset pool index. The wireless device may receive the downlink signal based on the second TCI state, for example, based on (e.g., in response to) the downlink signal being associated with the second coreset pool index. For example, the wireless device may receive a downlink signal (e.g., PDSCH transmission, transport block, DM-RS, CSI-RS, aperiodic CSI-RS, and/or the like) based on the second TCI state, for example, based on (e.g., in response to) the one or more configuration parameters indicating, for the downlink signal (or a resource set comprising the downlink signal), the second coreset pool index.

The wireless device may use/apply the second TCI state for/to uplink transmissions (e.g., PUSCH transmissions, transport block, PUCCH transmissions, SRS, and/or the like) associated with the second coreset pool index. For example, the one or more configuration parameters may indicate, for an uplink resource (or an uplink resource group/set comprising an uplink resource, the second coreset pool index. The wireless device may send (e.g., transmit), via the uplink resource, an uplink signal (e.g., UCI, HARQ-ACK, SR, CSI report, SRS, and/or the like) based on the second TCI state, for example, based on (e.g., in response to) the one or more configuration parameters indicating, for the uplink resource (or the uplink resource group/set comprising the uplink resource), the second coreset pool index. The (active) uplink BWP of the cell may comprise the uplink resource. The uplink resource may be, for example, a PUCCH resource. The uplink signal may be a UCI (e.g., UCI, HARQ-ACK, SR, CSI report, and/or the like). The uplink resource may be, for example, an SRS resource. The uplink signal may be an SRS. Transmission of the uplink signal via the uplink resource may be associated with the second coreset pool index, for example, based on the one or more configuration parameters indicating, for the uplink resource (or the uplink resource group/set comprising the uplink resource), the second coreset pool index.

For example, the wireless device may receive, via a coreset with the second coreset pool index, DCI triggering/scheduling transmission of an uplink signal (e.g., PUSCH transmission, transport block, SRS, HARQ-ACK, and/or the like). The plurality of coresets may comprise the coreset. The uplink signal may be associated with the second coreset pool index, for example, based on the receiving the DCI via the coreset with the second coreset pool index. The wireless device may send (e.g., transmit) the uplink signal based on the second TCI state, for example, based on (e.g., in response to) the uplink signal being associated with the second coreset pool index.

The wireless device may receive, via a coreset with a coreset pool index, DCI scheduling transmission of a downlink signal (e.g., transport block, PDSCH transmission, CSI-RS, reference signal, and/or the like). The plurality of coresets may comprise the coreset. The DCI may comprise a TCI field. For example, the wireless device may receive the downlink signal based on a TCI state in the first subset of the plurality of TCI states, for example, based on (e.g., in response to) the coreset pool index of the coreset being equal to the first coreset pool index. The TCI field may indicate (be equal to) a TCI codepoint, of the one or more first TCI codepoints, indicating the TCI state. For example, the wireless device may receive the downlink signal based on a TCI state in the second subset of the plurality of TCI states, for example, based on (e.g., in response to) the coreset pool index of the coreset being equal to the second coreset pool index. The TCI field may indicate (be equal to) a TCI codepoint, of the one or more second TCI codepoints, indicating the TCI state.

At least two TCI states may be active for the cell (or for the downlink BWP of the cell and/or for the uplink BWP of the cell). The first TCI state (e.g., TCI state 26) of the at least two TCI states may be associated with the first coreset pool index. The second TCI state (e.g., TCI state 61) of the at least two TCI states may be associated with the second coreset pool index.

The first TCI state (e.g., TCI state 26) may be identified/indicated by a first TCI state index. The second TCI state (e.g., TCI state 61) may be identified/indicated by a second TCI state index. The plurality of TCI state indexes may comprise the first TCI state index. The plurality of TCI state indexes may comprise the second TCI state index.

Figure 26:
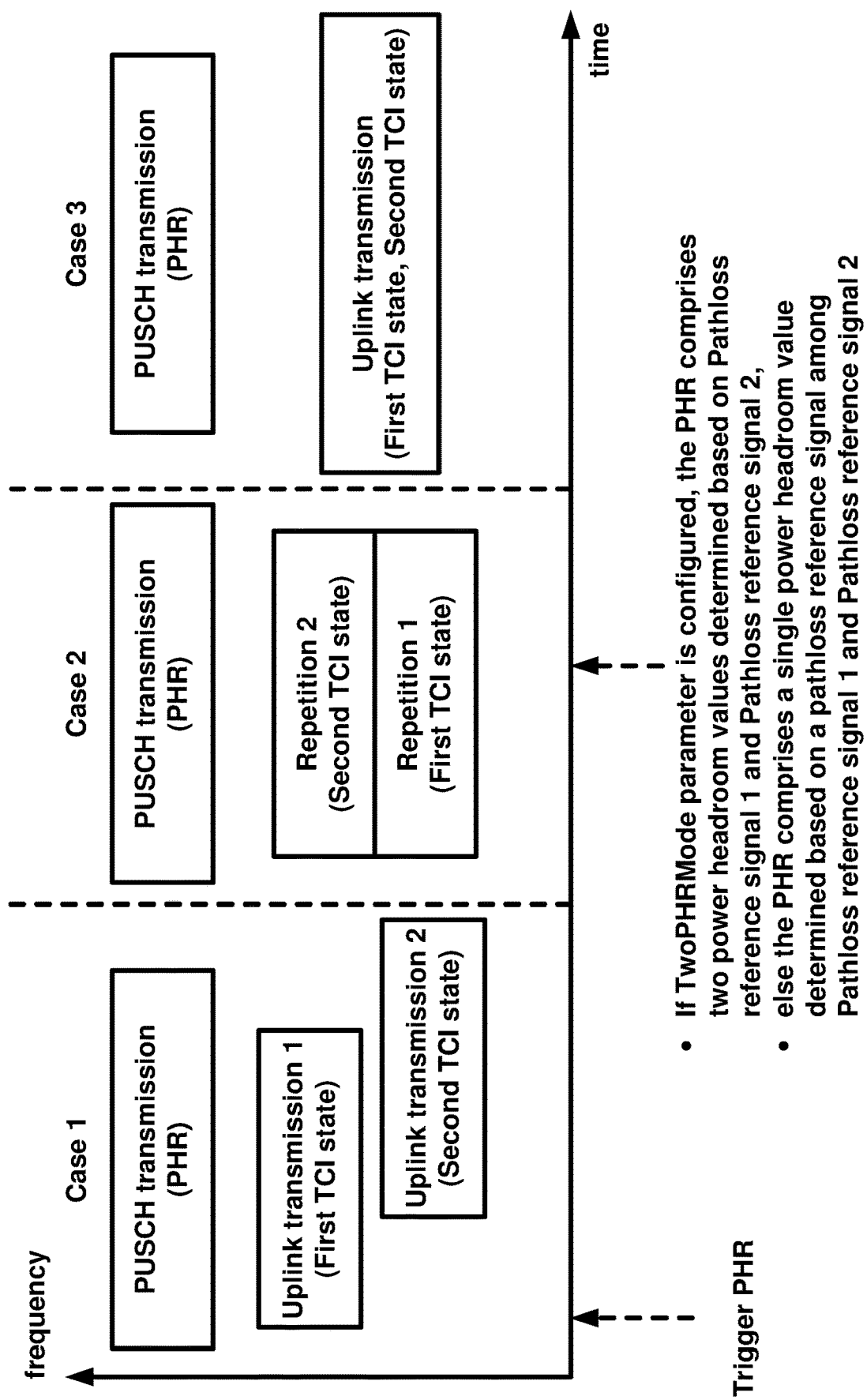
FIG. 26 shows an example of power headroom report (PHR).

FIG. 26 shows an example of power headroom report (PHR). The wireless device may trigger a PHR. The wireless device may trigger the PHR, for example, for the cell. The wireless device may trigger the PHR, for example, for a TRP. The wireless device may trigger the PHR, for example, for a non-serving cell (with a PCI that is different from a PCI of the serving cell). The plurality of cells may comprise the non-serving cell.

The wireless device may trigger the PHR, for example, based on an expiry of a timer (e.g., phr-PeriodicTimer, phr-ProhibitTimer). The one or more configuration parameters may indicate the timer. The timer may be the same or different for the cell and for the non-serving cell.

The wireless device may trigger the PHR, for example, based on a (quality or pathloss) change in/of a pathloss reference signal being more (or greater) than a threshold (e.g., phr-Tx-PowerFactorChange). The one or more configuration parameters may indicate the threshold. The one or more configuration parameters may indicate the pathloss reference signal. The threshold may be the same or different for the cell and for the non-serving cell. The wireless device may trigger the PHR, for example, based on receiving one or more second configuration parameters reconfiguring/configuring a power headroom reporting functionality.

The PHR may be, for example, a Type 1 PHR. The PHR may be, for example, a Type 2 PHR. The PHR may be, for example, a Type 3 PHR.

The PHR may indicate a difference between a nominal maximum send (e.g., transmit) power and an estimated power for an uplink transmission via an uplink channel (e.g., PUSCH, PUCCH, SRS). The PHR may be based on an actual uplink transmission. The actual uplink transmission may be an actual PUSCH transmission. The PHR may be based on a virtual/reference uplink transmission. The virtual/reference uplink transmission may be a virtual/reference PUSCH transmission. The PHR may be a PHR MAC CE.

The wireless device may send (e.g., transmit), in a time slot, a PUSCH transmission (e.g., PUSCH transmission in Case 1-Case 3 in FIG. 26) with/comprising/carrying the PHR (e.g., PHR MAC-CE, PHR in Case 1-Case 3 in FIG. 26). The wireless device may, for example, multiplex the PHR in/with the PUSCH transmission.

The wireless device may send (e.g., transmit) the PUSCH transmission, for example, via the cell (or the (active) uplink BWP of the cell or the (active) uplink BWP of an uplink carrier of the cell). The wireless device may send (e.g., transmit) the PUSCH transmission, for example, via a second cell different from the cell (or an (active) uplink BWP of the second cell or an (active) uplink BWP of an uplink carrier of the second cell). The one or more cells may comprise the second cell.

A first uplink transmission may be scheduled/configured on an uplink carrier of the cell. A second uplink transmission may be scheduled/configured on the uplink carrier of the cell. The uplink carrier may be, for example, a supplementary uplink (SUL) carrier. The uplink carrier may be, for example, a non-supplementary (or normal) uplink (NUL) carrier. The first uplink transmission and the second uplink transmission may be scheduled/configured on the (same) uplink carrier of the (same) cell. The first uplink transmission and the second uplink transmission may be scheduled/configured on the (same) uplink carrier of the (same) cell. The first uplink transmission and the second uplink transmission may be scheduled/configured on/via the (same) uplink BWP of the (same) uplink carrier of the (same) cell.

The first uplink transmission and the second uplink transmission may overlap in time (e.g., in at least one symbol, in at least one mini-slot, in at least one time slot). The first uplink transmission and the second uplink transmission may overlap in a transmission occasion. The first uplink transmission and the second uplink transmission may or may not overlap in frequency.

The wireless device may, for example, receive a first DCI scheduling/triggering/activating the first uplink transmission (e.g., dynamic transmission). The one or more configuration parameters may, for example, schedule/indicate/configure the first uplink transmission (e.g., configured uplink grant, periodic/semi-persistent PUCCH/PUSCH/SRS transmissions).

The wireless device may, for example, receive a second DCI scheduling/triggering/activating the second uplink transmission (e.g., dynamic transmission). The one or more configuration parameters may, for example, schedule/indicate/configure the second uplink transmission (e.g., configured uplink grant, periodic/semi-persistent PUCCH/PUSCH/SRS transmissions).

The first uplink transmission may be, for example, a first PUSCH transmission. The first uplink transmission may be, for example, a first PUCCH transmission. The first uplink transmission may be, for example, a first SRS transmission.

The second uplink transmission may be, for example, a second PUSCH transmission. The second uplink transmission may be, for example, a second PUCCH transmission. The second uplink transmission may be, for example, a second SRS transmission.

The first uplink transmission (e.g., Uplink transmission 1 in FIG. 26) and the second uplink transmission (e.g., Uplink transmission 2 in FIG. 26) may be different (Case 1 in FIG. 26). The first DCI scheduling/triggering/activating the first uplink transmission and the second DCI scheduling/triggering/activating the second uplink transmission may be, for example, different.

The first uplink transmission (e.g., Repetition 1 in Case 2 in FIG. 26) and the second uplink transmission (e.g., Repetition 2 in Case 2 in FIG. 26) may be the same. The first uplink transmission and the second uplink transmission may be repetitions of an uplink signal/transmission (Case 2 in FIG. 26). The first uplink transmission may be a first repetition of the uplink signal/transmission (e.g., PUSCH transmission, transport block, UCI, PUCCH transmission, SRS, and/or the like). The second uplink transmission may be a second repetition of the uplink signal/transmission (e.g., PUSCH transmission, transport block, UCI, PUCCH transmission, SRS, and/or the like). The first uplink transmission and the second uplink transmission may be repetitions of the uplink signal/transmission in frequency domain (e.g., FDM in FIG. 18). The one or more configuration parameters may indicate a repetition scheme to set to a frequency domain repetition (e.g., FDM). The first DCI and the second DCI may be, for example, the same (or a single DCI). The first DCI may schedule/trigger/activate the first repetition of the uplink signal and the second repetition of the uplink signal. The repetitions of the uplink signal/transmission may comprise the first repetition of the uplink signal/transmission and the second repetition of the uplink signal/transmission.

The one or more configuration parameters may indicate a repetition scheme. The repetition scheme may be (or set to) a frequency domain repetition (or frequency-domain-multiplexing (FDM) repetition). The repetitions of the uplink signal/transmission may be in a frequency domain. The repetitions of the uplink signal/transmission (Case 2 in FIG. 26) may be in the frequency domain, for example, based on the one or more configuration parameters indicating the repetition scheme that is (set to) the frequency domain repetition. The repetitions of the uplink signal/transmission may comprise the first repetition of the uplink signal/transmission (e.g., Repetition 1 in FIG. 26) and the second repetition of the uplink signal/transmission (Repetition 2 in FIG. 26). The first repetition and the second repetition may overlap in time (e.g., in at least one symbol, fully in time, partially in time). A starting symbol of the first repetition and a starting symbol of the second repetition may be, for example, the same. An ending symbol of the first repetition and an ending symbol of the second repetition may be, for example, the same. The first repetition and the second repetition may not overlap in frequency. The first repetition and the second repetition may be in different frequencies (or different RBs or different PRBs). The first repetition and the second repetition may not overlap in at least one RB (or PRB).

The first uplink transmission and the second uplink transmission may be different. The first uplink transmission may be a first portion of an uplink signal/transmission (e.g., PUSCH transmission, transport block, UCI, PUCCH transmission, SRS, Uplink transmission in Case 3 in FIG. 26). The second uplink transmission may be a second portion of the uplink transmission (Uplink transmission in Case 3 in FIG. 26). The first DCI and the second DCI may be, for example, the same (or a single DCI). The first DCI may schedule/trigger/activate the first uplink transmission and the second uplink transmission. The first DCI may schedule/trigger/activate transmission of the uplink transmission (e.g., Uplink transmission in Case 3 in FIG. 26). The first DCI may schedule/trigger/activate transmission of the first portion of the uplink transmission and the second portion of the uplink transmission.

The first portion may comprise/be one or more first layers (data streams) of the uplink transmission. The second portion may comprise/be one or more second layers (data streams) of the uplink transmission.

The first portion may comprise/be one or more first DM-RS antenna ports of the uplink transmission. The second portion may comprise/be one or more second DM-RS antenna ports of the uplink transmission.

The first uplink transmission and the second uplink transmission may be the same (Uplink transmission in Case 3 in FIG. 26). The first DCI and the second DCI may be, for example, the same (or a single DCI). The first DCI may schedule/trigger/activate the first uplink transmission and the second uplink transmission. The first DCI may schedule/trigger/activate transmission of the uplink transmission. The first uplink transmission and the second uplink transmission may be repetitions of the uplink transmission in spatial domain (e.g., SDM/SFN in FIG. 18). The one or more configuration parameters may indicate a repetition scheme to set to a code/spatial domain repetition (e.g., SDM/SFN). The one or more configuration parameters may, for example, comprise an SFN parameter (e.g., SFN-PUSCH, SFN-PUCCH, SFN-PDSCH) indicating SFN-uplink transmissions. The first uplink transmission and the second uplink transmission may be SFN-ed uplink transmissions. The first uplink transmission and the second uplink transmission may be SFN-ed uplink transmissions of the uplink transmission. The first uplink transmission and the second uplink transmission may be SFN-ed transmission of the uplink transmission.

The first uplink transmission may be associated with the first TCI state (e.g., TCI state 26 in FIG. 17 and FIG. 25, First TCI state in FIG. 26). The wireless device may send (e.g., transmit)/perform the first uplink transmission based on the first TCI state. The wireless device may use/apply the first TCI state for/to the first uplink transmission. The first uplink transmission may be associated with the first TCI state, for example, based on (e.g., in response to) the sending (e.g., transmitting)/performing the first uplink transmission based on the first TCI state.

The wireless device may send (e.g., transmit) the first uplink transmission with a first spatial domain transmission filter/beam that is determined based on a first reference signal indicated by the first TCI state. The first spatial domain transmitting/transmission filter/beam may be, for example, same as (or substantially same as, x degrees apart, x=0, 1, 5, 10, and/or the like) a spatial domain reception/receiving filter/beam used to receive the first reference signal. The first spatial domain transmitting/transmission filter/beam may be, for example, same as (or substantially same as, x degrees apart, x=0, 1, 5, 10, and/or the like) a spatial domain transmission/transmitting filter/beam used to send (e.g., transmit) the first reference signal.

The wireless device may determine/calculate/compute, for the first uplink transmission, a first transmission power based on the first TCI. The wireless device may determine the first transmission power based on one or more first power control parameters (e.g., target received power, closed-loop index, pathloss compensation factor, alpha, pathloss reference signal, and/or the like) indicated by (or included in or associated with or mapped to) the first TCI state. For example, the one or more configuration parameters may indicate/map/associate, for the first TCI state, the one or more first power control parameters. The one or more first power control parameters may comprise/indicate a first pathloss reference signal. The wireless device may send (e.g., transmit) the first uplink transmission with the first transmission power. The first uplink transmission may be associated with the first pathloss reference signal, for example, based on (e.g., in response to) sending (e.g., transmitting) the first uplink transmission based on the first TCI state associated with the first pathloss reference signal.

The second uplink transmission may be associated with the second TCI state (e.g., TCI state 61 in FIG. 17 and FIG. 25, Second TCI state in FIG. 26). The wireless device may send (e.g., transmit)/perform the second uplink transmission based on the second TCI state. The wireless device may use/apply the second TCI state for/to the second uplink transmission. The second uplink transmission may be associated with the second TCI state, for example, based on (e.g., in response to) the sending (e.g., transmitting)/performing the second uplink transmission based on the second TCI state.

The wireless device may send (e.g., transmit) the second uplink transmission with a second spatial domain transmission filter/beam that is determined based on a second reference signal indicated by the second TCI state. The second spatial domain transmitting/transmission filter/beam may be, for example, same as (or substantially same as, x degrees apart, x=0, 1, 5, 10, and/or the like) a spatial domain reception/receiving filter/beam used to receive the second reference signal. The second spatial domain transmitting/transmission filter/beam may be, for example, same as (or substantially same as, x degrees apart, x=0, 1, 5, 10, and/or the like) a spatial domain transmission/transmitting filter/beam used to send (e.g., transmit) the second reference signal.

The wireless device may determine/calculate/compute, for the second uplink transmission, a second transmission power based on the second TCI. The wireless device may determine the second transmission power based on one or more second power control parameters (e.g., target received power, closed-loop index, pathloss compensation factor, alpha, pathloss reference signal, and/or the like) indicated by (or included in or associated with or mapped to) the second TCI state. For example, the one or more configuration parameters may indicate/map/associate, for the second TCI state, the one or more second power control parameters. The one or more second power control parameters may comprise/indicate a second pathloss reference signal. The wireless device may send (e.g., transmit) the second uplink transmission with the second transmission power. The second uplink transmission may be associated with the second pathloss reference signal, for example, based on (e.g., in response to) sending (e.g., transmitting) the second uplink transmission based on the second TCI state associated with the second pathloss reference signal.

The PUSCH transmission with the PHR may overlap in time with the first uplink transmission and the second uplink transmission. The PUSCH transmission with the PHR may overlap with the first uplink transmission and the second uplink transmission, for example, in the time slot that the wireless device sends (e.g., transmits) the PUSCH transmission with the PHR. The time slot may be a first/earliest/ initial/starting time slot, among one or more time slots of the PUSCH transmission, that overlaps with the first uplink transmission and the second uplink transmission. The wireless device may send (e.g., transmit), via/in the one or more time slots, the PUSCH transmission. The one or more time slots may comprise the time slot.

In Case 1 of FIG. 26, the PUSCH transmission with the PHR may overlap in time with the first uplink transmission (e.g., Uplink transmission 1) and the second uplink transmission (e.g., Uplink transmission 2).

In Case 2 of FIG. 26, the PUSCH transmission with the PHR may overlap in time with the first repetition of the uplink signal/transmission (e.g., Repetition 1) and the second repetition of the uplink signal/transmission (e.g., Repetition 2). The PUSCH transmission with the PHR overlapping in time with the first uplink transmission and the second uplink transmission may comprise the PUSCH transmission with the PHR overlapping in time with the first repetition of the uplink signal/transmission and the second repetition of the uplink signal/transmission.

In Case 3 of FIG. 26, the PUSCH transmission with the PHR may overlap in time with the uplink transmission (e.g., Uplink transmission). The PUSCH transmission with the PHR may overlap in time with the first portion of the uplink transmission and the second portion of the uplink transmission. The PUSCH transmission with the PHR may overlap in time with the uplink transmission associated with the first TCI state and the uplink transmission associated with the second TCI state (e.g., SFN Scheme, SDM/SFN repetitions). The PUSCH transmission with the PHR may overlap in time with the uplink transmission associated with the first TCI state and the second TCI state (e.g., SFN Scheme, SDM/ SFN repetitions). The PUSCH transmission with the PHR overlapping in time with the first uplink transmission and the second uplink transmission may comprise the PUSCH transmission with the PHR overlapping in time with the first portion of the uplink transmission and the second portion of the uplink transmission. The PUSCH transmission with the PHR overlapping in time with the first uplink transmission and the second uplink transmission may comprise the PUSCH transmission with the PHR overlapping in time with the uplink transmission associated with the first TCI state and the uplink transmission associated with the second TCI state. The PUSCH transmission with the PHR overlapping in time with the first uplink transmission and the second uplink transmission may comprise the PUSCH transmission with the PHR overlapping in time with the uplink transmission associated with the first TCI state and the second TCI state.

The first DCI scheduling the first uplink transmission and the second uplink transmission (e.g., in Case 2 and Case 3 in FIG. 26) may be, for example, DCI format 0_1. The first DCI may be, for example, DCI format 0_2. The first DCI may be, for example, DCI format 0_x, x=0, 1, 2, 3, . . . . The first DCI scheduling the first uplink transmission (e.g., in Case 1 in FIG. 26) may be, for example, DCI format 0_1. The first DCI may be, for example, DCI format 0_2. The first DCI may be, for example, DCI format 0_x, x=0, 1, 2, 3, . . . . The second DCI scheduling the second uplink transmission (e.g., in Case 1 in FIG. 26) may be, for example, DCI format 0_1. The second DCI may be, for example, DCI format 0_2. The second DCI may be, for example, DCI format 0_x, x=0, 1, 2, 3, . . . .

The first DCI scheduling the first uplink transmission and the second uplink transmission (e.g., in Case 2 and Case 3 in FIG. 26) may comprise a field (e.g., SRS resource set indicator, TCI field, Unified TCI state(s) field, TRP indicator field(s), and/or the like). The field may indicate, for example, a multi-TRP uplink repetition (e.g., multi-TRP PUSCH repetition, multi-TRP PUCCH repetition, SFN-based PUSCH/PUCCH transmission, and/or the like). A value of the field may indicate the multi-TRP uplink repetition. A size/length of the field may be, for example, two bits (or any other quantity of bits). For example, the value of the field (e.g., SRS resource set indicator) may be equal to '10' (or any other value). For example, the value of the field (e.g., SRS resource set indicator) may be equal to '11' (or any other value). A size/length of the field may be, for example, one bit. For example, the value of the field (e.g., SRS resource set indicator) may be equal to '1' (or '0').

The first DCI may be a first/earliest/starting DCI that the wireless device receives/detects, for example, after the PHR was triggered. The first DCI may be a first/earliest/starting DCI that the wireless device receives/detects, for example, after the triggering of the PHR. The wireless device may trigger the PHR, for example, before (or prior to) the receiving/detecting the first DCI.

For example, the wireless device may send (e.g., transmit) the first uplink transmission in a first transmission occasion. The wireless device may send (e.g., transmit) the second uplink transmission in a second transmission occasion. The first transmission occasion and the second transmission occasion may be, for example, different (e.g., Case 1 and Case 2 in FIG. 26). The first transmission occasion and the second transmission occasion may be, for example, the same (e.g., Case 3 in FIG. 26).

The first uplink transmission and the second uplink transmission may be associated with the at least two SRS resource sets. The first uplink transmission may be associated with the first SRS resource set of the at least two SRS resource sets. The second uplink transmission may be associated with the second SRS resource set of the at least two SRS resource sets. The first uplink transmission and the second uplink transmission may be associated with the at least two SRS resource sets, for example, based on the value of the field (e.g., SRS resource set indicator) being equal to '10' (or any other value). The first uplink transmission and the second uplink transmission may be associated with the at least two SRS resource sets, for example, based on the value of the field (e.g., SRS resource set indicator) being equal to '11' (or any other value). The first uplink transmission and the second uplink transmission may be associated with the at least two SRS resource sets, for example, based on the value of the field (e.g., SRS resource set indicator) indicating the multi-TRP uplink repetition.

The one or more configuration parameters may comprise a two-PHR-Mode parameter. The two-PHR-Mode parameter may be (set to) enabled. The two-PHR-Mode parameter may be present in the one or more configuration parameters.

The two-PHR-Mode parameter may indicate calculating/ determining (or reporting of) two power headroom values/ levels/quantities. The two power headroom values/levels/ quantities may be associated with (or for) the cell (or the uplink carrier of the cell or for the (same) uplink carrier of the (same) cell). A first power headroom value of the two power headroom values may be for a first TRP. A second power headroom value of the two power headroom values may be for a second TRP. The first power headroom value of the two power headroom values may be associated with the first SRS resource set. The second power headroom value of the two power headroom values may be associated with the second SRS resource set. The two-PHR-Mode parameter may be used/applicable for time domain repetitions (e.g., TDM in FIG. 18). The two-PHR-Mode parameter may be, for example, used/applicable for frequency domain repetitions (e.g., FDM in FIG. 18). The two-PHR-Mode parameter may not be, for example, used/applicable for frequency domain repetitions (e.g., FDM in FIG. 18).

The wireless device may send (e.g., transmit) a capability message (e.g., UE capability message). The capability message may indicate, for example, support of calculating/determining (or reporting of) two power headroom values/levels/quantities. The capability message may indicate, for example, support of calculating/determining (or reporting of) the two power headroom values/levels/quantities for the cell (or for the uplink carrier of the cell or for the (same) uplink carrier of the (same) cell). The capability message may indicate, for example, support of calculating/determining/reporting two power headroom values/levels/quantities based on two pathloss reference signals. Each power headroom value of the two power headroom values/levels/quantities may be determined/calculated, by the wireless device, based a respective pathloss reference signal of the two pathloss reference signals. The one or more configuration parameters may comprise the two-PHR-Mode parameter (or the two-PHR-Mode parameter set to enabled), for example, based on the UE capability message indicating support of calculating/determining (or reporting of) the two power headroom values/levels/quantities.

The one or more configuration parameters may comprise a two-PHR-FDM-Mode parameter (or a two-PHR-Mode-FDM, and/or the like). The two-PHR-FDM-Mode parameter may be (set to) enabled. The two-PHR-FDM-Mode parameter may be present in the one or more configuration parameters. The two-PHR-FDM-Mode parameter may be, for example, different from the two-PHR-Mode parameter.

The two-PHR-FDM-Mode parameter may indicate calculating/determining (or reporting of) two power headroom values/levels/quantities. The two power headroom values/levels/quantities may be, for example, associated with (or for) the cell (or the uplink carrier of the cell or for the (same) uplink carrier of the (same) cell). A first power headroom value of the two power headroom values may be for a first TRP. A second power headroom value of the two power headroom values may be for a second TRP. The first power headroom value of the two power headroom values may be associated with the first SRS resource set. The second power headroom value of the two power headroom values may be associated with the second SRS resource set. The two-PHR-FDM-Mode parameter may be, for example, used/applicable for frequency domain repetitions (e.g., FDM in FIG. 18, Repetition 1 and Repetition 2 in Case 2 in FIG. 26). The two-PHR-FDM-Mode parameter may be, for example, used/applicable for uplink transmission associated with at least two TCI states frequency domain repetitions (e.g., Uplink transmission in Case 3 in FIG. 26). The two-PHR-FDM-Mode parameter may be, for example, used/applicable for simultaneous/overlapped uplink transmissions in the same cell (e.g., Uplink transmission 1 and Uplink transmission 2 in Case 1 in FIG. 26).

The wireless device may send (e.g., transmit) a capability message (e.g., UE capability message). The capability message may indicate, for example, support of calculating/determining (or reporting of) two power headroom values/levels/quantities. The capability message may indicate, for example, support of calculating/determining (or reporting of) the two power headroom values/levels/quantities for the cell (or for the uplink carrier of the cell or for the (same) uplink carrier of the (same) cell). The capability message may indicate, for example, support of calculating/determining/reporting two power headroom values/levels/quantities based on two pathloss reference signals. The capability message may indicate, for example, support of calculating/determining/reporting two power headroom values/levels/quantities based on two overlapping uplink transmissions (e.g., within the same uplink carrier of the same cell). Each power headroom value of the two power headroom values/levels/quantities may be determined/calculated, by the wireless device, based a respective pathloss reference signal of the two pathloss reference signals. The one or more configuration parameters may comprise the two-PHR-FDM-Mode parameter (or the two-PHR-FDM-Mode parameter set to enabled), for example, based on the capability message indicating support of calculating/determining/reporting the two power headroom values/levels/quantities.

The one or more configuration parameters may not comprise a two-PHR-Mode parameter. The one or more configuration parameters may not comprise the two-PHR-Mode parameter set to enabled. The two-PHR-Mode parameter may not be present (or may be absent) in the one or more configuration parameters.

The wireless device may send (e.g., transmit) a capability message (e.g., a UE capability message). The capability message may not indicate, for example, support of calculating/determining (or reporting of) two power headroom values/levels/quantities. The one or more configuration parameters may not comprise the two-PHR-Mode parameter (or the two-PHR-Mode parameter set to enabled), for example, based on the capability message not indicating support of calculating/determining/reporting two power headroom values/levels/quantities.

The one or more configuration parameters may not comprise a two-PHR-FDM-Mode parameter. The one or more configuration parameters may not comprise the two-PHR-FDM-Mode parameter set to enabled. The two-PHR-FDM-Mode parameter may not be present (or may be absent) in the one or more configuration parameters.

The wireless device may send (e.g., transmit) a capability message (e.g., UE capability message). The capability message may not indicate, for example, support of calculating/determining/reporting two power headroom values/levels/quantities. The one or more configuration parameters may not comprise the two-PHR-FDM-Mode parameter (or the two-PHR-FDM-Mode parameter set to enabled), for example, based on the capability message not indicating support of calculating/determining/reporting two power headroom values/levels/quantities.

The first uplink transmission may be associated with the first SRS resource set of the at least two SRS resource sets. The wireless device may send (e.g., transmit) the first uplink transmission, for example, based on the first SRS resource set. The wireless device may send (e.g., transmit) the first uplink transmission, for example, based on a first SRS resource in the first SRS resource set. The one or more configuration parameters may indicate, for the first SRS resource, a first number of SRS ports (e.g., nrofSRS-Ports). The wireless device may send (e.g., transmit) the first uplink transmission, for example, based on the first number of SRS ports of the first SRS resource in the first SRS resource set.

For example, the wireless device may send (e.g., transmit) the first uplink transmission with a first transmission precoder that is determined based on the first number of SRS ports.

The second uplink transmission may be associated with the second SRS resource set of the at least two SRS resource sets. The wireless device may send (e.g., transmit) the second uplink transmission, for example, based on the second SRS resource set. The wireless device may send (e.g., transmit) the second uplink transmission, for example, based on a second SRS resource in the second SRS resource set. The one or more configuration parameters may indicate, for the second SRS resource, a second number of SRS ports (e.g., nrofSRS-Ports). The wireless device may send (e.g., transmit) the second uplink transmission, for example, based on the second number of SRS ports of the second SRS resource in the second SRS resource set. For example, the wireless device may send (e.g., transmit) the second uplink transmission with a second transmission precoder that is determined based on the second number of SRS ports.

The wireless device may be equipped with a plurality of panels or other communication devices (e.g., antenna panels). The plurality of antenna panels (or communication devices) may comprise a first antenna panel and a second antenna panel. The first antenna panel may be identified/indicated by a first antenna panel index/identifier. The one or more configuration parameters may, for example, indicate the first antenna panel index for the first antenna panel. For example, the wireless device may send (e.g., transmit) an uplink signal (e.g., Beam report, CSI report, UE capability message, PUCCH transmission, and/or the like) indicating the first antenna panel index for the first antenna panel. The second antenna panel may be identified/indicated by a second antenna panel index/identifier. The one or more configuration parameters may, for example, indicate the second antenna panel index for the second antenna panel. For example, the wireless device may send (e.g., transmit) an uplink signal (e.g., Beam report, CSI report, UE capability message, PUCCH transmission, and/or the like) indicating the second antenna panel index for the second antenna panel.

The wireless device may send (e.g., transmit) the uplink transmissions with the antenna panels. The wireless device may send (e.g., transmit) the first uplink transmission with the first antenna panel. The first uplink transmission may be associated with the first antenna panel, for example, based on sending (e.g., transmitting) the first uplink transmission with the first antenna panel. The wireless device may send (e.g., transmit) the second uplink transmission with the second antenna panel. The second uplink transmission may be associated with the second antenna panel, for example, based on sending (e.g., transmitting) the second uplink transmission with the second antenna panel.

A capability message (e.g., UE capability message) may comprise/indicate a list of capability value sets (or a list of wireless device capability value sets or a list of capability value sets of the wireless device). Each capability value set of the list of capability value sets may comprise/indicate a respective maximum number of SRS ports. For example, a first capability value set of the list of capability value sets may comprise/indicate a first maximum number of SRS ports. A second capability value set of the list of capability value sets may comprise/indicate a second maximum number of SRS ports.

Each capability value set of the list of capability value sets may be identified/indicated by a respective capability value set index. For example, the first capability value set may be identified/indicated by a first capability value set index. The second capability value set may be identified/indicated by a second capability value set index.

The wireless device may send (e.g., transmit) a report (e.g., beam reporting, CSI reporting, L1-RSRP reporting, SINR reporting, and/or the like). The wireless device may send (e.g., transmit) the report via PUCCH. The report may indicate an association/mapping/correspondence between the first reference signal indicated by the first TCI state and the first capability value set. The report may comprise a first reference signal index (e.g., CSI-RS and/or SSB resource index) of the first reference signal and the first capability value set index of the first capability value set. The wireless device may determine the association/mapping/correspondence between the first reference signal and the first capability value set. The one or more configuration parameters may indicate, for the first reference signal, the first reference signal index. The first TCI state may be associated with the first capability value set, for example, based on the association/mapping/correspondence between the first reference signal indicated by the first TCI state and the first capability value set. The first uplink transmission may be associated with the first capability value set, for example, based on (e.g., in response to) sending (e.g., transmitting) the first uplink transmission based on the first TCI state associated with the first capability value set.

The report may indicate an association/mapping/correspondence between the second reference signal indicated by the second TCI state and the second capability value set. The report may comprise a second reference signal index (e.g., CSI-RS and/or SSB resource index) of the second reference signal and the second capability value set index of the second capability value set. The wireless device may determine the association/mapping/correspondence between the second reference signal and the second capability value set. The one or more configuration parameters may indicate, for the second reference signal, the second reference signal index. The second TCI state may be associated with the second capability value set, for example, based on the association/mapping/correspondence between the second reference signal indicated by the second TCI state and the second capability value set. The second uplink transmission may be associated with the second capability value set, for example, based on (e.g., in response to) sending (e.g., transmitting) the second uplink transmission based on the second TCI state associated with the second capability value set.

The wireless device may receive, for example, from the base station, an acknowledgement for the report. The acknowledgement may be, for example, DCI. The wireless device may determine/calculate/compute two power headroom values/levels/quantities comprising a first power headroom value/level/quantity and a second power headroom value/level/quantity.

The first uplink transmission may overlap in time with the PUSCH transmission carrying/indicating/with the PHR. The first power headroom value (or the PHR) may be based on an actual uplink transmission (e.g., actual PUSCH transmission), for example, based on the first uplink transmission overlapping in time with the PUSCH transmission.

The first uplink transmission may not overlap in time with the PUSCH transmission carrying/indicating/with the PHR. The first power headroom value (or the PHR) may be based on a reference/virtual uplink transmission (e.g., reference/virtual PUSCH transmission), for example, based on the first uplink transmission not overlapping in time with the PUSCH transmission.

The second uplink transmission may overlap in time with the PUSCH transmission carrying/indicating/with the PHR. The second power headroom value (or the PHR) may be based on an actual uplink transmission (e.g., actual PUSCH transmission), for example, based on the second uplink transmission overlapping in time with the PUSCH transmission.

The second uplink transmission may not overlap in time with the PUSCH transmission carrying/indicating/with the PHR. The second power headroom value (or the PHR) may be based on a reference/virtual uplink transmission (e.g., reference/virtual PUSCH transmission), for example, based on the second uplink transmission not overlapping in time with the PUSCH transmission.

The wireless device may determine/calculate/compute the first power headroom value, for example, based on the first pathloss reference signal associated with the first TCI state. The wireless device may determine/calculate/compute, for the first uplink transmission associated with the first pathloss reference signal, the first power headroom value.

The wireless device may determine the second power headroom value/level/quantity, for example, based on the second pathloss reference signal associated with the second TCI state. The wireless device may determine/calculate/compute, for the second uplink transmission associated with the second pathloss reference signal, the second power headroom value.

The wireless device may send (e.g., transmit) the PUSCH transmission with/carrying/comprising the PHR. The PHR may indicate/carry/comprise the two power headroom values that comprise the first power headroom value and the second power headroom value.

The PHR may be a PHR MAC-CE. The PHR may be a single PHR MAC-CE. The (single) PHR MAC-CE may indicate/carry/comprise the first power headroom value and the second power headroom value.

The PHR may be two PHR MAC-CEs. A first PHR MAC-CE of the two PHR MAC-CEs may indicate/carry/comprise the first power headroom value. A second PHR MAC-CE of the two PHR MAC-CEs may indicate/carry/comprise the second power headroom value.

The wireless device may determine/calculate/compute the two power headroom values, for example, based on the one or more configuration parameters indicating the at least two SRS resource sets. The wireless device may send (e.g., transmit) the PUSCH transmission with/carrying/comprising the PHR with the two power headroom values, for example, based on the one or more configuration parameters indicating the at least two SRS resource sets.

The wireless device may determine/calculate/compute the two power headroom values, for example, based on the field (or the value of the field) indicating the multi-TRP uplink repetition. The wireless device may determine/calculate/compute the two power headroom values, for example, based on the value of the field being equal to '10' or '11' or '1'. The wireless device may determine/calculate/compute the two power headroom values, for example, based on the first uplink transmission and the second uplink transmission being associated with the at least two SRS resource sets.

The wireless device may send (e.g., transmit) the PUSCH transmission with/carrying/comprising the PHR with the two power headroom values, for example, based on the field (or the value of the field) indicating the multi-TRP uplink repetition. The wireless device may send (e.g., transmit) the PUSCH transmission with/carrying/comprising the PHR with the two power headroom values, for example, based on the value of the field being equal to '10' or '11' or '1'. The wireless device may send (e.g., transmit) the PUSCH transmission with/carrying/comprising the PHR with the two power headroom values, for example, based on the first uplink transmission and the second uplink transmission being associated with the at least two SRS resource sets.

The wireless device may determine/calculate/compute the two power headroom values, for example, based on the one or more configuration parameters comprising the two-PHR-Mode parameter. The wireless device may determine/calculate/compute the two power headroom values, for example, based on the one or more configuration parameters comprising the two-PHR-Mode parameter that is enabled.

The wireless device may send (e.g., transmit) the PUSCH transmission with/carrying/comprising the PHR with the two power headroom values, for example, based on the one or more configuration parameters comprising the two-PHR-Mode parameter. The wireless device may send (e.g., transmit) the PUSCH transmission with/carrying/comprising the PHR with the two power headroom values, for example, based on the one or more configuration parameters comprising the two-PHR-Mode parameter that is enabled.

The wireless device may determine/calculate/compute the two power headroom values, for example, based on the one or more configuration parameters comprising the two-PHR-FDM-Mode parameter. The wireless device may determine/calculate/compute the two power headroom values, for example, based on the one or more configuration parameters comprising the two-PHR-FDM-Mode parameter that is enabled.

The wireless device may send (e.g., transmit) the PUSCH transmission with/carrying/comprising the PHR with the two power headroom values, for example, based on the one or more configuration parameters comprising the two-PHR-FDM-Mode parameter. The wireless device may send (e.g., transmit) the PUSCH transmission with/carrying/comprising the PHR with the two power headroom values, for example, based on the one or more configuration parameters comprising the two-PHR-FDM-Mode parameter that is enabled.

The wireless device may determine/calculate/compute the two power headroom values, for example, based on the UE capability message indicating support of determining/calculating (or reporting of) two power headroom values. The wireless device may send (e.g., transmit) the PUSCH transmission with/carrying/comprising the PHR with the two power headroom values, for example, based on the UE capability message indicating support of determining/calculating (or reporting of) two power headroom values.

The wireless device may determine/calculate/compute the two power headroom values, for example, based on the one or more configuration parameters indicating the repetition scheme that is (set to) the frequency domain repetition. The wireless device may send (e.g., transmit) the PUSCH transmission with/carrying/comprising the PHR with the two power headroom values, for example, based on one or more configuration parameters indicating the repetition scheme that is (set to) the frequency domain repetition.

The wireless device may determine/calculate/compute the two power headroom values, for example, based on the first uplink transmission being associated with the first coreset pool index and the second uplink transmission being associated with the second coreset pool index. The first coreset pool index and the second coreset pool index may be, for example, different.

The wireless device may send (e.g., transmit) the PUSCH transmission with/carrying/comprising the PHR with the two power headroom values, for example, based on the first uplink transmission being associated with the first coreset pool index and the second uplink transmission being associated with the second coreset pool index. The first coreset pool index and the second coreset pool index may be, for example, different.

The wireless device may determine/calculate/compute the two power headroom values, for example, based on the uplink transmission being associated with the first TCI state and the second TCI state (e.g., Case 3 in FIG. 26). The wireless device may send (e.g., transmit) the PUSCH transmission with/carrying/comprising the PHR with the two power headroom values, for example, based on the uplink transmission being associated with the first TCI state and the second TCI state (e.g., Case 3 in FIG. 26).

The wireless device may determine/calculate/compute the two power headroom values, for example, based on the PUSCH transmission with the PHR overlapping in time with the first uplink transmission and the second uplink transmission. The wireless device may send (e.g., transmit) the PUSCH transmission with/carrying/comprising the PHR with the two power headroom values, for example, based on the PUSCH transmission with the PHR overlapping in time with the first uplink transmission and the second uplink transmission.

The wireless device may determine/calculate/compute the two power headroom values, for example, regardless of the two-PHR-Mode parameter set is enabled or not. For example, in the frequency-domain repetitions, the wireless device may determine/calculate/compute the two power headroom values, for example, regardless of the two-PHR-Mode parameter set is enabled or not. For the uplink transmission associated with the first TCI state and the second TCI state (e.g., Case 3 in FIG. 26), the wireless device may determine/calculate/compute the two power headroom values, for example, regardless of the two-PHR-Mode parameter set is enabled or not.

The wireless device may send (e.g., transmit) the PUSCH transmission with/carrying/comprising the PHR with the two power headroom values, for example, regardless of the two-PHR-Mode parameter set is enabled or not. For example, in the frequency-domain repetitions, the wireless device may send (e.g., transmit) the PUSCH transmission with/carrying/comprising the PHR with the two power headroom values, for example, regardless of the two-PHR-Mode parameter set is enabled or not. For the uplink transmission associated with the first TCI state and the second TCI state (e.g., Case 3 in FIG. 26), the wireless device may send (e.g., transmit) the PUSCH transmission with/carrying/comprising the PHR with the two power headroom values, for example, regardless of the two-PHR-Mode parameter set is enabled or not.

The wireless device may determine/calculate, for an uplink transmission among the first uplink transmission and the second uplink transmission, a power headroom value/level/quantity. The power headroom value/level/quantity may be a single power headroom value/level/quantity. The wireless device may determine/calculate the power headroom value, for example, based on a pathloss reference signal, among the first pathloss reference signal and the second pathloss reference signal, associated with the uplink transmission. The wireless device may send (e.g., transmit) the uplink transmission based on a TCI state. The first TCI state and the second TCI state may comprise the TCI state of the uplink transmission. The TCI state associated with the uplink transmission may indicate/comprise (or be mapped to or associated with) the pathloss reference signal. The wireless device may send (e.g., transmit) the uplink transmission with a transmission power determined based on the pathloss reference signal. For example, the pathloss reference signal may be the first pathloss reference signal associated with the first TCI state if the uplink transmission is the first the uplink transmission. The TCI state may be the first TCI state. For example, the pathloss reference signal may be the second pathloss reference signal associated with the second TCI state if the uplink transmission is the second the uplink transmission. The TCI state may be the second TCI state.

The PHR in the PUSCH transmission may indicate/comprise/carry the power headroom value/level/quantity. The wireless device may not determine/calculate a power headroom value/level/quantity for any uplink transmission, among the first uplink transmission and the second uplink transmission, that is different from the uplink transmission. The wireless device may not determine/calculate a power headroom value/level/quantity based on any pathloss reference signal, among the first pathloss reference signal and the second pathloss reference signal, that is different from the pathloss reference signal.

The uplink transmission may be, for example, a default uplink transmission. The uplink transmission may be, for example, a reference uplink transmission. The uplink transmission may be the first uplink transmission. The wireless device may determine/calculate, for the first uplink transmission, a first power headroom value/level/quantity. The power headroom value/level/quantity may be the first power headroom value, for example, based on the uplink transmission being the first uplink transmission. The wireless device may determine/calculate the first power headroom value/level/quantity based on the first pathloss reference signal associated with the first TCI state. The pathloss reference signal may be the first pathloss reference signal, for example, based on the uplink transmission being the first uplink transmission. The wireless device may not determine/calculate, for the second uplink transmission, a second power headroom value/level/quantity. The wireless device may not determine/calculate a second power headroom value/level/quantity based on the second pathloss reference signal associated with the second TCI state. The PHR in the PUSCH transmission may indicate/comprise/carry the first power headroom value/level/quantity. The PHR in the PUSCH transmission may not indicate/comprise/carry a second power headroom value/level/quantity of the second uplink transmission. The PHR in the PUSCH transmission may not indicate/comprise/carry a second power headroom value/level/quantity determined based on the second pathloss reference signal.

The uplink transmission may be the second uplink transmission. The wireless device may determine/calculate, for the second uplink transmission, a second power headroom value/level/quantity. The power headroom value/level/quantity may be the second power headroom value, for example, based on the uplink transmission being the second uplink transmission. The wireless device may determine/calculate the second power headroom value/level/quantity based on the second pathloss reference signal associated with the second TCI state. The pathloss reference signal may be the second pathloss reference signal, for example, based on the uplink transmission being the second uplink transmission. The wireless device may not determine/calculate, for the first uplink transmission, a first power headroom value/level/quantity. The wireless device may not determine/calculate a first power headroom value/level/quantity based on the first pathloss reference signal associated with the first TCI state. The PHR in the PUSCH transmission may indicate/comprise/carry the second power headroom value/level/quantity.

The PHR in the PUSCH transmission may not indicate/ comprise/carry a first power headroom value/level/quantity of the first uplink transmission (or the first pathloss reference signal). The PHR in the PUSCH transmission may not indicate/comprise/carry a first power headroom value/level/ quantity determined based on the first pathloss reference signal.

The wireless device may determine/calculate, for the uplink transmission among the first uplink transmission and the second uplink transmission, the power headroom value/ level/quantity, for example, based on the one or more configuration parameters indicating the at least two SRS resource sets. The wireless device may determine/calculate the power headroom value based on the pathloss reference signal among the first pathloss reference signal and the second pathloss reference signal, for example, based on (e.g., in response to) the one or more configuration parameters indicating the at least two SRS resource sets.

The wireless device may determine/calculate, for the uplink transmission among the first uplink transmission and the second uplink transmission, the power headroom value/ level/quantity, for example, based on the one or more configuration parameters not indicating at least two SRS resource sets with codebook (or with a usage parameter set to codebook). The wireless device may determine/calculate, for the uplink transmission among the first uplink transmission and the second uplink transmission, the power headroom value/level/quantity, for example, based on the one or more configuration parameters not indicating at least two SRS resource sets with non-codebook (or with a usage parameter set to non-codebook). The wireless device may determine/calculate, for the uplink transmission among the first uplink transmission and the second uplink transmission, the power headroom value/level/quantity, for example, based on the one or more configuration parameters indicating an SRS resource set (or a single SRS resource set) with codebook (or with a usage parameter set to codebook). The wireless device may determine/calculate, for the uplink transmission among the first uplink transmission and the second uplink transmission, the power headroom value/ level/quantity, for example, based on the one or more configuration parameters indicating an SRS resource set (or a single SRS resource set) with non-codebook (or with a usage parameter set to non-codebook).

The wireless device may determine/calculate the power headroom value based on the pathloss reference signal among the first pathloss reference signal and the second pathloss reference signal, for example, based on (e.g., in response to) the one or more configuration parameters not indicating at least two SRS resource sets with codebook (or with a usage parameter set to codebook). The wireless device may determine/calculate the power headroom value based on the pathloss reference signal among the first pathloss reference signal and the second pathloss reference signal, for example, based on (e.g., in response to) the one or more configuration parameters not indicating at least two SRS resource sets with non-codebook (or with a usage parameter set to non-codebook). The wireless device may determine/calculate the power headroom value based on the pathloss reference signal among the first pathloss reference signal and the second pathloss reference signal, for example, based on (e.g., in response to) the one or more configuration parameters indicating an SRS resource set (or a single SRS resource set) with codebook (or with a usage parameter set to codebook). The wireless device may determine/calculate the power headroom value based on the pathloss reference signal among the first pathloss reference signal and the second pathloss reference signal, for example, based on (e.g., in response to) the one or more configuration parameters indicating an SRS resource set (or a single SRS resource set) with non-codebook (or with a usage parameter set to non-codebook).

The wireless device may determine/calculate, for the uplink transmission among the first uplink transmission and the second uplink transmission, the power headroom value/ level/quantity, for example, based on the field (or the value of the field) indicating the multi-TRP uplink repetition. The wireless device may determine/calculate, for the uplink transmission among the first uplink transmission and the second uplink transmission, the power headroom value/ level/quantity, for example, based on the value of the field being equal to '10' or '11' or '1'. The wireless device may determine/calculate, for the uplink transmission among the first uplink transmission and the second uplink transmission, the power headroom value/level/quantity, for example, based on the first uplink transmission and the second uplink transmission being associated with the at least two SRS resource sets.

The wireless device may determine/calculate the power headroom value based on the pathloss reference signal among the first pathloss reference signal and the second pathloss reference signal, for example, based on (e.g., in response to) the field (or the value of the field) indicating the multi-TRP uplink repetition. The wireless device may determine/calculate the power headroom value based on the pathloss reference signal among the first pathloss reference signal and the second pathloss reference signal, for example, based on (e.g., in response to) the value of the field being equal to '10' or '11' or '1'. The wireless device may determine/calculate the power headroom value based on the pathloss reference signal among the first pathloss reference signal and the second pathloss reference signal, for example, based on (e.g., in response to) the first uplink transmission and the second uplink transmission being associated with the at least two SRS resource sets.

The wireless device may determine/calculate, for the uplink transmission among the first uplink transmission and the second uplink transmission, the power headroom value/ level/quantity, for example, based on the field (or the value of the field) indicating a single-TRP uplink repetition/transmission. The wireless device may determine/calculate, for the uplink transmission among the first uplink transmission and the second uplink transmission, the power headroom value/level/quantity, for example, based on the value of the field being equal to '00' or '01' or '0'. The wireless device may determine/calculate, for the uplink transmission among the first uplink transmission and the second uplink transmission, the power headroom value/level/quantity, for example, based on the first uplink transmission and the second uplink transmission being associated with an SRS resource set (or a single SRS resource set) with codebook (or with a usage parameter set to codebook). The wireless device may determine/calculate, for the uplink transmission among the first uplink transmission and the second uplink transmission, the power headroom value/level/quantity, for example, based on the first uplink transmission and the second uplink transmission being associated with an SRS resource set (or a single SRS resource set) with non-codebook (or with a usage parameter set to non-codebook).

The wireless device may determine/calculate the power headroom value based on the pathloss reference signal among the first pathloss reference signal and the second pathloss reference signal, for example, based on (e.g., in response to) the field (or the value of the field) indicating a single-TRP uplink repetition/transmission. The wireless device may determine/calculate the power headroom value based on the pathloss reference signal among the first pathloss reference signal and the second pathloss reference signal, for example, based on (e.g., in response to) the value of the field being equal to '00' or '01' or '0'. The wireless device may determine/calculate the power headroom value based on the pathloss reference signal among the first pathloss reference signal and the second pathloss reference signal, for example, based on (e.g., in response to) the first uplink transmission and the second uplink transmission being associated with an SRS resource set (or a single SRS resource set) with codebook (or with a usage parameter set to codebook). The wireless device may determine/calculate the power headroom value based on the pathloss reference signal among the first pathloss reference signal and the second pathloss reference signal, for example, based on (e.g., in response to) the first uplink transmission and the second uplink transmission being associated with an SRS resource set (or a single SRS resource set) with non-codebook (or with a usage parameter set to non-codebook).

The wireless device may determine/calculate, for the uplink transmission among the first uplink transmission and the second uplink transmission, the power headroom value/level/quantity, for example, based on the one or more configuration parameters not comprising the two-PHR-Mode parameter. The wireless device may determine/calculate, for the uplink transmission among the first uplink transmission and the second uplink transmission, the power headroom value/level/quantity, for example, based on the one or more configuration parameters not comprising the two-PHR-Mode parameter set to enabled.

The wireless device may determine/calculate the power headroom value based on the pathloss reference signal among the first pathloss reference signal and the second pathloss reference signal, for example, based on (e.g., in response to) the one or more configuration parameters not comprising the two-PHR-Mode parameter. The wireless device may determine/calculate the power headroom value based on the pathloss reference signal among the first pathloss reference signal and the second pathloss reference signal, for example, based on (e.g., in response to) the one or more configuration parameters not comprising the two-PHR-Mode parameter set to enabled.

The wireless device may determine/calculate, for the uplink transmission among the first uplink transmission and the second uplink transmission, the power headroom value/level/quantity, for example, based on the one or more configuration parameters not comprising the two-PHR-FDM-Mode parameter. The wireless device may determine/calculate, for the uplink transmission among the first uplink transmission and the second uplink transmission, the power headroom value/level/quantity, for example, based on the one or more configuration parameters not comprising the two-PHR-FDM-Mode parameter set to enabled.

The wireless device may determine/calculate the power headroom value based on the pathloss reference signal among the first pathloss reference signal and the second pathloss reference signal, for example, based on (e.g., in response to) the one or more configuration parameters not comprising the two-PHR-FDM-Mode parameter. The wireless device may determine/calculate the power headroom value based on the pathloss reference signal among the first pathloss reference signal and the second pathloss reference signal, for example, based on (e.g., in response to) the one or more configuration parameters not comprising the two-PHR-FDM-Mode parameter set to enabled.

The wireless device may determine/calculate, for the uplink transmission among the first uplink transmission and the second uplink transmission, the power headroom value/level/quantity, for example, based on the UE capability message not indicating support of determining/calculating (or reporting of) two power headroom values. The wireless device may determine/calculate, for the uplink transmission among the first uplink transmission and the second uplink transmission, the power headroom value/level/quantity, for example, based on the UE capability message indicating support of determining/calculating (or reporting of) a single power headroom value.

The wireless device may determine/calculate the power headroom value based on the pathloss reference signal among the first pathloss reference signal and the second pathloss reference signal, for example, based on (e.g., in response to) the UE capability message not indicating support of determining/calculating (or reporting of) two power headroom values. The wireless device may determine/calculate the power headroom value based on the pathloss reference signal among the first pathloss reference signal and the second pathloss reference signal, for example, based on (e.g., in response to) the UE capability message indicating support of determining/calculating (or reporting of) a single power headroom value.

The wireless device may determine/calculate, for the uplink transmission among the first uplink transmission and the second uplink transmission, the power headroom value/level/quantity, for example, based on the one or more configuration parameters indicating the repetition scheme that is (set to) the frequency domain repetition. The wireless device may determine/calculate the power headroom value based on the pathloss reference signal among the first pathloss reference signal and the second pathloss reference signal, for example, based on (e.g., in response to) the one or more configuration parameters indicating the repetition scheme that is (set to) the frequency domain repetition.

The first uplink transmission may start in/from a first RB (or in a first PRB). The second uplink transmission may start in/from a second RB (or in a second PRB). The uplink transmission may be an uplink transmission, among the first uplink transmission and the second uplink transmission), with a lowest/highest starting RB among the first RB and the second RB. A starting RB of the uplink transmission may be lowest/highest among the first RB of the first uplink transmission and the second RB of the second uplink transmission.

The wireless device may determine/calculate, for the uplink transmission among the first uplink transmission and the second uplink transmission, the power headroom value/level/quantity, for example, based on the starting RB of the uplink transmission being lowest/highest among the first RB of the first uplink transmission and the second RB of the second uplink transmission. The wireless device may determine/select, for computation/calculation of the power headroom value/level/quantity, the uplink transmission, among the first uplink transmission and the second uplink transmission, with the lowest/highest starting RB among the first RB of the first uplink transmission and the second RB of the second uplink transmission.

The wireless device may determine/calculate the power headroom value based on the pathloss reference signal among the first pathloss reference signal and the second pathloss reference signal, for example, based on (e.g., in response to) the starting RB of the uplink transmission being lowest/highest among the first RB of the first uplink transmission and the second RB of the second uplink transmission. The first RB of the first uplink transmission may be lower/higher than the second RB of the second uplink transmission. The uplink transmission may be the first uplink transmission, for example, based on the first RB of the first uplink transmission being lower/higher than the second RB of the second uplink transmission. The wireless device may determine/calculate, for the first uplink transmission, the power headroom value/level/quantity, for example, based on the first RB of the first uplink transmission being lower/higher than the second RB of the second uplink transmission. The wireless device may determine/calculate the power headroom value based on the first pathloss reference signal associated with the first uplink transmission, for example, based on (e.g., in response to) the first RB of the first uplink transmission being lower/higher than the second RB of the second uplink transmission.

The second RB of the second uplink transmission may be lower/higher than the first RB of the first uplink transmission. The uplink transmission may be the second uplink transmission, for example, based on the second RB of the second uplink transmission being lower/higher than the first RB of the first uplink transmission. The wireless device may determine/calculate, for the second uplink transmission, the power headroom value/level/quantity, for example, based on the second RB of the second uplink transmission being lower/higher than the first RB of the first uplink transmission. The wireless device may determine/calculate the power headroom value based on the second pathloss reference signal associated with the second uplink transmission, for example, based on (e.g., in response to) the second RB of the second uplink transmission being lower/higher than the first RB of the first uplink transmission.

The first uplink transmission may end in/from/at a first RB (or in a first PRB). The second uplink transmission may end in/from/at a second RB (or in a second PRB).

The uplink transmission may be an uplink transmission, among the first uplink transmission and the second uplink transmission, with a lowest/highest ending RB among the first RB and the second RB. An ending RB of the uplink transmission may be lowest/highest among the first RB of the first uplink transmission and the second RB of the second uplink transmission.

The wireless device may determine/calculate, for the uplink transmission among the first uplink transmission and the second uplink transmission, the power headroom value/level/quantity, for example, based on the ending RB of the uplink transmission being lowest/highest among the first RB of the first uplink transmission and the second RB of the second uplink transmission. The wireless device may determine/calculate, for calculation/computation of the power headroom value/level/quantity, the uplink transmission, among the first uplink transmission and the second uplink transmission, with the lowest/highest ending RB among the first RB of the first uplink transmission and the second RB of the second uplink transmission.

The wireless device may determine/calculate the power headroom value based on the pathloss reference signal among the first pathloss reference signal and the second pathloss reference signal, for example, based on (e.g., in response to) the ending RB of the uplink transmission being lowest/highest among the first RB of the first uplink transmission and the second RB of the second uplink transmission. For example, the first RB of the first uplink transmission may be lower/higher than the second RB of the second uplink transmission. The uplink transmission may be the first uplink transmission, for example, based on the first RB of the first uplink transmission being lower/higher than the second RB of the second uplink transmission. The wireless device may determine/calculate, for the first uplink transmission, the power headroom value/level/quantity, for example, based on the first RB of the first uplink transmission being lower/higher than the second RB of the second uplink transmission. The wireless device may determine/calculate the power headroom value based on the first pathloss reference signal associated with the first uplink transmission, for example, based on (e.g., in response to) the first RB of the first uplink transmission being lower/higher than the second RB of the second uplink transmission.

For example, the second RB of the second uplink transmission may be lower/higher than the first RB of the first uplink transmission. The uplink transmission may be the second uplink transmission, for example, based on the second RB of the second uplink transmission being lower/higher than the first RB of the first uplink transmission. The wireless device may determine/calculate, for the second uplink transmission, the power headroom value/level/quantity, for example, based on the second RB of the second uplink transmission being lower/higher than the first RB of the first uplink transmission. The wireless device may determine/calculate the power headroom value based on the second pathloss reference signal associated with the second uplink transmission, for example, based on (e.g., in response to) the second RB of the second uplink transmission being lower/higher than the first RB of the first uplink transmission.

The first uplink transmission may be associated with the first TCI state (e.g., the TCI state 26). The wireless device may send (e.g., transmit) the first uplink transmission based on the first TCI state. The first uplink transmission may be associated with the first TCI state, for example, based on (e.g., in response to) the sending (e.g., transmitting) the first uplink transmission based on the first TCI state.

The second uplink transmission may be associated with the second TCI state (e.g., the TCI state 61). The wireless device may send (e.g., transmit) the second uplink transmission based on the second TCI state. The second uplink transmission may be associated with the second TCI state, for example, based on (e.g., in response to) the sending (e.g., transmitting) the second uplink transmission based on the second TCI state.

The uplink transmission may be an uplink transmission, among the first uplink transmission associated with the first TCI state and the second uplink transmission associated with the second TCI state, associated with a TCI state with a lowest/highest TCI state index among the first TCI state index of the first TCI state and the second TCI state index of the second TCI state. A TCI state index of a TCI state associated with the uplink transmission may be lowest/highest among the first TCI state index of the first TCI state associated with the first uplink transmission and the second TCI state index of the second TCI state associated with the second uplink transmission. The first TCI state and the second TCI state may comprise the TCI state associated with the uplink transmission. The first TCI state index and the second TCI state index may comprise the TCI state index of the TCI state associated with the uplink transmission. The wireless device may determine/calculate, for the uplink transmission among the first uplink transmission and the second uplink transmission, the power headroom value/level/quantity, for example, based on the TCI state index of the TCI state associated with the uplink transmission being lowest/highest among the first TCI state index of the first TCI state associated with the first uplink transmission and the second TCI state index of the second TCI state associated with the second uplink transmission. The wireless device may determine/calculate, for computation/calculation of the power headroom value/level/quantity, the uplink transmission, among the first uplink transmission and the second uplink transmission, associated with the TCI state with the lowest/highest TCI state index among the first TCI state index of the first TCI state associated with the first uplink transmission and the second TCI state index of the second TCI state associated with the second uplink transmission. The wireless device may determine/calculate the power headroom value based on the pathloss reference signal among the first pathloss reference signal and the second pathloss reference signal, for example, based on (e.g., in response to) the TCI state index of the TCI state associated with the uplink transmission being lowest/highest among the first TCI state index of the first TCI state associated with the first uplink transmission and the second TCI state index of the second TCI state associated with the second uplink transmission.

The first TCI state index of the first TCI state associated with the first uplink transmission may be lower/higher than the second TCI state index of the second TCI state associated with the second uplink transmission. The uplink transmission may be the first uplink transmission, for example, based on the first TCI state index of the first TCI state associated with the first uplink transmission being lower/higher than the second TCI state index of the second TCI state associated with the second uplink transmission. The wireless device may determine/calculate, for the first uplink transmission, the power headroom value/level/quantity, for example, based on the first TCI state index of the first TCI state associated with the first uplink transmission being lower/higher than the second TCI state index of the second TCI state associated with the second uplink transmission. The wireless device may determine/calculate the power headroom value based on the first pathloss reference signal associated with the first uplink transmission, for example, based on (e.g., in response to) the first TCI state index of the first TCI state associated with the first uplink transmission being lower/higher than the second TCI state index of the second TCI state associated with the second uplink transmission.

The second TCI state index of the second TCI state associated with the second uplink transmission may be lower/higher than the first TCI state index of the first TCI state associated with the first uplink transmission. The uplink transmission may be the second uplink transmission, for example, based on the second TCI state index of the second TCI state associated with the second uplink transmission being lower/higher than the first TCI state index of the first TCI state associated with the first uplink transmission. The wireless device may determine/calculate, for the second uplink transmission, the power headroom value/level/quantity, for example, based on the second TCI state index of the second TCI state associated with the second uplink transmission being lower/higher than the first TCI state index of the first TCI state associated with the first uplink transmission. The wireless device may determine/calculate the power headroom value based on the second pathloss reference signal associated with the second uplink transmission, for example, based on (e.g., in response to) the second TCI state index of the second TCI state associated with the second uplink transmission being lower/higher than the first TCI state index of the first TCI state associated with the first uplink transmission.

The uplink transmission may be the first uplink transmission, for example, based on the first TCI state associated with the first uplink transmission being the first/starting/earliest/initial TCI state in the vector/set/list of the at least two TCI states. The wireless device may determine/calculate, for the first uplink transmission, the power headroom value/level/quantity, for example, based on the first TCI state associated with the first uplink transmission being the first/starting/earliest/initial TCI state in the vector/set/list of the at least two TCI states. The wireless device may determine/calculate the power headroom value based on the first pathloss reference signal associated with the first uplink transmission, for example, based on (e.g., in response to) the first TCI state associated with the first uplink transmission being the first/starting/earliest/initial TCI state in the vector/set/list of the at least two TCI states.

The uplink transmission may be the first uplink transmission, for example, based on the first uplink transmission being associated with the first SRS resource set. The uplink transmission may be the first uplink transmission, for example, based on the first uplink transmission being associated with the first SRS resource set with the first SRS resource set index that is lower than the second SRS resource set index of the second SRS resource set. The uplink transmission may be the first uplink transmission, for example, based on the first SRS resource set index of the first SRS resource set associated with the first uplink transmission being lower than the second SRS resource set index of the second SRS resource set associated with the second uplink transmission.

The wireless device may determine/calculate, for the first uplink transmission, the power headroom value/level/quantity, for example, based on the first uplink transmission being associated with the first SRS resource set. The wireless device may determine/calculate, for the first uplink transmission, the power headroom value/level/quantity, for example, based on the first uplink transmission being associated with the first SRS resource set with the first SRS resource set index that is lower than the second SRS resource set index of the second SRS resource set associated with the second uplink transmission. The wireless device may determine/calculate, for the first uplink transmission, the power headroom value/level/quantity, for example, based on the first SRS resource set index of the first SRS resource set associated with the first uplink transmission being lower than the second SRS resource set index of the second SRS resource set associated with the second uplink transmission.

The wireless device may determine/calculate the power headroom value based on the first pathloss reference signal associated with the first uplink transmission, for example, based on (e.g., in response to) the first uplink transmission being associated with the first SRS resource set. The wireless device may determine/calculate the power headroom value based on the first pathloss reference signal associated with the first uplink transmission, for example, based on (e.g., in response to) the first uplink transmission being associated with the first SRS resource set with the first SRS resource set index that is lower than the second SRS resource set index of the second SRS resource set associated with the second uplink transmission. The wireless device may determine/calculate the power headroom value based on the first pathloss reference signal associated with the first uplink transmission, for example, based on (e.g., in response to) the first SRS resource set index of the first SRS resource set associated with the first uplink transmission being lower than the second SRS resource set index of the second SRS resource set associated with the second uplink transmission.

The first uplink transmission may be associated with the first antenna panel. The wireless device may send (e.g., transmit) the first uplink transmission with the first antenna panel. The first uplink transmission may be associated with the first antenna panel, for example, based on (e.g., in response to) the sending (e.g., transmitting) the first uplink transmission with the first antenna panel.

The second uplink transmission may be associated with the second antenna panel. The wireless device may send (e.g., transmit) the second uplink transmission with the second antenna panel. The second uplink transmission may be associated with the second antenna panel, for example, based on (e.g., in response to) the sending (e.g., transmitting) the second uplink transmission with the second antenna panel.

The uplink transmission may be an uplink transmission, among the first uplink transmission associated with the first antenna panel and the second uplink transmission associated with the second antenna panel, associated with an antenna panel with a lowest/highest antenna panel index among the first antenna panel index of the first antenna panel and the second antenna panel index of the second antenna panel. An antenna panel index of an antenna panel associated with the uplink transmission may be lowest/highest among the first antenna panel index of the first antenna panel associated with the first uplink transmission and the second antenna panel index of the second antenna panel associated with the second uplink transmission. The first antenna panel and the second antenna panel may comprise the antenna panel associated with the uplink transmission. The first antenna panel index and the second antenna panel index may comprise the antenna panel index of the antenna panel associated with the uplink transmission.

The wireless device may determine/calculate, for the uplink transmission among the first uplink transmission and the second uplink transmission, the power headroom value/level/quantity, for example, based on the antenna panel index of the antenna panel associated with the uplink transmission being lowest/highest among the first antenna panel index of the first antenna panel associated with the first uplink transmission and the second antenna panel index of the second antenna panel associated with the second uplink transmission. The wireless device may determine/calculate the power headroom value based on the pathloss reference signal among the first pathloss reference signal and the second pathloss reference signal, for example, based on (e.g., in response to) the antenna panel index of the antenna panel associated with the uplink transmission being lowest/highest among the first antenna panel index of the first antenna panel associated with the first uplink transmission and the second antenna panel index of the second antenna panel associated with the second uplink transmission. The wireless device may determine/calculate, for computation/calculation of the power headroom value/level/quantity, the uplink transmission, among the first uplink transmission and the second uplink transmission, associated with the antenna panel with the lowest/highest antenna panel index among the first antenna panel index of the first antenna panel associated with the first uplink transmission and the second antenna panel index of the second antenna panel associated with the second uplink transmission.

The first antenna panel index of the first antenna panel associated with the first uplink transmission may be lower/higher than the second antenna panel index of the second antenna panel associated with the second antenna panel transmission. The uplink transmission may be the first uplink transmission, for example, based on the first antenna panel index of the first antenna panel associated with the first uplink transmission being lower/higher than the second antenna panel index of the second antenna panel associated with the second uplink transmission. The wireless device may determine/calculate, for the first uplink transmission, the power headroom value/level/quantity, for example, based on the first antenna panel index of the first antenna panel associated with the first uplink transmission being lower/higher than the second antenna panel index of the second antenna panel associated with the second uplink transmission. The wireless device may determine/calculate the power headroom value based on the first pathloss reference signal associated with the first uplink transmission, for example, based on (e.g., in response to) the first antenna panel index of the first antenna panel associated with the first uplink transmission being lower/higher than the second antenna panel index of the second antenna panel associated with the second uplink transmission.

The second antenna panel index of the second antenna panel associated with the second uplink transmission may be lower/higher than the first antenna panel index of the first antenna panel associated with the first uplink transmission. The uplink transmission may be the second uplink transmission, for example, based on the second antenna panel index of the second antenna panel associated with the second uplink transmission being lower/higher than the first antenna panel index of the first antenna panel associated with the first uplink transmission. The wireless device may determine/calculate, for the second uplink transmission, the power headroom value/level/quantity, for example, based on the second antenna panel index of the second antenna panel associated with the second uplink transmission being lower/higher than the first antenna panel index of the first antenna panel associated with the first uplink transmission. The wireless device may determine/calculate the power headroom value based on the second pathloss reference signal associated with the second uplink transmission, for example, based on (e.g., in response to) the second antenna panel index of the second antenna panel associated with the second uplink transmission being lower/higher than the first antenna panel index of the first antenna panel associated with the first uplink transmission.

The first uplink transmission may be associated with the first capability value set. The wireless device may send (e.g., transmit) the first uplink transmission based on the first TCI state associated with the first capability value set. The first uplink transmission may be associated with the first capability value set, for example, based on (e.g., in response to) the sending (e.g., transmitting) the first uplink transmission based on the first TCI state associated with the first capability value set.

The second uplink transmission may be associated with the second capability value set. The wireless device may send (e.g., transmit) the second uplink transmission based on the second TCI state associated with the second capability value set. The second uplink transmission may be associated with the second capability value set, for example, based on (e.g., in response to) the sending (e.g., transmitting) the second uplink transmission based on the second TCI state associated with the second capability value set.

The uplink transmission may be an uplink transmission, among the first uplink transmission associated with the first capability value set and the second uplink transmission associated with the second capability value set, associated with a capability value set with a lowest/highest capability value set index among the first capability value set index of the first capability value set and the second capability value set index of the second capability value set. A capability value set index of the capability value set associated with the uplink transmission may be lowest/highest among the first capability value set index of the first capability value set associated with the first uplink transmission and the second capability value set index of the second capability value set associated with the second uplink transmission. The first capability value set and the second capability value set may comprise the capability value set associated with the uplink transmission. The first capability value set index and the second capability value set index may comprise the capability value set index of the capability value set associated with the uplink transmission.

The wireless device may determine/calculate, for the uplink transmission among the first uplink transmission and the second uplink transmission, the power headroom value/level/quantity, for example, based on the capability value set index of the capability value set associated with the uplink transmission being lowest/highest among the first capability value set index of the first capability value set associated with the first uplink transmission and the second capability value set index of the second capability value set associated with the second uplink transmission. The wireless device may determine/calculate, for computation/calculation of the power headroom value/level/quantity, the uplink transmission, among the first uplink transmission and the second uplink transmission, associated with the capability value set with the lowest/highest capability value set index among the first capability value set index of the first capability value set associated with the first uplink transmission and the second capability value set index of the second capability value set associated with the second uplink transmission. The wireless device may determine/calculate the power headroom value based on the pathloss reference signal among the first pathloss reference signal and the second pathloss reference signal, for example, based on (e.g., in response to) the capability value set index of the capability value set associated with the uplink transmission being lowest/highest among the first capability value set index of the first capability value set associated with the first uplink transmission and the second capability value set index of the second capability value set associated with the second uplink transmission.

The first capability value set index of the first capability value set associated with the first uplink transmission may be lower/higher than the second capability value set index of the second capability value set associated with the second uplink transmission. The uplink transmission may be the first uplink transmission, for example, based on the first capability value set index of the first capability value set associated with the first uplink transmission being lower/higher than the second capability value set index of the second capability value set associated with the second uplink transmission.

The wireless device may determine/calculate, for the first uplink transmission, the power headroom value/level/quantity, for example, based on the first capability value set index of the first capability value set associated with the first uplink transmission being lower/higher than the second capability value set index of the second capability value set associated with the second uplink transmission. The wireless device may determine/calculate the power headroom value based on the first pathloss reference signal associated with the first uplink transmission, for example, based on (e.g., in response to) the first capability value set index of the first capability value set associated with the first uplink transmission being lower/higher than the second capability value set index of the second capability value set associated with the second uplink transmission.

The second capability value set index of the second capability value set associated with the second uplink transmission may be lower/higher than the first capability value set index of the first capability value set associated with the first uplink transmission. The uplink transmission may be the second uplink transmission, for example, based on the second capability value set index of the second capability value set associated with the second uplink transmission being lower/higher than the first capability value set index of the first capability value set associated with the first uplink transmission.

The wireless device may determine/calculate, for the second uplink transmission, the power headroom value/level/quantity, for example, based on the second capability value set index of the second capability value set associated with the second uplink transmission being lower/higher than the first capability value set index of the first capability value set associated with the first uplink transmission. The wireless device may determine/calculate the power headroom value based on the second pathloss reference signal associated with the second uplink transmission, for example, based on (e.g., in response to) the second capability value set index of the second capability value set associated with the second uplink transmission being lower/higher than the first capability value set index of the first capability value set associated with the first uplink transmission.

The first uplink transmission may be associated with a first value of an index (e.g., TRP index, coreset pool index, SRS resource set index, antenna panel index, capability value set index, beam failure detection set index, Unified TCI state index, physical cell index (PCI), and/or the like). The first uplink transmission may be associated with the first value of the index, for example, based on the first TCI state being associated with the first value of the index. The wireless device may send (e.g., transmit) the first uplink transmission based on the first TCI state. For example, the one or more configuration parameters may indicate, for the first TCI state, the first value of the index. The one or more configuration parameters may, for example, indicate an association/mapping/correspondence between the first TCI state and the first value of the index.

The first uplink transmission may be associated with the first value of the index, for example, based on the first reference signal indicated by the first TCI state being associated with the first value of the index. The wireless device may send (e.g., transmit) the first uplink transmission based on the first TCI state. For example, the one or more configuration parameters may indicate, for the first reference signal, the first value of the index. The one or more configuration parameters may, for example, indicate an association/mapping/correspondence between the first reference signal and the first value of the index.

The second uplink transmission may be associated with a second value of the index (e.g., TRP index, coreset pool index, SRS resource set index, antenna panel index, capability value set index, beam failure detection set index, Unified TCI state index, physical cell index (PCI), and/or the like). The second uplink transmission may be associated with the second value of the index, for example, based on the second TCI state being associated with the second value of the index. The wireless device may send (e.g., transmit) the second uplink transmission based on the second TCI state. For example, the one or more configuration parameters may indicate, for the second TCI state, the second value of the index. The one or more configuration parameters may, for example, indicate an association/mapping/correspondence between the second TCI state and the second value of the index.

The second uplink transmission may be associated with the second value of the index, for example, based on the second reference signal indicated by the second TCI state being associated with the second value of the index. The wireless device may send (e.g., transmit) the second uplink transmission based on the second TCI state. For example, the one or more configuration parameters may indicate, for the second reference signal, the second value of the index. The one or more configuration parameters may, for example, indicate an association/mapping/correspondence between the second reference signal and the second value of the index.

The PUSCH transmission with/carrying/comprising the PHR may be associated with a value of the index (e.g., TRP index, coreset pool index, SRS resource set index, antenna panel index, capability value set index, beam failure detection set index, Unified TCI state index, physical cell index (PCI), and/or the like). For example, the one or more configuration parameters may indicate, for the PUSCH transmission, the value of the index. For example, the wireless device may receive/detect DCI scheduling the PUSCH transmission. The DCI may indicate, for the PUSCH transmission, the value of the index.

For example, the value of the index of the PUSCH transmission may be equal to (or the same as) the first value of the index of the first uplink transmission. The value of the index of the PUSCH transmission may be different from the second value of the index of the second uplink transmission. The uplink transmission may be the first uplink transmission, for example, based on the value of the index of the PUSCH transmission being equal to (or the same as) the first value of the index of the first uplink transmission. The wireless device may determine/calculate, for the first uplink transmission, the power headroom value/level/quantity, for example, based on the value of the index of the PUSCH transmission being equal to (or the same as) the first value of the index of the first uplink transmission. The wireless device may determine/calculate the power headroom value based on the first pathloss reference signal associated with the first uplink transmission, for example, based on (e.g., in response to) the value of the index of the PUSCH transmission being equal to (or the same as) the first value of the index of the first uplink transmission. For example, the first value may be equal to zero. For example, the value may be equal to zero.

The value of the index of the PUSCH transmission may be equal to (or the same as) the second value of the index of the second uplink transmission. The value of the index of the PUSCH transmission may be different from the first value of the index of the first uplink transmission. The uplink transmission may be the second uplink transmission, for example, based on the value of the index of the PUSCH transmission being equal to (or the same as) the second value of the index of the second uplink transmission. The wireless device may determine/calculate, for the second uplink transmission, the power headroom value/level/quantity, for example, based on the value of the index of the PUSCH transmission being equal to (or the same as) the second value of the index of the second uplink transmission. The wireless device may determine/calculate the power headroom value based on the second pathloss reference signal associated with the second uplink transmission, for example, based on (e.g., in response to) the value of the index of the PUSCH transmission being equal to (or the same as) the second value of the index of the second uplink transmission. For example, the second value may be equal to one. For example, the value may be equal to one.

The first DCI scheduling the first uplink transmission and the second uplink transmission may indicate the uplink transmission among the first uplink transmission and the second uplink transmission. The first DCI may comprise a field (e.g., TRP field, coreset pool index field, SRS resource set index field, antenna panel index field, capability value set index field, beam failure detection set index field, Unified TCI state index field, physical cell index (PCI) field, TCI state field, CSI request field, FDRA field, TDRA field, RV field, HARQ process number field, and/or the like) indicating the uplink transmission. A value of the field may indicate the uplink transmission.

The field may be a 1-bit field (or any quantity of bits). For example, a size/length of the field may be more than 1-bit field. For example, the least significant bit (LSB) of the field may indicate the uplink transmission. For example, the most significant bit (MSB) of the field may indicate the uplink transmission. For example, a reserved bit of the field may indicate the uplink transmission.

A first value of the field may indicate the first uplink transmission. The uplink transmission may be the first uplink transmission, for example, based on the value of the field being equal to the first value (e.g., 0). The wireless device may determine/calculate, for the first uplink transmission, the power headroom value/level/quantity, for example, based on the value of the field being equal to the first value. The wireless device may determine/calculate the power headroom value based on the first pathloss reference signal associated with the first uplink transmission, for example, based on (e.g., in response to) the value of the field being equal to the first value.

A second value of the field may indicate the second uplink transmission. The uplink transmission may be the second uplink transmission, for example, based on the value of the field being equal to the second value (e.g., 1). The wireless device may determine/calculate, for the second uplink transmission, the power headroom value/level/quantity, for example, based on the value of the field being equal to the second value. The wireless device may determine/calculate the power headroom value based on the second pathloss reference signal associated with the second uplink transmission, for example, based on (e.g., in response to) the value of the field being equal to the second value.

The PUSCH transmission with/carrying/comprising the PHR may be associated with a value of an index (e.g., TRP index, coreset pool index, SRS resource set index, antenna panel index, capability value set index, beam failure detection set index, Unified TCI state index, physical cell index (PCI), and/or the like). The value of the index may indicate the uplink transmission among the first uplink transmission and the second uplink transmission. The one or more configuration parameters may indicate, for the PUSCH transmission, the value of the index.

A first value of the index may indicate the first uplink transmission. The uplink transmission may be the first uplink transmission, for example, based on the value of the index being equal to the first value (e.g., 0). The wireless device may determine/calculate, for the first uplink transmission, the power headroom value/level/quantity, for example, based on the value of the index being equal to the first value. The wireless device may determine/calculate the power headroom value based on the first pathloss reference signal associated with the first uplink transmission, for example, based on (e.g., in response to) the value of the index being equal to the first value.

A second value of the index may indicate the second uplink transmission. The uplink transmission may be the second uplink transmission, for example, based on the value of the index being equal to the second value (e.g., 1). The wireless device may determine/calculate, for the second uplink transmission, the power headroom value/level/quantity, for example, based on the value of the index being equal to the second value. The wireless device may determine/calculate the power headroom value based on the second pathloss reference signal associated with the second uplink transmission, for example, based on (e.g., in response to) the value of the index being equal to the second value.

The first uplink transmission (e.g., Uplink transmission 1 in Case 1) may be associated with the first coreset pool index (e.g., Coreset pool index 0). The wireless device may receive, via a first coreset with the first coreset pool index, a first DCI scheduling/triggering the first uplink transmission (e.g., PUSCH transmission, HARQ-ACK transmission). The first uplink transmission may be associated with the first coreset pool index, for example, based on the receiving the first DCI scheduling/triggering the first uplink transmission via the first coreset with the first coreset pool index. The plurality of coresets may comprise the first coreset.

The one or more configuration parameters may indicate, for a first uplink resource (or a first uplink resource group/set comprising a first uplink resource), the first coreset pool index. For example, the wireless device may send (e.g., transmit)/perform the first uplink transmission via the first uplink resource. For example, the first uplink transmission may be configured/scheduled on the first uplink resource. The first uplink transmission may be associated with the first coreset pool index, for example, based on the one or more configuration parameters indicating, for the first uplink resource (or the first uplink resource group/set comprising the first uplink resource), the first coreset pool index. The uplink carrier of the cell may comprise the first uplink resource. The (active) uplink BWP of the uplink carrier of the cell may comprise the first uplink resource. The first uplink resource (or the first uplink resource group/set) may be, for example, a first SRS resource (or a first SRS resource set). The first uplink resource (or the first uplink resource group/set) may be, for example, a first PUCCH resource (or a first PUCCH resource group/set).

The second uplink transmission (e.g., Uplink transmission 2 in Case 1) may be associated with the second coreset pool index (e.g., Coreset pool index 1). The wireless device may receive, via a second coreset with the second coreset pool index, a second DCI scheduling/triggering the second uplink transmission (e.g., PUSCH transmission, HARQ-ACK transmission). The second uplink transmission may be associated with the second coreset pool index, for example, based on the receiving the second DCI scheduling/triggering the second uplink transmission via the second coreset with the second coreset pool index. The plurality of coresets may comprise the second coreset.

The one or more configuration parameters may indicate, for a second uplink resource (or a second uplink resource group/set comprising a second uplink resource), the second coreset pool index. For example, the wireless device may send (e.g., transmit)/perform the second uplink transmission via the second uplink resource. For example, the second uplink transmission may be configured/scheduled on the second uplink resource. The second uplink transmission may be associated with the second coreset pool index, for example, based on the one or more configuration parameters indicating, for the second uplink resource (or the second uplink resource group/set comprising the second uplink resource), the second coreset pool index. The uplink carrier of the cell may comprise the second uplink resource. The (active) uplink BWP of the uplink carrier of the cell may comprise the second uplink resource. The second uplink resource (or the second uplink resource group/set) may be, for example, a second SRS resource (or a second SRS resource set). The second uplink resource (or the second uplink resource group/set) may be, for example, a second PUCCH resource (or a second PUCCH resource group/set).

The uplink transmission may be the first uplink transmission. The wireless device may determine/calculate, for the first uplink transmission, the power headroom value/level/quantity, for example, based on the first coreset pool index of (or associated with) the first uplink transmission being lower than the second coreset pool index of (or associated with) the second uplink transmission. The wireless device may determine/calculate the power headroom value based on the first pathloss reference signal associated with the first uplink transmission, for example, based on (e.g., in response to) the first coreset pool index of (or associated with) the first uplink transmission being lower than the second coreset pool index of (or associated with) the second uplink transmission. The first coreset pool index may be, for example, equal to zero. The second coreset pool index may be, for example, equal to one.

The uplink transmission may be the first uplink transmission. The wireless device may determine/calculate, for the first uplink transmission, the power headroom value/level/quantity, for example, based on the first coreset pool index of (or associated with) the first uplink transmission being higher than the second coreset pool index of (or associated with) the second uplink transmission. The wireless device may determine/calculate the power headroom value based on the first pathloss reference signal associated with the first uplink transmission, for example, based on (e.g., in response to) the first coreset pool index of (or associated with) the first uplink transmission being higher than the second coreset pool index of (or associated with) the second uplink transmission. The first coreset pool index may be, for example, equal to one. The second coreset pool index may be, for example, equal to zero.

The uplink transmission may be the first uplink transmission. The wireless device may determine/calculate, for the first uplink transmission, the power headroom value/level/quantity, for example, based on the first coreset pool index of (or associated with) the first uplink transmission being equal to zero. The wireless device may determine/calculate the power headroom value based on the first pathloss reference signal associated with the first uplink transmission, for example, based on (e.g., in response to) the first coreset pool index of (or associated with) the first uplink transmission being equal to zero.

The one or more configuration parameters may indicate, for the first TCI state, a first PCI of (or associated with/indicating/identifying) the cell. The one or more configuration parameters may comprise a higher layer (or RRC) parameter physCellId indicating the first PCI for the cell. The first PCI may identify/indicate a physical cell identity of the cell. The cell may be a serving cell. The first PCI may be associated with the first uplink transmission based on the first TCI state indicating (or associated/indicated with) the first PCI being associated with the first uplink transmission.

The one or more configuration parameters may indicate, for the second TCI state, a second PCI of (or associated with/indicating/identifying) a second cell. The one or more configuration parameters may comprise a higher layer (or RRC) parameter physCellId indicating the second PCI for the second cell. The second PCI may identify/indicate a physical cell identity of the second cell. The second cell may be different from the cell. The first PCI may be different from the second PCI. The second cell may be, for example, a non-serving cell. The second cell may be, for example, a neighboring cell. The second cell may be, for example, a candidate/assisting cell. The second PCI may be associated with the second uplink transmission based on the second TCI state indicating (or associated/indicated with) the second PCI being associated with the second uplink transmission.

The wireless device may determine/calculate, for the first uplink transmission, the power headroom value/level/quantity, for example, based on the first PCI associated with the first uplink transmission being lower/higher than the second PCI associated with the second uplink transmission. The wireless device may determine/calculate the power headroom value based on the first pathloss reference signal associated with the first uplink transmission, for example, based on (e.g., in response to) the first PCI associated with the first uplink transmission being lower/higher than the second PCI associated with the second uplink transmission.

The wireless device may determine/calculate, for the first uplink transmission, the power headroom value/level/quantity, for example, based on the first uplink transmission being associated with the first PCI of a serving cell (or the cell). The wireless device may determine/calculate, for the first uplink transmission, the power headroom value/level/quantity, for example, based on the first TCI state of the first uplink transmission being associated with the first PCI of a serving cell (or the cell).

The wireless device may determine/calculate the power headroom value based on the first pathloss reference signal associated with the first uplink transmission, for example, based on (e.g., in response to) the first uplink transmission being associated with the first PCI of a serving cell (or the cell). The wireless device may determine/calculate the power headroom value based on the first pathloss reference signal associated with the first uplink transmission, for example, based on (e.g., in response to) the first TCI state of the first uplink transmission being associated with the first PCI of a serving cell (or the cell).

The wireless device may determine/calculate, for the first uplink transmission, the power headroom value/level/quantity, for example, based on the second uplink transmission being associated with the second PCI of a non-serving cell (or the second cell). The wireless device may determine/calculate, for the first uplink transmission, the power headroom value/level/quantity, for example, based on the second TCI state of the second uplink transmission being associated with the second PCI of a non-serving cell (or the second cell).

The wireless device may determine/calculate the power headroom value based on the first pathloss reference signal associated with the first uplink transmission, for example, based on (e.g., in response to) the second uplink transmission being associated with the second PCI of a non-serving cell (or the second cell). The wireless device may determine/calculate the power headroom value based on the first pathloss reference signal associated with the first uplink transmission, for example, based on (e.g., in response to) the second TCI state of the second uplink transmission being associated with the second PCI of a non-serving cell (or the second cell).

A TCI state of the at least two TCI states may be associated with a PCI. The one or more configuration parameters may indicate an association between the TCI state and the PCI. The TCI state being associated with the PCI may comprise/indicate the TCI state being associated with a first cell, of the one or more cells, identified/indicated by the PCI.

The one or more configuration parameters may, for example, indicate a plurality of indexes/identifiers/identities (e.g., neighboring/non-serving/assisting/candidate cell indexes/re-indexes, TRP indexes, coreset pool indexes, TCI state group/pool indexes) for the at least two TCI states. The one or more configuration parameters may, for example, indicate a respective index of the plurality of indexes for each TCI state of the at least two TCI states. A first index (or a value of a first index) of the plurality of indexes/identifiers/identities may indicate (or be mapped to or be associated with) the first PCI of the cell. The one or more configuration parameters may, for example, indicate the first index for the first TCI state. A second index (or a value of a second index) of the plurality of indexes/identifiers/identities may indicate (or be mapped to or be associated with) the second PCI of the second cell. The one or more configuration parameters may, for example, indicate the second index for the second TCI state.

The one or more configuration parameters indicating the plurality of indexes/identifiers/identities for the at least two TCI states may comprise the one or more configuration parameters indicating, for the at least two TCI states, a plurality of values of an index/identifier/identity (e.g., (e.g., neighboring/non-serving/assisting/candidate cell index/re-index, TRP index, coreset pool index, TCI state group/pool index). The one or more configuration parameters may indicate, for each TCI state of the at least two TCI states, a respective value of the plurality of values of the index/identifier/identity. A first value of the plurality of values may indicate (or be mapped to or be associated with) the first PCI. The one or more configuration parameters may, for example, indicate the first value for the first TCI state. A second value of the plurality of values may indicate (or be mapped to or be associated with) the second PCI. The one or more configuration parameters may, for example, indicate the second value for the second TCI state.

A wireless device may receive, for example, from a base station, one or more messages comprising one or more configuration parameters for a cell. The base station may send (e.g., transmit) the one or more messages to the wireless device.

The one or more configuration parameters may indicate at least two SRS resource sets comprising a first SRS resource set and a second SRS resource set. The one or more configuration parameters may indicate, for the at least two SRS resource sets, codebook. The one or more configuration parameters may indicate, for the at least two SRS resource sets, non-codebook.

The wireless device may receive a downlink message/command (e.g., MAC-CE, DCI) indicating activation of at least two TCI states comprising a first TCI state and a second TCI state. The base station may send (e.g., transmit) the downlink message/command.

The wireless device may receive a first downlink message/command (e.g., MAC-CE, DCI) indicating activation of a first TCI state. The wireless device may receive a second downlink message/command (e.g., MAC-CE, DCI) indicating activation of a second TCI state. The base station may send (e.g., transmit) the first downlink message/command. The base station may send (e.g., transmit) the second downlink message/command.

Figure 27A:
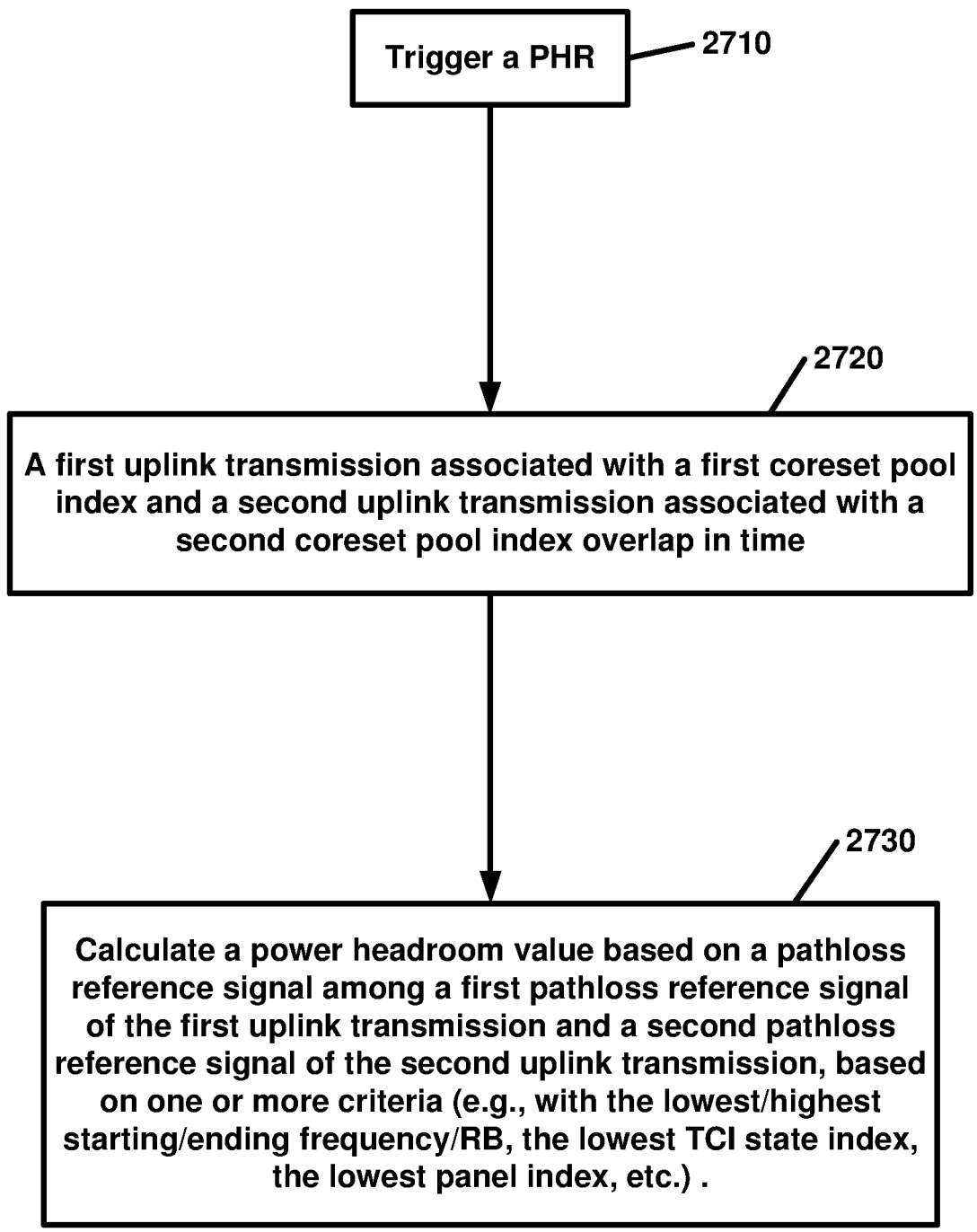
FIG. 27A and FIG. 27B show an example of PHR.
Figure 27B:
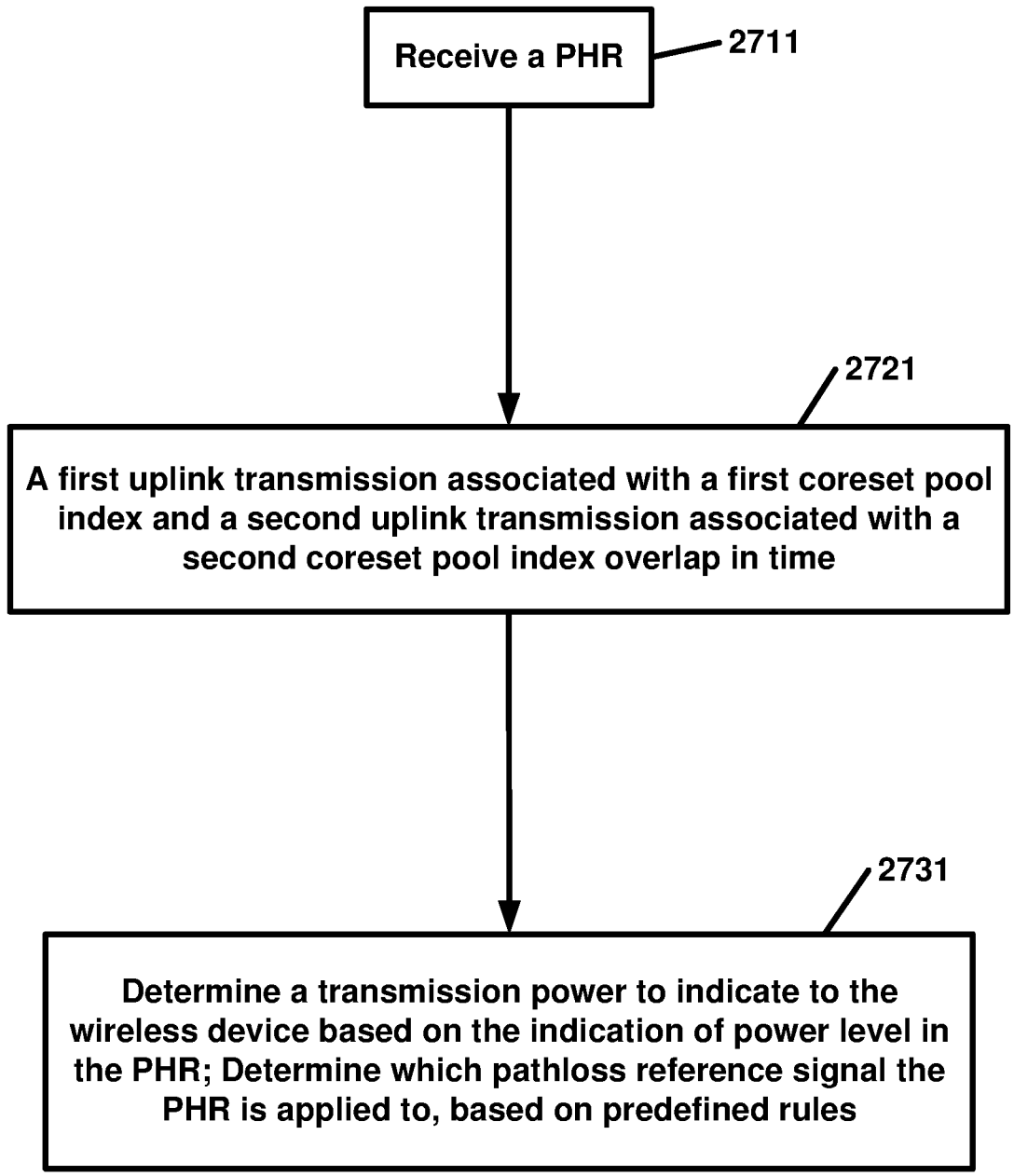

FIG. 27A and FIG. 27B show examples of PHR. As shown at step 2710 in FIG. 27A, the wireless device may trigger a PHR. The PHR may be a Type 1 PHR. The Type 1 PHR may be, for example, for an actual PUSCH transmission/repetition. The wireless device may send (e.g., transmit), in a time slot, a PUSCH transmission comprising/carrying/with the PHR (e.g., PHR MAC-CE). As shown at step 2711 in FIG. 27B, the base station may receive the PUSCH transmission with the PHR.

The PUSCH transmission may overlap in time with at least two uplink transmissions (e.g., a first uplink transmission and a second uplink transmission). The first uplink transmission may be scheduled/configured, for example, by the base station, via/on an uplink carrier (e.g., NUL, SUL) of the cell. The second uplink transmission may be scheduled/configured, for example, by the base station, via/on the uplink carrier (e.g., NUL, SUL) of the cell. As indicated at step 2720 in FIG. 27A and/or at step 2721 in FIG. 27B, the at least two uplink transmissions (e.g., the first uplink transmission and the second uplink transmission) may overlap in time (e.g., at least one symbol).

An uplink transmission may be associated with an SRS resource set. The first uplink transmission may be associated with the first SRS resource set. The second uplink transmission may be associated with the second SRS resource set.

An uplink transmission may be associated with a coreset pool index. The first uplink transmission may be associated with a first coreset pool index. The second uplink transmission may be associated with a second coreset pool index.

The wireless device may determine/calculate a transmission power for the uplink transmission. The wireless device may determine/calculate a first transmission power for the first uplink transmission. The wireless device may determine/calculate, for the first uplink transmission, the first transmission power based on a first TCI state. The first TCI state may indicate/comprise/have (or be associated with or mapped to) a first pathloss reference signal. The first uplink transmission may be associated with the first TCI state. The wireless device may send (e.g., transmit) the first uplink transmission based on the first TCI state. The wireless device may send (e.g., transmit) the first uplink transmission with the first transmission power. The wireless device may send (e.g., transmit) the first uplink transmission with a first spatial domain transmission filter/beam determined based on a first reference signal indicated by the first TCI state.

The wireless device may determine/calculate a second transmission power for the second uplink transmission. The wireless device may determine/calculate, for the second uplink transmission, the second transmission power based on a second TCI state. The second TCI state may indicate/comprise/have (or be associated with or mapped to) a second pathloss reference signal. The second uplink transmission may be associated with the second TCI state. The wireless device may send (e.g., transmit) the second uplink transmission based on the second TCI state. The wireless device may send (e.g., transmit) the second uplink transmission with the second transmission power. The wireless device may send (e.g., transmit) the second uplink transmission with a second spatial domain transmission filter/beam determined based on a second reference signal indicated by the second TCI state.

The first TCI state and the second TCI state may be different. The first TCI state and the second TCI state may be the same.

The wireless device may determine/calculate two power headroom values/levels/quantities comprising a first power headroom value/level/quantity and a second power headroom value/level/quantity. The wireless device may determine/calculate the first power headroom value/quantity/level based on the first pathloss reference signal indicated by the first TCI state. The wireless device may determine/calculate the first power headroom value/quantity/level based on the first pathloss reference signal associated with the first uplink transmission. The wireless device may determine/calculate, for the first uplink transmission associated with the first pathloss reference signal, the first power headroom value/quantity/level.

The wireless device may determine/calculate the second power headroom value/quantity/level based on the second pathloss reference signal indicated by the second TCI state. The wireless device may determine/calculate the second power headroom value/quantity/level based on the second pathloss reference signal associated with the second uplink transmission. The wireless device may determine/calculate, for the second uplink transmission associated with the second pathloss reference signal, the second power headroom value/quantity/level.

The PHR may comprise/indicate the two power headroom values comprising the first power headroom value and the second power headroom value. The wireless device may send (e.g., transmit) the PUSCH transmission with the PHR comprising/indicating the two power headroom values.

The wireless device may send (e.g., transmit) the PUSCH transmission with the PHR comprising/indicating the two power headroom values, for example, based on the first uplink transmission being associated with the first coreset pool index and the second uplink transmission being associated with the second coreset pool index. The first coreset pool index may be, for example, different from the second coreset pool index. The base station may receive the PUSCH transmission with the PHR comprising/indicating the two power headroom values, for example, based on the first uplink transmission being associated with the first coreset pool index and the second uplink transmission being associated with the second coreset pool index.

The wireless device may send (e.g., transmit) the PUSCH transmission with the PHR comprising/indicating the two power headroom values, for example, based on the first uplink transmission and the second uplink transmission overlapping in time. The base station may receive the PUSCH transmission with the PHR comprising/indicating the two power headroom values, for example, based on the first uplink transmission and the second uplink transmission overlapping in time.

The one or more configuration parameters may comprise a two-PHR-Mode parameter. The two-PHR-Mode parameter may be (set to) enabled. The two-PHR-Mode parameter may be present in the one or more configuration parameters. The wireless device may send (e.g., transmit) the PUSCH transmission with the PHR comprising/indicating the two power headroom values, for example, based on the one or more configuration parameters comprising the two-PHR-Mode parameter. The base station may receive the PUSCH transmission with the PHR comprising/indicating the two power headroom values, for example, based on the one or more configuration parameters comprising the two-PHR-Mode parameter.

The one or more configuration parameters may comprise a two-PHR-FDM-Mode parameter. The two-PHR-FDM-Mode parameter may be different from the two-PHR-Mode parameter. The two-PHR-FDM-Mode parameter may be (set to) enabled. The two-PHR-FDM-Mode parameter may be present in the one or more configuration parameters. The wireless device may send (e.g., transmit) the PUSCH transmission with the PHR comprising/indicating the two power headroom values, for example, based on the one or more configuration parameters comprising the two-PHR-FDM-Mode parameter. The base station may receive the PUSCH transmission with the PHR comprising/indicating the two power headroom values, for example, based on the one or more configuration parameters comprising the two-PHR-FDM-Mode parameter.

The wireless device may determine/calculate a power headroom value/level/quantity. The wireless device may determine/calculate a single power headroom value/level/quantity. The wireless device may not determine/calculate more than one (or at least two) power headroom value/level/quantity. The wireless device may not determine/calculate more than one (or at least two) power headroom value/level/quantity, for example, for the cell (or for the uplink carrier of the cell).

The wireless device may determine/calculate the power headroom value/quantity/level based on a pathloss reference signal among the first pathloss reference signal indicated by the first TCI state and the second pathloss reference signal indicated by the second TCI state. The wireless device may determine/calculate the power headroom value/quantity/level based on the pathloss reference signal associated with an uplink transmission among the first uplink transmission and the second uplink transmission. The wireless device may determine/calculate, for the uplink transmission among the first uplink transmission and the second uplink transmission, the power headroom value/quantity/level. The uplink transmission may be associated with the pathloss reference signal. The uplink transmission may be associated with a TCI state among the first TCI state and the second TCI state. The TCI state may indicate (or be associated with or be mapped to) the pathloss reference signal. The wireless device may send (e.g., transmit) the uplink transmission based on the TCI state.

The pathloss reference signal may be, for example, a default/reference pathloss reference signal. The pathloss reference signal may be, for example, a default/reference pathloss reference signal among the first pathloss reference signal and the second pathloss reference signal.

The uplink transmission may be, for example, a default/reference uplink transmission. The uplink transmission may be, for example, a default/reference uplink transmission among the first uplink transmission and the second uplink transmission.

For example, the uplink transmission may be the first uplink transmission if (or based on) the pathloss reference signal is (or being) the first pathloss reference signal. The wireless device may determine/calculate the power headroom value/quantity/level based on the first pathloss reference signal indicated by the first TCI state. The wireless device may determine/calculate the power headroom value/quantity/level based on the first pathloss reference signal associated with the first uplink transmission. The wireless device may determine/calculate, for the first uplink transmission associated with the first pathloss reference signal, the power headroom value/quantity/level. The wireless device may not determine/calculate a second power headroom value/quantity/level based on the second pathloss reference signal indicated by the second TCI state. The wireless device may not determine/calculate a second power headroom value/quantity/level based on the second pathloss reference signal associated with the second uplink transmission. The wireless device may not determine/calculate, for the second uplink transmission associated with the second pathloss reference signal, a second power headroom value/quantity/level.

For example, the uplink transmission may be the second uplink transmission if (or based on) the pathloss reference signal is (or being) the second pathloss reference signal. The wireless device may determine/calculate the power headroom value/quantity/level based on the second pathloss reference signal indicated by the second TCI state. The wireless device may determine/calculate the power headroom value/quantity/level based on the second pathloss reference signal associated with the second uplink transmission. The wireless device may determine/calculate, for the second uplink transmission associated with the second pathloss reference signal, the power headroom value/quantity/level. The wireless device may not determine/calculate a first power headroom value/quantity/level based on the first pathloss reference signal indicated by the first TCI state. The wireless device may not determine/calculate a first power headroom value/quantity/level based on the first pathloss reference signal associated with the first uplink transmission. The wireless device may not determine/calculate, for the first uplink transmission associated with the first pathloss reference signal, a first power headroom value/quantity/level.

The PHR may comprise/indicate the power headroom value. The wireless device may send (e.g., transmit) the PUSCH transmission with the PHR comprising/indicating the power headroom value. The base station may receive the PUSCH transmission with the PHR comprising/indicating the power headroom value.

The one or more configuration parameters may not comprise a two-PHR-Mode parameter. The two-PHR-Mode parameter may not be (set to) enabled. The two-PHR-Mode parameter may not be present (or may be absent) in the one or more configuration parameters. The wireless device may determine/calculate the power headroom value/quantity/level based on the pathloss reference signal among the first pathloss reference signal and the second pathloss reference signal, for example, based on (e.g., in response to) the one or more configuration parameters not comprising the two-PHR-Mode parameter (or that is not enabled). The wireless device may determine/calculate, for the uplink transmission among the first uplink transmission and the second uplink transmission, the power headroom value/quantity/level, for example, based on the one or more configuration parameters not comprising the two-PHR-Mode parameter (or that is not enabled). The wireless device may send (e.g., transmit) the PUSCH transmission with the PHR comprising/indicating the power headroom value, for example, based on (e.g., in response to) the one or more configuration parameters not comprising the two-PHR-Mode parameter (or that is not enabled). The base station may receive the PUSCH transmission with the PHR comprising/indicating the power headroom value, for example, based on (e.g., in response to) the one or more configuration parameters not comprising the two-PHR-Mode parameter (or that is not enabled).

The one or more configuration parameters may not comprise a two-PHR-FDM-Mode parameter. The two-PHR-FDM-Mode parameter may not be (set to) enabled. The two-PHR-FDM-Mode parameter may not be present (or may be absent) in the one or more configuration parameters. The two-PHR-FDM-Mode parameter may be different from the two-PHR-Mode parameter. The wireless device may determine/calculate the power headroom value/quantity/level based on the pathloss reference signal among the first pathloss reference signal and the second pathloss reference signal, for example, based on (e.g., in response to) the one or more configuration parameters not comprising the two-PHR-FDM-Mode parameter (or that is not enabled). The wireless device may determine/calculate, for the uplink transmission among the first uplink transmission and the second uplink transmission, the power headroom value/quantity/level, for example, based on the one or more configuration parameters not comprising the two-PHR-FDM-Mode parameter (or that is not enabled). The wireless device may send (e.g., transmit) the PUSCH transmission with the PHR comprising/indicating the power headroom value, for example, based on (e.g., in response to) the one or more configuration parameters not comprising the two-PHR-FDM-Mode parameter (or that is not enabled). The base station may receive the PUSCH transmission with the PHR comprising/indicating the power headroom value, for example, based on (e.g., in response to) the one or more configuration parameters not comprising the two-PHR-FDM-Mode parameter (or that is not enabled).

As shown at step 2730 in FIG. 27A, the wireless device may determine/select, for determination/calculation/computation of the power headroom value, the pathloss reference signal among the first pathloss reference signal and the second pathloss reference signal. The wireless device may determine/select, for determination/calculation/computation of the power headroom value, the pathloss reference signal among the first pathloss reference signal and the second pathloss reference signal, for example, based on one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like).

The wireless device may determine/select, for determination/calculation/computation of the power headroom value, the uplink transmission among the first uplink transmission and the second uplink transmission. The wireless device may determine/select, for determination/calculation/computation of the power headroom value, the uplink transmission among the first uplink transmission and the second uplink transmission, for example, based one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like).

The wireless device may determine/calculate the power headroom value/quantity/level based on the pathloss reference signal among the first pathloss reference signal and the second pathloss reference signal, for example, based on (e.g., in response to) one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like).

The wireless device may determine/calculate, for the uplink transmission among the first uplink transmission and the second uplink transmission, the power headroom value/quantity/level, for example, based on one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like).

The wireless device may send (e.g., transmit) the PUSCH transmission with the PHR comprising/indicating the power headroom value, for example, based on (e.g., in response to) one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like). The base station may receive the PUSCH transmission with the PHR comprising/indicating the power headroom value, for example, based on (e.g., in response to) one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like). As indicated at step 2731 in FIG. 27B, the base station may determine a transmission power to indicate to the wireless device, based on the indication of power headroom value. The base station may determine which pathloss reference signal the PHR is applied to, based on predefined rules.

Figure 28A:
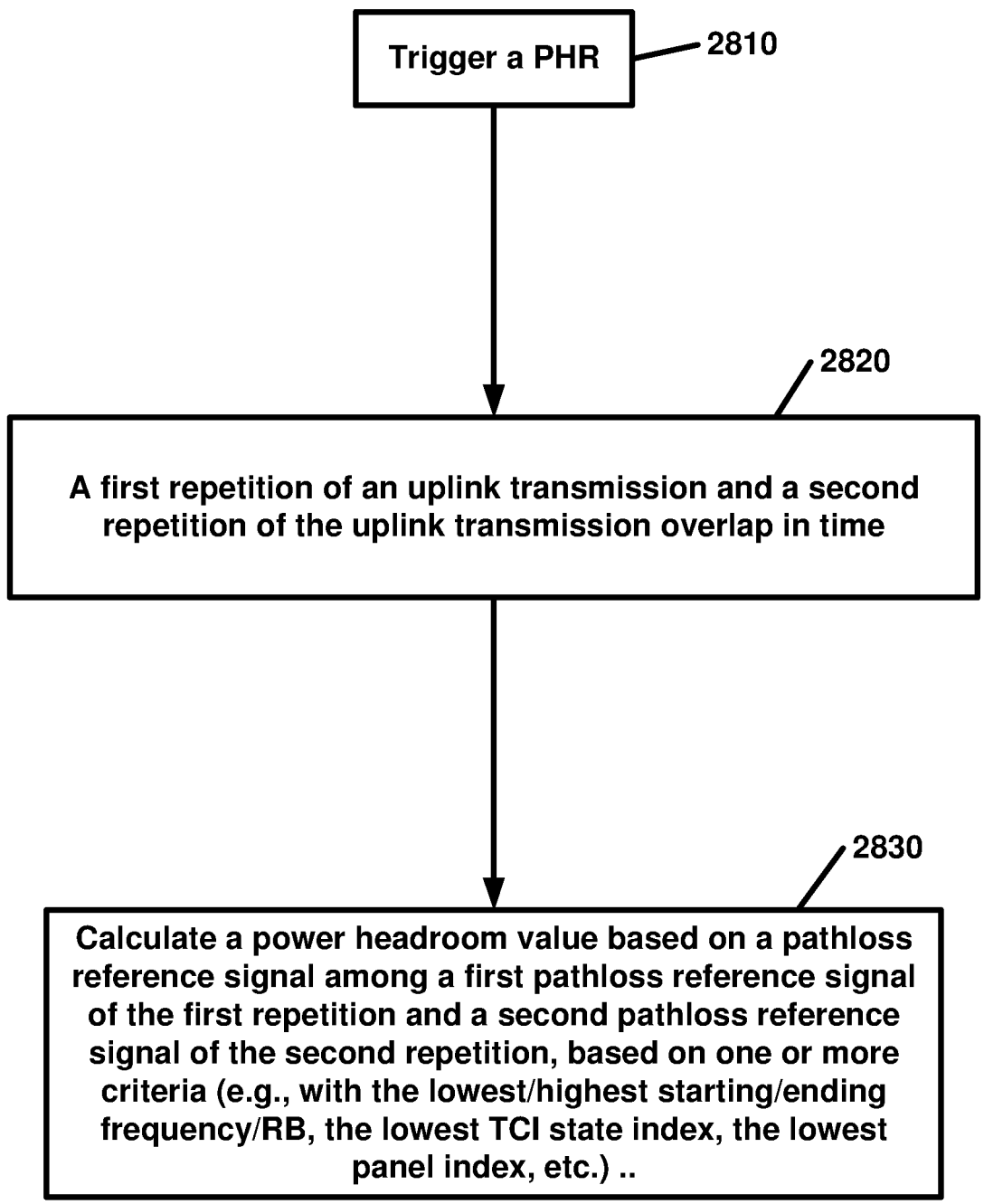
FIG. 28A and FIG. 28B show an example of PHR.
Figure 28B:
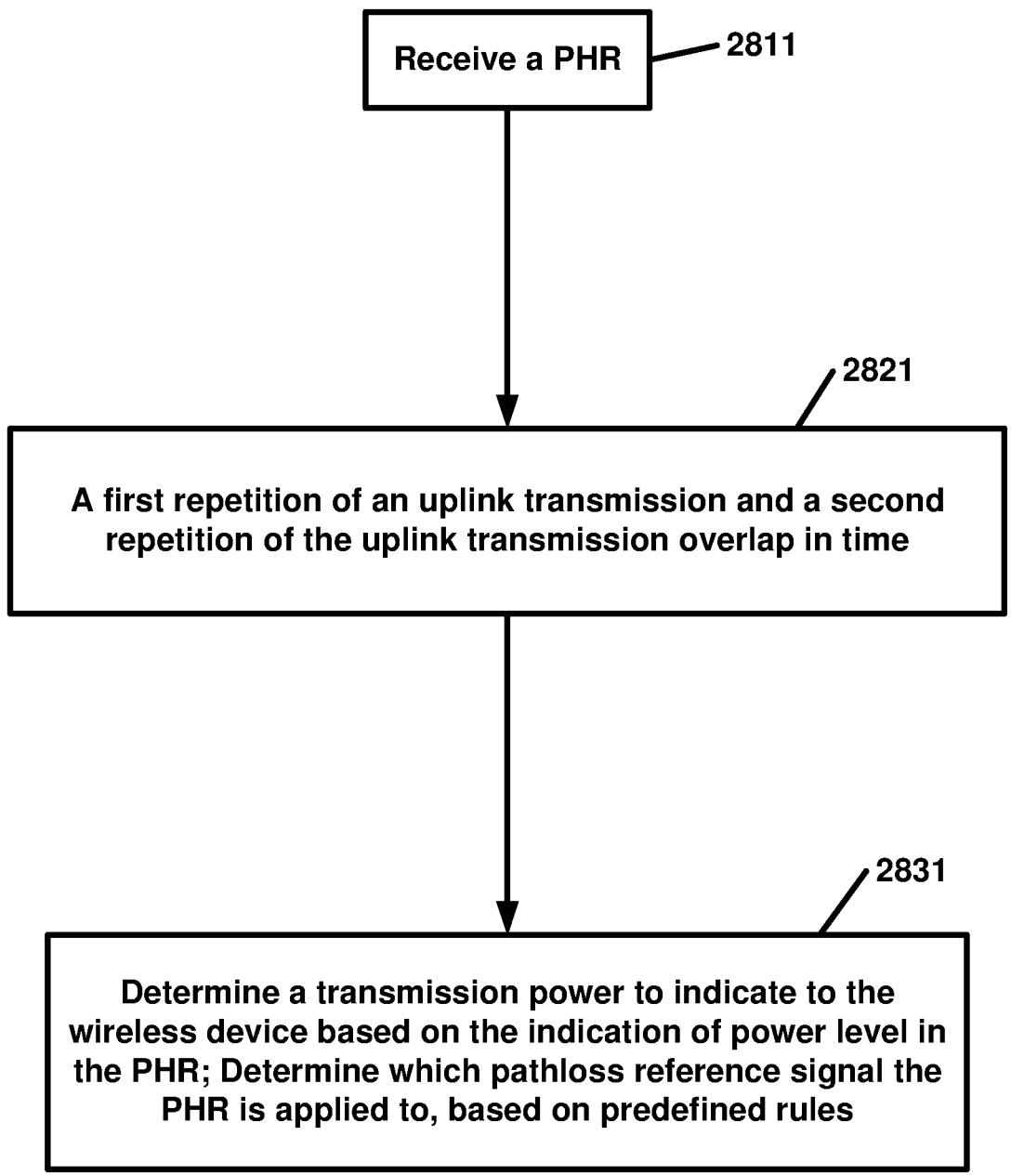

FIG. 28A and FIG. 28B show examples of PHR. As shown at step 2810 in FIG. 28A, the wireless device may trigger a PHR. The wireless device may send (e.g., transmit), in a time slot, a PUSCH transmission comprising/carrying/with the PHR (e.g., PHR MAC-CE). As shown at step 2811 in FIG. 28B, the base station may receive the PUSCH transmission with the PHR.

The PUSCH transmission may overlap in time with a first repetition of an (scheduled/configured) uplink transmission and a second repetition of an (scheduled/configured) uplink transmission. The first repetition may be scheduled/configured, for example, by the base station, via/on an uplink carrier (e.g., NUL, SUL) of the cell. The second repetition may be scheduled/configured, for example, by the base station, via/on the uplink carrier (e.g., NUL, SUL) of the cell. The first repetition and the second repetition may be via the uplink carrier of the cell. As indicated at step 2820 in FIG. 28A and/or at step 2821 in FIG. 28B, the first repetition of the uplink transmission and the second repetition of the uplink transmission may overlap in time.

The first repetition and the second repetition may be in a frequency domain. The first repetition and the second repetition may be frequency domain repetitions (e.g., FDM).

The first repetition may be associated with the first SRS resource set. The second repetition may be associated with the second SRS resource set.

The wireless device may determine/calculate a first transmission power for the first repetition. The wireless device may determine/calculate, for the first repetition, the first transmission power based on a first TCI state. The first TCI state may indicate/comprise/have (or be associated with or mapped to) a first pathloss reference signal. The first repetition may be associated with the first TCI state. The wireless device may send (e.g., transmit) the first repetition based on the first TCI state. The wireless device may send (e.g., transmit) the first repetition with the first transmission power. The wireless device may send (e.g., transmit) the first repetition with a first spatial domain transmission filter/beam determined based on a first reference signal indicated by the first TCI state.

The wireless device may determine/calculate a second transmission power for the second repetition. The wireless device may determine/calculate, for the second repetition, the second transmission power based on a second TCI state. The second TCI state may indicate/comprise/have (or be associated with or mapped to) a second pathloss reference signal. The second repetition may be associated with the second TCI state. The wireless device may send (e.g., transmit) the second repetition based on the second TCI state. The wireless device may send (e.g., transmit) the second repetition with the second transmission power. The wireless device may send (e.g., transmit) the second repetition with a second spatial domain transmission filter/beam determined based on a second reference signal indicated by the second TCI state.

The first TCI state and the second TCI state may be different. The first TCI state and the second TCI state may be the same.

The wireless device may determine/calculate two power headroom values/levels/quantities comprising a first power headroom value/level/quantity and a second power headroom value/level/quantity. The wireless device may determine/calculate the first power headroom value/quantity/level based on the first pathloss reference signal indicated by the first TCI state. The wireless device may determine/calculate the first power headroom value/quantity/level based on the first pathloss reference signal associated with the first repetition. The wireless device may determine/calculate, for the first repetition associated with the first pathloss reference signal, the first power headroom value/quantity/level.

The wireless device may determine/calculate the second power headroom value/quantity/level based on the second pathloss reference signal indicated by the second TCI state. The wireless device may determine/calculate the second power headroom value/quantity/level based on the second pathloss reference signal associated with the second repetition. The wireless device may determine/calculate, for the second repetition associated with the second pathloss reference signal, the second power headroom value/quantity/level.

The PHR may comprise/indicate the two power headroom values comprising the first power headroom value and the second power headroom value. The wireless device may send (e.g., transmit) the PUSCH transmission with the PHR comprising/indicating the two power headroom values.

The wireless device may send (e.g., transmit) the PUSCH transmission with the PHR comprising/indicating the two power headroom values, for example, based on the first repetition and the second repetition overlapping in time. The base station may receive the PUSCH transmission with the PHR comprising/indicating the two power headroom values, for example, based on the first repetition and the repetition overlapping in time.

The wireless device may send (e.g., transmit) the PUSCH transmission with the PHR comprising/indicating the two power headroom values, for example, based on the one or more configuration parameters indicating a repetition scheme set to a frequency domain repetition (e.g., FDM). The wireless device may send (e.g., transmit) the PUSCH transmission with the PHR comprising/indicating the two power headroom values, for example, based on the first repetition and the second repetition being frequency domain repetitions.

The one or more configuration parameters may comprise a two-PHR-Mode parameter. The two-PHR-Mode parameter may be (set to) enabled. The two-PHR-Mode parameter may be present in the one or more configuration parameters. The wireless device may send (e.g., transmit) the PUSCH transmission with the PHR comprising/indicating the two power headroom values, for example, based on the one or more configuration parameters comprising the two-PHR-Mode parameter. The base station may receive the PUSCH transmission with the PHR comprising/indicating the two power headroom values, for example, based on the one or more configuration parameters comprising the two-PHR-Mode parameter.

The one or more configuration parameters may comprise a two-PHR-FDM-Mode parameter. The two-PHR-FDM-Mode parameter may be different from the two-PHR-Mode parameter. The two-PHR-FDM-Mode parameter may be (set to) enabled. The two-PHR-FDM-Mode parameter may be present in the one or more configuration parameters. The wireless device may send (e.g., transmit) the PUSCH transmission with the PHR comprising/indicating the two power headroom values, for example, based on the one or more configuration parameters comprising the two-PHR-FDM-Mode parameter. The base station may receive the PUSCH transmission with the PHR comprising/indicating the two power headroom values, for example, based on the one or more configuration parameters comprising the two-PHR-FDM-Mode parameter.

The wireless device may determine/calculate a power headroom value/level/quantity. The wireless device may determine/calculate a single power headroom value/level/quantity. The wireless device may not determine/calculate more than one (or at least two) power headroom value/level/quantity. The wireless device may not determine/calculate more than one (or at least two) power headroom value/level/quantity, for example, for the cell (or for the uplink carrier of the cell).

The wireless device may determine/calculate the power headroom value/quantity/level based on a pathloss reference signal among the first pathloss reference signal indicated by the first TCI state and the second pathloss reference signal indicated by the second TCI state. The wireless device may determine/calculate the power headroom value/quantity/level based on the pathloss reference signal associated with a repetition among the first repetition and the second repetition. The wireless device may determine/calculate, for the repetition among the first repetition and the second repetition, the power headroom value/quantity/level. The repetition may be associated with the pathloss reference signal. The repetition may be associated with a TCI state among the first TCI state and the second TCI state. The TCI state may indicate (or be associated with or be mapped to) the pathloss reference signal. The wireless device may send (e.g., transmit) the repetition based on the TCI state.

The pathloss reference signal may be, for example, a default/reference pathloss reference signal. The pathloss reference signal may be, for example, a default/reference pathloss reference signal among the first pathloss reference signal and the second pathloss reference signal.

The repetition may be, for example, a default/reference repetition. The repetition may be, for example, a default/reference repetition among the first repetition and the second repetition.

For example, the repetition may be the first repetition if (or based on) the pathloss reference signal is (or being) the first pathloss reference signal. The wireless device may determine/calculate the power headroom value/quantity/level based on the first pathloss reference signal indicated by the first TCI state. The wireless device may determine/calculate the power headroom value/quantity/level based on the first pathloss reference signal associated with the first repetition. The wireless device may determine/calculate, for the first repetition associated with the first pathloss reference signal, the power headroom value/quantity/level. The wireless device may not determine/calculate a second power headroom value/quantity/level based on the second pathloss reference signal indicated by the second TCI state. The first wireless device may not determine/calculate a second power headroom value/quantity/level based on the second pathloss reference signal associated with the second repetition. The wireless device may not determine/calculate, for the second repetition associated with the second pathloss reference signal, a second power headroom value/quantity/level.

The repetition may be the second repetition if (or based on) the pathloss reference signal is (or being) the second pathloss reference signal. The wireless device may determine/calculate the power headroom value/quantity/level based on the second pathloss reference signal indicated by the second TCI state. The wireless device may determine/calculate the power headroom value/quantity/level based on the second pathloss reference signal associated with the second repetition. The wireless device may determine/calculate, for the second repetition associated with the second pathloss reference signal, the power headroom value/quantity/level. The wireless device may not determine/calculate a first power headroom value/quantity/level based on the first pathloss reference signal indicated by the first TCI state. The wireless device may not determine/calculate a first power headroom value/quantity/level based on the first pathloss reference signal associated with the first repetition. The wireless device may not determine/calculate, for the first repetition associated with the first pathloss reference signal, a first power headroom value/quantity/level.

The PHR may comprise/indicate the power headroom value. The wireless device may send (e.g., transmit) the PUSCH transmission with the PHR comprising/indicating the power headroom value. The base station may receive the PUSCH transmission with the PHR comprising/indicating the power headroom value.

The one or more configuration parameters may not comprise a two-PHR-Mode parameter. The two-PHR-Mode parameter may not be (set to) enabled. The two-PHR-Mode parameter may not be present (or may be absent) in the one or more configuration parameters. The wireless device may determine/calculate the power headroom value/quantity/level based on the pathloss reference signal among the first pathloss reference signal and the second pathloss reference signal, for example, based on (e.g., in response to) the one or more configuration parameters not comprising the two-PHR-Mode parameter (or that is not enabled). The wireless device may determine/calculate, for the repetition among the first repetition and the second repetition, the power headroom value/quantity/level, for example, based on the one or more configuration parameters not comprising the two-PHR-Mode parameter (or that is not enabled). The wireless device may send (e.g., transmit) the PUSCH transmission with the PHR comprising/indicating the power headroom value, for example, based on (e.g., in response to) the one or more configuration parameters not comprising the two-PHR-Mode parameter (or that is not enabled). The base station may receive the PUSCH transmission with the PHR comprising/indicating the power headroom value, for example, based on (e.g., in response to) the one or more configuration parameters not comprising the two-PHR-Mode parameter (or that is not enabled).

The one or more configuration parameters may not comprise a two-PHR-FDM-Mode parameter. The two-PHR-FDM-Mode parameter may not be (set to) enabled. The two-PHR-FDM-Mode parameter may not be present (or may be absent) in the one or more configuration parameters. The two-PHR-FDM-Mode parameter may be different from the two-PHR-Mode parameter. The wireless device may determine/calculate the power headroom value/quantity/level based on the pathloss reference signal among the first pathloss reference signal and the second pathloss reference signal, for example, based on (e.g., in response to) the one or more configuration parameters not comprising the two-PHR-FDM-Mode parameter (or that is not enabled). The wireless device may determine/calculate, for the repetition among the first repetition and the second repetition, the power headroom value/quantity/level, for example, based on the one or more configuration parameters not comprising the two-PHR-FDM-Mode parameter (or that is not enabled). The wireless device may send (e.g., transmit) the PUSCH transmission with the PHR comprising/indicating the power headroom value, for example, based on (e.g., in response to) the one or more configuration parameters not comprising the two-PHR-FDM-Mode parameter (or that is not enabled). The base station may receive the PUSCH transmission with the PHR comprising/indicating the power headroom value, for example, based on (e.g., in response to) the one or more configuration parameters not comprising the two-PHR-FDM-Mode parameter (or that is not enabled).

As shown at step 2830 in FIG. 28A, the wireless device may determine/select, for determination/calculation/computation of the power headroom value, the pathloss reference signal among the first pathloss reference signal and the second pathloss reference signal. The wireless device may determine/select, for determination/calculation/computation of the power headroom value, the pathloss reference signal among the first pathloss reference signal and the second pathloss reference signal, for example, based on one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like).

The wireless device may determine/select, for determination/calculation/computation of the power headroom value, the repetition among the first repetition and the second repetition. The wireless device may determine/select, for determination/calculation/computation of the power headroom value, the repetition among the first repetition and the second repetition, for example, based one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like).

The wireless device may determine/calculate the power headroom value/quantity/level based on the pathloss reference signal among the first pathloss reference signal and the second pathloss reference signal, for example, based on (e.g., in response to) one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like).

The wireless device may determine/calculate, for the repetition among the first repetition and the second repetition, the power headroom value/quantity/level, for example, based on one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like).

The wireless device may send (e.g., transmit) the PUSCH transmission with the PHR comprising/indicating the power headroom value, for example, based on (e.g., in response to) one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like). The base station may receive the PUSCH transmission with the PHR comprising/indicating the power headroom value, for example, based on (e.g., in response to) one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like). As indicated at step 2831 in FIG. 28B, the base station may determine a transmission power to indicate to the wireless device, based on the indication of power headroom value. The base station may determine which pathloss reference signal the PHR is applied to, based on predefined rules.

Figure 29A:
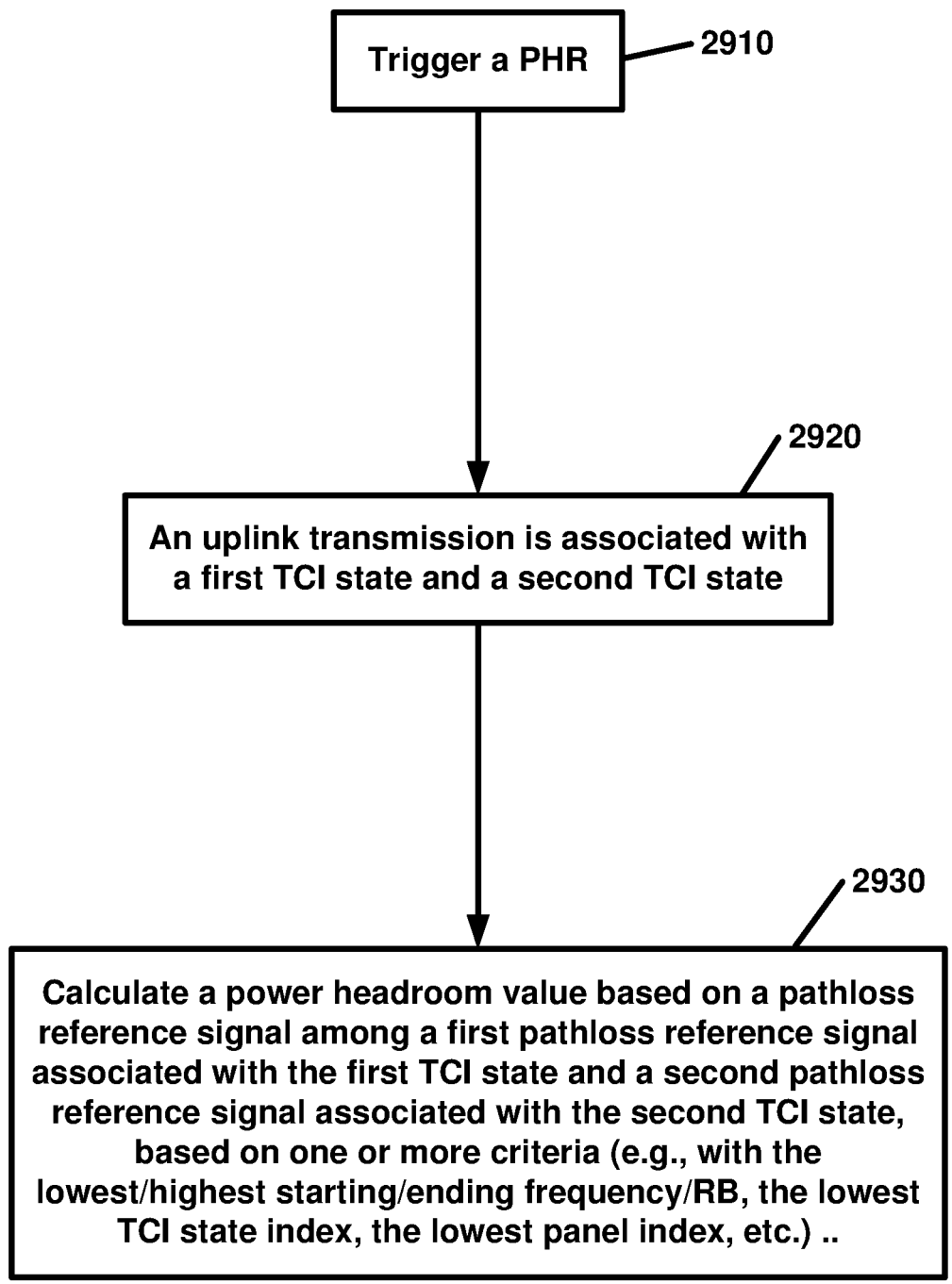
FIG. 29A and FIG. 29B show an example of PHR.
Figure 29B:
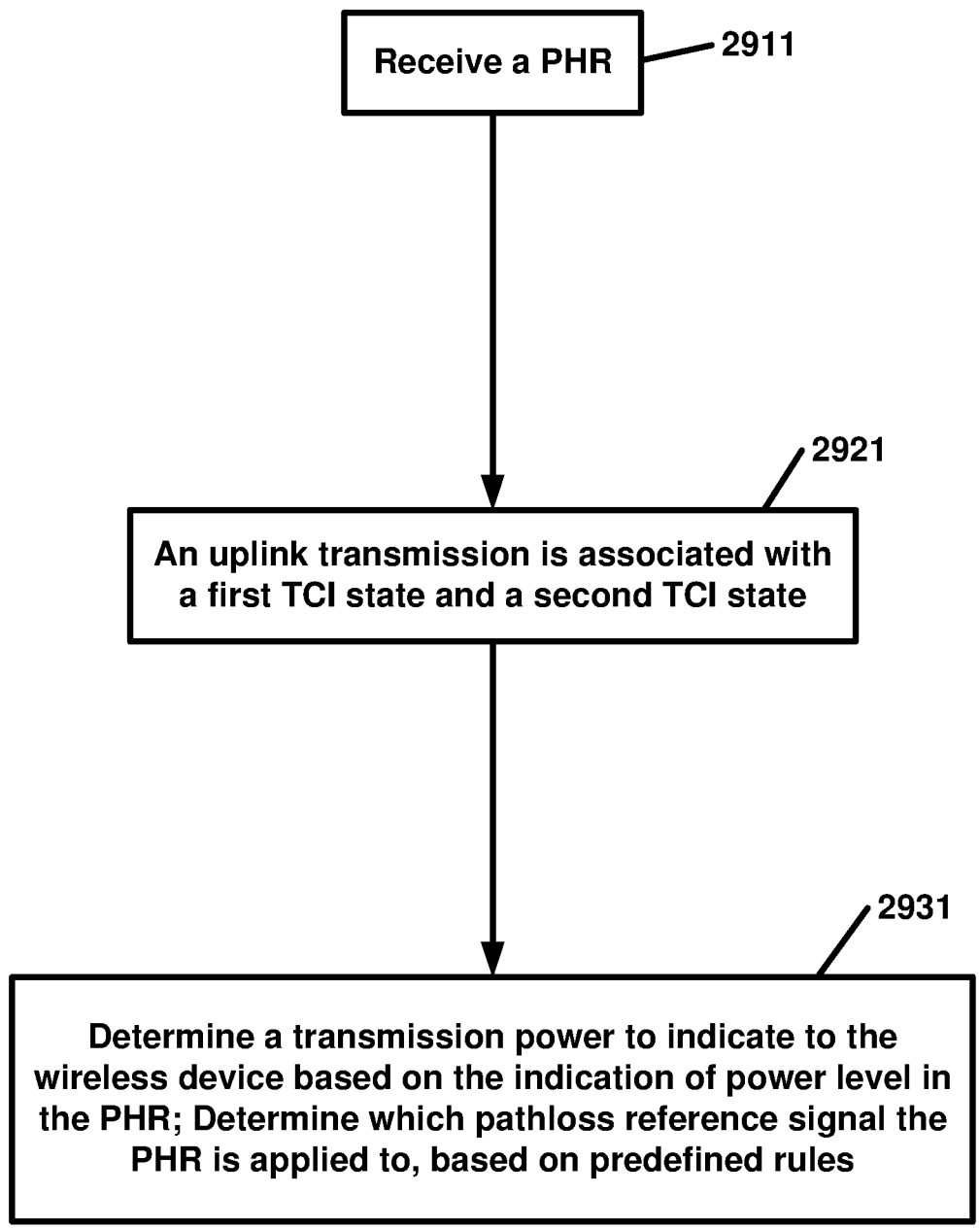

FIG. 29A and FIG. 29B show examples of PHR. As shown at step 2910 in FIG. 29A, the wireless device may trigger a PHR. The wireless device may send (e.g., transmit), in a time slot, a PUSCH transmission comprising/carrying/with the PHR (e.g., PHR MAC-CE). As shown at step 2911 in FIG. 29B, the base station may receive the PUSCH transmission with the PHR.

The PUSCH transmission may overlap in time with an uplink transmission. The uplink transmission may be scheduled/configured, for example, by the base station, via/on an uplink carrier (e.g., NUL, SUL) of the cell. The uplink transmission may be associated with at least two TCI states (e.g., a first TCI state and a second TCI state), as indicated at step 2920 in FIG. 29A and/or at step 2921 in FIG. 29B.

The at least two TCI states (e.g., the first TCI state and the second TCI state) may be different. The at least two TCI states (e.g., the first TCI state and the second TCI state) may be the same.

A TCI state may indicate/comprise/have (or be associated with or mapped to) a pathloss reference signal. The first TCI state may indicate/comprise/have (or be associated with or mapped to) a first pathloss reference signal. The second TCI state may indicate/comprise/have (or be associated with or mapped to) a second pathloss reference signal.

A first portion (e.g., first layer(s), first data stream(s), first antenna port(s), first DM-RS antenna port(s)) of the uplink transmission may be associated with the first TCI state. A second portion (e.g., second layer(s), second data stream(s), second antenna port(s), second DM-RS antenna port(s)) of the uplink transmission may be associated with the second TCI state.

The first portion may be associated with the first SRS resource set. The second portion may be associated with the second SRS resource set.

The first portion may be associated with the first TCI state. The wireless device may send (e.g., transmit) the first portion based on the first TCI state. The wireless device may determine/calculate a first transmission power for the first portion. The wireless device may determine/calculate, for the first portion, the first transmission power based on the first TCI state. The wireless device may send (e.g., transmit) the first portion with the first transmission power. The wireless device may send (e.g., transmit) the first portion with a first spatial domain transmission filter/beam determined based on a first reference signal indicated by the first TCI state.

The second portion may be associated with the second TCI state. The wireless device may send (e.g., transmit) the second portion based on the second TCI state. The wireless device may determine/calculate a second transmission power for the second portion. The wireless device may determine/calculate, for the second portion, the second transmission power based on the second TCI state. The wireless device may send (e.g., transmit) the second portion with the second transmission power. The wireless device may send (e.g., transmit) the second portion with a second spatial domain transmission filter/beam determined based on a second reference signal indicated by the second TCI state.

The one or more configuration parameters may indicate an SFN scheme (e.g., SFN-PUSCH, SFN-PDSCH). Each portion (e.g., layer, data stream, antenna port, DM-RS antenna port) of the uplink transmission may be associated with the first TCI state and the second TCI state. The uplink transmission may be associated with the first TCI state and the second TCI state, for example, in the SFN scheme. The wireless device may send (e.g., transmit) the uplink transmission based on the first TCI state and the second TCI state. The wireless device may determine/calculate a first transmission power for the uplink transmission. The wireless device may determine/calculate, for the uplink transmission, the first transmission power based on the first TCI state. The wireless device may send (e.g., transmit) the uplink transmission with the first transmission power. The wireless device may send (e.g., transmit) the uplink transmission with a first spatial domain transmission filter/beam determined based on a first reference signal indicated by the first TCI state. The wireless device may determine/calculate a second transmission power for the uplink transmission. The wireless device may determine/calculate, for the uplink transmission, the second transmission power based on the second TCI state. The wireless device may send (e.g., transmit) the uplink transmission with the second transmission power. The wireless device may send (e.g., transmit) the uplink transmission with a second spatial domain transmission filter/beam determined based on a second reference signal indicated by the second TCI state.

The wireless device may determine/calculate two power headroom values/levels/quantities comprising a first power headroom value/level/quantity and a second power headroom value/level/quantity. The wireless device may determine/calculate the first power headroom value/quantity/level based on the first pathloss reference signal indicated by the first TCI state.

The wireless device may determine/calculate the first power headroom value/quantity/level based on the first pathloss reference signal associated with the first portion. The wireless device may determine/calculate, for the first portion associated with the first pathloss reference signal, the first power headroom value/quantity/level.

The wireless device may determine/calculate the first power headroom value/quantity/level based on the first pathloss reference signal associated with the uplink transmission associated with the first TCI state. The wireless device may determine/calculate, for the uplink transmission associated with the first TCI state (or with the first pathloss reference signal), the first power headroom value/quantity/level.

The wireless device may determine/calculate the second power headroom value/quantity/level based on the second pathloss reference signal indicated by the second TCI state. The wireless device may determine/calculate the second power headroom value/quantity/level based on the second pathloss reference signal associated with the second portion. The wireless device may determine/calculate, for the second portion associated with the second pathloss reference signal, the second power headroom value/quantity/level.

The wireless device may determine/calculate the second power headroom value/quantity/level based on the second pathloss reference signal associated with the uplink transmission associated with the second TCI state. The wireless device may determine/calculate, for the uplink transmission associated with the second TCI state (or with the second pathloss reference signal), the second power headroom value/quantity/level.

The PHR may comprise/indicate the two power headroom values comprising the first power headroom value and the second power headroom value. The wireless device may send (e.g., transmit) the PUSCH transmission with the PHR comprising/indicating the two power headroom values.

The wireless device may send (e.g., transmit) the PUSCH transmission with the PHR comprising/indicating the two power headroom values, for example, based on the first portion and the second portion overlapping in time. The base station may receive the PUSCH transmission with the PHR comprising/indicating the two power headroom values, for example, based on the first portion and the second portion overlapping in time.

The wireless device may send (e.g., transmit) the PUSCH transmission with the PHR comprising/indicating the two power headroom values, for example, based on the uplink transmission associated with the first TCI state and the uplink transmission associated with the second TCI state overlapping in time. The base station may receive the PUSCH transmission with the PHR comprising/indicating the two power headroom values, for example, based on the uplink transmission associated with the first TCI state and the uplink transmission associated with the second TCI state overlapping in time.

The wireless device may send (e.g., transmit) the PUSCH transmission with the PHR comprising/indicating the two power headroom values, for example, based on the one or more configuration parameters indicating a repetition scheme set to SDM (or SFN). The wireless device may send (e.g., transmit) the PUSCH transmission with the PHR comprising/indicating the two power headroom values, for example, based on the one or more configuration parameters indicating an SFN scheme (e.g., SFN-PUSCH, SFN-PDSCH, SFN-Uplink).

The one or more configuration parameters may comprise a two-PHR-Mode parameter. The two-PHR-Mode parameter may be (set to) enabled. The two-PHR-Mode parameter may be present in the one or more configuration parameters. The wireless device may send (e.g., transmit) the PUSCH transmission with the PHR comprising/indicating the two power headroom values, for example, based on the one or more configuration parameters comprising the two-PHR-Mode parameter. The base station may receive the PUSCH transmission with the PHR comprising/indicating the two power headroom values, for example, based on the one or more configuration parameters comprising the two-PHR-Mode parameter.

The one or more configuration parameters may comprise a two-PHR-FDM-Mode parameter. The two-PHR-FDM-Mode parameter may be different from the two-PHR-Mode parameter. The two-PHR-FDM-Mode parameter may be (set to) enabled. The two-PHR-FDM-Mode parameter may be present in the one or more configuration parameters. The wireless device may send (e.g., transmit) the PUSCH transmission with the PHR comprising/indicating the two power headroom values, for example, based on the one or more configuration parameters comprising the two-PHR-FDM-Mode parameter. The base station may receive the PUSCH transmission with the PHR comprising/indicating the two power headroom values, for example, based on the one or more configuration parameters comprising the two-PHR-FDM-Mode parameter.

The wireless device may determine/calculate a power headroom value/level/quantity. The wireless device may determine/calculate a single power headroom value/level/quantity. The wireless device may not determine/calculate more than one (or at least two) power headroom value/level/quantity. The wireless device may not determine/calculate more than one (or at least two) power headroom value/level/quantity, for example, for the cell (or for the uplink carrier of the cell).

The wireless device may determine/calculate the power headroom value/quantity/level based on a pathloss reference signal among the first pathloss reference signal indicated by the first TCI state and the second pathloss reference signal indicated by the second TCI state. The wireless device may determine/calculate the power headroom value/quantity/level based on the pathloss reference signal associated with a portion among the first portion and the second portion. The wireless device may determine/calculate, for the portion among the first portion and the second portion, the power headroom value/quantity/level. The portion may be associated with the pathloss reference signal. The portion may be associated with a TCI state among the first TCI state and the second TCI state. The TCI state may indicate (or be associated with or be mapped to) the pathloss reference signal. The wireless device may send (e.g., transmit) the portion based on the TCI state.

The wireless device may determine/calculate the power headroom value/quantity/level based on the pathloss reference signal indicated by a TCI state among the first TCI state and the second TCI state that the uplink transmission is associated with. The wireless device may determine/calculate, for the uplink transmission associated with the TCI state, the power headroom value/quantity/level. The TCI state may indicate (or be associated with or be mapped to) the pathloss reference signal. The wireless device may send (e.g., transmit) the uplink transmission based on the TCI state.

The pathloss reference signal may be, for example, a default/reference pathloss reference signal. The pathloss reference signal may be, for example, a default/reference pathloss reference signal among the first pathloss reference signal and the second pathloss reference signal.

The portion may be, for example, a default/reference portion. The portion may be, for example, a default/reference portion among the first portion and the second portion.

The TCI state may be, for example, a default/reference TCI state. The TCI state may be, for example, a default/reference TCI state among the first TCI state and the second TCI state.

For example, the portion may be the first portion if (or based on) the pathloss reference signal is (or being) the first pathloss reference signal. For example, the (default) TCI state may be the first TCI state of the uplink transmission. The wireless device may determine/calculate the power headroom value/quantity/level based on the first pathloss reference signal indicated by the first TCI state. The wireless device may determine/calculate the power headroom value/quantity/level based on the first pathloss reference signal associated with the first portion (or associated with the uplink transmission). The wireless device may determine/calculate, for the first portion associated with the first pathloss reference signal, the power headroom value/quantity/level. The wireless device may determine/calculate, for the uplink transmission associated with the first TCI state (or with the first pathloss reference signal), the power headroom value/quantity/level. The wireless device may not determine/calculate a second power headroom value/quantity/level based on the second pathloss reference signal indicated by the second TCI state. The wireless device may not determine/calculate a second power headroom value/quantity/level based on the second pathloss reference signal associated with the second portion (or associated with the uplink transmission). The wireless device may not determine/calculate, for the second portion associated with the second pathloss reference signal, a second power headroom value/quantity/level. The wireless device may not determine/calculate, for the uplink transmission associated with the second TCI state (or with the second pathloss reference signal), a second power headroom value/quantity/level.

For example, the portion may be the second portion if (or based on) the pathloss reference signal is (or being) the second pathloss reference signal. For example, the (default) TCI state may be the second TCI state of the uplink transmission. The wireless device may determine/calculate the power headroom value/quantity/level based on the second pathloss reference signal indicated by the second TCI state. The wireless device may determine/calculate the power headroom value/quantity/level based on the second pathloss reference signal associated with the second portion (or the uplink transmission associated with the second TCI state). The wireless device may determine/calculate, for the second portion associated with the second pathloss reference signal, the power headroom value/quantity/level. The wireless device may determine/calculate, for the uplink transmission associated with the second TCI state (or with the second pathloss reference signal), the power headroom value/quantity/level. The wireless device may not determine/calculate a first power headroom value/quantity/level based on the first pathloss reference signal indicated by the first TCI state. The wireless device may not determine/calculate a first power headroom value/quantity/level based on the first pathloss reference signal associated with the first portion (or with the uplink transmission associated with the first TCI state). The wireless device may not determine/calculate, for the first portion associated with the first pathloss reference signal, a first power headroom value/quantity/level. The wireless device may not determine/calculate, for the uplink transmission associated with the first TCI state (or with the first pathloss reference signal), a first power headroom value/quantity/level.

The PHR may comprise/indicate the power headroom value. The wireless device may send (e.g., transmit) the PUSCH transmission with the PHR comprising/indicating the power headroom value. The base station may receive the PUSCH transmission with the PHR comprising/indicating the power headroom value.

The one or more configuration parameters may not comprise a two-PHR-Mode parameter. The two-PHR-Mode parameter may not be (set to) enabled. The two-PHR-Mode parameter may not be present (or may be absent) in the one or more configuration parameters. The wireless device may determine/calculate the power headroom value/quantity/level based on the pathloss reference signal among the first pathloss reference signal and the second pathloss reference signal, for example, based on (e.g., in response to) the one or more configuration parameters not comprising the two-PHR-Mode parameter (or that is not enabled). The wireless device may determine/calculate, for the portion among the first portion and the second portion, the power headroom value/quantity/level, for example, based on the one or more configuration parameters not comprising the two-PHR-Mode parameter (or that is not enabled). The wireless device may determine/calculate, for the uplink transmission associated with the TCI state among the first TCI state and the second TCI state, the power headroom value/quantity/level, for example, based on the one or more configuration parameters not comprising the two-PHR-Mode parameter (or that is not enabled). The wireless device may send (e.g., transmit) the PUSCH transmission with the PHR comprising/indicating the power headroom value, for example, based on (e.g., in response to) the one or more configuration parameters not comprising the two-PHR-Mode parameter (or that is not enabled). The base station may receive the PUSCH transmission with the PHR comprising/indicating the power headroom value, for example, based on (e.g., in response to) the one or more configuration parameters not comprising the two-PHR-Mode parameter (or that is not enabled).

The one or more configuration parameters may not comprise a two-PHR-FDM-Mode parameter. The two-PHR-FDM-Mode parameter may not be (set to) enabled. The two-PHR-FDM-Mode parameter may not be present (or may be absent) in the one or more configuration parameters. The two-PHR-FDM-Mode parameter may be different from the two-PHR-Mode parameter. The wireless device may determine/calculate the power headroom value/quantity/level based on the pathloss reference signal among the first pathloss reference signal and the second pathloss reference signal, for example, based on (e.g., in response to) the one or more configuration parameters not comprising the two-PHR-FDM-Mode parameter (or that is not enabled). The wireless device may determine/calculate, for the portion among the first portion and the second portion, the power headroom value/quantity/level, for example, based on the one or more configuration parameters not comprising the two-PHR-FDM-Mode parameter (or that is not enabled). The wireless device may determine/calculate, for the uplink transmission associated with the TCI state among the uplink transmission associated with the first TCI state and the uplink transmission associated with the second TCI state, the power headroom value/quantity/level, for example, based on the one or more configuration parameters not comprising the two-PHR-FDM-Mode parameter (or that is not enabled). The wireless device may send (e.g., transmit) the PUSCH transmission with the PHR comprising/indicating the power headroom value, for example, based on (e.g., in response to) the one or more configuration parameters not comprising the two-PHR-FDM-Mode parameter (or that is not enabled). The base station may receive the PUSCH transmission with the PHR comprising/indicating the power headroom value, for example, based on (e.g., in response to) the one or more configuration parameters not comprising the two-PHR-FDM-Mode parameter (or that is not enabled).

As shown at step 2930 in FIG. 29A, the wireless device may determine/select, for determination/calculation/computation of the power headroom value, the pathloss reference signal among the first pathloss reference signal and the second pathloss reference signal. The wireless device may determine/select, for determination/calculation/computation of the power headroom value, the pathloss reference signal among the first pathloss reference signal and the second pathloss reference signal, for example, based on one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like).

The wireless device may determine/select, for determination/calculation/computation of the power headroom value, the portion among the first portion and the second portion. The wireless device may determine/select, for determination/calculation/computation of the power headroom value, the portion among the first portion and the second portion, for example, based one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like).

The wireless device may determine/select, for determination/calculation/computation of the power headroom value, the uplink transmission associated with the TCI state among the uplink transmission associated with the first TCI state and the uplink transmission associated with the second TCI state. The wireless device may determine/select, for determination/calculation/computation of the power headroom value, the uplink transmission associated with the TCI state among the uplink transmission associated with the first TCI state and the uplink transmission associated with the second TCI state, for example, based one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like).

The wireless device may determine/calculate the power headroom value/quantity/level based on the pathloss reference signal among the first pathloss reference signal and the second pathloss reference signal, for example, based on (e.g., in response to) one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like).

The wireless device may determine/calculate, for the uplink transmission associated with the TCI state among the uplink transmission associated with the first TCI state and the uplink transmission associated with the second TCI state, the power headroom value/quantity/level, for example, based on one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like).

The wireless device may send (e.g., transmit) the PUSCH transmission with the PHR comprising/indicating the power headroom value, for example, based on (e.g., in response to) one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like). The base station may receive the PUSCH transmission with the PHR comprising/indicating the power headroom value, for example, based on (e.g., in response to) one or more criteria discussed in FIG. 26 (e.g., the lowest/highest starting frequency/RB, lowest/highest ending frequency/RB, lowest/highest TCI state index, the first (starting) TCI state, the lowest/highest panel index, the lowest/highest capability value set index, with the same value of the index, and/or the like). As indicated at step 2931 in FIG. 29B, the base station may determine a transmission power to indicate to the wireless device, based on the indication of power headroom value. The base station may determine which pathloss reference signal the PHR is applied to, based on predefined rules.

Repetitions of an uplink transmission (e.g., PUSCH transmission) may overlap with the PUSCH transmission with/carrying/comprising the PHR. The repetitions of the uplink transmission may comprise one or more first repetitions and one or more second repetitions.

The one or more first repetitions of the repetitions of the uplink transmission may be associated with the first SRS resource set. The one or more second repetitions of the repetitions of the uplink transmission may be associated with the second SRS resource set.

The one or more first repetitions of the repetitions of the uplink transmission may be associated with a first TCI state. The wireless device may send (e.g., transmit) the one or more first repetitions based on the first TCI state. The wireless device may send (e.g., transmit) the one or more first repetitions with a first spatial domain transmission filter/beam determined based on the first TCI state (or a first reference signal indicated by the first TCI state). The wireless device may send (e.g., transmit) the one or more first repetitions with a first transmission power determined based on the first TCI state. The base station may receive the one or more first repetitions based on the first TCI state.

The one or more second repetitions of the repetitions of the uplink transmission may be associated with a second TCI state. The wireless device may send (e.g., transmit) the one or more second repetitions based on the second TCI state. The wireless device may send (e.g., transmit) the one or more second repetitions with a second spatial domain transmission filter/beam determined based on the second TCI state (or a second reference signal indicated by the second TCI state). The wireless device may send (e.g., transmit) the one or more second repetitions with a second transmission power determined based on the second TCI state. The base station may receive the one or more second repetitions based on the second TCI state.

The repetitions of the uplink transmission may be in a time domain (e.g., TDM in FIG. 18). The repetitions of the PUSCH transmission may not be in a frequency domain (e.g., FDM in FIG. 18).

The one or more configuration parameters may comprise a two-PHR-Mode parameter. The two-PHR-Mode parameter may be (set to) enabled.

The wireless device may determine/calculate two power headroom values/levels/quantities comprising a first power headroom value/level/quantity and a second power headroom value/level/quantity. The wireless device may determine/calculate the first power headroom value/quantity/level based on a first pathloss reference signal indicated by the first TCI state. The wireless device may determine/calculate, for an earliest/starting repetition among the one or more first repetitions associated with the first TCI state (or with the first pathloss reference signal), the first power headroom value/quantity/level based on the first pathloss reference signal indicated by the first TCI state. The wireless device may determine/calculate the second power headroom value/quantity/level based on a second pathloss reference signal indicated by the second TCI state. The wireless device may determine/calculate, for an earliest/starting repetition among the one or more second repetitions associated with the second TCI state (or with the second pathloss reference signal), the second power headroom value/quantity/level based on the first pathloss reference signal indicated by the second TCI state.

The wireless device may send (e.g., transmit) the PUSCH transmission with the PHR comprising/indicating the two power headroom values, for example, based on the one or more configuration parameters comprising the two-PHR-Mode parameter. The wireless device may send (e.g., transmit) the PUSCH transmission with the PHR comprising/indicating the two power headroom values, for example, based on the repetitions of the uplink transmission being in the time domain.

The one or more configuration parameters may not comprise a two-PHR-Mode parameter. The two-PHR-Mode parameter may not be (set to) enabled.

The wireless device may determine/calculate a power headroom value/level/quantity based on a pathloss reference signal among the first pathloss reference signal indicated by the first TCI state and the second pathloss reference signal indicated by the second TCI state. The wireless device may determine/calculate the power headroom value/level/quantity based on the pathloss reference signal, for example, based on (e.g., in response to) the one or more configuration parameters not comprising the two-PHR-Mode parameter. The wireless device may determine/calculate, for an earliest/starting repetition among the repetitions of the uplink transmission, the power headroom value/level/quantity. The wireless device may determine/calculate, for the earliest/starting repetition among the repetitions of the uplink transmission, the power headroom value/level/quantity, for example, based on the one or more configuration parameters not comprising the two-PHR-Mode parameter. The earliest/starting repetition among the repetitions of the uplink transmission may be associated with the pathloss reference signal. The wireless device may send (e.g., transmit) the earliest/starting repetition of the uplink transmission based on a TCI state, among the first TCI state and the second TCI state, indicating the pathloss reference signal.

A wireless device may receive, for example, from a base station, one or more messages comprising one or more configuration parameters. A plurality of uplink transmissions over/via/on one or more cells may overlap in time. A (calculated) total transmission/transmit power of the plurality of uplink transmissions in a transmission occasion may exceed a maximum transmission/transmit power. In at least some wireless communications, the wireless device may prioritize the plurality of uplink transmissions based on a priority order (or power priorities of the plurality of uplink transmissions, e.g., cell indexes, priority orders, overlapping channel types, e.g., PRACH>PUSCH, the control information carried by the PUCCH transmission, e.g., HARQ-ACK>SR). The wireless device may reduce/adjust transmission power of at least one uplink transmission of the plurality of uplink transmissions. A total adjusted transmission/transmit power of the plurality of uplink transmissions in the transmission occasion may not exceed the maximum transmission power, for example, after the reduction/adjustment. In at least some wireless communications, the plurality of uplink transmissions may not comprise two uplink transmissions in the same uplink carrier (e.g., NUL, SUL) of the same cell.

The wireless device may be equipped with a plurality of antenna panels. The wireless device may support sending (e.g., transmitting), simultaneously, two uplink transmissions in the same uplink carrier (e.g., NUL, SUL) of the same cell. The wireless device may send (e.g., transmit) a first uplink transmission with a first antenna panel of the plurality of antenna panels. The wireless device may send (e.g., transmit) a second uplink transmission with a second antenna panel of the plurality of antenna panels. At least some prioritization rules may not be efficient, for example, if the plurality of uplink transmissions comprise the first uplink transmission and the second uplink transmission. At least some prioritization rules may not work, for example, if two uplink transmissions on/via the same uplink carrier of the same cell overlap in time. The wireless device may not have information on the prioritization between the first uplink transmission and the second uplink transmission. The base station and the wireless device may not be aligned on the prioritized uplink transmission/repetition/portion. This may increase the power consumption at the wireless device.

Examples described herein may enhance power prioritization, for example, if two uplink transmissions on/via the same uplink carrier of the same cell overlap in time and the maximum transmission power is exceeded. A wireless device may prioritize a first uplink transmission of the two uplink transmissions over a second uplink transmission of the two uplink transmissions. The wireless device may reduce transmission power of the second uplink transmission. The wireless device may prioritize the first uplink transmission over the second uplink transmission based on one or more criteria.

Examples described herein may enhance power prioritization, for example, if repetitions of an uplink transmission on/via the same uplink carrier of the same cell overlap in time and the maximum transmission power is exceeded. The wireless device may prioritize a first repetition of the repetitions of the uplink transmission over a second repetition of the repetitions of the uplink transmission. The wireless device may reduce transmission power of the second repetition. The wireless device may prioritize the first repetition over the second repetition based on one or more criteria.

Examples described herein may enhance power prioritization, for example, if an uplink transmission associated with two TCI states are sent (e.g., transmitted) on/via an uplink carrier of a cell and the maximum transmission power is exceeded. The wireless device may prioritize a first portion of the uplink transmission over a second portion of the uplink transmission. The wireless device may reduce transmission power of the second portion. The wireless device may prioritize the first portion over the second portion based on one or more criteria.

Examples described herein may improve/enhance power efficiency of the wireless device. The base station and the wireless device may be aligned on the prioritized uplink transmission/repetition/portion. This alignment may reduce the power consumption at the wireless device.

Figure 30:
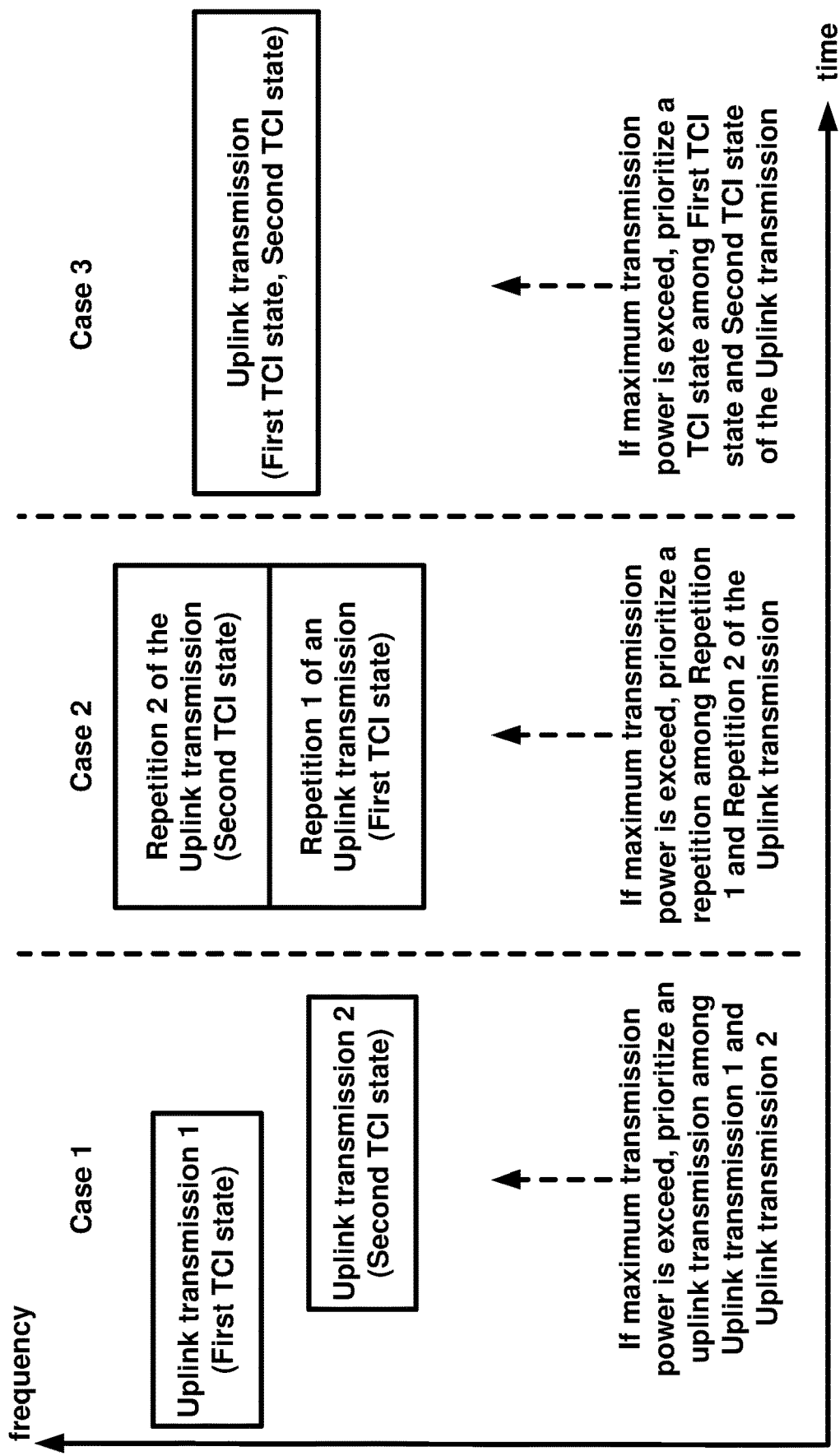
FIG. 30 shows an example of power prioritization.

A FIG. 30 shows an example of power prioritization. A wireless device may determine/calculate a plurality of transmission powers for a plurality of uplink transmissions (e.g., PRACH/PUCCH/PUSCH/SRS transmissions). The wireless device may determine/calculate each transmission power of the plurality of transmission powers for a respective uplink transmission of the plurality of uplink transmissions. For example, the wireless device may determine/calculate a first transmission power of the plurality of transmission powers for a first uplink transmission of the plurality of uplink transmissions. The wireless device may determine/calculate a second transmission power of the plurality of transmission powers for a second uplink transmission of the plurality of uplink transmissions.

The plurality of uplink transmissions may be for/via one or more cells comprising the cell. Each uplink transmission of the plurality of uplink transmissions may be for/via a respective cell of the one or more cells.

The plurality of uplink transmissions may be, for example, in a frequency range (e.g., between frequency A and frequency B). The one or more cells may be, for example, operating in a frequency range (e.g., between frequency A and frequency B).

A (calculated) total transmission/transmit power of the plurality of uplink transmissions in a transmission occasion may exceed a maximum transmission/transmit power (e.g., $\hat{P}_{CMAX}(i)$). The one or more configuration parameters may, for example, indicate the maximum transmission power. For example, the wireless device may send (e.g., transmit), to the base station, a UE capability message indicating the maximum transmission power of the wireless device.

The total transmission/transmit power of the plurality of uplink transmissions on the one or more cells in the frequency range in the transmission occasion may exceed the maximum transmission power. The plurality of uplink transmissions may occur/scheduled/configured/be in the transmission occasion. Respective uplink resource(s) of each uplink transmission of the plurality of uplink transmissions may occur/scheduled/configured/be in the transmission occasion.

The wireless device may determine/calculate the total transmission power based on the plurality of transmission powers. The wireless device may determine the total transmission power, for example, based on a summation/sum of the plurality of transmission powers. The wireless device may determine the total transmission power, for example, based on a summation of each transmission power of the plurality of transmission powers. The wireless device may determine the total transmission power, for example, based on a summation of linear value of each transmission power of the plurality of transmission powers.

The wireless device may determine/allocate a plurality of adjusted transmission/transmit powers for/to the plurality of uplink transmissions, for example, based on the total transmission power of the plurality of uplink transmissions exceeding the maximum transmission power. The wireless device may determine/allocate a respective adjusted transmission power of the plurality of adjusted transmission powers for/to each uplink transmission of the plurality of uplink transmissions. For example, the wireless device may determine/allocate a first adjusted transmission power of the plurality of adjusted transmission powers for/to a first uplink transmission of the plurality of uplink transmissions. The wireless device may determine/allocate a second adjusted transmission power of the plurality of adjusted transmission powers for/to a second uplink transmission of the plurality of uplink transmissions.

A total adjusted transmission/transmit power of the plurality of uplink transmissions in the transmission occasion may not exceed the maximum transmission power, for example, based on the determining/allocating the plurality of adjusted transmission powers for/to the plurality of uplink transmissions. The total adjusted transmission power of the plurality of uplink transmissions on the one or more cells in the frequency range in the transmission occasion may be smaller than or equal to the maximum transmission power. The total adjusted transmission power of the plurality of uplink transmissions on the one or more cells in the frequency range may be smaller than or equal to the maximum transmission power in each/every symbol of the transmission occasion. The total adjusted transmission power of the plurality of uplink transmissions may be smaller than or equal to the maximum transmission power, for example, based on the determining/allocating the plurality of adjusted transmission powers for/to the plurality of uplink transmissions.

The wireless device may determine/calculate the total adjusted transmission power based on the plurality of adjusted transmission powers. The wireless device may determine the total adjusted transmission power, for example, based on a summation of the plurality of adjusted transmission powers. The wireless device may determine the total adjusted transmission power, for example, based on a summation of each adjusted transmission power of the plurality of adjusted transmission powers. The wireless device may determine the total adjusted transmission power, for example, based on a summation of linear value of each adjusted transmission power of the plurality of adjusted transmission powers.

The wireless device may determine/allocate the plurality of adjusted transmission/transmit powers for/to the plurality of uplink transmissions, for example, based on a priority order (or power priorities of the plurality of uplink transmissions). Each uplink transmission of the plurality of uplink transmissions may have (or be associated with) a respective power priority of the power priorities. The one or more configuration parameters indicate, for the plurality of uplink transmissions, the power priorities. The power priorities of the plurality of uplink transmissions may be preconfigured/predefined/preset.

The wireless device may determine the power priorities of the plurality of uplink transmissions according to the following priority order (in descending order):
PRACH transmission on the Pcell (e.g., highest power priority)
PUCCH or PUSCH transmissions with higher priority index
For PUCCH or PUSCH transmissions with same priority index
PUCCH transmission with HARQ-ACK information, and/or SR, and/or LRR, or PUSCH transmission with HARQ-ACK information
PUCCH transmission with CSI or PUSCH transmission with CSI
PUSCH transmission without HARQ-ACK information or CSI and, for Type-2 random access procedure, PUSCH transmission on the PCell
SRS transmission, with aperiodic SRS having higher priority than semi-persistent and/or periodic SRS, or PRACH transmission on a serving cell other than the PCell (e.g., lowest power priority).

The plurality of uplink transmissions may comprise a first uplink transmission and a second uplink transmission. The first uplink transmission may be scheduled/configured on an uplink carrier of the cell. The second uplink transmission may be scheduled/configured on the uplink carrier of the cell. The uplink carrier may be, for example, a supplementary uplink (SUL) carrier. The uplink carrier may be, for example, a non-supplementary (or normal) uplink (NUL) carrier. The first uplink transmission and the second uplink transmission may be scheduled/configured on the (same) uplink carrier of the (same) cell. The first uplink transmission and the second uplink transmission may be scheduled/configured on the (same) uplink carrier of the (same) cell. The first uplink transmission and the second uplink transmission may be scheduled/configured on/via the (same) uplink BWP of the (same) uplink carrier of the (same) cell.

The first uplink transmission and the second uplink transmission may overlap in time (e.g., in at least one symbol, in at least one mini-slot, in at least one time slot). The first uplink transmission and the second uplink transmission may overlap in the transmission occasion. The first uplink transmission and the second uplink transmission may or may not overlap in frequency.

The wireless device may, for example, receive a first DCI scheduling/triggering/activating the first uplink transmission (e.g., dynamic transmission). The one or more configuration parameters may, for example, schedule/indicate/configure the first uplink transmission (e.g., configured uplink grant, periodic/semi-persistent PUCCH/PUSCH/SRS transmissions).

For example, the first DCI may indicate, for the first uplink transmission, a first priority index. For example, the one or more configuration parameters may indicate, for the first uplink transmission, a first priority index. The wireless device may use the first priority index (e.g., phy-PriorityIndex) to prioritize overlapping (e.g., time overlapping) uplink transmissions comprising the first uplink transmission. The first priority index is different from a first power priority of the first uplink transmission.

The wireless device may, for example, receive a second DCI scheduling/triggering/activating the second uplink transmission (e.g., dynamic transmission). The one or more configuration parameters may, for example, schedule/indicate/configure the second uplink transmission (e.g., configured uplink grant, periodic/semi-persistent PUCCH/PUSCH/SRS transmissions).

For example, the second DCI may indicate, for the second uplink transmission, a second priority index. For example, the one or more configuration parameters may indicate, for the first uplink transmission, a second priority index. The wireless device may use the second priority index (e.g., phy-PriorityIndex) to prioritize overlapping (e.g., time overlapping) uplink transmissions comprising the second uplink transmission. The second priority index is different from a second power priority of the second uplink transmission.

The first priority index of the first uplink transmission and the second priority index of the second uplink transmission may be the same (or equal). The first uplink transmission may be, for example, a first PUSCH transmission. The first uplink transmission may be, for example, a first PUCCH transmission. The first uplink transmission may be, for example, a first SRS transmission.

The second uplink transmission may be, for example, a second PUSCH transmission. The second uplink transmission may be, for example, a second PUCCH transmission. The second uplink transmission may be, for example, a second SRS transmission.

The first uplink transmission may carry/comprise (or be with) a first UCI with a UCI type (e.g., HARQ-ACK, SR, CSI report, and/or the like). The second uplink transmission may carry/comprise (or be with) a second UCI with the same UCI type as the first uplink transmission. For example, the first UCI may be a first HARQ-ACK. The second UCI may be a second HARQ-ACK. Both UCIs are the same UCI type (e.g., HARQ-ACK). For example, the first UCI may be a first SR. The second UCI may be a second SR. Both UCIs are the same UCI type (e.g., SR). For example, the first UCI may be a first CSI report. The second UCI may be a second CSI report. Both UCIs are the same UCI type (e.g., CSI report).

The first uplink transmission (e.g., Uplink transmission 1 in FIG. 30) and the second uplink transmission (e.g., Uplink transmission 2 in FIG. 30) may be different (Case 1 in FIG. 30). The first DCI and the second DCI may be, for example, different.

The first uplink transmission (e.g., Repetition 1 of an Uplink transmission in FIG. 30) and the second uplink transmission (e.g., Repetition 2 of the Uplink transmission in FIG. 30) may be the same. The first uplink transmission and the second uplink transmission may be repetitions of an uplink signal (Case 2 in FIG. 30). The first uplink transmission may be a first repetition of the uplink signal (e.g., PUSCH transmission, transport block, UCI, PUCCH transmission, SRS, and/or the like). The second uplink transmission may be a second repetition of the uplink signal (e.g., PUSCH transmission, transport block, UCI, PUCCH transmission, SRS, and/or the like). The first uplink transmission and the second uplink transmission may be repetitions of the uplink signal in frequency domain (e.g., FDM in FIG. 19). The one or more configuration parameters may indicate a repetition scheme to set to a frequency domain repetition (e.g., FDM). The first DCI and the second DCI may be, for example, the same (or a single DCI). The first DCI may schedule/trigger/activate the first repetition of the uplink signal and the second repetition of the uplink signal.

The first uplink transmission and the second uplink transmission may be different. The first uplink transmission may be a first portion of an uplink signal (e.g., PUSCH transmission, transport block, UCI, PUCCH transmission, SRS, Uplink transmission in Case 3 in FIG. 30). The second uplink transmission may be a second portion of the uplink signal (Uplink transmission in Case 3 in FIG. 30). The first DCI and the second DCI may be, for example, the same (or a single DCI). The first DCI may schedule/trigger/activate the first uplink transmission and the second uplink transmission. The first DCI may schedule/trigger/activate transmission of the uplink signal (e.g., Uplink transmission in Case 3 in FIG. 30). The first DCI may schedule/trigger/activate transmission of the first portion of the uplink signal and the second portion of the uplink signal.

The first portion may comprise/be one or more first layers (data streams) of the uplink signal. The second portion may comprise/be one or more second layers (data streams) of the uplink signal.

The first portion may comprise/be one or more first DM-RS antenna ports of the uplink signal. The second portion may comprise/be one or more second DM-RS antenna ports of the uplink signal.

The first uplink transmission and the second uplink transmission may be the same (Uplink transmission in Case 3 in FIG. 30). The first DCI and the second DCI may be, for example, the same (or a single DCI). The first DCI may schedule/trigger/activate the first uplink transmission and the second uplink transmission. The first DCI may schedule/trigger/activate transmission of the uplink signal. The first uplink transmission and the second uplink transmission may be repetitions of the uplink signal in spatial domain (e.g., SDM/SFN in FIG. 19). The one or more configuration parameters may indicate a repetition scheme to set to a code/spatial domain repetition (e.g., SDM/SFN). The one or more configuration parameters may, for example, comprise an SFN parameter (e.g., SFN-PUSCH, SFN-PUCCH) indicating SFN-uplink transmissions.

The wireless device may determine/calculate/compute, for the first uplink transmission, a first transmission power based on the first TCI state (e.g., TCI state 26 in FIG. 17-FIG. 18, First TCI state in FIG. 30). The wireless device may determine the first transmission power based on one or more first power control parameters (e.g., target received power, closed-loop index, pathloss compensation factor, alpha, pathloss reference signal, and/or the like) indicated by (or included in or associated with or mapped to) the first TCI state. The plurality of transmission powers may comprise the first transmission power.

The first uplink transmission may have (or be associated with) a first power priority. The power priorities of the plurality of uplink transmissions may comprise the first power priority of the first uplink transmission.

The wireless device may determine/calculate/compute, for the second uplink transmission, a second transmission power based on the second TCI state (e.g., TCI state 61 in FIG. 17-FIG. 18, Second TCI state in FIG. 30). The wireless device may determine the second transmission power based on one or more second power control parameters (e.g., target received power, closed-loop index, pathloss compensation factor, alpha, pathloss reference signal, and/or the like) indicated by (or included in or associated with or mapped to) the second TCI state. The plurality of transmission powers may comprise the second transmission power.

The second uplink transmission may have (or be associated with) a second power priority. The power priorities of the plurality of uplink transmissions may comprise the second power priority of the second uplink transmission.

The wireless device may prioritize the first uplink transmission over the second uplink transmission. The wireless device may prioritize the first uplink transmission over the second uplink transmission, for example, based on the first power priority of the first uplink transmission being greater/larger than the second power priority of the second uplink transmission. The wireless device may prioritize the first uplink transmission over the second uplink transmission, for example, based on the first uplink transmission and the second uplink transmission overlapping in time. The wireless device may prioritize the first uplink transmission over the second uplink transmission, for example, based on the total transmission power of the plurality of uplink transmissions exceeding the maximum transmission power.

The wireless device may adjust the second transmission power of the second uplink transmission, for example, based on the prioritizing the first uplink transmission over the second uplink transmission. The wireless device may reduce the second transmission power of the second uplink transmission, for example, based on the prioritizing the first uplink transmission over the second uplink transmission. The wireless device may determine/allocate a second adjusted transmission power to/for the second uplink transmission, for example, based on the prioritizing the first uplink transmission over the second uplink transmission. The plurality of adjusted transmission/transmit powers may comprise the second adjusted transmission power.

The wireless device may determine/calculate the second adjusted transmission power based on multiplying the second transmission power with a scaling factor (e.g., 0<=scaling factor<=1). The wireless device may determine/calculate the second adjusted transmission power based on subtracting a transmission power offset from the second transmission power (e.g., max (0, transmission power−transmission power offset).

The second adjusted transmission power may be lower than the second transmission power (e.g., 0<scaling factor<1). The wireless device may send (e.g., transmit)/perform, via the uplink BWP of the uplink carrier of the cell, the second uplink transmission with the second adjusted transmission power. The wireless device may send (e.g., transmit)/perform, via the uplink BWP of the uplink carrier of the cell, the second uplink transmission with the second adjusted transmission power, for example, based on the prioritizing the first uplink transmission over the second uplink transmission.

The second adjusted transmission power may be equal to zero (e.g., scaling factor=0). The wireless device may drop (or may not perform/send (e.g., transmit)) the second uplink transmission, for example, based on the prioritizing the first uplink transmission over the second uplink transmission. The wireless device may drop (or may not perform/send (e.g., transmit)) the second uplink transmission, for example, based on the second adjusted transmission power being equal to zero.

The second adjusted transmission power may be equal to the second transmission power (e.g., scaling factor=1). The wireless device may send (e.g., transmit)/perform, via the uplink BWP of the uplink carrier of the cell, the second uplink transmission with the second transmission power.

The wireless device may send (e.g., transmit)/perform, via the uplink BWP of the uplink carrier of the cell, the second uplink transmission in a second transmission occasion (e.g., a second time resource and a second frequency resource). The wireless device may send (e.g., transmit) the second uplink transmission based on the second TCI state (e.g., the TCI state 61). The wireless device may send (e.g., transmit) the second uplink transmission with a second spatial domain transmission filter/beam that is determined based on a second reference signal indicated by the second TCI state. The second spatial domain transmitting/transmission filter/beam may be, for example, same as (or substantially same as, x degrees apart, x=0, 1, 5, 10, and/or the like) a spatial domain reception/receiving filter/beam used to receive the second reference signal. The second spatial domain transmitting/transmission filter/beam may be, for example, same as (or substantially same as, x degrees apart, x=0, 1, 5, 10, and/or the like) a spatial domain transmission/transmitting filter/beam used to send (e.g., transmit) the second reference signal.

The wireless device may not adjust the first transmission power of the first uplink transmission, for example, based on the prioritizing the first uplink transmission over the second uplink transmission. The wireless device may not reduce the first transmission power of the first uplink transmission, for example, based on the prioritizing the first uplink transmission over the second uplink transmission.

The wireless device may send (e.g., transmit)/perform, via the uplink BWP of the uplink carrier of the cell, the first uplink transmission with the first transmission power. The wireless device may send (e.g., transmit)/perform, via the uplink BWP of the uplink carrier of the cell, the first uplink transmission with the first transmission power, for example, based on the prioritizing the first uplink transmission over the second uplink transmission.

The wireless device may send (e.g., transmit)/perform, via the uplink BWP of the uplink carrier of the cell, the first uplink transmission in a first transmission occasion (e.g., a first time resource and a first frequency resource). The wireless device may send (e.g., transmit) the first uplink transmission based on the first TCI state (e.g., the TCI state 26). The wireless device may send (e.g., transmit) the first uplink transmission with a first spatial domain transmission filter/beam that is determined based on a first reference signal indicated by the first TCI state. The first spatial domain transmitting/transmission filter/beam may be, for example, same as (or substantially same as, x degrees apart, x=0, 1, 5, 10, and/or the like) a spatial domain reception/ receiving filter/beam used to receive the first reference signal. The first spatial domain transmitting/transmission filter/beam may be, for example, same as (or substantially same as, x degrees apart, x=0, 1, 5, 10, and/or the like) a spatial domain transmission/transmitting filter/beam used to send (e.g., transmit) the first reference signal.

The first uplink transmission (e.g., Uplink transmission 1 in Case 1) may be associated with the first coreset pool index (e.g., Coreset pool index 0). The wireless device may receive, via a first coreset with the first coreset pool index, a first DCI scheduling/triggering the first uplink transmission (e.g., PUSCH transmission, HARQ-ACK transmission, and/or the like). The first uplink transmission may be associated with the first coreset pool index, for example, based on the receiving the first DCI scheduling/triggering the first uplink transmission via the first coreset with the first coreset pool index. The plurality of coresets may comprise the first coreset.

The one or more configuration parameters may indicate, for a first uplink resource (or a first uplink resource group/set comprising a first uplink resource), the first coreset pool index. For example, the wireless device may send (e.g., transmit)/perform the first uplink transmission via the first uplink resource. For example, the first uplink transmission may be configured/scheduled on the first uplink resource. The first uplink transmission may be associated with the first coreset pool index, for example, based on the one or more configuration parameters indicating, for the first uplink resource (or the first uplink resource group/set comprising the first uplink resource), the first coreset pool index. The uplink carrier of the cell may comprise the first uplink resource. The (active) uplink BWP of the uplink carrier of the cell may comprise the first uplink resource. The first uplink resource (or the first uplink resource group/set) may be, for example, a first SRS resource (or a first SRS resource set). The first uplink resource (or the first uplink resource group/set) may be, for example, a first PUCCH resource (or a first PUCCH resource group/set).

The second uplink transmission (e.g., Uplink transmission 2 in Case 1) may be associated with the second coreset pool index (e.g., Coreset pool index 1). The wireless device may receive, via a second coreset with the second coreset pool index, a second DCI scheduling/triggering the second uplink transmission (e.g., PUSCH transmission, HARQ-ACK transmission, and/or the like). The second uplink transmission may be associated with the second coreset pool index, for example, based on the receiving the second DCI scheduling/triggering the second uplink transmission via the second coreset with the second coreset pool index. The plurality of coresets may comprise the second coreset.

The one or more configuration parameters may indicate, for a second uplink resource (or a second uplink resource group/set comprising a second uplink resource), the second coreset pool index. For example, the wireless device may send (e.g., transmit)/perform the second uplink transmission via the second uplink resource. For example, the second uplink transmission may be configured/scheduled on the second uplink resource. The second uplink transmission may be associated with the second coreset pool index, for example, based on the one or more configuration parameters indicating, for the second uplink resource (or the second uplink resource group/set comprising the second uplink resource), the second coreset pool index. The uplink carrier of the cell may comprise the second uplink resource. The (active) uplink BWP of the uplink carrier of the cell may comprise the second uplink resource. The second uplink resource (or the second uplink resource group/set) may be, for example, a second SRS resource (or a second SRS resource set). The second uplink resource (or the second uplink resource group/set) may be, for example, a second PUCCH resource (or a second PUCCH resource group/set).

The wireless device may prioritize the first uplink transmission over the second uplink transmission, for example, based on the first coreset pool index of (or associated with) the first uplink transmission being lower than the second coreset pool index of (or associated with) the second uplink transmission. The first coreset pool index may be, for example, equal to zero. The second coreset pool index may be, for example, equal to one.

The wireless device may prioritize the first uplink transmission over the second uplink transmission, for example, based on the first coreset pool index of (or associated with) the first uplink transmission being higher than the second coreset pool index of (or associated with) the second uplink transmission. The first coreset pool index may be, for example, equal to one. The second coreset pool index may be, for example, equal to zero.

The wireless device may prioritize the first uplink transmission over the second uplink transmission, for example, based on the first coreset pool index of (or associated with) the first uplink transmission being equal to zero. The wireless device may prioritize the first uplink transmission over the second uplink transmission, for example, based on the first TCI state index of the first TCI state of (or associated with) the first uplink transmission being lower than the second TCI state index of the second TCI state of (or associated with) the second uplink transmission.

The wireless device may prioritize the first uplink transmission over the second uplink transmission, for example, based on the first TCI state index of the first TCI state of (or associated with) the first uplink transmission being higher than the second TCI state index of the second TCI state of (or associated with) the second uplink transmission. The wireless device may prioritize the first uplink transmission over the second uplink transmission, for example, based on the first TCI state of (or associated with) the first uplink transmission being the first/starting/earliest/initial TCI state in the vector/set/list of the at least two TCI states.

The one or more configuration parameters may indicate, for the first TCI state, a first PCI of (or associated with/indicating/identifying) the cell. The one or more configuration parameters may comprise a higher layer (or RRC) parameter physCellId indicating the first PCI for the cell. The first PCI may identify/indicate a physical cell identity of the cell. The cell may be a serving cell. The first PCI may be associated with the first uplink transmission based on the first TCI state indicated with the first PCI being associated with the first uplink transmission.

The one or more configuration parameters may indicate, for the second TCI state, a second PCI of (or associated with/indicating/identifying) a second cell. The one or more configuration parameters may comprise a higher layer (or RRC) parameter physCellId indicating the second PCI for the second cell. The second PCI may identify/indicate a physical cell identity of the second cell. The second cell may be different from the cell. The first PCI may be different from the second PCI. The second cell may be, for example, a non-serving cell. The second cell may be, for example, a neighboring cell. The second cell may be, for example, a candidate/assisting cell. The second PCI may be associated with the second uplink transmission based on the second TCI state indicated with the second PCI being associated with the second uplink transmission.

The wireless device may prioritize the first uplink transmission over the second uplink transmission, for example, based on the first PCI associated with the first uplink transmission being lower/higher than the second PCI associated with the second uplink transmission. The wireless device may prioritize the first uplink transmission over the second uplink transmission, for example, based on the first uplink transmission being associated with the first PCI of a serving cell (or the cell). The wireless device may prioritize the first uplink transmission over the second uplink transmission, for example, based on the first TCI state of the first uplink transmission being associated with the first PCI of a serving cell (or the cell).

The wireless device may prioritize the first uplink transmission over the second uplink transmission, for example, based on the second uplink transmission being associated with the second PCI of a non-serving cell (or the second cell). The wireless device may prioritize the first uplink transmission over the second uplink transmission, for example, based on the second TCI state of the second uplink transmission being associated with the second PCI of a non-serving cell (or the second cell).

A TCI state of the at least two TCI states may be associated with a PCI. The one or more configuration parameters may indicate an association between the TCI state and the PCI. The TCI state being associated with the PCI may comprise/indicate the TCI state being associated with a first cell, of the one or more cells, identified/indicated by the PCI.

The one or more configuration parameters may, for example, indicate a plurality of indexes/identifiers/identities (e.g., neighboring/non-serving/assisting/candidate cell indexes/re-indexes, TRP indexes, coreset pool indexes, TCI state group/pool indexes) for the at least two TCI states. The one or more configuration parameters may, for example, indicate a respective index of the plurality of indexes for each TCI state of the at least two TCI states. A first index (or a value of a first index) of the plurality of indexes/identifiers/identities may indicate (or be mapped to or be associated with) the first PCI of the cell. The one or more configuration parameters may, for example, indicate the first index for the first TCI state. A second index (or a value of a second index) of the plurality of indexes/identifiers/identities may indicate (or be mapped to or be associated with) the second PCI of the second cell. The one or more configuration parameters may, for example, indicate the second index for the second TCI state.

The one or more configuration parameters indicating the plurality of indexes/identifiers/identities for the at least two TCI states may comprise the one or more configuration parameters indicating, for the at least two TCI states, a plurality of values of an index/identifier/identity (e.g., (e.g., neighboring/non-serving/assisting/candidate cell index/re-index, TRP index, coreset pool index, TCI state group/pool index). The one or more configuration parameters may indicate, for each TCI state of the at least two TCI states, a respective value of the plurality of values of the index/identifier/identity. A first value of the plurality of values may indicate (or be mapped to or be associated with) the first PCI. The one or more configuration parameters may, for example, indicate the first value for the first TCI state. A second value of the plurality of values may indicate (or be mapped to or be associated with) the second PCI. The one or more configuration parameters may, for example, indicate the second value for the second TCI state.

The first uplink transmission (or the first transmission occasion) may start in/from a first RB (or in a first PRB). The second uplink transmission (or the second transmission occasion) may start in/from a second RB (or in a second PRB).

The wireless device may prioritize the first uplink transmission over the second uplink transmission, for example, based on the first RB of the first uplink transmission being lower/higher than the second RB of the second uplink transmission. The wireless device may prioritize the first uplink transmission over the second uplink transmission, for example, based on a starting RB of the first uplink transmission being lower/higher than a starting RB of the second uplink transmission.

The first uplink transmission (or the first transmission occasion) may end in/from/at a first RB (or in a first PRB). The second uplink transmission (or the second transmission occasion) may end in/from/at a second RB (or in a second PRB).

The wireless device may prioritize the first uplink transmission over the second uplink transmission, for example, based on the first RB of the first uplink transmission being lower/higher than the second RB of the second uplink transmission. The wireless device may prioritize the first uplink transmission over the second uplink transmission, for example, based on an ending RB of the first uplink transmission being lower/higher than an ending RB of the second uplink transmission.

The one or more configuration parameters may indicate at least two SRS resource sets. The at least two SRS resource sets may comprise a first SRS resource set and a second SRS resource set.

The one or more configuration parameters may comprise, for each SRS resource set of the at least two SRS resource sets, a respective usage parameter. For example, the usage parameter may be set to codebook. The usage parameter of each SRS resource set of the at least two SRS resource sets may be set to codebook. The one or more configuration parameters may indicate codebook, for example, for each SRS resource set of the at least two SRS resource sets. The one or more configuration parameters may indicate, for the first SRS resource set, codebook (or a usage parameter set to codebook). The one or more configuration parameters may indicate, for the second SRS resource set, codebook (or a usage parameter set to codebook).

For example, the usage parameter may be set to non-codebook. The usage parameter of each SRS resource set of the at least two SRS resource sets may be set to non-codebook. The one or more configuration parameters may indicate non-codebook, for example, for each SRS resource set of the at least two SRS resource sets. The one or more configuration parameters may indicate, for the first SRS resource set, non-codebook (or a usage parameter set to non-codebook). The one or more configuration parameters may indicate, for the second SRS resource set, non-codebook (or a usage parameter set to non-codebook).

The one or more configuration parameters may indicate, for the at least two SRS resource sets, at least two SRS resource set indexes. The one or more configuration parameters may indicate, for each SRS resource set of the at least two SRS resource sets, a respective SRS resource set index of the at least two SRS resource set indexes. Each SRS resource set of the at least two SRS resource sets may be identified/indicated by a respective SRS resource set index of the at least two SRS resource set indexes. The first SRS resource set of the at least two SRS resource sets may be identified/indicated by a first SRS resource set index of the at least two SRS resource set indexes. The second SRS resource set of the at least two SRS resource sets may be identified/indicated by a second SRS resource set index of the at least two SRS resource set indexes.

The first SRS resource set index of the first SRS resource set may be lower than the second SRS resource set index of the second SRS resource set. The first DCI scheduling/triggering/activating the first uplink transmission and the second uplink transmission may comprise a field (e.g., SRS resource set indicator, TCI field, Unified TCI state(s) field, TRP indicator field(s), and/or the like). The field may indicate, for example, a multi-TRP uplink repetition (e.g., multi-TRP PUSCH repetition, multi-TRP PUCCH repetition). A value of the field may indicate the multi-TRP uplink repetition. A value of the field may indicate the multi-TRP uplink repetition. A size/length of the field may be, for example, two bits. For example, the value of the field (e.g., SRS resource set indicator) may be equal to '10'. For example, the value of the field (e.g., SRS resource set indicator) may be equal to '11'. A size/length of the field may be, for example, one bit. For example, the value of the field (e.g., SRS resource set indicator) may be equal to '1'.

The first uplink transmission and the second uplink transmission may be associated with the at least two SRS resource sets. The first uplink transmission may be associated with the first SRS resource set of the at least two SRS resource sets. The second uplink transmission may be associated with the second SRS resource set of the at least two SRS resource sets. The first uplink transmission and the second uplink transmission may be associated with the at least two SRS resource sets, for example, based on the value of the field (e.g., SRS resource set indicator) being equal to '10' or '11'. The first uplink transmission and the second uplink transmission may be associated with the at least two SRS resource sets, for example, based on the value of the field (e.g., SRS resource set indicator) indicating the multi-TRP uplink repetition.

The wireless device may send (e.g., transmit) the first uplink transmission, for example, based on the first SRS resource set. The wireless device may send (e.g., transmit) the first uplink transmission, for example, based on a first SRS resource in the first SRS resource set. The one or more configuration parameters may indicate, for the first SRS resource, a first number of SRS ports (e.g., nrofSRS-Ports). The wireless device may send (e.g., transmit) the first uplink transmission, for example, based on the first number of SRS ports of the first SRS resource in the first SRS resource set. For example, the wireless device may send (e.g., transmit) the first uplink transmission with a first transmission precoder that is determined based on the first number of SRS ports.

The wireless device may send (e.g., transmit) the second uplink transmission, for example, based on the second SRS resource set. The wireless device may send (e.g., transmit) the second uplink transmission, for example, based on a second SRS resource in the second SRS resource set. The one or more configuration parameters may indicate, for the second SRS resource, a second number of SRS ports (e.g., nrofSRS-Ports). The wireless device may send (e.g., transmit) the second uplink transmission, for example, based on the second number of SRS ports of the second SRS resource in the second SRS resource set. For example, the wireless device may send (e.g., transmit) the second uplink transmission with a second transmission precoder that is determined based on the second number of SRS ports.

The wireless device may prioritize the first uplink transmission over the second uplink transmission, for example, based on the first uplink transmission being associated with the first SRS resource set. The wireless device may prioritize the first uplink transmission over the second uplink transmission, for example, based on the first uplink transmission being associated with the first SRS resource set with the first SRS resource set index that is lower than the second SRS resource set index of the second SRS resource set associated with the second uplink transmission. The wireless device may prioritize the first uplink transmission over the second uplink transmission, for example, based on the first SRS resource set index of the first SRS resource set associated with the first uplink transmission being lower than the second SRS resource set index of the second SRS resource set associated with the second uplink transmission.

The wireless device may be equipped with a plurality of antenna panels. The plurality of antenna panels may comprise a first antenna panel and a second antenna panel. The first antenna panel may be identified/indicated by a first antenna panel index/identifier. The one or more configuration parameters may, for example, indicate the first antenna panel index for the first antenna panel. For example, the wireless device may send (e.g., transmit) an uplink signal (e.g., Beam report, CSI report, UE capability message, PUCCH transmission) indicating the first antenna panel index for the first antenna panel. The second antenna panel may be identified/indicated by a second antenna panel index/identifier. The one or more configuration parameters may, for example, indicate the second antenna panel index for the second antenna panel. For example, the wireless device may send (e.g., transmit) an uplink signal (e.g., Beam report, CSI report, UE capability message, PUCCH transmission) indicating the second antenna panel index for the second antenna panel.

The wireless device may send (e.g., transmit) the first uplink transmission with the first antenna panel. The first uplink transmission may be associated with the first antenna panel, for example, based on sending (e.g., transmitting) the first uplink transmission with the first antenna panel. The wireless device may send (e.g., transmit) the second uplink transmission with the second antenna panel. The second uplink transmission may be associated with the second antenna panel, for example, based on sending (e.g., transmitting) the second uplink transmission with the second antenna panel.

The first antenna panel index of the first antenna panel associated with the first uplink transmission may be lower/higher than the second antenna panel index of the second antenna panel associated with the second uplink transmission. The wireless device may prioritize the first uplink transmission over the second uplink transmission, for example, based on the first antenna panel index of the first antenna panel associated with the first uplink transmission being lower/higher than the second antenna panel index of the second antenna panel associated with the second uplink transmission.

A capability message (e.g., a UE capability message) may comprise/indicate a list of capability value sets (or a list of wireless device capability value sets or a list of capability value sets of the wireless device). Each capability value set of the list of capability value sets may comprise/indicate a respective maximum number of SRS ports. For example, a first capability value set of the list of capability value sets may comprise/indicate a first maximum number of SRS ports. A second capability value set of the list of capability value sets may comprise/indicate a second maximum number of SRS ports.

Each capability value set of the list of capability value sets may be identified/indicated by a respective capability value set index. For example, the first capability value set may be identified/indicated by a first capability value set index. The second capability value set may be identified/indicated by a second capability value set index.

The wireless device may send (e.g., transmit) a report (e.g., beam reporting, CSI reporting, L1-RSRP reporting, SINR reporting). The wireless device may send (e.g., transmit) the report via PUCCH The report may indicate an association/mapping/correspondence between the first reference signal indicated by the first TCI state and the first capability value set. The report may comprise a first reference signal index (e.g., CSI-RS and/or SSB resource index) of the first reference signal and the first capability value set index of the first capability value set. The wireless device may determine the association/mapping/correspondence between the first reference signal and the first capability value set. The one or more configuration parameters may indicate, for the first reference signal, the first reference signal index. The first TCI state may be associated with the first capability value set, for example, based on the association/mapping/correspondence between the first reference signal indicated by the first TCI state and the first capability value set. The first uplink transmission may be associated with the first capability value set, for example, based on (e.g., in response to) sending (e.g., transmitting) the first repetition based on the first TCI state associated with the first capability value set.

The report may indicate an association/mapping/correspondence between the second reference signal indicated by the second TCI state and the second capability value set. The report may comprise a second reference signal index (e.g., CSI-RS and/or SSB resource index) of the second reference signal and the second capability value set index of the second capability value set. The wireless device may determine the association/mapping/correspondence between the second reference signal and the second capability value set. The one or more configuration parameters may indicate, for the second reference signal, the second reference signal index. The second TCI state may be associated with the second capability value set, for example, based on the association/mapping/correspondence between the second reference signal indicated by the second TCI state and the second capability value set. The second uplink transmission may be associated with the second capability value set, for example, based on (e.g., in response to) sending (e.g., transmitting) the second repetition based on the second TCI state associated with the second capability value set.

The wireless device may receive, for example, from the base station, an acknowledgement for the report. The acknowledgement may be, for example, DCI.

The first uplink transmission may be associated with the first capability value set. The wireless device may send (e.g., transmit) the first uplink transmission based on the first TCI state associated with the first capability value set. The first uplink transmission may be associated with the first capability value set, for example, based on (e.g., in response to) the sending (e.g., transmitting) the first uplink transmission based on the first TCI state associated with the first capability value set.

The second uplink transmission may be associated with the second capability value set. The wireless device may send (e.g., transmit) the second uplink transmission based on the second TCI state associated with the second capability value set. The second uplink transmission may be associated with the second capability value set, for example, based on (e.g., in response to) the sending (e.g., transmitting) the second uplink transmission based on the second TCI state associated with the second capability value set.

For example, the first capability value set index of the first capability value set associated with the first uplink transmission may be lower/higher than the second capability value set index of the second capability value set associated with the second uplink transmission. The wireless device may prioritize the first uplink transmission over the second uplink transmission, for example, based on the first capability value set index of the first capability value set associated with the first uplink transmission being lower/higher than the second capability value set index of the second capability value set associated with the second uplink transmission.

The first DCI scheduling/activating/triggering the first uplink transmission and the second uplink transmission may indicate the first uplink transmission among the first uplink transmission and the second uplink transmission. The DCI may comprise a field (e.g., TRP field, coreset pool index field, SRS resource set index field, antenna panel index field, capability value set index field, beam failure detection set index field, Unified TCI state index field, physical cell index (PCI) field, TCI state field, CSI request field, FDRA field, TDRA field, RV field, HARQ process number field, and/or the like) indicating the first uplink transmission. A value of the field may indicate the first uplink transmission.

The field may be a 1-bit field (or any other quantity of bits). For example, a size/length of the field may be more than 1-bit field. For example, the least significant bit (LSB) of the field may indicate an uplink transmission among the first uplink transmission and the second uplink transmission. For example, the most significant bit (MSB) of the field may indicate an uplink transmission among the first uplink transmission and the second uplink transmission. For example, a reserved bit of the field may indicate an uplink transmission among the first uplink transmission and the second uplink transmission A first value of the field may indicate the first uplink transmission. The uplink transmission may be the first uplink transmission, for example, based on the value of the field being equal to the first value (e.g., 0). The wireless device may prioritize the first uplink transmission over the second uplink transmission, for example, based on the value of the field being equal to the first value.

A second value of the field may indicate the second uplink transmission. The uplink transmission may be the second uplink transmission, for example, based on the value of the field being equal to the second value (e.g., 1).

The one or more configuration parameters may comprise/indicate a value of/for an index (e.g., TRP index, coreset pool index, SRS resource set index, antenna panel index, capability value set index, beam failure detection set index, Unified TCI state index, physical cell index (PCI), and/or the like). The value of the index may indicate an uplink transmission among the first repetition uplink transmission and the second uplink transmission. For example, the one or more configuration parameters may indicate, for the uplink BWP of the cell, the value of the index. For example, the one or more configuration parameters may indicate, for the cell, the value of the index.

A first value of the index may indicate the first uplink transmission. The uplink transmission may be the first uplink transmission, for example, based on the value of the index being equal to the first value (e.g., 0). The wireless device may prioritize the first uplink transmission over the second uplink transmission, for example, based on the value of the index being equal to the first value.

A second value of the index may indicate the second uplink transmission. The uplink transmission may be the second uplink transmission, for example, based on the value of the index being equal to the second value (e.g., 1).

Figure 31:
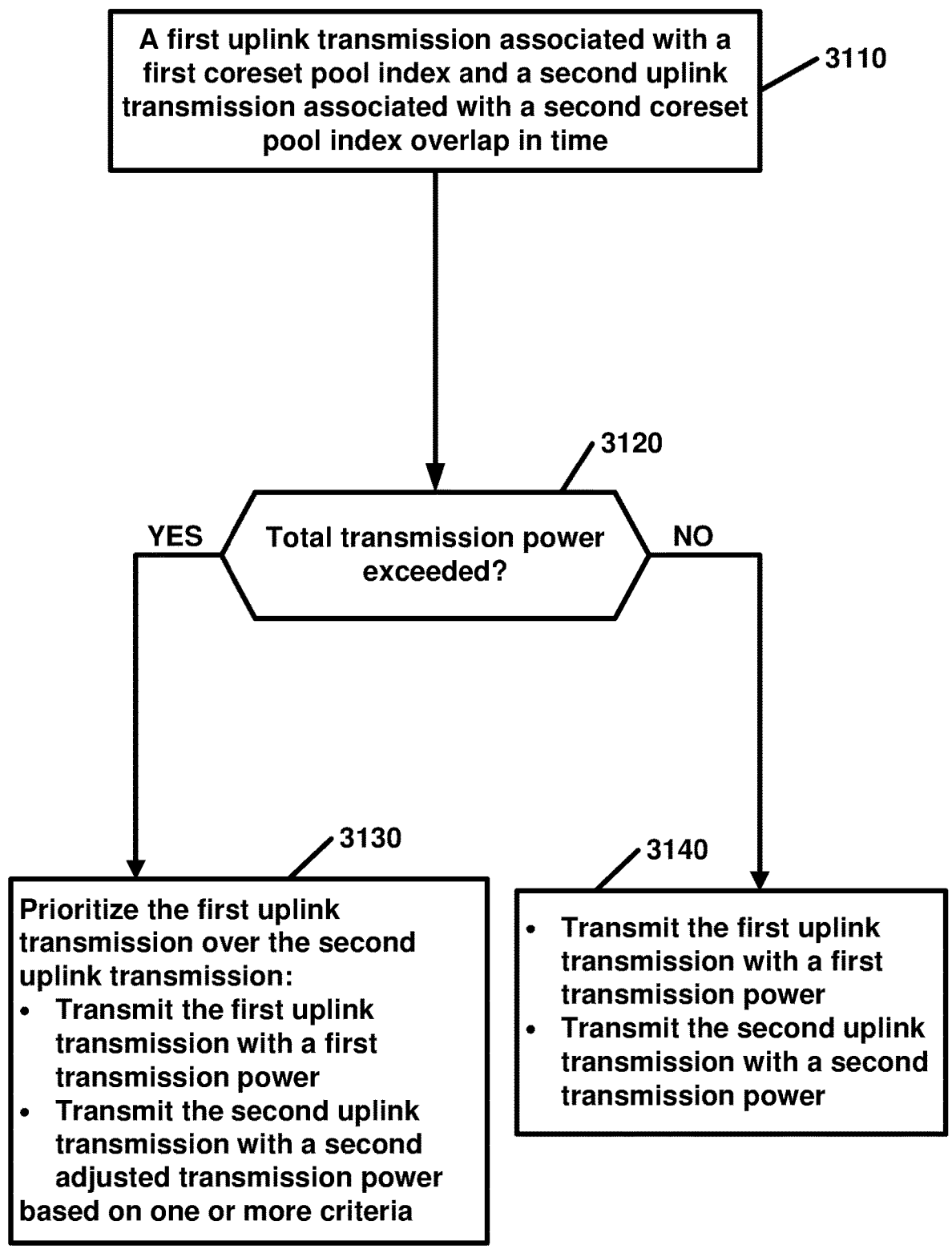
FIG. 31 shows an example of power prioritization.

FIG. 31 shows an example of power prioritization. A wireless device may receive, for example, from a base station, one or more messages comprising one or more configuration parameters. The base station may send (e.g., transmit) the one or more messages to the wireless device.

In FIG. 31, the wireless device may determine that a first (scheduled/configured) uplink transmission of/via/on an uplink carrier (e.g., NUL, SUL) of the cell overlaps in time with a second (scheduled/configured) uplink transmission of/via/on the uplink carrier of the cell, as indicated at step 3110.

A base station may determine that the first (scheduled/configured) uplink transmission of the uplink carrier (e.g., NUL, SUL) of the cell overlaps in time with the second (scheduled/configured) uplink transmission of the uplink carrier of the cell. The first uplink transmission may be associated with a first coreset pool index. The second uplink transmission may be associated with a second coreset pool index.

The wireless device may determine/calculate a first transmission power for the first uplink transmission. The wireless device may determine/calculate, for the first uplink transmission, the first transmission power based on a first TCI state. The wireless device may determine/calculate a second transmission power for the second uplink transmission. The wireless device may determine/calculate, for the second uplink transmission, the second transmission power based on a second TCI state.

The first TCI state and the second TCI state may be different. The first TCI state and the second TCI state may be the same.

A total transmission/transmit power may exceed a maximum transmission/transmit power (e.g., $\hat{P}_{CMAX}(i)$). The total transmission power of a plurality of uplink transmissions comprising the first uplink transmission and the second uplink transmission may exceed the maximum transmission power in a transmission occasion. This may be shown by the direction "YES" at step 3120.

As indicated by step 3130, the wireless device may prioritize the first uplink transmission over the second uplink transmission, for example, based on the total transmission power exceeding the maximum transmission/transmit power. The base station may prioritize the first uplink transmission over the second uplink transmission, for example, based on the total transmission power exceeding the maximum transmission/transmit power. The wireless device may reduce the second transmission power of the second uplink transmission, for example, based on the prioritizing the first uplink transmission over the second uplink transmission. The wireless device may determine a second adjusted transmission power for the second uplink transmission. The second adjusted transmission power may be lower/less than the second transmission power.

The wireless device may prioritize the first uplink transmission over the second uplink transmission, for example, based on one or more criteria discussed in FIG. 30 (e.g., lowest/highest coreset pool index, lowest/highest starting/ending frequency/RB, lowest/highest TCI state index, lowest/highest antenna panel index, and/or the like). The base station may prioritize the first uplink transmission over the second uplink transmission, for example, based on one or more criteria discussed in FIG. 30 (e.g., lowest/highest coreset pool index, lowest/highest starting/ending frequency/RB, lowest/highest TCI state index, lowest/highest antenna panel index, and/or the like).

The wireless device may send (e.g., transmit), via the uplink carrier of the cell, the first uplink transmission with the first transmission power. The wireless device may send (e.g., transmit) the first uplink transmission with the first transmission power, for example, based on the prioritizing the first uplink transmission over the second uplink transmission.

The base station may receive, via the uplink carrier of the cell, the first uplink transmission based on the first transmission power. The base station may receive the first uplink transmission based on the first transmission power, for example, based on (e.g., in response to) the prioritizing the first uplink transmission over the second uplink transmission.

The wireless device may send (e.g., transmit), via the uplink carrier of the cell, the second uplink transmission with the second adjusted transmission power. The wireless device may send (e.g., transmit) the second uplink transmission with the second adjusted transmission power, for example, based on the prioritizing the first uplink transmission over the second uplink transmission.

The base station may receive, via the uplink carrier of the cell, the second uplink transmission based on the second adjusted transmission power. The base station may receive the second uplink transmission based on the second adjusted transmission power, for example, based on (e.g., in response to) the prioritizing the first uplink transmission over the second uplink transmission.

A total transmission/transmit power may not exceed a maximum transmission/transmit power (e.g., $\hat{P}_{CMAX}(i)$) The total transmission power of a plurality of uplink transmissions comprising the first uplink transmission and the second uplink transmission may not exceed the maximum transmission power in a transmission occasion. The total transmission power of the plurality of uplink transmissions may be lower than or equal to the maximum transmission power. This may be shown by the direction "NO" at step 3120.

As shown at step 3140, the wireless device may send (e.g., transmit), via the uplink carrier of the cell, the first uplink transmission with the first transmission power. The wireless device may send (e.g., transmit) the first uplink transmission with the first transmission power, for example, based on the total transmission power not exceeding the maximum transmission power.

The base station may receive, via the uplink carrier of the cell, the first uplink transmission based on the first transmission power. The base station may receive the first uplink transmission based on the first transmission power, for example, based on (e.g., in response to) the total transmission power not exceeding the maximum transmission power.

As shown at step 3140, the wireless device may send (e.g., transmit), via the uplink carrier of the cell, the second uplink transmission with the second transmission power. The wireless device may send (e.g., transmit) the second uplink transmission with the second transmission power, for example, based on the total transmission power not exceeding the maximum transmission power.

The base station may receive, via the uplink carrier of the cell, the second uplink transmission based on the second transmission power. The base station may receive the second uplink transmission based on the second transmission power, for example, based on (e.g., in response to) the total transmission power not exceeding the maximum transmission power.

Figure 32:
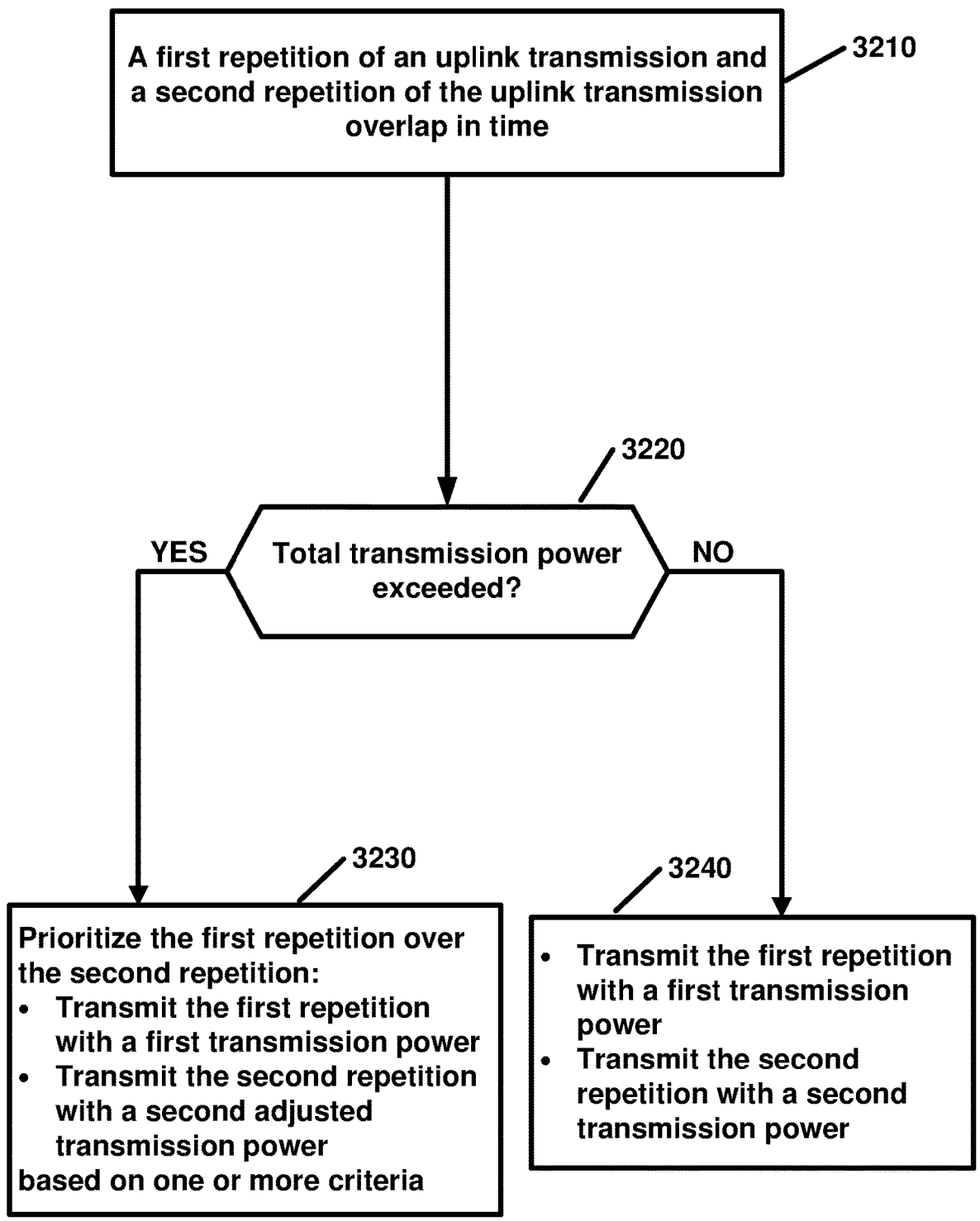
FIG. 32 shows an example of power prioritization.

FIG. 32 shows an example of power prioritization. A wireless device may receive, for example, from a base station, one or more messages comprising one or more configuration parameters. The base station may send (e.g., transmit) the one or more messages to the wireless device.

In FIG. 32, as shown at step 3210, the wireless device may determine that a first repetition of an (scheduled/configured) uplink transmission of/via/on an uplink carrier (e.g., NUL, SUL) of the cell overlaps in time with a second repetition of the (scheduled/configured) uplink transmission of/via/on the uplink carrier of the cell. The first repetition and the second repetition are via the uplink carrier of the cell.

The first repetition and the second repetition may be in a frequency domain. The first repetition and the second repetition may be frequency domain repetitions (e.g., FDM).

The base station may determine that the first repetition of the uplink transmission of the uplink carrier (e.g., NUL, SUL) of the cell overlaps in time with the second repetition of the uplink transmission of the uplink carrier of the cell. The wireless device may determine/calculate a first transmission power for the first repetition of the uplink transmission. The wireless device may determine/calculate, for the first repetition of the uplink transmission, the first transmission power based on a first TCI state. The wireless device may determine/calculate a second transmission power for the second repetition of the uplink transmission. The wireless device may determine/calculate, for the second repetition of the uplink transmission, the second transmission power based on a second TCI state.

The first TCI state and the second TCI state may be different. The first TCI state and the second TCI state may be the same.

A total transmission/transmit power may exceed a maximum transmission/transmit power (e.g., $\hat{P}_{CMAX}(i)$). The total transmission power of a plurality of uplink transmissions comprising the first repetition of the uplink transmission and the second repetition of the uplink transmission may exceed the maximum transmission power in a transmission occasion. This may be shown by the direction "YES" at step 3220.

As indicated at step 3230, the wireless device may prioritize the first repetition of the uplink transmission over the second repetition of the uplink transmission, for example, based on the total transmission power exceeding the maximum transmission/transmit power. The base station may prioritize the first repetition of the uplink transmission over the second repetition of the uplink transmission, for example, based on the total transmission power exceeding the maximum transmission/transmit power. The wireless device may reduce the second transmission power of the second repetition of the uplink transmission, for example, based on the prioritizing the first repetition of the uplink transmission over the second repetition of the uplink transmission. The wireless device may determine a second adjusted transmission power for the second repetition of the uplink transmission. The second adjusted transmission power may be lower/less than the second transmission power.

The wireless device may prioritize the first repetition of the uplink transmission over the second repetition of the uplink transmission, for example, based on one or more criteria discussed in FIG. 30 (e.g., lowest/highest coreset pool index, lowest/highest starting/ending frequency/RB, lowest/highest TCI state index, lowest/highest antenna panel index, and/or the like).

The base station may prioritize the first repetition of the uplink transmission over the second repetition of the uplink transmission, for example, based on one or more criteria discussed in FIG. 30 (e.g., lowest/highest coreset pool index, lowest/highest starting/ending RB, lowest/highest TCI state index, lowest/highest antenna panel index, and/or the like). The wireless device may send (e.g., transmit), via the uplink carrier of the cell, the first repetition of the uplink transmission with the first transmission power. The wireless device may send (e.g., transmit) the first repetition of the uplink transmission with the first transmission power, for example, based on the prioritizing the first repetition of the uplink transmission over the second repetition of the uplink transmission.

The base station may receive, via the uplink carrier of the cell, the first repetition of the uplink transmission based on the first transmission power. The base station may receive the first repetition of the uplink transmission based on the first transmission power, for example, based on (e.g., in response to) the prioritizing the first repetition of the uplink transmission over the second repetition of the uplink transmission.

The wireless device may send (e.g., transmit), via the uplink carrier of the cell, the second repetition of the uplink transmission with the second adjusted transmission power. The wireless device may send (e.g., transmit) the second repetition of the uplink transmission with the second adjusted transmission power, for example, based on the prioritizing the first repetition of the uplink transmission over the second repetition of the uplink transmission.

The base station may receive, via the uplink carrier of the cell, the second repetition of the uplink transmission based on the second adjusted transmission power. The base station may receive the second repetition of the uplink transmission based on the second adjusted transmission power, for example, based on (e.g., in response to) the prioritizing the first repetition of the uplink transmission over the second repetition of the uplink transmission.

A total transmission/transmit power may not exceed a maximum transmission/transmit power (e.g., $\hat{P}_{CMAX}(i)$). The total transmission power of a plurality of uplink transmissions comprising the first repetition of the uplink transmission and the second repetition of the uplink transmission may not exceed the maximum transmission power in a transmission occasion. The total transmission power of the plurality of uplink transmissions may be lower than or equal to the maximum transmission power. This may be shown by the direction "NO" at step 3220.

As shown at step 3240, the wireless device may send (e.g., transmit), via the uplink carrier of the cell, the first repetition of the uplink transmission with the first transmission power. The wireless device may send (e.g., transmit) the first repetition of the uplink transmission with the first transmission power, for example, based on the total transmission power not exceeding the maximum transmission power.

The base station may receive, via the uplink carrier of the cell, the first repetition of the uplink transmission based on the first transmission power. The base station may receive the first repetition of the uplink transmission based on the first transmission power, for example, based on (e.g., in response to) the total transmission power not exceeding the maximum transmission power.

As shown at step 3240, the wireless device may send (e.g., transmit), via the uplink carrier of the cell, the second repetition of the uplink transmission with the second transmission power. The wireless device may send (e.g., transmit) the second repetition of the uplink transmission with the second transmission power, for example, based on the total transmission power not exceeding the maximum transmission power.

The base station may receive, via the uplink carrier of the cell, the second repetition of the uplink transmission based on the second transmission power. The base station may receive the second repetition of the uplink transmission based on the second transmission power, for example, based on (e.g., in response to) the total transmission power not exceeding the maximum transmission power.

Figure 33:
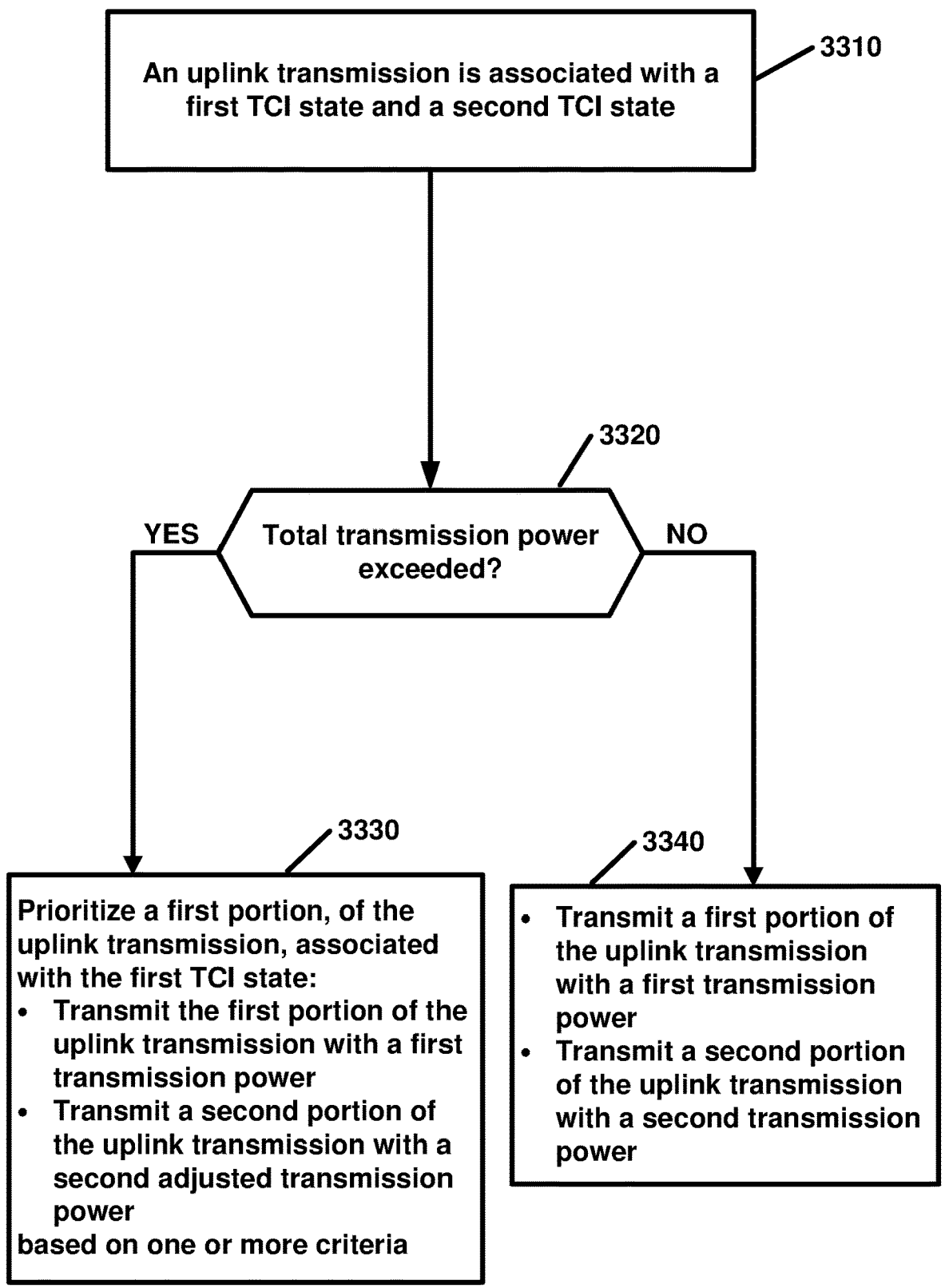
FIG. 33 shows an example of power prioritization.

FIG. 33 shows an example of power prioritization. A wireless device may receive, for example, from a base station, one or more messages comprising one or more configuration parameters. The base station may send (e.g., transmit) the one or more messages to the wireless device.

In FIG. 33, as shown at step 3310, an uplink transmission via an uplink carrier (e.g., NUL, SUL) of a cell may be associated with a first TCI state and a second TCI state. A first portion (e.g., first layer(s), first data stream(s), first antenna port(s), first DM-RS antenna port(s)) of the uplink transmission may be associated with the first TCI state. A second portion (e.g., second layer(s), second data stream(s), second antenna port(s), second DM-RS antenna port(s)) of the uplink transmission may be associated with the second TCI state.

The one or more configuration parameters may indicate an SFN scheme (e.g., SFN-PUSCH, SFN-PDSCH). Each portion (e.g., layer, data stream, antenna port, DM-RS antenna port) of the uplink transmission may be associated with the first TCI state and the second TCI state.

The wireless device may determine/calculate a first transmission power for the first portion of the uplink transmission. The wireless device may determine/calculate, for the first portion of the uplink transmission, the first transmission power based on a first TCI state. The wireless device may determine/calculate a second transmission power for the second portion of the uplink transmission. The wireless device may determine/calculate, for the second portion of the uplink transmission, the second transmission power based on a second TCI state.

The wireless device may determine/calculate a first transmission power for the uplink transmission, for example, in the SFN scheme. The wireless device may determine/calculate the first transmission power based on a first TCI state. The wireless device may determine/calculate a second transmission power for the uplink transmission. The wireless device may determine/calculate the second transmission power based on a second TCI state.

The first TCI state and the second TCI state may be different. The first TCI state and the second TCI state may be the same.

A total transmission/transmit power may exceed a maximum transmission/transmit power (e.g., $\hat{P}_{CMAX}(i)$) The total transmission power of a plurality of uplink transmissions comprising the uplink transmission may exceed the maximum transmission power in a transmission occasion. This may be shown by the direction "YES" at step 3320.

As shown at step 3330, the wireless device may prioritize the first portion of the uplink transmission over the second portion of the uplink transmission, for example, based on the total transmission power exceeding the maximum transmission/transmit power. The base station may prioritize the first portion of the uplink transmission over the second portion of the uplink transmission, for example, based on the total transmission power exceeding the maximum transmission/transmit power. The wireless device may reduce the second transmission power of the second portion of the uplink transmission, for example, based on the prioritizing the first portion of the uplink transmission over the second portion of the uplink transmission. The wireless device may determine a second adjusted transmission power for the second portion of the uplink transmission. The second adjusted transmission power may be lower/less than the second transmission power.

The wireless device may prioritize the first portion of the uplink transmission over the second portion of the uplink transmission, for example, based on one or more criteria discussed in FIG. 30 (e.g., lowest/highest coreset pool index, lowest/highest starting/ending frequency/RB, lowest/highest TCI state index, lowest/highest antenna panel index, and/or the like).

The base station may prioritize the first portion of the uplink transmission over the second portion of the uplink transmission, for example, based on one or more criteria discussed in FIG. 30 (e.g., lowest/highest coreset pool index, lowest/highest starting/ending frequency/RB, lowest/highest TCI state index, lowest/highest antenna panel index, and/or the like).

The wireless device may send (e.g., transmit), via the uplink carrier of the cell, the first portion of the uplink transmission with the first transmission power. The wireless device may send (e.g., transmit) the first portion of the uplink transmission with the first transmission power, for example, based on the prioritizing the first portion of the uplink transmission over the second portion of the uplink transmission.

The base station may receive, via the uplink carrier of the cell, the first portion of the uplink transmission based on the first transmission power. The base station may receive the first portion of the uplink transmission based on the first transmission power, for example, based on (e.g., in response to) the prioritizing the first portion of the uplink transmission over the second portion of the uplink transmission.

The wireless device may send (e.g., transmit), via the uplink carrier of the cell, the second portion of the uplink transmission with the second adjusted transmission power. The wireless device may send (e.g., transmit) the second portion of the uplink transmission with the second adjusted transmission power, for example, based on the prioritizing the first portion of the uplink transmission over the second portion of the uplink transmission.

The base station may receive, via the uplink carrier of the cell, the second portion of the uplink transmission based on the second adjusted transmission power. The base station may receive the second portion of the uplink transmission based on the second adjusted transmission power, for example, based on (e.g., in response to) the prioritizing the first portion of the uplink transmission over the second portion of the uplink transmission.

A total transmission/transmit power may not exceed a maximum transmission/transmit power (e.g., $\hat{P}_{CMAX}(i)$). The total transmission power of a plurality of uplink transmissions comprising the uplink transmission may not exceed the maximum transmission power in a transmission occasion. The total transmission power of the plurality of uplink transmissions may be lower than or equal to the maximum transmission power. This may be shown by the direction "NO" at step 3320.

As shown at step 3340, the wireless device may send (e.g., transmit), via the uplink carrier of the cell, the first portion of the uplink transmission with the first transmission power. The wireless device may send (e.g., transmit) the first portion of the uplink transmission with the first transmission power, for example, based on the total transmission power not exceeding the maximum transmission power.

The base station may receive, via the uplink carrier of the cell, the first portion of the uplink transmission based on the first transmission power. The base station may receive the first portion of the uplink transmission based on the first transmission power, for example, based on (e.g., in response to) the total transmission power not exceeding the maximum transmission power.

As shown at step 3340, the wireless device may send (e.g., transmit), via the uplink carrier of the cell, the second portion of the uplink transmission with the second transmission power. The wireless device may send (e.g., transmit) the second portion of the uplink transmission with the second transmission power, for example, based on the total transmission power not exceeding the maximum transmission power.

The base station may receive, via the uplink carrier of the cell, the second portion of the uplink transmission based on the second transmission power. The base station may receive the second portion of the uplink transmission based on the second transmission power, for example, based on (e.g., in response to) the total transmission power not exceeding the maximum transmission power.

The wireless device may prioritize the uplink transmission with (or associated with) the first TCI state over the uplink transmission with (or associated with) the second TCI state, for example, based on the total transmission power exceeding the maximum transmission/transmit power. The base station may prioritize the uplink transmission with the first TCI state over the uplink transmission with the second TCI state, for example, based on the total transmission power exceeding the maximum transmission/transmit power. The wireless device may reduce the second transmission power of the uplink transmission with the second TCI state, for example, based on the prioritizing the uplink transmission with the first TCI state over the uplink transmission with the second TCI state. The wireless device may determine a second adjusted transmission power for the uplink transmission with the second TCI state. The second adjusted transmission power may be lower/less than the second transmission power.

The wireless device may prioritize the uplink transmission with the first TCI state over the uplink transmission with the second TCI state, for example, based on one or more criteria discussed in FIG. 30 (e.g., lowest/highest coreset pool index, lowest/highest starting/ending frequency/RB, lowest/highest TCI state index, lowest/highest antenna panel index, and/or the like).

The base station may prioritize the uplink transmission with the first TCI state over the uplink transmission with the second TCI state, for example, based on one or more criteria discussed in FIG. 30 (e.g., lowest/highest coreset pool index, lowest/highest starting/ending frequency/RB, lowest/highest TCI state index, lowest/highest antenna panel index, and/or the like).

The wireless device may send (e.g., transmit), via the uplink carrier of the cell and with the first transmission power, the uplink transmission with the first TCI state. The wireless device may send (e.g., transmit), with the first transmission power, the uplink transmission with the first TCI state, for example, based on the prioritizing the uplink transmission with the first TCI state over the uplink transmission with the second TCI state.

The base station may receive, via the uplink carrier of the cell, the uplink transmission with the first TCI state based on the first transmission power. The base station may receive the uplink transmission with the first TCI state based on the first transmission power, for example, based on (e.g., in response to) the prioritizing the uplink transmission with the first TCI state over the uplink transmission with the second TCI state.

The wireless device may send (e.g., transmit), via the uplink carrier of the cell and with the second adjusted transmission power, the uplink transmission with the second TCI state. The wireless device may send (e.g., transmit), with the second adjusted transmission power, the uplink transmission with the second TCI state, for example, based on the prioritizing the uplink transmission with the first TCI state over the uplink transmission with the second TCI state.

The base station may receive, via the uplink carrier of the cell, the uplink transmission with the second TCI state based on the second adjusted transmission power. The base station may receive the uplink transmission with the second TCI state based on the second adjusted transmission power, for example, based on (e.g., in response to) the prioritizing the uplink transmission with the first TCI state over the uplink transmission with the second TCI state.

A total transmission/transmit power may not exceed a maximum transmission/transmit power (e.g., $\hat{P}_{CMAX}(i)$) The total transmission power of a plurality of uplink transmissions comprising the uplink transmission may not exceed the maximum transmission power in a transmission occasion. The total transmission power of the plurality of uplink transmissions may be lower than or equal to the maximum transmission power.

The wireless device may send (e.g., transmit), via the uplink carrier of the cell and with the first transmission power, the uplink transmission with the first TCI state. The wireless device may send (e.g., transmit), with the first transmission power, the uplink transmission with the first TCI state, for example, based on the total transmission power not exceeding the maximum transmission power.

The base station may receive, via the uplink carrier of the cell, the uplink transmission with the first TCI state based on the first transmission power. The base station may receive the uplink transmission with the first TCI state based on the first transmission power, for example, based on (e.g., in response to) the total transmission power not exceeding the maximum transmission power.

The wireless device may send (e.g., transmit), via the uplink carrier of the cell and with the second transmission power, the uplink transmission with the second TCI state. The wireless device may send (e.g., transmit), with the second transmission power, the uplink transmission with the second TCI state, for example, based on the total transmission power not exceeding the maximum transmission power.

The base station may receive, via the uplink carrier of the cell, the uplink transmission with the second TCI state based on the second transmission power. The base station may receive the uplink transmission with the second TCI state based on the second transmission power, for example, based on (e.g., in response to) the total transmission power not exceeding the maximum transmission power.

A wireless device may perform a method comprising multiple operations. A wireless device may receive one or more configuration parameters associated with frequency domain repetition of physical uplink shared channel (PUSCH) transmission. The wireless device may receive downlink control information (DCI). The DCI may comprise a channel state information (CSI) request field indicating transmission of a CSI report, and may schedule (and/or may be configured to schedule) frequency domain repetitions of a PUSCH transmission. The frequency domain repetitions may comprise a first repetition in a first frequency range overlapping in time with a second repetition in a second frequency range. The wireless device may transmit the CSI report in the first repetition, based on the first repetition being associated with a value satisfying a criteria.

The transmitting the CSI report in the first repetition may be further based on the one or more configuration parameters. The configuration parameters may comprise a CSI multiplexing mode parameter that may not be enabled. The transmitting the SI report in the first repetition may be based on at least one of: the one or more configuration parameters comprising a CSI multiplexing mode parameter that is enabled; or the one or more configuration parameters not comprising a CSI multiplexing mode parameter. Each repetition, of the frequency domain repetitions, may be associated with a respective value of a plurality of values. The plurality of values may comprise the value satisfying the criteria. The criteria may comprise a determination of a lowest value, or a highest value, of the plurality of values. The value associated with the first repetition may indicate at least one of: a frequency; a resource block value; a transmission configuration indicator (TCI) state; a TCI state index; a sounding reference signal (SRS) resource set; a control resource set (CORESET) pool index; a transmission and reception point (TRP) index; an antenna panel; or an antenna panel index. The wireless device may transmit the second repetition in a same time period as the first repetition. The CSI report may be multiplexed in the first repetition, and the CSI report may not be multiplexed in the second repetition. The CSI report may comprise at least one of: an aperiodic CSI report; or a semi-persistent CSI report. The CSI request field may comprise information for scheduling transmission of the CSI report. The wireless device may transmit each of the frequency domain repetitions, of the PUSCH transmission, in a plurality of transmission occasions in different frequency ranges and overlapping in time. Each repetition of the frequency domain repetitions of the PUSCH transmission may be transmitted, by the wireless device, in a respective transmission occasion of the plurality of transmission occasions. The wireless device may receive second DCI, and the second DCI may be configured to schedule: transmission of a second CSI report; and frequency domain repetitions of a second PUSCH transmission. The wireless device may transmit the second CSI report in each of the frequency domain repetitions of the second PUSCH transmission, based on a CSI multiplexing mode parameter being enabled. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive one or more configuration parameters associated with frequency domain repetition of physical uplink shared channel (PUSCH) transmission. The one or more configuration parameters may comprise a channel state information (CSI) multiplexing mode parameter. The wireless device may receive downlink control information (DCI) scheduling (and/or configured to schedule) frequency domain repetitions of a PUSCH transmission. The frequency domain repetitions may comprise a first repetition in a first frequency range overlapping in time with a second repetition in a second frequency range. The wireless device may transmit a CSI report in one of the first repetition or the second repetition, based on the one or more configuration parameters (e.g., based on the CSI multiplexing mode parameter) indicating that CSI multiplexing may not be enabled. Selection of the first repetition or the second repetition for the transmitting the CSI report may be based on an index, associated with one of the first repetition or the second repetition, satisfying a criteria. The DCI may further comprise a CSI request field for scheduling transmission of the CSI report. Each repetition, of the frequency domain repetitions, may be associated with a respective index of a plurality of indexes. The plurality of indexes may comprise the index satisfying the criteria. The transmitting the CSI report may be in the first repetition based on an index associated with the first repetition being a lowest index, or a highest index, of the plurality of indexes. The criteria may comprise a determination of the lowest index, or the highest index, of the plurality of indexes. The index satisfying the criteria may comprise at least one of: a TCI state index; or an antenna panel index. The wireless device may transmit the second repetition in a same time period as the first repetition. The CSI report may be multiplexed in the first repetition, and the CSI report may not be multiplexed in the second repetition. The CSI report may comprise at least one of: an aperiodic CSI report; or a semi-persistent CSI report. The wireless device may transmit each of the frequency domain repetitions, of the PUSCH transmission, in a plurality of transmission occasions in different frequency ranges and overlapping in time. Each repetition of the frequency domain repetitions of the PUSCH transmission may be transmitted, by the wireless device, in a respective transmission occasion of the plurality of transmission occasions. The wireless device may receive an indication of a change of the CSI multiplexing mode parameter from being not enabled to being enabled. After receiving the indication of the change of the CSI multiplexing mode parameter, the wireless device may receive second DCI scheduling (and/or configured to schedule): transmission of a second CSI report; and frequency domain repetitions of a second PUSCH transmission. The wireless device may transmit the second CSI report in each of the frequency domain repetitions of the second PUSCH transmission, based on the CSI multiplexing mode parameter being enabled. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A base station may transmit one or more configuration parameters associated with frequency domain repetition of physical uplink shared channel (PUSCH) transmission. The one or more configuration parameters may comprise a channel state information (CSI) multiplexing mode parameter. The base station may transmit downlink control information (DCI). The DCI may be configured to schedule frequency domain repetitions of a PUSCH transmission. The frequency domain repetitions may comprise a first repetition in a first frequency range overlapping in time with a second repetition in a second frequency range. The base station may receive a CSI report in one of the first repetition or the second repetition, based on the one or more configuration parameters (e.g., the CSI multiplexing mode parameter) indicating that CSI multiplexing may not be enabled. Reception of the CSI report in the first repetition or in the second repetition may be based on an index, associated with one of the first repetition or the second repetition, satisfying a criteria. Each repetition, of the frequency domain repetitions, may be associated with a respective index of a plurality of indexes. The receiving the CSI report may be in the first repetition based on an index associated with the first repetition being a lowest index, or a highest index, of the plurality of indexes. The criteria may comprise a determination of the lowest index, or the highest index, of the plurality of indexes. The index associated with the first repetition may comprise at least one of: a TCI state index; or an antenna panel index. The base station may receive the second repetition in a same time period as the first repetition. The CSI report may be multiplexed in the first repetition, and the CSI report may not be multiplexed in the second repetition. The base station may receive each of the frequency domain repetitions, of the PUSCH transmission, in a plurality of reception occasions in different frequency ranges and overlapping in time. Each repetition of the frequency domain repetitions of the PUSCH transmission may be received, by the base station, in a respective reception occasion of the plurality of reception occasions. The base station may transmit an indication of a change of the CSI multiplexing mode parameter from being not enabled to being enabled. After transmitting the indication of the change of the CSI multiplexing mode parameter, the base station may transmit second DCI configured to schedule: transmission of a second CSI report; and frequency domain repetitions of a second PUSCH transmission. The base station may receive the second CSI report in each of the frequency domain repetitions of the second PUSCH transmission, based on the CSI multiplexing mode parameter being enabled. The base station may comprise one or more processors and memory, storing instructions, that when executed by the one or more processors perform the method described herein. A system may comprise the base station configured to perform the described method, additional operations, and/or include the additional elements; and a wireless device configured to communicate with the base station. A computer-readable medium may store instructions that, when executed, cause performance of the described method, additional operations, and/or include additional elements. The wireless device may perform a corresponding method comprising multiple operations. The wireless device may perform a corresponding method, for example, by communicating with the base station.

A wireless device may perform a method comprising multiple operations. A wireless device may receive one or more configuration parameters indicating: a physical uplink control channel (PUCCH) transmission of uplink control information (UCI); and a frequency domain repetition scheme for physical uplink shared channel (PUSCH) transmissions. The wireless device may receive downlink control information (DCI) scheduling frequency domain repetitions of a PUSCH transmission. The frequency domain repetitions may comprise a first repetition and a second repetition. The wireless device may transmit the UCI in the first repetition, based on the frequency domain repetitions of the PUSCH transmission overlapping in time with the PUCCH transmission of the UCI and based on the first repetition being associated with a value satisfying a criteria. The transmitting the UCI in the first repetition may be further based on at least one of: the one or more configuration parameters indicating a UCI multiplexing mode parameter that may not be enabled; or the one or more configuration parameters not comprising a UCI multiplexing mode parameter. Each repetition, of the frequency domain repetitions, may be associated with a respective value of a plurality of values. The criteria may comprise a determination of a lowest value, or a highest value, of the plurality of values. The plurality of values may comprise the value satisfying the criteria. The value associated with the first repetition may indicate at least one of: a frequency; a resource block value; a transmission configuration indicator (TCI) state; a TCI state index; a sounding reference signal (SRS) resource set; a control resource set (CORESET) pool index; a transmission and reception point (TRP) index; an antenna panel; or an antenna panel index. The wireless device may transmit the second repetition in a same time period as the first repetition. The UCI may be multiplexed in the first repetition, and the UCI may not be multiplexed in the second repetition. The UCI may comprise at least one of: a hybrid automatic repeat request acknowledgement (HARQ-ACK); a channel state information (CSI) report; and a scheduling request (SR). The wireless device may transmit each of the frequency domain repetitions, of the PUSCH transmission, in a plurality of transmission occasions in different frequency ranges. Each repetition of the frequency domain repetitions of the PUSCH transmission may be transmitted, by the wireless device, in a respective transmission occasion of the plurality of transmission occasions. The wireless device may receive second DCI scheduling (and/or configured to schedule): transmission of second UCI; and frequency domain repetitions of a second PUSCH transmission. The wireless device may transmit, based on a UCI multiplexing mode parameter being enabled, the second UCI in each of the frequency domain repetitions of the second PUSCH transmission. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A base station may perform a method comprising multiple operations. A base station may transmit one or more configuration parameters indicating: a physical uplink control channel (PUCCH) transmission of uplink control information (UCI); and a frequency domain repetition scheme for physical uplink shared channel (PUSCH) transmissions. The base station may transmit downlink control information (DCI) scheduling frequency domain repetitions of a PUSCH transmission. The frequency domain repetitions may comprise a first repetition and a second repetition. The base station may receive the UCI in the first repetition, based on the frequency domain repetitions of the PUSCH transmission overlapping in time with the PUCCH transmission of the UCI and based on the first repetition being associated with a value satisfying a criteria. The receiving the UCI in the first repetition may be further based on at least one of: the one or more configuration parameters indicating a UCI multiplexing mode parameter that may not be enabled; or the one or more configuration parameters not comprising a UCI multiplexing mode parameter. Each repetition, of the frequency domain repetitions, may be associated with a respective value of a plurality of values. The criteria may comprise a determination of a lowest value, or a highest value, of the plurality of values. The plurality of values may comprise the value satisfying the criteria. The value associated with the first repetition may indicate at least one of: a frequency; a resource block value; a transmission configuration indicator (TCI) state; a TCI state index; a sounding reference signal (SRS) resource set; a control resource set (CORESET) pool index; a transmission and reception point (TRP) index; an antenna panel; or an antenna panel index. The base station may receive the second repetition in a same time period as the first repetition. The UCI may be multiplexed in the first repetition, and the UCI may not be multiplexed in the second repetition. The UCI may comprise at least one of: a hybrid automatic repeat request acknowledgement (HARQ-ACK); a channel state information (CSI) report; and a scheduling request (SR). The base station may receive each of the frequency domain repetitions, of the PUSCH transmission, in a plurality of transmission occasions in different frequency ranges. Each repetition of the frequency domain repetitions of the PUSCH transmission may be received, by the base station, in a respective transmission occasion of the plurality of transmission occasions. The base station may transmit second DCI scheduling (and/or configured to schedule): transmission of second UCI; and frequency domain repetitions of a second PUSCH transmission. The base station may receive, based on a UCI multiplexing mode parameter being enabled, the second UCI in each of the frequency domain repetitions of the second PUSCH transmission. The base station may comprise one or more processors and memory, storing instructions, that when executed by the one or more processors perform the method described herein. A system may comprise the base station configured to perform the described method, additional operations, and/or include the additional elements; and a wireless device configured to communicate with the base station. A computer-readable medium may store instructions that, when executed, cause performance of the described method, additional operations, and/or include additional elements. A wireless device may perform a corresponding method comprising multiple operations. The wireless device may perform a corresponding method, for example, by communicating with the base station.

A wireless device may perform a method comprising multiple operations. A wireless device may receive one or more configuration parameters comprising an uplink control information (UCI) multiplexing mode parameter; and a frequency domain repetition scheme for physical uplink shared channel (PUSCH) transmissions. The one or more configuration parameters may indicate a physical uplink control channel (PUCCH) transmission of UCI. The wireless device may receive downlink control information (DCI) scheduling frequency domain repetitions of a PUSCH transmission. The frequency domain repetitions may comprise a first repetition and a second repetition. The wireless device may transmit the UCI in one of the first repetition or the second repetition, based on the one or more configuration parameters (e.g., the UCI multiplexing mode parameter) indicating that UCI multiplexing may not be enabled. Selection of the first repetition or the second repetition for the transmitting the UCI may be based on an index, associated with one of the first repetition or the second repetition, satisfying a criteria. The transmitting the UCI may comprise transmitting the UCI in the first repetition based on the first repetition that may comprise a lowest index of a plurality of indexes, and the plurality of indexes may comprise a first index associated with the first repetition and a second index associated with the second repetition. Each repetition, of the frequency domain repetitions, may be associated with a respective index of a plurality of indexes. The plurality of indexes may comprise the index satisfying the criteria. The transmitting the UCI may be in the first repetition based on an index associated with the first repetition being a lowest index, or a highest index, of the plurality of indexes. The criteria may comprise a determination of the lowest index, or the highest index, of the plurality of indexes. The index satisfying the criteria may comprise at least one of: a TCI state index; or an antenna panel index. The wireless device may transmit the second repetition in a same time period as the first repetition. The UCI may be multiplexed in the first repetition, and the UCI may not be multiplexed in the second repetition. The UCI may comprise at least one of: a hybrid automatic repeat request acknowledgement (HARQ-ACK); a channel state information (CSI) report; and a scheduling request (SR). The wireless device may transmit each of the frequency domain repetitions, of the PUSCH transmission, in a plurality of transmission occasions in different frequency ranges and overlapping in time. Each repetition of the frequency domain repetitions of the PUSCH transmission may be transmitted, by the wireless device, in a respective transmission occasion of the plurality of transmission occasions. The wireless device may receive an indication of a change of the UCI multiplexing mode parameter from being not enabled to being enabled. After receiving the indication of the change of the UCI multiplexing mode parameter, the wireless device may receive second DCI scheduling (and/or configured to schedule): transmission of second UCI; and frequency domain repetitions of a second PUSCH transmission. The wireless device may transmit the second UCI in each of the frequency domain repetitions of the second PUSCH transmission, based on the UCI multiplexing mode parameter being enabled. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A base station may transmit one or more configuration parameters indicating: uplink control information (UCI) multiplexing mode parameter; a physical uplink control channel (PUCCH) transmission of uplink control information (UCI); and a frequency domain repetition scheme for physical uplink shared channel (PUSCH) transmissions. The base station may transmit downlink control information (DCI) scheduling frequency domain repetitions of a PUSCH transmission. The frequency domain repetitions may comprise a first repetition and a second repetition. The base station may receive the UCI in one of the first repetition or the second repetition, based on the one or more configuration parameters (e.g., the UCI multiplexing mode parameter) indicating that UCI multiplexing may not be enabled. Reception of the UCI in the first repetition or in the second repetition may be based on an index, associated with one of the first repetition or the second repetition, satisfying a criteria. Each repetition, of the frequency domain repetitions, may be associated with a respective index of a plurality of indexes. The plurality of indexes may comprise the index satisfying the criteria. The receiving the UCI may be in the first repetition based on an index associated with the first repetition being a lowest index, or a highest index, of the plurality of indexes. The criteria may comprise a determination of the lowest index, or the highest index, of the plurality of indexes. The index may comprise at least one of: a TCI state index; or an antenna panel index. The base station may transmit the second repetition in a same time period as the first repetition. The UCI may be multiplexed in the first repetition, and the UCI may not be multiplexed in the second repetition. The UCI may comprise at least one of: a hybrid automatic repeat request acknowledgement (HARQ-ACK); a channel state information (CSI) report; and a scheduling request (SR). The base station may receive each of the frequency domain repetitions, of the PUSCH transmission, in a plurality of reception occasions in different frequency ranges and overlapping in time. Each repetition of the frequency domain repetitions of the PUSCH transmission may be received, by the base station, in a respective reception occasion of the plurality of reception occasions. The base station may transmit an indication of a change of the UCI multiplexing mode parameter from being not enabled to being enabled. After transmitting the indication of the change of the UCI multiplexing mode parameter, the base station may transmit second DCI scheduling (and/or configured to schedule): transmission of second UCI; and frequency domain repetitions of a second PUSCH transmission. The base station may receive, based on the UCI multiplexing mode parameter being enabled, the second UCI in each of the frequency domain repetitions of the second PUSCH transmission. The base station may comprise one or more processors and memory, storing instructions, that when executed by the one or more processors perform the method described herein. A system may comprise the base station configured to perform the described method, additional operations, and/or include the additional elements; and a wireless device configured to communicate with the base station. A computer-readable medium may store instructions that, when executed, cause performance of the described method, additional operations, and/or include additional elements. The wireless device may perform a corresponding method comprising multiple operations. The wireless device may perform a corresponding method, for example, by communicating with the base station.

A wireless device may perform a method comprising multiple operations. A wireless device may receive downlink control information (DCI) scheduling repetitions of a first physical uplink shared channel (PUSCH) transmission. The repetitions of the first PUSCH transmission may be in frequency domain, and each repetition of the repetitions may be associated with a respective transmission configuration indicator (TCI) state of a plurality of TCI states. Based on the repetitions of the first PUSCH transmission overlapping in time with a second PUSCH transmission comprising a power headroom report, the wireless device may determine the power headroom report using a pathloss reference signal associated with a TCI state, of the plurality of TCI states, indicated by a lowest TCI state index among TCI state indexes of respective TCI states associated with the repetitions of the first PUSCH transmission. The wireless device may transmit the power headroom report. Each repetition of the repetition of the first PUSCH transmission may be associated with a respective pathloss reference signal of a plurality of pathloss reference signals, and each pathloss reference signal of the plurality of pathloss reference signals may be associated with a respective TCI state of the plurality of TCI states. The wireless device may transmit a first repetition of the repetitions of the first PUSCH transmission, based on a first TCI state. The wireless device may transmit a second repetition of the repetitions of the first PUSCH transmission, based on a second TCI state. The determining the power headroom report using the pathloss reference signal may be based on at least one of: receiving a power headroom mode parameter indicating that a single power headroom report mode may be enabled; or a determination that a two power headroom mode parameter has not been received. The wireless device may receive an indication to activate at least two TCI states comprising the TCI state. The wireless device may transmit a first repetition of the repetitions the first PUSCH transmission, using a spatial domain transmission filter determined based on a first TCI state of the at least two TCI states, and using a transmission power determined based on a pathloss reference signal indicated by the first TCI state. The wireless device may determine the pathloss reference signal associated with a first repetition of the first PUSCH transmission. The determining the pathloss reference signal may be based on the power headroom report and the first repetition being associated with a same value of a TCI state index. The power headroom report may comprise a power headroom value determined using the pathloss reference signal associated with the TCI state indicated by the lowest TCI state index. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive downlink control information (DCI) scheduling frequency domain repetitions of a first physical uplink shared channel (PUSCH) overlapping in time with a second PUSCH transmission comprising a power headroom report. Each repetition of the repetitions may be associated with a respective pathloss reference signal of a plurality of pathloss reference signals and a respective index of a plurality of indexes. The wireless device may determine the power headroom report using a pathloss reference signal corresponding to a repetition, among the repetitions of the first PUSCH transmission, that may be associated with a lowest index of the respective indexes of the repetitions. The wireless device may transmit the power headroom report. The lowest index may indicate at least one of: a transmission configuration indicator (TCI) index; a lowest sounding reference signal (SRS) resource set; a lowest control resource set (CORESET) pool index; a lowest transmission and reception point (TRP) index an antenna panel index; or a resource block position. Each pathloss reference signal of the plurality of pathloss reference signals may be associated with a respective transmission configuration indicator (TCI) state of a plurality of TCI states. Each TCI state of the plurality of TCI states may be associated with a respective TCI state index of a plurality of TCI state indexes. The wireless device may transmit a first repetition of the repetitions of the first PUSCH transmission, based on a first transmission configuration indicator (TCI) state. The wireless device may transmit a second repetition of the repetitions of the first PUSCH transmission, based on a second TCI state. The determining the power headroom report sing the pathloss reference signal may be based on at least one of: receiving a power headroom mode parameter indicating that a single power headroom mode may be enabled; or a determination that a two power headroom report mode parameter has not been received. The wireless device may receive an indication to activate at least two transmission configuration indicator (TCI) states. The wireless device may transmit a first repetition of the repetitions of the first PUSCH transmission, using a spatial domain transmission filter determined based on a first TCI state of the at least two TCI states, and using a transmission power determined based on a pathloss reference signal associated with the first TCI state. The wireless device may determine the pathloss reference signal corresponding to the repetition that may be associated with the lowest index. The determining the pathloss reference signal may be based on the power headroom report and the repetition that may be associated with a lowest index being associated with a same value of a transmission configuration indicator (TCI) state. The power headroom report may comprise a power headroom value determined using the pathloss reference signal associated with a transmission configuration indicator (TCI) state indicated by the lowest TCI state. The transmitting the power headroom report may be based on receiving a power headroom mode parameter indicating that a single power headroom mode is enabled. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive downlink control information (DCI) scheduling frequency domain repetitions of a first physical uplink shared channel (PUSCH) overlapping in time with a second PUSCH transmission comprising a power headroom report. Each repetition of the repetitions may be associated with a respective pathloss reference signal of a plurality of pathloss reference signals and a respective index of a plurality of indexes. The wireless device may transmit a power headroom value in the power headroom report. The power headroom value may be determined using a pathloss reference signal corresponding to a repetition, among the repetitions of the first PUSCH transmission, that may be associated with a lowest index of the respective indexes of the repetitions. The lowest index may indicate at least one of: a lowest transmission configuration indicator (TCI) index; a lowest antenna panel index; or a lowest resource block position. The transmitting the power headroom report may be based on receiving a power headroom mode parameter indicating that a single power headroom mode may be enabled. The wireless device may determine the pathloss reference signal corresponding to the repetition that may be associated with the lowest index. The determining the pathloss reference signal may be based on the power headroom report and the repetition that may be associated with the lowest index being associated with a same value of a transmission configuration indicator (TCI) state index. The power headroom report may comprise a power headroom value determined using the pathloss reference signal corresponding to the repetition that may be associated with the lowest index. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive first downlink control information (DCI) scheduling a first uplink transmission in a first transmission occasion. The wireless device may receive second DCI scheduling a second uplink transmission in a second transmission occasion overlapping in time with the first transmission occasion. The wireless device may determine that a total transmission power of transmission exceeds a maximum transmit power. The transmission may comprise the first uplink transmission and the second uplink transmission. The wireless device may prioritize one of the first uplink transmission and second uplink transmission, based on the determining that the total transmission power of transmission by the wireless device exceeds the maximum transmit power, and based on a comparison of a first value associated with the first uplink transmission with a second value associated with the second uplink transmission. The receiving the first DCI may comprise receiving the first DCI via a first control resource set (CORESET) associated with a first CORESET pool index, and the receiving the second DCI may comprise receiving the second DCI via a second CORESET different from the first CORESET and associated with a second CORESET pool index different from the first CORESET pool index. The first value may be the first CORESET pool index and the second value may be the second CORESET pool index. The prioritizing the one of the first uplink transmission and the second uplink transmission may comprise at least one of: reducing transmission power associated with at least one of the first uplink transmission or the second uplink transmission; or dropping transmission of at least one of the first uplink transmission or the second uplink transmission. The prioritizing the one of the first uplink transmission and the second uplink transmission may comprise at least one of: reducing transmission power associated with at least one layer of the first uplink transmission; or dropping transmission of at least one layer of the first uplink transmission. The comparison of the first value associated with the first uplink transmission and the second value associated with the second uplink transmission may comprise a determination of a lowest or highest: frequency; resource block value; transmission configuration indicator (TCI) state; TCI state index; a sounding reference signal (SRS) resource set; a control resource set (CORESET) pool index; a transmission and reception point (TRP) index; antenna panel; or antenna panel index. The wireless device may transmit the first uplink transmission, based on the comparison indicating the first value may be less than the second value. The wireless device may perform at least one of: dropping, based on the comparison indicating the first value may be less than the second value, the second uplink transmission; or transmitting, using an adjusted transmission power based on the comparison indicating the first value may be less than the second value, the second uplink transmission. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive first downlink control information (DCI) scheduling a first uplink transmission in a first transmission occasion. The wireless device may receive second DCI scheduling a second uplink transmission in a second transmission occasion overlapping in time with the first transmission occasion. The wireless device may determine that a total transmission power of transmission by the wireless device exceeds a maximum transmit power. The transmission may comprise the first uplink transmission and the second uplink transmission. The wireless device may transmit the first uplink transmission. The wireless device may transmit the second uplink transmission using an adjusted transmission power based on: the determining that the total transmission power of transmission by the wireless device exceeds the maximum transmit power; and a determination that a first value associated with the first uplink transmission may be less than a second value associated with the second uplink transmission. The receiving the first DCI may comprise receiving the first DCI via a first control resource set (CORESET) associated with a first CORESET pool index, and the receiving the second DCI may comprise receiving the second DCI via a second CORESET different from the first CORESET and associated with a second CORESET pool index different from the first CORESET pool index. The first value may be the first CORESET pool index and the second value may be the second CORESET pool index. The first value may comprise a first transmission configuration indicator (TCI) state index associated with the first uplink transmission and the second value may comprise a second TCI state index associated with the second uplink transmission. The transmitting the second uplink transmission using the adjusted transmission power may comprise at least one of: reducing transmission power associated with at least one layer of the second uplink transmission; or dropping transmission of at least one layer of the second uplink transmission. The first value and the second value may comprise different: frequencies; resource block values; transmission configuration indicator (TCI) states; TCI state indexes; antenna panels; or antenna panel indexes. The wireless device may transmit the first uplink transmission using a first uplink transmission power that may be greater than a second uplink transmission power used for transmitting the second uplink transmission. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive first downlink control information (DCI) scheduling a first uplink transmission in a first transmission occasion. The wireless device may receive second DCI scheduling a second uplink transmission in a second transmission occasion overlapping in time with the first transmission occasion. The wireless device may determine that a total transmission power of transmission by the wireless device exceeds a maximum transmit power. The transmission may comprise the first uplink transmission and the second uplink transmission. The wireless device may transmit the first uplink transmission and may transmit the second uplink transmission using an adjusted transmission power or dropping the second uplink transmission, based on a determination that a first value associated with the first uplink transmission may be less than a second value associated with the second uplink transmission. The receiving the first DCI may comprise receiving the first DCI via a first control resource set (CORESET) associated with a first CORESET pool index, and the receiving the second DCI may comprise receiving the second DCI via a second CORESET different from the first CORESET and associated with a second CORESET pool index different from the first CORESET pool index. The first value may be the first CORESET pool index and the second value may be the second CORESET pool index. The first value may comprise a first transmission configuration indicator (TCI) state index associated with the first uplink transmission and the second value may comprise a second TCI state index associated with the second uplink transmission. The transmitting the second uplink transmission using the adjusted transmission power may comprise at least one of: reducing transmission power associated with at least one layer of the second uplink transmission; or dropping transmission of at least one layer of the second uplink transmission. The first value and the second value may comprise a different: frequencies; resource block values; transmission configuration indicator (TCI) states; TCI state indexes; antenna panels; or antenna panel indexes. The wireless device may transmit the first uplink transmission using a first uplink transmission power that may be greater than a second uplink transmission power used for transmitting the second uplink transmission. The wireless device may perform dropping the second uplink transmission, based on the determination that the first value associated with the first uplink transmission may be less than the second value associated with the second uplink transmission. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive one or more configuration parameters indicating frequency domain repetitions for physical uplink shared channel (PUSCH) transmissions. The wireless device may receive downlink control information (DCI). The DCI may schedule repetitions of a PUSCH transmission in frequency domain, and may comprise a channel state information (CSI) request field indicating transmission of an aperiodic CSI report. The wireless device may transmit the aperiodic CSI report in a first repetition, among the repetitions of the PUSCH transmission, with a lowest starting resource block (RB) among starting RBs of the repetitions of the PUSCH transmission. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive downlink control information (DCI). The DCI may schedule transmission of a channel state information (CSI) report and repetitions of a physical uplink shared channel (PUSCH) transmission in frequency domain. The wireless device may transmit the CSI report in a first repetition, among the repetitions of the PUSCH transmission, with a lowest starting resource block (RB) among starting RBs of the repetitions of the PUSCH transmission. The wireless device may multiplex the CSI report in the first repetition. The wireless device may not multiplex the CSI report in a second repetition, of the repetitions of the PUSCH transmission, that may be different from the first repetition. The wireless device may not transmit the CSI report in the second repetition. The CSI report may be an aperiodic CSI report or a semi-persistent CSI report. The DCI may be a DCI format 0_1 or a DCI format 0_2. The DCI may comprise a sounding reference signal (SRS) resource indicator field that may be equal to 10 or 11. The DCI may comprise a CSI request field scheduling transmission of the CSI report. The PUSCH transmission may comprise a transport block or may not comprise a transport block. The PUSCH transmission may not comprise an uplink control information (UCI) other than the CSI report. The wireless device may not multiplex, in the PUSCH transmission, the UCI other than the CSI report. The wireless device may transmit the repetitions of the PUSCH transmission in a plurality of transmission occasions in the frequency domain. Each repetition of the repetitions of the PUSCH transmission may be transmitted, by the wireless device, in a respective transmission occasion of the plurality of transmission occasions. The transmitting the CSI report in the first repetition of the PUSCH transmission may comprise transmitting the CSI report in a first transmission occasion of the plurality of transmission occasions. The first repetition of the PUSCH transmission may be transmitted, by the wireless device, in the first transmission occasion. The plurality of transmission occasions may be in different RBs. The transmitting may be based on a first transmission configuration indicator (TCI) state. The wireless device may receive one or more messages. The one or more messages may comprise one or more configuration parameters. The transmitting may be in response to the one or more configuration parameters not comprising a CSI-Multiplexing-Mode parameter that may be enabled. The CSI-Multiplexing-Mode parameter may indicate transmission of a CSI report on at least two repetitions of a PUSCH transmission. The wireless device may receive one or more second messages. The one or more second messages may comprise one or more second configuration parameters. The one or more second configuration parameters may comprise a CSI-MultiplexingMode parameter that may be enabled. The CSI-Multiplexing-Mode parameter may indicate transmission of a CSI report on at least two repetitions of a PUSCH transmission. The wireless device may receive second DCI. The second DCI may schedule transmission of a second CSI report and repetitions of a second PUSCH transmission in frequency domain. The wireless device may transmit the second CSI report in the repetitions of the second PUSCH transmission based on the one or more second configuration parameters comprising the CSI-MultiplexingMode parameter that may be enabled. The one or more configuration parameters may indicate a frequency domain multiplexing (FDM) repetition scheme. The transmitting may be in response to the one or more configuration parameters indicating the FDM repetition scheme. The plurality of transmission occasions may overlap in time and may not overlap in frequency. The DCI may indicate activation of the semi-persistent CSI report. The CSI-Multiplexing-Mode parameter may be an aperiodic CSI-Multiplexing-Mode parameter or a semi-persistent CSI-Multiplexing-Mode parameter. The wireless device may transmit a user-equipment (UE) capability message indicating support transmitting a CSI report on at least two repetitions of a PUSCH transmission. The one or more second configuration parameters may comprise the CSI-MultiplexingMode parameter that may be enabled in response to the UE capability message indicating support transmitting a CSI report on at least two repetitions of a PUSCH transmission. The wireless device may not transmit a UE capability message indicating support transmitting a CSI report on at least two repetitions of a PUSCH transmission. The one or more configuration parameters may not comprise the CSI-MultiplexingMode parameter that may be enabled in response to the UE capability message not indicating support transmitting a CSI report on at least two repetitions of a PUSCH transmission. The one or more configuration parameters may indicate at least two SRS resource sets with codebook or non-codebook. One or more first repetitions of the repetitions of the PUSCH transmission may be associated with a first SRS resource set of the at least two SRS resource sets, and one or more second repetitions of the repetitions of the PUSCH transmission may be associated with a second SRS resource set of the at least two SRS resource sets. The wireless device may transmit the one or more first repetitions based on a first SRS resource in the first SRS resource set, and the wireless device may transmit the one or more second repetitions based on a second SRS resource in the second SRS resource set. The wireless device may receive second DCI. The second DCI may schedule transmission of a second CSI report and repetitions of a second PUSCH transmission in time domain. The wireless device may transmit the second CSI report in a starting repetition among the repetitions of the second PUSCH transmission. Starting times of the repetitions of the PUSCH transmission may be the same. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive one or more configuration parameters. The one or more configuration parameters may indicate a frequency domain multiplexing (FDM) scheme for physical uplink shared channel (PUSCH) repetitions and no channel-state information (CSI) multiplexing mode that enables multiplexing of a CSI report in at least two repetitions of a PUSCH transmission. The wireless device may receive downlink control information (DCI). The DCI may schedule transmission of a channel state information (CSI) report and repetitions of a PUSCH transmission. The wireless device may transmit the CSI report in a first repetition among the repetitions of the PUSCH transmission based on the one or more configuration parameters indicating: the FDM scheme; and no CSI multiplexing mode. The first repetition may have a lowest or highest starting resource block (RB) among starting RBs of the repetitions of the PUSCH transmission. The first repetition may have a lowest or highest ending RB among ending RBs of the repetitions of the PUSCH transmission. The wireless device may receive a control message. The control message may indicate activation of at least two transmission configuration indicator (TCI) states. The transmitting the CSI report may be with a spatial domain transmission filter determined based on a TCI state among the at least two TCI states. The transmitting the CSI report may be with a transmission power determined based on the TCI state. The first repetition may be associated with the TCI state, among the at least two TCI states, that may be identified by a lowest or highest TCI state index among TCI state indexes of the at least two TCI states. The first repetition may be associated with the TCI state, among the at least two TCI states, that may occur first in a list of the at least two TCI states. The one or more configuration parameters may indicate at least two sounding reference signal (SRS) resource sets with codebook or non-codebook. The at least two SRS resource sets may comprise a first SRS resource set and a second SRS resource set. The one or more configuration parameters may indicate a first SRS resource set index for the first SRS resource set and a second SRS resource set index for the second SRS resource set. The first SRS resource set index may be lower than the second SRS resource set index. The first repetition may be associated with the first SRS resource set with a lower SRS resource set index. The CSI report may be associated with a first value of an index. The first repetition may be associated with a second value of the index. The first value and the second value may be the same. The index may comprise: a transmission-and-reception point (TRP) index; a control resource set (coreset) pool index; an SRS resource set index; an antenna panel index; a capability value set index; a beam failure detection set index; a unified TCI state index; and a physical cell index (PCI). The transmitting may be in response to the CSI report and the first repetition being associated with the same value of the index. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may determine repetitions of a physical uplink shared channel (PUSCH) transmission in frequency domain overlap in time with a scheduled physical uplink control channel (PUCCH) transmission of an uplink control information (UCI). Based on the overlapping, the wireless device may transmit the UCI in a first repetition, among the repetitions of the PUSCH transmission, with a lowest starting resource block (RB) among starting RBs of the repetitions. The wireless device may multiplex the UCI in the first repetition of the repetitions of the PUSCH transmission. The wireless device may not multiplex the UCI in a second repetition, of the repetitions of the PUSCH transmission, that may be different from the first repetition. The wireless device may not transmit the UCI in the second repetition. The UCI may comprise at least one of: a hybrid automatic repeat request acknowledgement (HARQ-ACK); a channel state information (CSI) report; and a scheduling request (SR). The scheduled PUCCH transmission may be over a single time slot. The repetitions of the PUSCH transmission may overlap with the PUCCH transmission in one time slot. The wireless device may receive one or more messages comprising one or more configuration parameters. The wireless device may transmit the repetitions of the PUSCH transmission in a plurality of transmission occasions in the frequency domain. Each repetition of the repetitions of the PUSCH transmission may be transmitted, by the wireless device, in a respective transmission occasion of the plurality of transmission occasions. The transmitting the UCI in the first repetition of the PUSCH transmission may comprise transmitting the UCI in a first transmission occasion of the plurality of transmission occasions. The first repetition of the PUSCH transmission may be transmitted, by the wireless device, in the first transmission occasion. The plurality of transmission occasions may be in different RBs. The transmitting may be in response to the one or more configuration parameters not comprising a UCI-Multiplexing-Mode parameter that may be enabled. The UCI-Multiplexing-Mode parameter may indicate transmission of a UCI on at least two repetitions of a PUSCH transmission. The one or more configuration parameters may indicate a frequency domain multiplexing (FDM) repetition scheme. The transmitting may be in response to the one or more configuration parameters indicating the FDM repetition scheme. The plurality of transmission occasions may overlap in time and may not overlap in frequency. The wireless device may receive one or more second messages comprising one or more second configuration parameters. The one or more second configuration parameters may comprise a UCI-MultiplexingMode parameter that may be enabled. The UCI-Multiplexing-Mode parameter may indicate transmission of a UCI on at least two repetitions of a PUSCH transmission. The wireless device may determine repetitions of a second PUSCH transmission in frequency domain overlap in time with a scheduled PUCCH transmission of a second UCI. The wireless device may transmit the second UCI in the repetitions of the second PUSCH transmission based on: the repetitions of the second PUSCH transmission overlapping in time with the scheduled PUCCH transmission of the second UCI; and the one or more second configuration parameters comprising the UCI-MultiplexingMode parameter that may be enabled. The wireless device may transmit a user-equipment (UE) capability message. The UE capability message may indicate support transmitting a UCI on at least two repetitions of a PUSCH transmission. The one or more second configuration parameters may comprise the UCI-MultiplexingMode parameter that may be enabled in response to the UE capability message. The UE capability message may indicate support transmitting a UCI on at least two repetitions of a PUSCH transmission. The wireless device may not transmit a UE capability message indicating support transmitting a UCI on at least two repetitions of a PUSCH transmission. The one or more configuration parameters may not comprise the CSI-MultiplexingMode parameter that may be enabled in response to the UE capability message. The UE capability message may not indicate support transmitting a UCI on at least two repetitions of a PUSCH transmission. The one or more configuration parameters may indicate at least two sounding reference signal (SRS) resource sets with codebook or non-codebook. One or more first repetitions of the repetitions of the PUSCH transmission may be associated with a first SRS resource set of the at least two SRS resource sets, and one or more second repetitions of the repetitions of the PUSCH transmission may be associated with a second SRS resource set of the at least two SRS resource sets. The wireless device may transmit the one or more first repetitions based on a first SRS resource in the first SRS resource set, and the one or more second repetitions based on a second SRS resource in the second SRS resource set. The transmitting may be based on a first transmission configuration indicator (TCI) state. The one or more configuration parameters may schedule the PUCCH transmission of the UCI. The wireless device may receive downlink control information (DCI) scheduling the PUCCH transmission with the UCI. The wireless device may receive DCI scheduling the repetitions of the PUSCH transmission in the frequency domain. The DCI may comprise a sounding reference signal (SRS) resource indicator field. The SRS resource indicator field may be equal to 10 or 11. The one or more configuration parameters may indicate a configured uplink grant. The repetitions of the PUSCH transmission may be for the configured uplink grant. The wireless device may determine repetitions of a second PUSCH transmission in time domain overlap in time with a scheduled PUCCH transmission of a second UCI. The wireless device may transmit the second UCI in an earliest repetition of the repetitions of the second PUSCH transmission. The wireless device may not transmit the UCI in the scheduled PUCCH transmission based on the transmitting the UCI in the first repetition. Starting times of the repetitions of the PUSCH transmission may be the same. The first repetition of the PUSCH transmission may comprise more than one symbol. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive one or more configuration parameters. The one or more configuration parameters may indicate a physical uplink control channel (PUCCH) transmission of an uplink control information (UCI) and a frequency domain repetition scheme for physical uplink shared channel (PUSCH) transmissions. The wireless device may receive downlink control information (DCI). The DCI may schedule repetitions of a PUSCH transmission in frequency domain. Based on the repetitions of the PUSCH transmissions overlapping in time with the PUCCH transmission of the UCI, the wireless device may transmit the UCI in a first repetition, among the repetitions of the PUSCH transmission, with a lowest starting resource block (RB) among starting RBs of the repetitions. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive one or more configuration parameters. The one or more configuration parameters may indicate a frequency domain multiplexing (FDM) scheme for physical uplink shared channel (PUSCH) repetitions and no uplink control information (UCI) multiplexing mode that enables multiplexing of a UCI in at least two repetitions of a PUSCH transmission. The wireless device may determine repetitions of a PUSCH transmission in frequency domain may overlap in time with a scheduled physical uplink control channel (PUCCH) transmission of a UCI. The wireless device may transmit the UCI in a first repetition among the repetitions of the PUSCH transmission based on the one or more configuration parameters. The one or more configuration parameters may indicate the FDM scheme and no UCI multiplexing mode. The first repetition may have a lowest or highest starting resource block (RB) among starting RBs of the repetitions of the PUSCH transmission. The first repetition may have a lowest or highest ending RB among ending RBs of the repetitions of the PUSCH transmission. The wireless device may receive a control message indicating activation of at least two transmission configuration indicator (TCI) states. The transmitting the first repetition comprising the UCI may be with a spatial domain transmission filter determined based on a TCI state among the at least two TCI states. The transmitting the first repetition comprising the UCI may be with a transmission power determined based on the TCI state. The first repetition may be associated with the TCI state, among the at least two TCI states, that may be identified by a lowest or highest TCI state index among TCI state indexes of the at least two TCI states. The first repetition may be associated with the TCI state, among the at least two TCI states, that may occur first in a list of the at least two TCI states. The one or more configuration parameters may indicate at least two sounding reference signal (SRS) resource sets with codebook or non-codebook. The at least two SRS resource sets may comprise a first SRS resource set and a second SRS resource set. The one or more configuration parameters may indicate a first SRS resource set index for the first SRS resource set and a second SRS resource set index for the second SRS resource set. The first SRS resource set index may be lower than the second SRS resource set index. The first repetition may be associated with the first SRS resource set with a lower SRS resource set index. The UCI may be associated with a first value of an index. The first repetition may be associated with a second value of the index. The first value and the second value may be the same. The index may comprise: a transmission-and-reception point (TRP) index; a control resource set (coreset) pool index; an SRS resource set index; an antenna panel index; a capability value set index; a beam failure detection set index; a unified TCI state index; and a physical cell index (PCI). The transmitting may be in response to the UCI and the first repetition being associated with the same value of the index. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive downlink control information (DCI). The DCI may schedule a first physical uplink shared channel (PUSCH) transmission. One or more first layers of the first PUSCH transmission may be associated with a first transmission configuration indicator (TCI) state, and one or more second layers of the first PUSCH transmission may be associated with a second TCI state. Based on the first PUSCH transmission overlapping in time with a second PUSCH transmission comprising a power headroom report, the wireless device may transmit the power headroom report with a power headroom value. The power headroom report may be determined based on a TCI state among the first TCI state and the second TCI state. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive downlink control information (DCI) scheduling repetitions of a first physical uplink shared channel (PUSCH) transmission via a first cell. The repetitions of the first PUSCH transmission may be in frequency domain, and each repetition of the repetitions may be associated with a respective transmission configuration indicator (TCI) state. The wireless device may determine the repetitions of the first PUSCH transmission of the first cell overlap in time with a second PUSCH transmission of a second cell. The second PUSCH transmission may comprise a power headroom report. The wireless device may transmit the power headroom report comprising a power headroom value, based on the determining. The power headroom report may be determined based on a TCI state with a lowest TCI state index among TCI state indexes of TCI states associated with the repetitions of the first PUSCH transmission. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may determine repetitions of a first physical uplink shared channel (PUSCH) transmission in frequency domain overlap in time with a second PUSCH transmission comprising a power headroom report. Each repetition of the repetitions may be associated with a respective pathloss reference signal. The wireless device may determine a pathloss reference signal associated with a repetition, among the repetitions of the first PUSCH transmission, with a lowest starting resource block (RB) among starting RBs of the repetitions. The wireless device may transmit the power headroom report comprising a power headroom value determined based on the pathloss reference signal. The power headroom report may be a power headroom report medium-access control control element (PHR MAC-CE). The wireless device may trigger the power headroom report for a first cell. The repetitions of the first PUSCH transmission may be for an uplink carrier of the first cell. The transmitting the power headroom report may be via a second cell. The first cell and the second cell may be the same or different. The wireless device may transmit a first repetition of the repetitions of the first PUSCH transmission based on a first transmission configuration indicator (TCI) state and a second repetition of the repetitions of the first PUSCH transmission based on a second TCI state. The first repetition may be with a first transmission power determined based on a first pathloss reference signal indicated by the first TCI state, and the second repetition may be with a second transmission power determined based on a second pathloss reference signal indicated by the second TCI state. The pathloss reference signal may be the first pathloss reference signal based on the repetition being the first repetition. The power headroom report may not comprise a second power headroom value determined based on the second pathloss reference signal. The pathloss reference signal may be the second pathloss reference signal based on the repetition being the second repetition. The power headroom report may not comprise a first power headroom value determined based on the first pathloss reference signal. The wireless device may receive one or more messages. The one or more messages may comprise one or more configuration parameters. The wireless device may transmit the repetitions of the first PUSCH transmission in a plurality of transmission occasions in the frequency domain. Each repetition of the repetitions of the first PUSCH transmission may be transmitted, by the wireless device, in a respective transmission occasion of the plurality of transmission occasions. The determining the pathloss reference signal associated with the repetition of the first PUSCH transmission may comprise determining the pathloss reference signal associated with a transmission occasion of the plurality of transmission occasions. The repetition of the first PUSCH transmission may be transmitted, by the wireless device, in the transmission occasion. The plurality of transmission occasions may be in different RBs. The transmitting may be in response to the one or more configuration parameters not comprising a two-PHR-Mode parameter. The two-PHR-Mode parameter may indicate reporting of two power headroom values for a cell. The one or more configuration parameters may indicate a frequency domain multiplexing (FDM) repetition scheme. The transmitting may be in response to the one or more configuration parameters indicating the FDM repetition scheme. The plurality of transmission occasions may overlap in time and may not overlap in frequency. The power headroom report may be a Type 1 power headroom report. The power headroom report may be based on an actual PUSCH transmission. The transmitting the power headroom report may be in a time slot. The repetitions of the first PUSCH transmission may overlap with the second PUSCH transmission in the time slot. The time slot may be an earliest time slot, among one or more time slots of the second PUSCH transmission, that may overlap with the repetitions of the first PUSCH transmission. The uplink carrier may be a supplementary uplink carrier (SUL) or a normal uplink carrier (NUL). The wireless device may receive downlink control information (DCI) scheduling the repetitions of the first PUSCH transmission. The DCI may comprise a sounding reference signal (SRS) resource indicator field. The SRS resource indicator field may be equal to 10 or 11. The one or more configuration parameters may indicate at least two SRS resource sets with codebook or non-codebook. The one or more configuration parameters may indicate a configured uplink grant. The repetitions of the first PUSCH transmission may be for the configured uplink grant. The first repetition may be associated with a first SRS resource set of the at least two SRS resource sets, and the second repetition may be associated with a second SRS resource set of the at least two SRS resource sets. The wireless device may transmit the first repetition based on a first SRS resource in the first SRS resource set, and may transmit the second repetition based on a second SRS resource in the second SRS resource set. The wireless device may receive one or more second messages comprising one or more second configuration parameters. The one or more second configuration parameters may comprise a two-PHR-Mode parameter. The two-PHR-Mode parameter may indicate reporting of two power headroom values for a cell. The wireless device may determine repetitions of a third PUSCH transmission in frequency domain overlap in time with a fourth PUSCH transmission. The fourth PUSCH transmission may comprise a second power headroom report. Each repetition of the repetitions of the third PUSCH transmission may be associated with a respective pathloss reference signal. The wireless device may transmit the second power headroom report comprising power headroom values determined based on pathloss reference signals associated with the repetitions of the third PUSCH transmission, in response to the one or more second configuration parameters comprising the two-PHR-Mode parameter. The wireless device may transmit a user-equipment (UE) capability message. The UE capability message may indicate support of reporting of two power headroom values for a cell. The one or more second configuration parameters may comprise the two-PHR-Mode parameter in response to the UE capability message indicating support of reporting of two power headroom values for a cell. The wireless device may not transmit a UE capability message indicating support of reporting of two power headroom values for a cell. The one or more configuration parameters may not comprise the two-PHR-Mode parameter in response to the UE capability message not indicating support of reporting of two power headroom values for a cell. Starting times of the repetitions of the first PUSCH transmission may be the same. The wireless device may determine repetitions of a third PUSCH transmission in time domain overlap in time with a fourth PUSCH transmission. The fourth PUSCH transmission may comprise a second power headroom report. Each repetition of the repetitions of the third PUSCH transmission may be associated with a respective pathloss reference signal. The wireless device may determine a second pathloss reference signal associated with an earliest repetition among the repetitions of the third PUSCH transmission. The wireless device may transmit the second power headroom report comprising a second power headroom value. The second power headroom value may be determined based on the second pathloss reference signal. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive one or more configuration parameters. The one or more configuration parameters may indicate a frequency domain multiplexing (FDM) scheme for physical uplink shared channel (PUSCH) repetitions and no two power headroom report (PHR) mode that may indicate reporting of two power headroom values for a cell. The wireless device may determine repetitions of a first PUSCH transmission in frequency domain overlap in time with a second PUSCH transmission comprising a power headroom report. Each repetition of the repetitions may be associated with a respective pathloss reference signal. The wireless device may determine a pathloss reference signal associated with a first repetition among the repetitions of the first PUSCH transmission, based on the one or more configuration parameters indicating: the FDM scheme; and no UCI multiplexing mode. The wireless device may transmit the power headroom report comprising a power headroom value. The power headroom value may be determined based on the pathloss reference signal. The first repetition may have a lowest or highest starting resource block (RB) among starting RBs of the repetitions of the first PUSCH transmission. The first repetition may have a lowest or highest ending RB among ending RBs of the repetitions of the PUSCH transmission. The wireless device may receive a control message indicating activation of at least two transmission configuration indicator (TCI) states. The wireless device may transmit the first repetition with a spatial domain transmission filter determined based on a TCI state among the at least two TCI states. The transmitting the first repetition may be with a transmission power determined based on the pathloss reference signal indicated by the TCI state. The first repetition may be associated with the TCI state, among the at least two TCI states, that may be identified by a lowest or highest TCI state index among TCI state indexes of the at least two TCI states. The first repetition may be associated with the TCI state, among the at least two TCI states, that may occur first in a list of the at least two TCI states. The one or more configuration parameters may indicate at least two sounding reference signal (SRS) resource sets with codebook or non-codebook. The at least two SRS resource sets may comprise a first SRS resource set and a second SRS resource set. The one or more configuration parameters may indicate a first SRS resource set index for the first SRS resource set and a second SRS resource set index for the second SRS resource set. The first SRS resource set index may be lower than the second SRS resource set index. The first repetition may be associated with the first SRS resource set with a lower SRS resource set index. The power headroom report may be associated with a first value of an index. The first repetition may be associated with a second value of the index. The first value and the second value may be the same. The index may comprise: a transmission-and-reception point (TRP) index; a control resource set (coreset) pool index; an SRS resource set index; an antenna panel index; a capability value set index; a beam failure detection set index; a unified TCI state index; and a physical cell index (PCI). The determining the pathloss reference signal associated with the first repetition may be in response to the power headroom report and the first repetition being associated with the same value of the index. The TCI state may be associated with a PCI of a serving cell. The determining the pathloss reference signal associated with the first repetition may be in response to the TCI state being associated with the PCI of the serving cell. The TCI state may be associated with a second PCI different from a PCI of a serving cell. The determining the pathloss reference signal associated with the first repetition may be in response to the TCI state being associated with the second PCI different from the PCI of the serving cell. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may determine a first physical uplink shared channel (PUSCH) transmission associated with at least two transmission configuration indicator (TCI) states overlap in time with a second PUSCH transmission comprising a power headroom report. The wireless device may determine a pathloss reference signal indicated by a TCI state, among the at least two TCI states of the first PUSCH transmission, with a lowest TCI state index among TCI state indexes of the at least two TCI states. The wireless device may transmit the power headroom report comprising a power headroom value determined based on the pathloss reference signal. The wireless device may receive one or more messages comprising one or more configuration parameters. The at least two TCI states may comprise a first TCI state and a second TCI state. The one or more configuration parameters may indicate a spatial domain multiplexing (SDM) scheme. The wireless device may transmit, in a time slot, the first PUSCH transmission based on the first TCI state; and the second TCI state. The one or more configuration parameters may indicate a single frequency network (SFN) for uplink transmissions. The wireless device may transmit one or more first layers of the first PUSCH transmission based on the first TCI state of the at least two TCI states, and may transmit one or more second layers of the first PUSCH transmission based on the second TCI state of the at least two TCI states. The wireless device may receive downlink control information (DCI) scheduling the first PUSCH transmission. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may receive downlink control information (DCI) scheduling an uplink transmission in a transmission occasion. One or more first layers of the uplink transmission may be associated with a first transmission configuration indicator (TCI) state identified by a first TCI state index, and one or more second layers of the uplink transmission may be associated with a second TCI state identified by a second TCI state index. The wireless device may determine that a total transmission power of a plurality of uplink transmissions in the transmission occasion exceeds a maximum transmit power. The plurality of uplink transmissions may comprise the uplink transmission. The wireless device may prioritize the one or more first layers of the uplink transmission based on: the determining; and the first TCI state index of the first TCI state of the one or more first layers being lower than the second TCI state index of the second TCI state of the one or more second layers. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may determine a total transmission power of a plurality of uplink transmissions in a transmission occasion exceeds a maximum transmit power. The plurality of uplink transmissions may comprise a first repetition of an uplink transmission and a second repetition of the uplink transmission. The first repetition may be associated with a first transmission configuration indicator (TCI) state identified by a first TCI state index. The second repetition may be associated with a second TCI state identified by a second TCI state index. The wireless device may prioritize a repetition, among the first repetition and the second repetition of the uplink transmission, associated with a TCI state with a lowest TCI state index among the first TCI state index and the second TCI state index, based on the determining. The wireless device may determine the total transmission power based on a summation of linear value of each transmission power of a plurality of transmission powers of the plurality of uplink transmissions. Each transmission power of the plurality of transmission powers may be associated with a respective uplink transmission of the plurality of uplink transmissions. The wireless device may determine a plurality of adjusted transmission powers for the plurality of uplink transmissions based on the total transmission power exceeding the maximum transmit power. Each adjusted transmission power of the plurality of adjusted transmission powers may be associated with a respective uplink transmission of the plurality of uplink transmissions. The determining the plurality of adjusted transmission powers may be based on power priorities of the plurality of uplink transmissions. Each uplink transmission of the plurality of uplink transmissions may be associated with a respective power priority of the power priorities. The wireless device may determine a total adjusted transmission power based on a summation of linear value of each adjusted transmission power of the plurality of adjusted transmission powers. The total adjusted transmission power of the plurality of uplink transmissions in the transmission occasion may not exceed the maximum transmit power. The wireless device may determine: a first transmission power of the plurality of transmission powers based on one or more first power control parameters indicated by the first TCI state; and a second transmission power of the plurality of transmission powers based on one or more second power control parameters indicated by the second TCI state. The repetition may be the first repetition based on the first TCI state index of the first TCI state being lower than the second TCI state index of the second TCI state. The repetition may be the second repetition based on the second TCI state index of the second TCI state being lower than the first TCI state index of the first TCI state. The prioritizing the first repetition may comprise: allocating transmission power to the first repetition of the uplink transmission before the second repetition of the uplink transmission; reducing transmission power of the second repetition of the uplink transmission; adjusting transmission power of the second repetition of the uplink transmission; or scaling transmission power of the second repetition of the uplink transmission. The wireless device may determine a second adjusted transmission power of the second repetition based on the prioritizing the first repetition. The plurality of adjusted transmission powers may comprise the second adjusted transmission power. The second adjusted transmission power may be zero. The wireless device may transmit the first repetition with the first transmission power. The wireless device may drop transmission of the second repetition based on the second adjusted transmission power being equal to zero. The second adjusted transmission power may be less than the second transmission power. The wireless device may transmit the first repetition with the first transmission power and the second repetition with the second adjusted transmission power. The wireless device may not determine a first adjusted transmission power of the first repetition based on the prioritizing the first repetition. The wireless device may not reduce the first transmission power of the first repetition based on the prioritizing the first repetition. The plurality of uplink transmissions may overlap in time. The uplink transmission may be a physical uplink shared channel (PUSCH) transmission or a physical uplink control channel (PUCCH) transmission. The wireless device may receive one or more messages comprising one or more configuration parameters. The one or more configuration parameters may indicate a first priority index for the first repetition and a second priority index for the second repetition. The wireless device may receive downlink control information (DCI) scheduling the uplink transmission. The DCI may indicate a first priority index for the first repetition of the uplink transmission and a second priority index for the second repetition of the uplink transmission. The first priority index and the second priority index may be the same. The first repetition of the uplink transmission and the second repetition of the uplink transmission may comprise a same uplink control information (UCI) type. The plurality of uplink transmissions may be for one or more cells. The plurality of uplink transmissions may be in a frequency range. The one or more configuration parameters may indicate a frequency domain multiplexing (FDM) repetition scheme. The prioritizing may be in response to the one or more configuration parameters indicating the FDM repetition scheme. The first repetition and the second repetition may overlap in time and may not overlap in frequency. The one or more configuration parameters may indicate at least two sounding reference signal (SRS) resource sets with codebook or non-codebook. The first repetition may be associated with a first SRS resource set of the at least two SRS resource sets, and the second repetition may be associated with a second SRS resource set of the at least two SRS resource sets. The wireless device may transmit the first repetition based on a first SRS resource in the first SRS resource set, and may transmit the second repetition based on a second SRS resource in the second SRS resource set. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may determine a total transmission power of a plurality of uplink transmissions in a transmission occasion exceeds a maximum transmit power. The plurality of uplink transmissions may comprise repetitions of an uplink transmission in a frequency domain. The wireless device may prioritize a repetition among the repetition of the uplink transmission, based on the determining. The prioritizing the repetition may be in response to the repetition being associated with a coreset pool index that may be equal to a first value. The first value may be equal to zero. The repetition may be associated with a transmission configuration indicator (TCI) state. The prioritizing the repetition may be in response to the repetition being associated with the TCI state with a lowest TCI state index among TCI state indexes of TCI states associated with the repetitions of the uplink transmission. The prioritizing the repetition may be in response to the TCI state being associated a physical cell index (PCI) of a serving cell. The repetition may have a lowest or highest starting resource block (RB) among starting RBs of the repetitions of the uplink transmission. The repetition may have a lowest or highest ending RB among ending RBs of the repetitions of the uplink transmission. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

A wireless device may perform a method comprising multiple operations. A wireless device may determine a total transmission power of a plurality of uplink transmissions in a transmission occasion exceeds a maximum transmit power. The plurality of uplink transmissions may comprise an uplink transmission associated with at least two transmission configuration indicator (TCI) states. The wireless device may prioritize a part of the uplink transmission that may be associated with a TCI state of the at least two TCI states, based on the determining. One or more first layers of the uplink transmission may be associated with a first TCI state of the at least two TCI states, and one or more second layers of the uplink transmission may be associated with a second TCI state of the at least two TCI states. The wireless device may comprise one or more processors and memory, storing instructions, that when executed by the one or more processors perform the method described herein. A system may comprise the wireless device configured to perform the described method, additional operations, and/or include the additional elements; and a base station configured to communicate with the wireless device. A computer-readable medium may store instructions that, when executed, cause performance of the described method, additional operations, and/or include additional elements. A base station may perform a corresponding method comprising multiple operations. The base station may perform a corresponding method, for example, by communicating with the wireless device.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, 6G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
receiving, by a wireless device, one or more configuration parameters associated with frequency domain repetition of physical uplink shared channel (PUSCH) transmission;
receiving downlink control information (DCI), wherein the DCI:
comprises a channel state information (CSI) request field indicating transmission of a CSI report; and
schedules frequency domain repetitions of a PUSCH transmission, wherein the frequency domain repetitions comprise a first repetition in a first frequency range overlapping in time with a second repetition in a second frequency range; and
based on the first repetition being associated with a value satisfying a criteria, transmitting the CSI report in the first repetition.

2. The method of claim 1, wherein the transmitting the CSI report in the first repetition is further based on at least one of:
the one or more configuration parameters comprising a CSI multiplexing mode parameter that is not enabled; or
the one or more configuration parameters not comprising a CSI multiplexing mode parameter.

3. The method of claim 1, wherein:
each repetition, of the frequency domain repetitions, is associated with a respective value of a plurality of values, wherein the plurality of values comprises the value satisfying the criteria;
the criteria comprises a determination of a lowest value, or a highest value, of the plurality of values; and
the value associated with the first repetition indicates at least one of:
a frequency;
a resource block value;
a transmission configuration indicator (TCI) state;
a TCI state index;
a sounding reference signal (SRS) resource set;
a control resource set (CORESET) pool index;
a transmission and reception point (TRP) index;
an antenna panel; or
an antenna panel index.

4. The method of claim 1, further comprising transmitting the second repetition in a same time period as the first repetition, wherein the CSI report is multiplexed in the first repetition, and wherein the CSI report is not multiplexed in the second repetition.

5. The method of claim 1, wherein the CSI report comprises at least one of:
an aperiodic CSI report; or
a semi-persistent CSI report.

6. The method of claim 1, wherein the CSI request field comprises information for scheduling transmission of the CSI report.

7. The method of claim 1, further comprising transmitting each of the frequency domain repetitions, of the PUSCH transmission, in a plurality of transmission occasions in different frequency ranges and overlapping in time, wherein each repetition of the frequency domain repetitions of the PUSCH transmission is transmitted, by the wireless device, in a respective transmission occasion of the plurality of transmission occasions.

8. The method of claim 1, further comprising:
receiving second DCI configured to schedule:
transmission of a second CSI report; and
frequency domain repetitions of a second PUSCH transmission; and
transmitting, based on a CSI multiplexing mode parameter being enabled, the second CSI report in each of the frequency domain repetitions of the second PUSCH transmission.

9. A method comprising:
receiving, by a wireless device, one or more configuration parameters associated with frequency domain repetition of physical uplink shared channel (PUSCH) transmission, wherein the one or more configuration parameters comprise a channel state information (CSI) multiplexing mode parameter;
receiving downlink control information (DCI) scheduling frequency domain repetitions of a PUSCH transmission, wherein the frequency domain repetitions comprise a first repetition in a first frequency range overlapping in time with a second repetition in a second frequency range; and
based on the one or more configuration parameters indicating that CSI multiplexing is not enabled, transmitting a CSI report in one of the first repetition or the second repetition, wherein selection of the first repetition or the second repetition for the transmitting the CSI report is based on an index, associated with one of the first repetition or the second repetition, satisfying a criteria.

10. The method of claim 9, wherein the DCI further comprises a CSI request field for scheduling transmission of the CSI report.

11. The method of claim 9, wherein:
each repetition, of the frequency domain repetitions, is associated with a respective index of a plurality of indexes, wherein the plurality of indexes comprises the index satisfying the criteria;
the transmitting the CSI report is in the first repetition based on an index associated with the first repetition being a lowest index, or a highest index, of the plurality of indexes;
the criteria comprises a determination of the lowest index, or the highest index, of the plurality of indexes; and
the index satisfying the criteria comprises at least one of:
a TCI state index; or
an antenna panel index.

12. The method of claim 9, further comprising transmitting the second repetition in a same time period as the first repetition, wherein the CSI report is multiplexed in the first repetition, and wherein the CSI report is not multiplexed in the second repetition.

13. The method of claim 9, wherein the CSI report comprises at least one of:
an aperiodic CSI report; or
a semi-persistent CSI report.

14. The method of claim 9, further comprising transmitting each of the frequency domain repetitions, of the PUSCH transmission, in a plurality of transmission occasions in different frequency ranges and overlapping in time, wherein each repetition of the frequency domain repetitions of the PUSCH transmission is transmitted, by the wireless device, in a respective transmission occasion of the plurality of transmission occasions.

15. The method of claim 9, further comprising:
receiving an indication of a change of the CSI multiplexing mode parameter from being not enabled to being enabled;
after receiving the indication of the change of the CSI multiplexing mode parameter, receiving second DCI scheduling:
transmission of a second CSI report; and
frequency domain repetitions of a second PUSCH transmission; and
transmitting, based on the CSI multiplexing mode parameter being enabled, the second CSI report in each of the frequency domain repetitions of the second PUSCH transmission.

16. A method comprising:
transmitting, by a base station, one or more configuration parameters associated with frequency domain repetition of physical uplink shared channel (PUSCH) transmission, wherein the one or more configuration parameters comprise a channel state information (CSI) multiplexing mode parameter;
transmitting downlink control information (DCI) scheduling frequency domain repetitions of a PUSCH transmission, wherein the frequency domain repetitions comprise a first repetition in a first frequency range overlapping in time with a second repetition in a second frequency range; and
based on the one or more configuration parameters indicating that CSI multiplexing is not enabled, receiving a CSI report in one of the first repetition or the second repetition, wherein reception of the CSI report in the first repetition or in the second repetition is based on an index, associated with one of the first repetition or the second repetition, satisfying a criteria.

17. The method of claim 16, wherein:
each repetition, of the frequency domain repetitions, is associated with a respective index of a plurality of indexes;
the receiving the CSI report is in the first repetition based on an index associated with the first repetition being a lowest index, or a highest index, of the plurality of indexes;
the criteria comprises a determination of the lowest index, or the highest index, of the plurality of indexes; and
the index associated with the first repetition comprises at least one of:
a TCI state index; or
an antenna panel index.

18. The method of claim 16, further comprising receiving the second repetition in a same time period as the first repetition, wherein the CSI report is multiplexed in the first repetition, and wherein the CSI report is not multiplexed in the second repetition.

19. The method of claim 16, further comprising receiving each of the frequency domain repetitions, of the PUSCH transmission, in a plurality of reception occasions in different frequency ranges and overlapping in time, wherein each repetition of the frequency domain repetitions of the PUSCH transmission is received, by the base station, in a respective reception occasion of the plurality of reception occasions.

20. The method of claim 16, further comprising:
transmitting an indication of a change of the CSI multiplexing mode parameter from being not enabled to being enabled;

after transmitting the indication of the change of the CSI multiplexing mode parameter, transmitting second DCI configured to schedule:
  transmission of a second CSI report; and
  frequency domain repetitions of a second PUSCH transmission; and
receiving, based on the CSI multiplexing mode parameter being enabled, the second CSI report in each of the frequency domain repetitions of the second PUSCH transmission.

* * * * *